(12) United States Patent
Zalewski et al.

(10) Patent No.: US 10,924,144 B2
(45) Date of Patent: Feb. 16, 2021

(54) WIRELESS CODED COMMUNICATION (WCC) DEVICES WITH POWER HARVESTING POWER SOURCES

(71) Applicants: Gary M. Zalewski, Piedmont, CA (US); Albert S. Penilla, Sunnyvale, CA (US)

(72) Inventors: Gary M. Zalewski, Piedmont, CA (US); Albert S. Penilla, Sunnyvale, CA (US)

( * ) Notice: Subject to any disclaimer, the term of this patent is extended or adjusted under 35 U.S.C. 154(b) by 0 days.

(21) Appl. No.: 16/729,209

(22) Filed: Dec. 27, 2019

(65) Prior Publication Data

US 2020/0244297 A1 Jul. 30, 2020

Related U.S. Application Data

(63) Continuation of application No. 16/512,376, filed on Jul. 16, 2019, now Pat. No. 10,848,192, and a
(Continued)

(51) Int. Cl.
*H04B 1/38* (2015.01)
*H04B 1/3827* (2015.01)
(Continued)

(52) U.S. Cl.
CPC ....... *H04B 1/3833* (2013.01); *G06Q 30/0635* (2013.01); *H02N 11/002* (2013.01); *H04L 67/10* (2013.01); *H04W 4/70* (2018.02); *H04W 4/80* (2018.02); *H04W 76/14* (2018.02); *H04B 1/1607* (2013.01); *H04L 67/12* (2013.01);
(Continued)

(58) Field of Classification Search
CPC combination set(s) only.
See application file for complete search history.

(56) References Cited

U.S. PATENT DOCUMENTS 9,948,902 B1* 4/2018 Trundle ................. H04N 7/183
2011/0260839 A1* 10/2011 Cook ................. G06K 19/0708
340/10.4

(Continued)

*Primary Examiner* — Junpeng Chen

(57) ABSTRACT

Energy harvesting Internet of Things (IOT) devices are shown including configurations involving a persistent memory, microcontroller, and flat antenna for electromagnetic RF harvesting. In one embodiment, multiple cycles of energy harvesting are performed by an IOT device, where power harvested via the flat antenna is transferred to a power storage of the device such that when the power storage has an amount of power the microcontroller performs processing resulting in state data stored to persistent memory, then during an additional cycle or cycles of energy harvesting, the device completes a process resulting in a payload that is sent to an end node via wireless transmission. Additional energy harvesting may be provided via an energy harvesting input that provides device input and causes additional energy for harvesting. Configurations include ones where energy harvesting is performed by the device, based on capturing vocal energy from a human voice spoken to the device. Configurations also include IOT devices coupled to cloud processing and cloud storage, cloud IOT device state setting, cloud IOT device state getting, cloud provisioning, etc.

20 Claims, 41 Drawing Sheets

Related U.S. Application Data continuation of application No. 15/382,760, filed on Dec. 19, 2016, which is a continuation of application No. 15/217,972, filed on Jul. 23, 2016, now Pat. No. 10,142,822, said application No. 15/382,760 is a continuation of application No. 15/376,636, filed on Dec. 12, 2016, now Pat. No. 9,911,290.

(60) Provisional application No. 62/387,403, filed on Dec. 24, 2015, provisional application No. 62/197,003, filed on Jul. 25, 2015.

(51) Int. Cl.
| | | |
|---|---|---|
| *H04W 76/14* | (2018.01) | |
| *H04W 4/80* | (2018.01) | |
| *H04W 4/70* | (2018.01) | |
| *H02N 11/00* | (2006.01) | |
| *H04L 29/08* | (2006.01) | |
| *G06Q 30/06* | (2012.01) | |
| *H04W 84/12* | (2009.01) | |
| *H04W 88/06* | (2009.01) | |
| *H04W 4/50* | (2018.01) | |
| *H04B 1/16* | (2006.01) | |
| *H04W 88/02* | (2009.01) | |

(52) U.S. Cl.
CPC ............. *H04L 67/125* (2013.01); *H04W 4/50* (2018.02); *H04W 84/12* (2013.01); *H04W 88/02* (2013.01); *H04W 88/06* (2013.01); *Y02D 30/70* (2020.08); *Y04S 40/18* (2018.05)

(56) References Cited

U.S. PATENT DOCUMENTS

| | | | |
|---|---|---|---|
| 2013/0121176 A1* | 5/2013 | Addepalli | H04L 67/12 370/252 |
| 2015/0249787 A1* | 9/2015 | Hall | G01S 5/02 348/372 |
| 2016/0323689 A1* | 11/2016 | Goluboff | H04W 12/06 |
| 2017/0025857 A1* | 1/2017 | Matthews | H02J 50/40 |
| 2018/0159954 A1* | 6/2018 | Lu | H04L 67/34 |

* cited by examiner

Dynamic Local Cloud (DLC) Group Registered Members

| IOTs | Description | Registered |
|---|---|---|
| IOT1 | Refrigerator | DLC ID1 |
| IOT2 | Toaster | DLC ID2 |
| IOT3 | Television | DLC ID3 |
| IOT4 | Hand held device | DLC ID4 |
| IOT5 | Router | DLC ID5 |
|  |  |  |

FIG. 1C-1

Device Configurations

| Registered | Memory | Processor | Firmware/OS | DLC Enable | Share Memory | Share Processor |
|---|---|---|---|---|---|---|
| DLC ID1 | 500MB | 100 MHz | GE R.2.56 | Yes | < 10% | < 30% |
| DLC ID2 | 100MB | 50 MHz | LG H.5.8 | No | N/A | N/A |
| DLC ID3 | 100GB | 1 GHz | VISIO.7.51 | Yes | < 20% | < 40% |
| DLC ID4 | 500GB | 4 GHz | iOS 12.3 | Yes | < 10% | < 20% |
| DLC ID5 | 100GB | 500 MHz | CISC.J.87 | Yes | < 5% | < 5% |
|  |  |  |  |  |  |  |

FIG. 1C-2

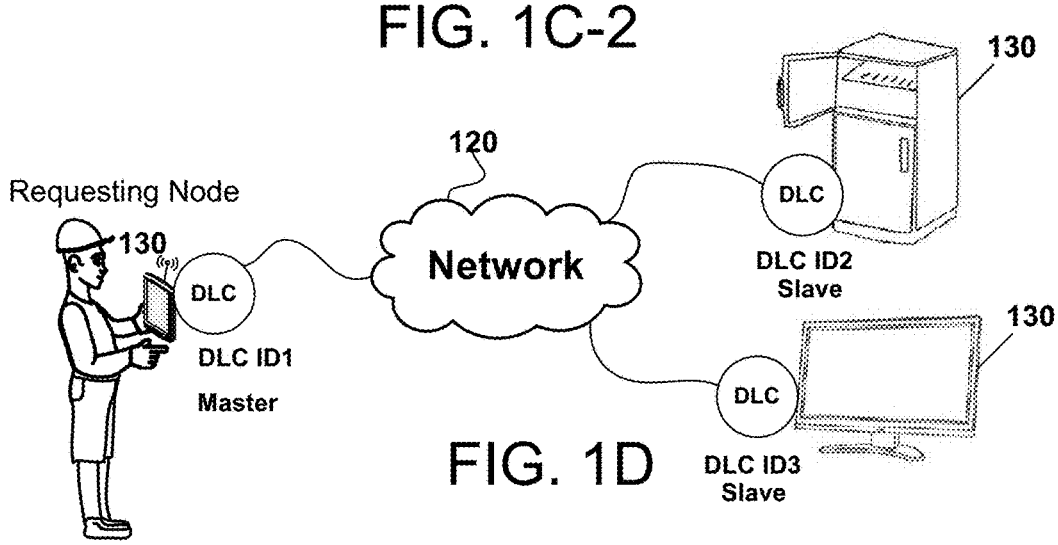

FIG. 1D

**Dynamic Local Cloud (DLC) Group
Registered Members**

| IOTs | Description | Registered | IP Addr | SSID | Role |
|---|---|---|---|---|---|
| IOT1 | WCC 1 | DLC ID1 | 192.168.55.75 | BTHomehub1-1xyz | Master |
| IOT2 | Refrigerator | DLC ID2 | 192.168.55.7 | BTHomehub1-1xyz | Slave |
| IOT3 | Television | DLC ID3 | 192.168.55.10 | BTHomehub1-1xyz | Slave |

FIG. 1E

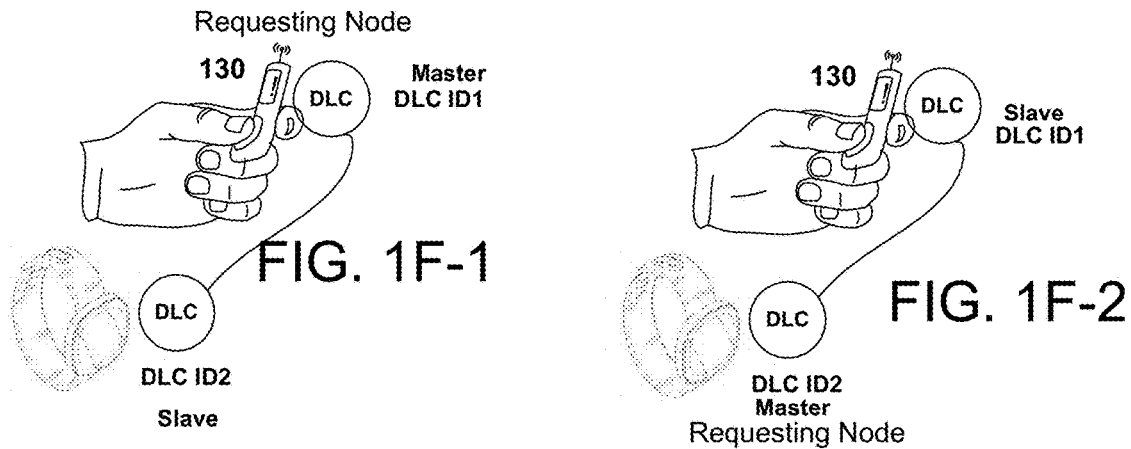

**Dynamic Local Cloud (DLC) Group
Registered Members   Peer-to-Peer**

| IOTs | Description | Registered | IP Addr | SSID | Role |
|---|---|---|---|---|---|
| IOT1 | WCC 1 | DLC ID1 | - | P2P | Master |
| IOT2 | Watch | DLC ID2 | - | P2P | Slave |

FIG. 1G-1

**Dynamic Local Cloud (DLC) Group
Registered Members   Peer-to-Peer**

| IOTs | Description | Registered | IP Addr | SSID | Role |
|---|---|---|---|---|---|
| IOT1 | WCC 1 | DLC ID1 | - | P2P | Slave |
| IOT2 | Watch | DLC ID2 | - | P2P | Master |

FIG. 1G-2

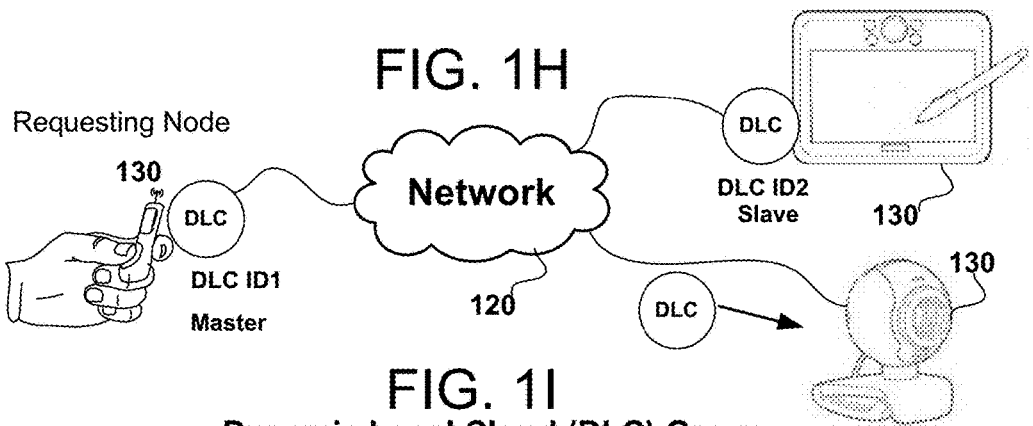

Dynamic Local Cloud (DLC) Group
Discovery + Pairing

| IOTs | Description | Registered | IP Addr | SSID | Role |
|------|-------------|------------|---------------|-----------------|--------|
| IOT1 | WCC 1       | DLC ID1    | 192.168.55.61 | BTHomehub1-1xyz | Master |
| IOT2 | Tablet      | DLC ID2    | 192.168.55.9  | BTHomehub1-1xyz | Slave  |
| IOT3 | Unknown     | N/A        | 87.1.43.1     | Unsecured       | N/A    |

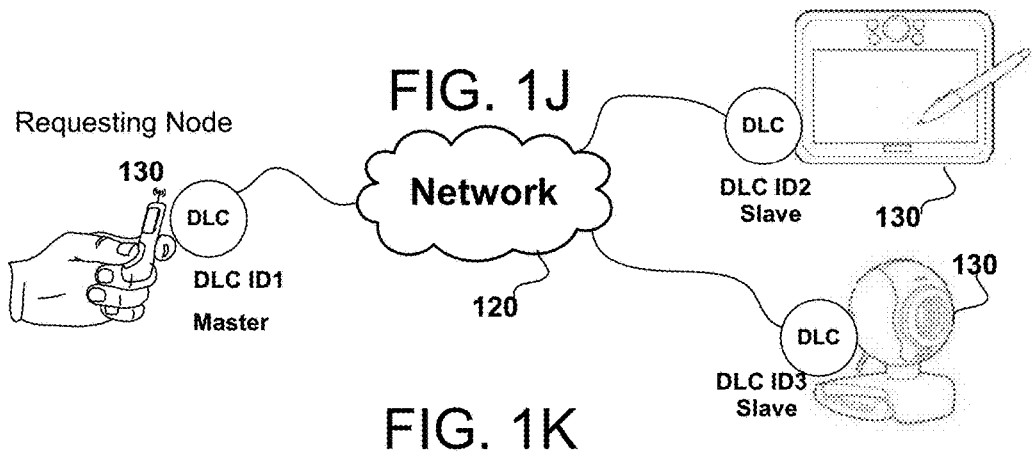

Dynamic Local Cloud (DLC) Group
Registered Members

|      | Description     | Registered | IP Addr       | SSID            | Role   |
|------|-----------------|------------|---------------|-----------------|--------|
| IOT1 | WCC 1           | DLC ID1    | 192.168.55.61 | BTHomehub1-1xyz | Master |
| IOT2 | Tablet          | DLC ID2    | 192.168.55.9  | BTHomehub1-1xyz | Slave  |
| IOT3 | Wireless Camera | DLC ID3    | 192.168.55.62 | BTHomehub1-1xyz | Slave  |

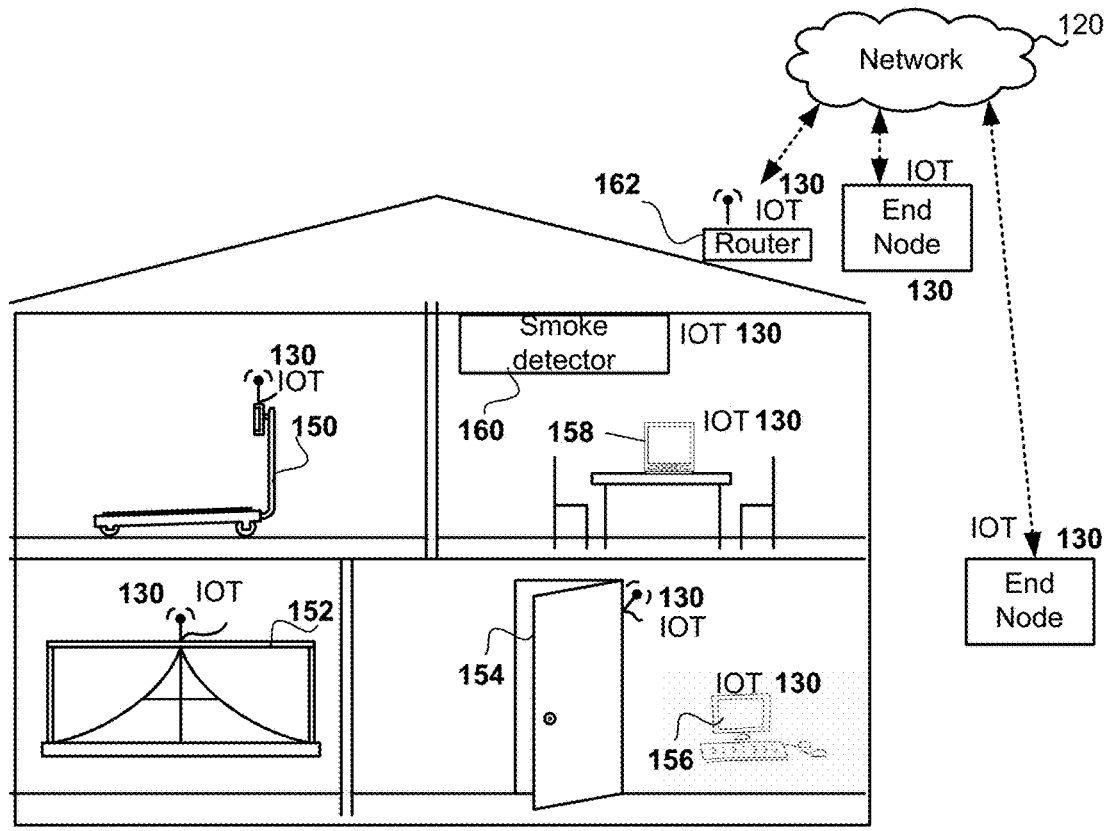

FIG. 1L

Dynamic Local Cloud (DLC) Group Registered Members

| | Description | Registered | IP Addr | SSID | Role |
|---|---|---|---|---|---|
| IOT1 | Treadmill | DLC ID1 | 192.168.55.61 | BTHomehub1-1xyz | Slave |
| IOT2 | Window shade | DLC ID2 | 192.168.55.9 | BTHomehub1-1xyz | Slave |
| IOT3 | Door WCC | DLC ID3 | 192.168.55.62 | BTHomehub1-1xyz | Slave |
| IOT4 | Smoke Detector | DLC ID4 | 192.168.55.3 | BTHomehub1-1xyz | Slave |
| IOT5 | Router | DLC ID5 | 192.168.55.1 | BTHomehub1-1xyz | Slave |
| IOT6 | Television | DLC ID6 | 192.168.55.2 | BTHomehub1-1xyz | Slave |
| IOT7 | Computer | DLC ID7 | 192.168.55.10 | BTHomehub1-1xyz | Master |

- 2210 — Request IOTs from a network to establish a DLC group to process a task
- 2212 — Identify IOTs that are available to join a DLC group
- 2214 — Identify security level for the task
- 2216 — Filter IOTs capable of operating under the identified security level
- 2218 — Assemble DLC group to process the task using the identified security level

FIG. 22C

- 2210 — Request IOTs from a network to establish a DLC group to process a task
- 2212 — Identify IOTs that are available to join a DLC group
- 2214 — Identify security level for the task
- 2220 — Instruct IOTs to switch to the identified security level while processing the task
- 2222 — Assemble DLC group to process the task using the identified security level

FIG. 22D

- 2224 — Identify IOTs from a set of available IOTs to process a task
- 2226 — Assemble a group of IOTs from the available IOTs to define a DLC group
- 2228 — Define a security level for the task
- 2230 — Communicate the security level to each of the IOTs, the security level being applied before processed data is exchanged
- 2232 — Process the task using the security level

FIG. 22E

- 2234 — Identify connections between IOTs
- 2236 — Select security level for processing a task
- 2238 — Query IOTs to identify available security levels settable by the IOTs
- 2240 — Select one of the connections between IOTs capable of processing via a specific security level, the IOTs of the connection defining a DLC group
- 2242 — Process the task using the security level

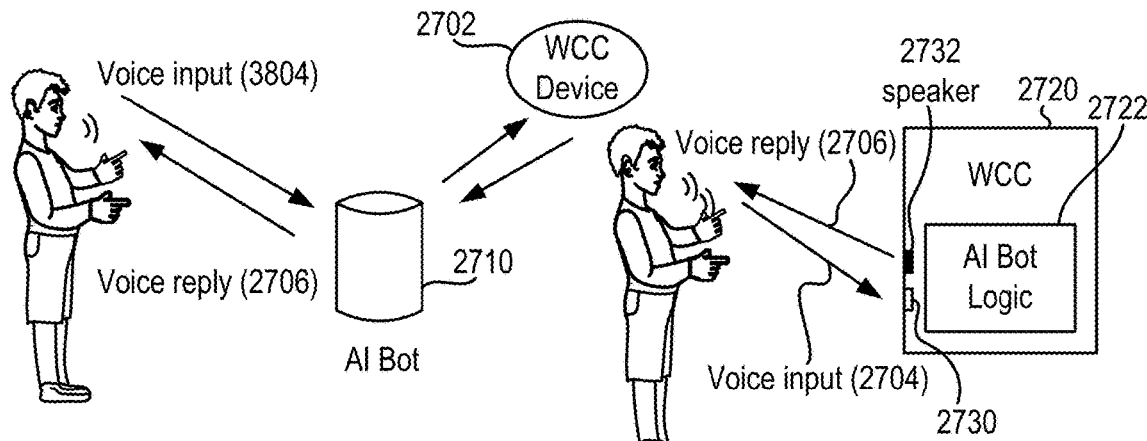
FIG. 27A
FIG. 27B
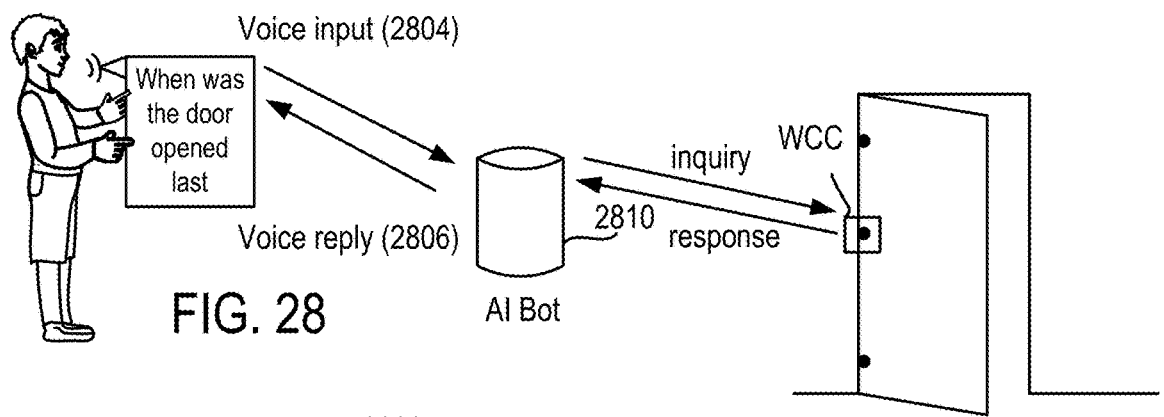
FIG. 28
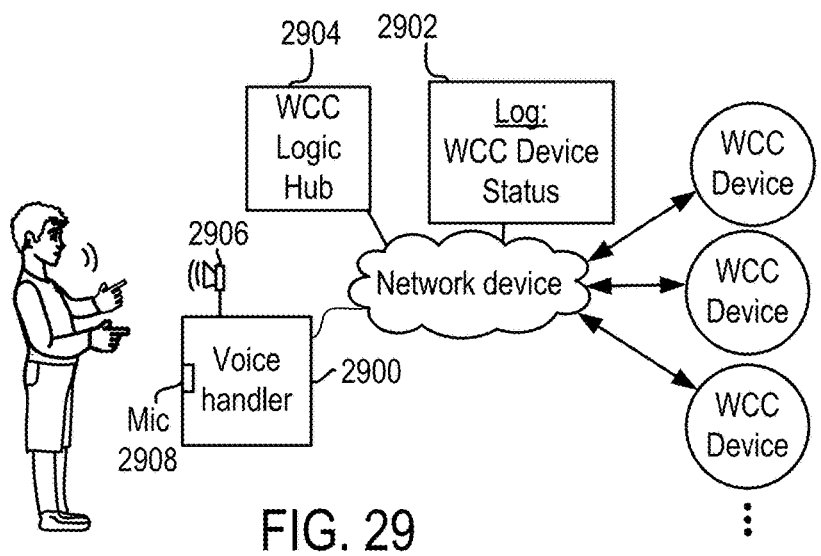
FIG. 29

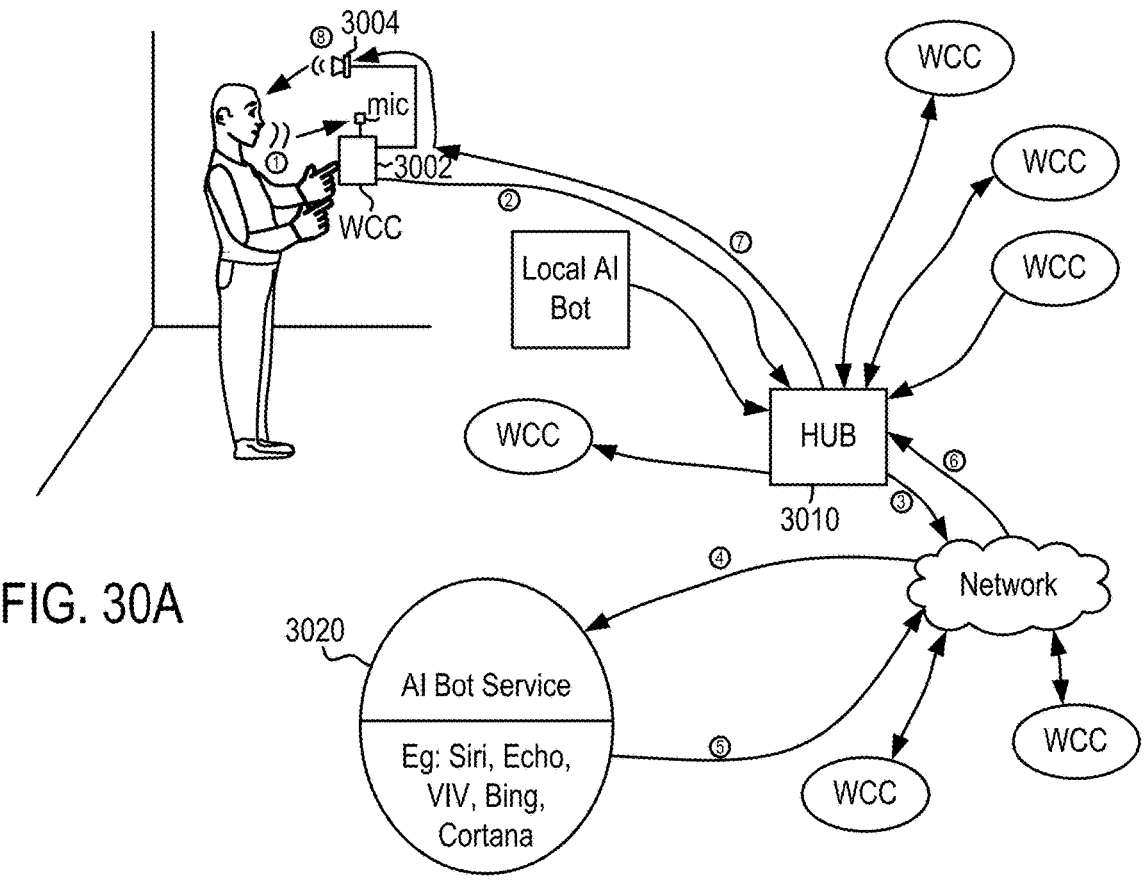
FIG. 30A
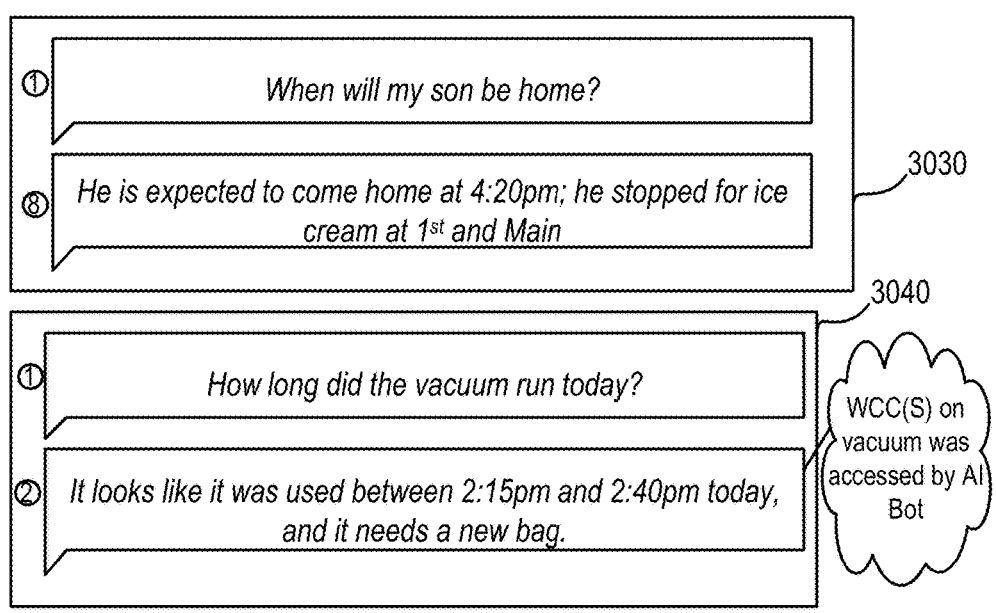
FIG. 30B
FIG. 30C

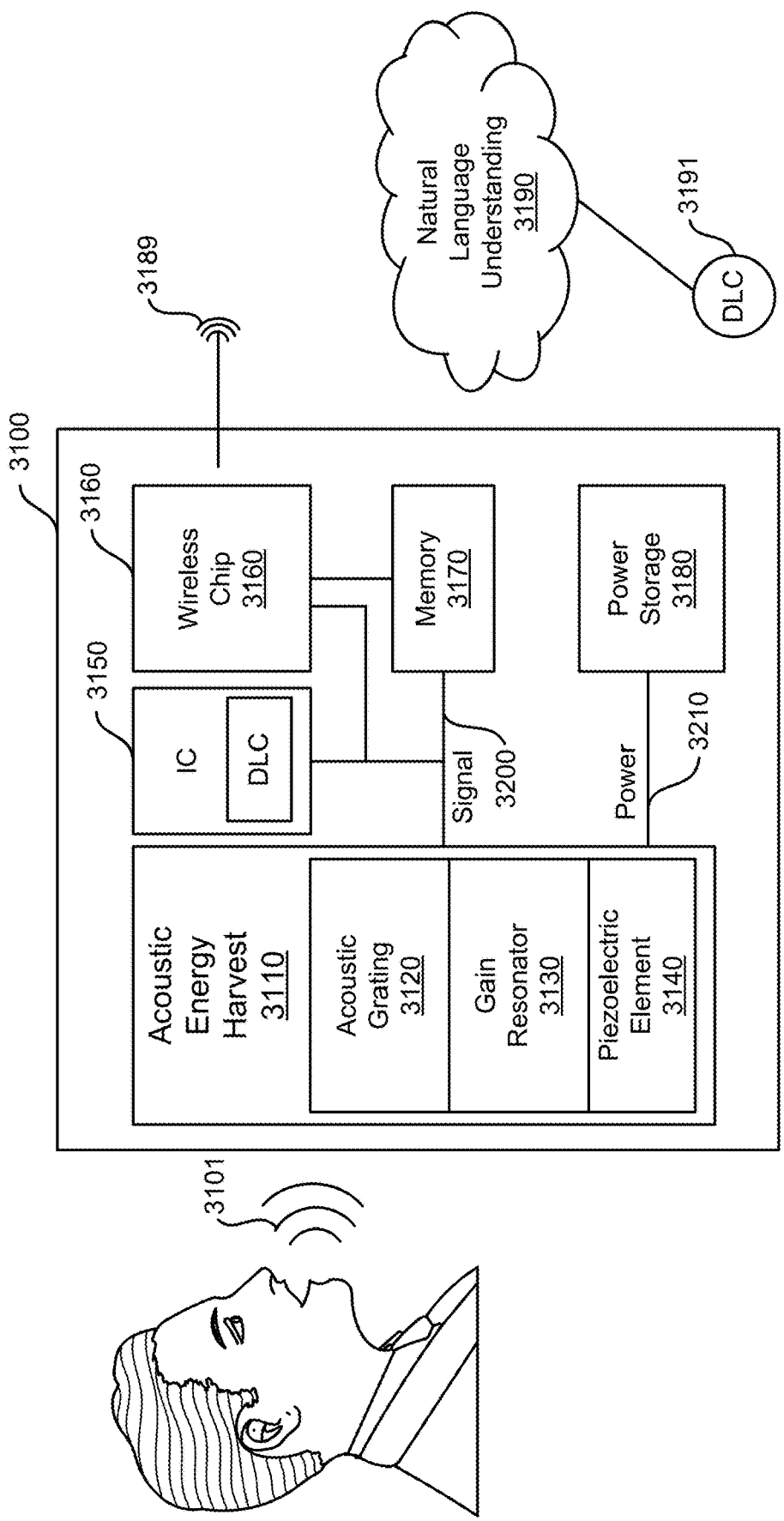

WIRELESS CODED COMMUNICATION (WCC) DEVICES WITH POWER HARVESTING POWER SOURCES

CLAIM OF PRIORITY

This application is a continuation of U.S. patent application Ser. No. 16/512,376, filed on Jul. 15, 2019, and entitled "ENERGY AWARE WIRELESS POWER HARVESTING DEVICE," which is incorporated herein by reference.

This application is a continuation of U.S. patent application Ser. No. 15/382,760, filed on Dec. 19, 2016, and entitled "SIGNALING SYSTEMS FOR WIRELESS CODED COMMUNICATION (WCC) DEVICES AND CONNECTED DEVICES," which claims priority to U.S. Provisional Patent Application No. 62/387,403, filed on Dec. 24, 2015, and entitled "SIGNALING SYSTEMS FOR WIRELESS CODED COMMUNICATION (WCC) DEVICES AND CONNECTED DEVICES," which is incorporated by reference for all purposes.

U.S. patent application Ser. No. 15/382,760 is a continuation in part of U.S. patent application Ser. No. 15/217,972, filed on Jul. 23, 2016, entitled "WIRELESS CODED COMMUNICATION (WCC) DEVICES WITH ENERGY HARVESTING POWER SOURCES TRIGGERED WITH INCIDENTAL MECHANICAL FORCES," which claims priority from U.S. Provisional Patent Application No. 62/197,003, filed on Jul. 25, 2015, and entitled "WIRELESS CODED COMMUNICATION (WCC) DEVICES AND METHODS, SYSTEMS, DEVICES USING OR IMPLEMENTING WCC DEVICES," which are incorporated herein by reference.

U.S. patent application Ser. No. 15/382,760 is a continuation in part of U.S. patent application Ser. No. 15/376,636, filed on Dec. 12, 2016, entitled "WIRELESS CODED COMMUNICATION (WCC) DEVICES FOR TRACKING RETAIL INTERACTIONS WITH GOODS AND ASSOCIATION TO USER ACCOUNTS, which is herein incorporated by reference.

FIELD OF THE EMBODIMENTS

Embodiments are described regarding devices that transmit data, including those that may also sense input, produce output, receive, process and exchange data with end-nodes or other nodes. Some devices are configured to harness power to cause or enable activation of a communication device to transmit data. The data can be pre-configured or coded to report occurrence of an event, log and even, log state, cause an action, and send a message or request data from one or more end nodes. In some embodiments, the devices may form groups of devices, which may function together to deliver processing power to a requesting device or node. The grouping, in one embodiment, produces a dynamic local cloud (DLC) group, which enables processing of some task or tasks for the requester. In some embodiments, some devices are configured with wireless access, which enables access to the Internet and further enables cloud processing on data received or processing for data returned or communicated.

BACKGROUND

Computing devices have existed for some time. Traditionally, a computing device has been designed with a specific intent or function. For instance, broader level computing devices exist for general purpose computing, e.g., desktop computers, laptop computers, smartphones, tablets or the like. Specific level computing devices also exist for special purposes computing, e.g., home appliances, office equipment, networking equipment, digital video recorders, home lighting controls, watches, and the like. Each of these devices is designed for a purpose, and in their initial design, their specification set processing parameters for its hardware and/or software. With the advent of the internet of things (IOTs), even more devices are being designed for very specialized purposes.

Although the speed at which such devices are being developed has been remarkable, the rush to produce these devices has also introduced problems with interconnectivity, security, and interoperability. This problem is compounded further as more and more companies have rushed to produce their version of IOTs, automation devices, and the like.

It is in this context that the following improvements arise.

SUMMARY

Embodiments are described with reference to devices with integrated with a wireless communication chip and integrated power generating or delivering device. In one embodiment, these devices are referred to herein as wireless coded communication (WCCs) devices. In some embodiments, WCC devices are forms of internet of things (IOT) devices.

In one embodiment, methods and systems are provided for a lighting control device for integration into a wall of a building. The lighting control device includes a switch circuit for receiving input for controlling a light of the building and a wireless chip for wirelessly communicating with an end node. Also included is a speaker and a microphone. A processor and memory are included for processing instructions for voice input received via the microphone. The voice input is a command for artificial intelligence processing by the light control device. The artificial intelligence processing is configured to use the end node for exchanging data with one or more data sources. The data sources used for retrieval of information for generating an audible response via the speaker of the lighting control device.

In one embodiment, a method for processing communication between devices and a network is provided. The method includes providing at least two internet of thing (IOT) devices. Each IOT device includes wireless circuitry, a memory interfaced with the wireless circuitry, a power storage cell and a microprocessor interfaced the wireless circuitry, the memory, and the power storage cell. The method includes executing program instructions of each of said IOTs that enable each respective IOT device to perform native duties associated with the IOT device. The method also includes executing program instructions of each of said IOTs for a resource sharing process that enables each IOT device to form a dynamic local cloud (DLC) group over a network. The DLC group is configured to collectively process a task that is additional to the native duties of the respective IOT devices. The DLC group is configured to coordinate communication between the IOT devices for sharing of information during processing of said task. At least one of the IOT devices is an energy harvesting device that harvests energy from one of a mechanical force, or an RF source, or a magnetic force, or a heat source, or a light source, or a battery source, or a chemical source, or a thermal electric source, or a combination of two or more thereof.

In some embodiments, a first of the IOTs provides a user interface for a second IOT, wherein the second IOT lacking said user interface and said second IOT provides an output, the first IOT not having a system for providing the output.

In some embodiments, a first IOT of the IOTs is configured to provide authentication processing for a second IOT of the IOTs, wherein said authentication processing is used to enable formation of said DLC group.

In some embodiments, at least one of the IOTs devices is coupled over the network to a natural language understanding (NLU) service, the NLU service is configured to receive voice input captured by one of said IOT devices and generate a response.

In some embodiments, the response is one of a confirmation to the voice input, or a question back to a user responsive to the voice input, or a result from a web service, or a status of an order placed for a good or a service, or an answer to a question, or a voice response of a status of one of the IOTs, or a voice response associated with a state or condition of one of the IOTs, a combination of two or more thereof.

In some embodiments, one or both of the IOTs is a wireless coded communication device.

In another embodiment, a system is provided. The system includes at least two internet of thing (IOT) devices. Each IOT device includes wireless circuitry, a memory interfaced with the wireless circuitry, a power storage cell and a microprocessor interfaced the wireless circuitry, the memory, and the power storage cell. The memory of each IOT device includes program instructions that enable each respective IOT device to perform native duties associated with the IOT device. The memory of each IOT device includes program instructions for a resource sharing process that enables each IOT device to form a dynamic local cloud (DLC) group over a network. The DLC group is configured to collectively process a task that is additional to the native duties of the respective IOT devices.

In some embodiments, the DLC group is configured to coordinate communication between the IOT devices, the coordinated communication providing for sharing of information during processing of said task.

In some embodiments, wherein at least one of the IOT devices is an energy harvesting device that harvests energy from one of a mechanical force, or an RF source, or a magnetic force, or a heat source, or a light source, or a battery source, or a chemical source, or a thermal electric source, or a combination of two or more thereof.

In some embodiments, a first of the IOTs provides a user interface for a second IOT, wherein the second IOT lacking said user interface.

In some embodiments, said second IOT provides an output, the first IOT not having a system for providing the output.

In some embodiments, a first IOT of the IOTs is configured to provide authentication processing for a second IOT of the IOTs, wherein said authentication processing is used to enable formation of said DLC group.

In some embodiments, any one of the IOTs that are part of the DLC group is configured to periodically poll for other IOT devices that require pairing to said network.

In some embodiments, the network is configured to provide access to the Internet, where said access provides access to a cloud processing system, said cloud processing system is configured to process instances that are configured to execute predefined functions or programs.

In some embodiments, said IOTs are defined from one or more of a wireless coded communication (WCC) device or a computing device.

In some embodiments, at least one of the IOTs devices is coupled over the network to a natural language understanding (NLU) service, the NLU service is configured to receive voice input captured by one of said IOT devices and generate a response.

In some embodiments, the response is one of a confirmation to the voice input, or a question back to a user responsive to the voice input, or a result from a web service, or a status of an order placed for a good or a service, or an answer to a question, or a voice response of a status of one of the IOTs, or a voice response associated with a state or condition of one of the IOTs, a combination of two or more thereof.

In some embodiments, the task processed by the DLC generates an output, the output is used as training data for a machine learning or deep learning process.

Broadly speaking, a WCC device is one that has or is coupled with signal wireless transmission capability (e.g., a transmitter, a transceiver, WiFi chip, Mobile Broadband, Bluetooth chip, radio communication chip, etc.), and a power supply. A WCC device will typically include an integrated circuit such as a digital microcontroller, ASIC or a programmable system on a chip and memory. A WCC device is considered to be an Internet of Things (IOT) device having memory containing state data and programming to control the operation of an underlying device, associated service or operating system.

In one embodiment, IOT or WCC devices share a portion of their resources with each other while each device also manages its own resources necessary to carry out the normal functionality associated with the device. A dynamic local cloud (DLC) may formed from at least two WCC devices. DLC clusters may share compute, storage and I/O services and coordinate the running of applications or services.

In one embodiment, the DLC service may act to register and pair new WCC and IOT devices to grow the DLC service base.

In some implementations, the DLC operates, forms or exchanges data to a sever-less, event driven, infrastructure while in other implementations, the DLC operates, forms or exchanges data with a server-based infrastructure, and then there are embodiments involving hybrid infrastructures involving both forms of network topology.

Some embodiments described herein, without limitation, relate to internet of things (IOT) devices, sensors and devices, and communication logic for interfacing IOTs, receiving data from IOTs, assembling data received from IOTs, sharing resources of IOTs, sending state data to IOTs, requesting data from select IOTs, data mining "big data" received from many IOTs, interfacing IOTs with larger systems, setting security levels for communicating with select or groups of IOTs. Also disclosed herein are systems, methods and circuitry for assembly of virtual computers using resources assembled from IOTs, cloud communication with IOTs, assembly of logic to interface with cloud resources, automated communication between IOT nodes, and integration of communication logic into IOTs. Further disclosed are systems, methods and circuitry for integration of communication logic in to standard computing devices, use of smart device, smart phones, computers, tablets, home appliances, business appliances, commercial appliances, network devices, and other electronics.

The devices described herein may be WCC devices, IOTs, hybrid devices, standards computing devices. These devices, in one embodiment, produce data from integrated sensors, and/or receive and process data requested from a requested node/computer. The data may be collected over time in databases local to computing resources, databases connected to cloud infrastructure, e.g., datacenters, or distributed in memory of individual devices. Data collected may grow over time, to form "big data," which can be data mined to identify new information, generate rules for analysis, form predictions and assist in machine learning of events, actions, functions, data sensed, and/or model data for more efficient operation of individual devices, groups of devices, or improve inter-node communication. Therefore, the embodiments described herein should be viewed broadly and not restrictive to any one specific example.

In some implementations, functions may be selected and triggered according to results of processing of the payload before, during or after transmission of the payload. In certain embodiments, the WCC device includes the capability to detect or image the identity or attribute of a user, a sound, a scene, object position, QR code, RFID code, barcode, status, temperature, pressure, absence or presence of conditions, environmental condition, vibration, and any signal or source coupled to, near or within sensing range of one or more sensors coupled to, or integrated with, a WCC device.

Embodiments include WCC and IOT devices that can operate by harvesting power from various power sources, mechanical force and other sources.

BRIEF DESCRIPTION OF THE DRAWINGS

The invention may best be understood by reference to the following description taken in conjunction with the accompanying drawings.

FIG. 1C-1 illustrates a table, showing how certain IOTs can be grouped to define a DLC group, in accordance with one embodiment.

FIG. 1C-2 illustrates an example of device configuration metrics that can be supplied by individual IOTs that are discovered, in accordance with one embodiment.

FIG. 1D illustrates an example of a user utilizing a device to access a network, to request processing power from devices that can operate DLC logic, in accordance with one embodiment.

FIG. 1E illustrates an example table showing the members of the DLC group, for the DLC group shown in FIG. 1D, in accordance with one embodiment.

FIGS. 1F-1 and 1F-2 illustrate examples of a device end node held in the hand of the user, and executing DLC logic, which is able to connect to a local device executing DLC logic, e.g., a smart watch, in accordance with some embodiments.

FIG. 1G-1 illustrates an example of the registered members of the DLC group of FIG. 1F-1, in accordance with one embodiment.

FIG. 1G-2 illustrates an example of a table showing the devices connected in peer-to-peer mode, where the watch is now acting in a master mode and the WCC device is acting in slave mode, in accordance with one embodiment.

FIG. 1H illustrates an example of DLC group having various devices connected to network, in accordance with one embodiment.

FIG. 1I shows that the tablet computer is functioning as a slave to the requesting node that is functioning as the master, in accordance with one embodiment.

FIG. 1J illustrates an example of when the camera has now been brought in to the DLC group, in accordance with one embodiment.

FIG. 1K shows has the camera is now a registered member, in accordance with one embodiment.

FIG. 1L illustrates an example of a home, having a variety of end nodes, which may be connected to a router, in accordance with one embodiment.

FIG. 1M illustrates an example of registered members of a DLC group, in accordance with one embodiment.

FIGS. 22B-22E illustrate example flowchart operation for assigned security levels for DLC groups or tasks, in accordance with one embodiment.

FIGS. 27A-27B illustrate examples of a user interfacing with an artificial intelligence (AI) bot, in accordance with some embodiments.

FIG. 28 illustrates an example of a user providing a query to the AI bot, in accordance with some embodiments.

FIG. 29 illustrates another configuration of interface by a user with a voice handler, which can be connected to a network device, in accordance with some embodiments.

FIG. 30A illustrates an example of a user interfacing with a WCC, which can function as a terminal for communicating with the hub, which in turn communicates with WCC devices over a network, in one embodiment.

FIGS. 30B and 30C illustrate examples of queries made to the WCC device at step 1, and the responses received by the user from the WCC device at step 8, in accordance with some embodiments.

FIG. 31A shows a WCC device or computing device that operates using harvested energy from sound waves to at least partially power the device and for transmission of a representation of a voice or acoustic signal for processing, in accordance with some embodiments.

DETAILED DESCRIPTION

Figure 1A:
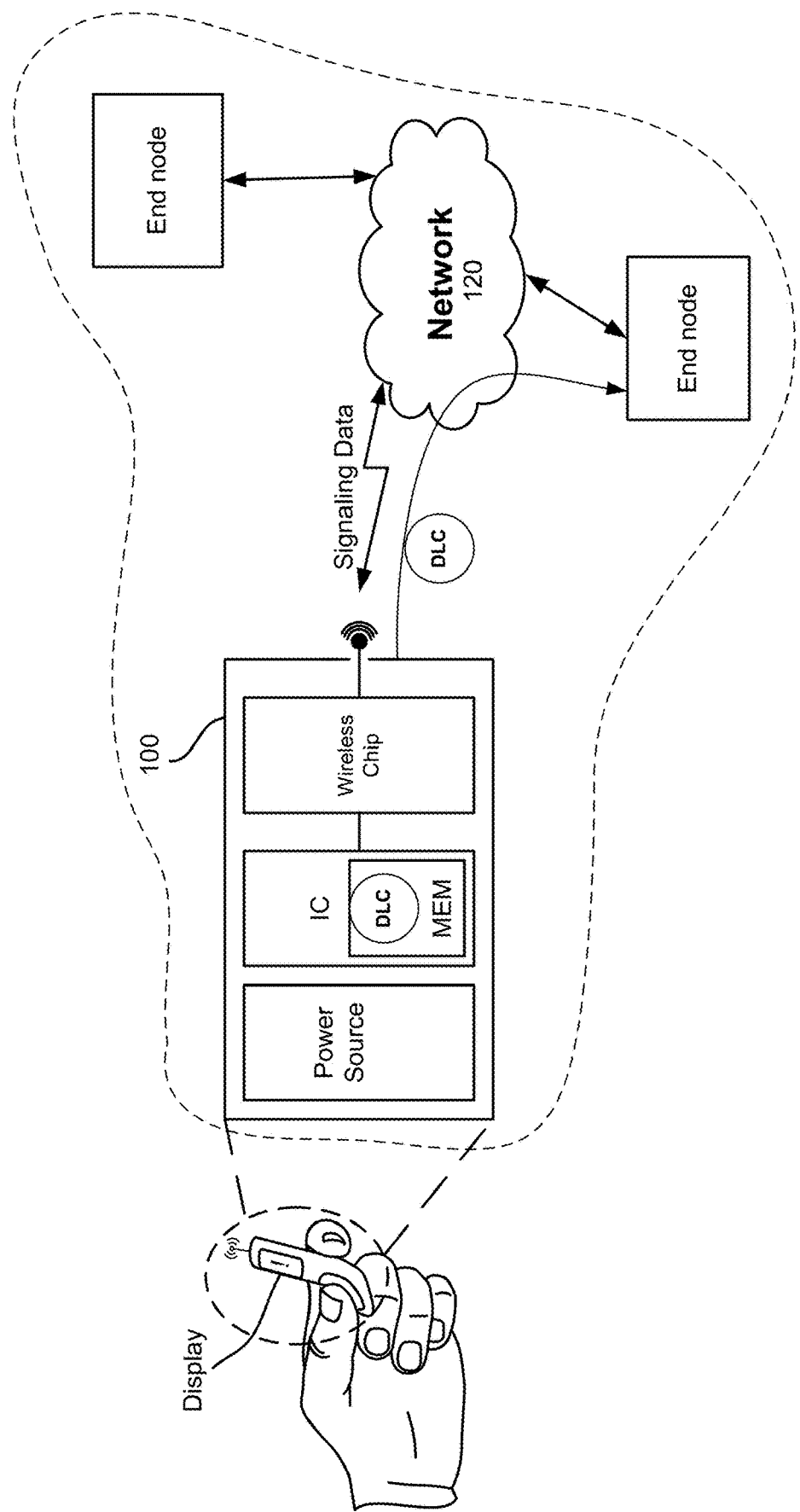
FIG. 1A illustrates one example embodiment of a WCC device, in accordance with one embodiment.

Embodiments are described for devices that can receive input, respond to or process, the input and then transmit data wirelessly to an end node. These devices may be portable, and depending on whether the device is configured for energy harvesting or is powered by a power source, these devices are capable of being integrated into any type of physical configuration. The configuration can be a device that is dedicated to receive input and send data wireless upon receiving the input. In some embodiments, the device can be integrated into physical objects, such that movement, changes in state, or changes in orientation of such physical objects trigger or causes sensing of data, position, state or location information that is then processed locally in the device or transmitted as raw data wirelessly to an end node. The end node may be another local device, may be a device that is part of a network, or may be the WCC device or other WCC devices. In one embodiment, the end node may be coupled to a network. In some embodiments, the end node may be another wireless device or a server that is part of a cloud system having access to the Internet.

As will be described in greater detail below, the devices are in some embodiments configured or paired for communication with specific network devices, which in turn provide access to the Internet. In other embodiments, the devices may connect to an ad-hoc network, such as a wireless mesh network, or other wireless network to enable access to the Internet or among the devices. The data sensed, captured, and processed by these devices can then be received by the end nodes, and based on the coded data sent to the end node, the end node can act to save the data, send the data to another device, use repeater nodes to transmit the data to other processing nodes/servers/devices, and or act in relaying the data to specific individuals (e.g., messages) and or request data from individuals or services connected to the Internet.

In some embodiments, one or more devices can be configured to operate logic for establishing a dynamic local cloud (DLC) group. A DLC group, in one embodiment is defined when at least one device that operates DLC logic initiates the establishment of a DLC group. In one embodiment, the DLC logic may be configured to execute an application, logic operations to perform a specific function, and/or logic for joining groups of DLCs to share hardware to execute a single or multiple applications. DLC logic can, in one embodiment, be defined as a container of logic that is an integrated bundle that includes an image of an operating system (OS) to be executed, an application to be executed. In one embodiment, the container can include an operating system (OS), a database, a web server, and web scripting software. In one example, the container can define a server stack. The server stack may be part of or include a WAMP stack, e.g., wherein the container includes Microsoft Windows as the operating system, Apache as the web server, MySQL as the database, and PHP, Python or PERL as the dynamic scripting languages. In server stack may be part of or include a LAMP stack, wherein Linux is the operating system, Apache is the web server, MySQL is the database (e.g., RDBMS), and PHP is the object-oriented scripting language. In some embodiments, Perl or Python can be substituted for PHP.

In one embodiment, a device that is operating a DLC, may be a device having a different primary purpose. For example, a DLC may be executed on a portable computer, a phone, a tablet, network devices (e.g., network routing, switching, storage, or server devices). In some embodiments, a DL may be integrated into a special purpose device, e.g., such as an internet of things (IOT) device. An IOT device may take on many forms, for instance, small devices found in a home, an office, a commercial environment or out in public. By way of example, IOTs may be appliances, such as refrigerators, toasters, coffee makers, ovens, microwaves, garbage disposals, trash compactors, copy machines, fax machines, telephone systems, smoke alarms, thermostats, light switches, hubs, switches, light bulbs, door knobs, door latches, digital video recorders (DVRs), televisions, computers, lamps, web cameras, motion sensors, etc. These IOTs share one function, which is the ability to process at least one operation. In one embodiment, an IOT may include a processor, special purpose processor, a microcontroller, a digital signal processor (DSP), an application specific integrated circuit (ASIC), an FPGA, or general logic gates. An IOT may also include memory, which stores data that is processed by the processing component of the IOT. The IOT may also include software, logic, firmware, or instructions that are processed, e.g., to enable processing by the IOT.

In some embodiments, the hardware (e.g., processor/processing logic and/or memory) may not always be utilized. One embodiment described herein, is the ability to install a DLC on an IOT, wherein the IOT can then process a function desired by the DLC. For instance, the function desired by a DLC may be specific to the programmer's desire. In one example, a device executing a DLC may be executing a DNA sequencing task. This device may, for example, need more processing power. The DLC may reach out to other devices that may be local, to establish a DLC group (e.g., to gain access to their processing power for a shared period of time). In one embodiment, the device executing the DNA sequencing task may discover local devices, and send requests to such other local devices to install a DLC or if they already are executing a DLC, the other devices can lend processing power to the requesting device.

In one configuration, the container of the DLC may also include a container manager. A container manager, for example, is code that runs on the IOT so that the container can be executed. The container manager may, in some embodiments, be installed separately on the IOT. The container manager may, for example, be included in specific firmware updates. In one example, a home appliance may be configured to execute a specific task, e.g., the native task of the home appliance. The home appliance, being an IOT, is provided with network access. In some embodiments, the manufacturer of the appliance can provide options of firmware that include a container manager, such as to enable the appliance to share some, part or all of its unused processing power. Thus, when a DLC is installed on the appliance, the firmware already has the container manager to enable processing of the DLC tasks. As noted, the container manager may alternatively be included with the DLC, so no firmware updates are required by the IOT that is hosting processing of a task or tasks.

In some embodiments, the requesting device can be an IOT, which itself is operating a DLC. It should be understood that a wireless coded communication (WCC) device is a type of IOT. The WCC device may have memory, which has a DLC installed therein. As mentioned above, a WCC device may be a special purpose device, and the DLC may be a container that is installed thereon to run and be executed by the hardware resources of the WCC device. The WCC device may also include a container manager, either as separately installed code or as part of the firmware of the WCC device. In still other embodiments, the container of the DLC may be wrapped or integrated with the container manager. In one embodiment, the container manager may be a layer that sits over the operating system of the host device. If the host device is a WCC device, the WCC device may have its own operating system, or firmware to enable it to achieve its special purpose function. The DLC, being a container, may thus be loaded on the operating system of the WCC device, via a container manager. As noted above, the container itself will have its own operating system that is part of the container stack, which is different than the operating system of the WCC device.

For devices that have DLCs, the application of the DLC may include discovery logic for finding other local devices, e.g., referred generally as end nodes. The other devices may also be considered IOTs, and some IOTs are WCC devices. It should be understood, therefore, that other devices are those that may be local to a requesting device, and those other device will have some network connectivity, e.g., ability to communicate with another device either directly or via a network device. For instance, communication may be local, e.g., between devices using peer-to-per communication or over a network node, repeater node, or connected node. Various examples discover and pairing algorithms will be described below.

In one embodiment, a WCC device is one that has or is coupled with a wireless chip (e.g., a WiFi chip, Bluetooth chip, transmitter, transceiver, radio or communication chip, etc.), and a power supply.

In one embodiment, WCC devices may engage in predetermined methods and functions. In other embodiments, the methods and functions are particularly selected based on the state of the WCC or its inputs during an activation or use cycle/session.

In some embodiments, WCC devices may be hybrid devices that have both power pumps to enable energy harvesting and also a battery or rechargeable storage cell, or hybrid devices that use have power pumps to enable energy harvesting for use or activation of a WCC device and a dedicated battery or plug-in AC power source. In other embodiments, WCC devices and/or IOT devices may be supplied with various types of power sources. Examples of these power sources are provided with reference to FIGS. 2A and 2B.

In one embodiment, a WCC device is a special purpose device that performs instructions, tasks in the same order, each time upon receiving activation power (e.g., enough power that meets a given threshold level). In another embodiment, the WCC device performs different functions based on a state of the WCC device. The current state of a WCC device may be based on prior activity of the WCC device, and the WCC device may operate in a persistent manner or may save all or part of state data, including sensed data, user controls, settings, payload history, etc., in information in memory.

In some embodiments, multiple WCC devices may be applied to different objects, and coded communication from the multiple WCC devices may be received by a selected end node. For instance, a user may establish a server that receives the communication. In another embodiment, the user may associate WCC devices to a cloud service, wherein the cloud service enables access from any device to see status communicated by the multiple WCC devices. In still other embodiments, WCC devices can communicate with other WCC devices. The communication among the WCC devices may occur prior to at least one of the WCC devices sending data to an end node, which may identify interaction patterns among the WCC devices.

In one example, WCC devices may be used for tracking packages (e.g., commercial carrier packages or personal packages). Packages that are stacked or moved around can cause forces to be applied to an input of the WCC devices, which in turn harvests power. The power will power a microcontroller of the WCC device to trigger communication by a wireless chip of the WCC device. In other embodiments, a WCC device may have its own power source, e.g., such as a battery. The communication can be among multiple packages, e.g., such as communication to verify that all packages are present or all packages are present in a specific geolocation. In some embodiments, WCC devices can be associated as a group, and group data from the WCC devices can be received by an end node, e.g., a server or a computer or some device connected to a network.

Tracking can be associated to more than just packages, for example, tracking can extend to parts used to build things, such as homes, offices complexes, roads, computers, towers, automobiles, etc. The tracking can also be used by people, e.g., such as to track employees entering into restricted areas, tracking computers of employees, tracking devices, tracking employee badges, tracking use of things, tracing movement of things, absolute or relative positioning of things, etc. Again, the WCC devices are configured to communicate coded information, and the information communicated depends on a predefined coding set at each WCC device. Further, it should be understood that state is not the only type of communication a WCC device can do, and the coded information can further include sending data, sending messages, requesting data, paring with other devices, sending packets, sending payloads, sending IP addresses, relaying data or packets, receiving data for display on a local screen, etc.

In another embodiment, the WCC device performs different functions based on the environment surrounding the WCC device and/or depending the type of communication being sent or received by the WCC device. For example, the WCC device may perform different functions for one user that is different than for another user, based on, for example, a detected user identity (i.e., biometric ID, password ID, code ID, gesture ID, etc.) or condition. In another embodiment, the WCC device performs different functions based on the state of user input selection. In another embodiment, the WCC device performs different functions based on a level of power available. In other embodiments, the WCC device may select and traverse code routines based on permutations of the above in whole or part.

WCC device may initialize its state each activation cycle, perform a known start state and perform initial function upon boot or activation, continue performance of a previously started function, repeat performance of a function, or perform a new function. The WCC device may also operate in a persistent manner In a persistent operation, the WCC device is able to store state data between activation cycles, including activation cycles in devices that use mechanical energy harvested, e.g., from a piezoelectric element, RF harvested power, heat harvested power, or other types of harvested power operations.

In one embodiment, fabric associated with a user's clothing can be modified, such as to generate or capture energy. By way of example, fabric can be designed to define a solar cell. The fabric threads can be arranged and woven so as to define regions, patches, or areas of a person's clothing, which can then capture the light and produce power. In some embodiments, the captured light can be from florescent lighting, incandescent lighting, LED lighting, or lighting from the sun. In various embodiments, the woven material that can define a solar cell can be interconnected to a WCC device, which can also be integrated into the fabric of a clothing item. In some embodiments, a WCC device can be embodied in a button, clip, buckle, class, or other clothing related object. In this manner, the clothing related object can function as does a regular clothing related item, but can also process information in accordance with its defined WCC implementation or IOT implementation.

Power can be generated by the captured light from the generated solar cell or cells integrated into the clothing or fabric. In other embodiments, fabric can be generated to produce an interface surface, that can be touched, selected, rubbed, and the like, to produce or provide input. Similar to the way a touchscreen on a smart phone can be interacted with by a person's fingers, a person's fingers can be used to interface with parts of the fabric or clothing. This can provide input to the clothing that can then be transferred by way of one or more WCC devices or IOT devices associated with the clothing, to a network. In other embodiments, resistive elements can be integrated into the clothing or fabric of certain types of clothing, shoes, apparel, and the like. These type types of elements can also be used to determine when movement of the clothing, person, or objects occur. This can be provided input to a WCC device or IOT device, which may be associated with the person's clothing or objects worn or held. Several examples of power sources are described with reference to FIGS. 2A and 2B.

In some embodiments, applications are hosted on servers, to provide access to applications (e.g., mobile APPs or websites), which receive communication related to output from WCC devices. In one embodiment, a cloud system can include one or more processing servers, which may be distributed. The cloud systems can include network storage for storing user accounts. The user accounts can be associated with users that may access services that are responsive to input or data received from WCC devices. The cloud systems, in one embodiment, can be an end node. An end node, for example, is a processing system or unit that executes program instructions for generating data, e.g., in response to input received from the WCC devices or multiple WCC devices that operate in a group to establish a dynamic local cloud (DLC) group. In other embodiments, the cloud system is configured to interface with APPs executed on smart devices, such as smartphones, tablets, laptops, computers, smart watches, and other internet connected devices or Internet of Things (IOTs). In one configuration, a WCC device with associated with a physical object, may make the use of that physical object an Internet connected thing. Each physical object associated with a WCC device may be thought of as a thing, such as an IOT.

In some embodiments, the data sent by a WCC is encrypted. Encryption can be implemented using any number of ways. Some ways include, for example, symmetric or asymmetric key encryption, public key encryption, message verification, digital signature verification, message authentication codes (MAC), cryptographic software, hashing encryption, digital encryption standards (DES), Asymmetric RSA, cryptographic hash functions, application layer encryption, session encryption, IP layer encryption, or combination of two or more thereof.

In some embodiments, WCC devices can be integrated into different objects, devices, appliances, IOTs, structures or physical objects. When such devices move or are caused to move, a WCC device can be made trigger. Without limitation, some additional example devices may include airline seats, airline tray tables, airline overhead compartments, doors, stadium food ordering, stadium seats, dials, chairs, tables, doors, garages, cars, bikes, motor cars, electric cars, luggage, desks, boxes, tools, power tools, etc.

In one embodiment, a WCC device can use various networks of nodes to enable routing through intermediary nodes or always-on-devices. For example, a WCC may be coupled to control a remote device through direct communication, through relayed communication using a phone, or through a server. A sleeping device may periodically wake up using a watchdog timer to check status of wireless wake-up signals. The frequency and duration of the wake-up period of any device depends on several factors, including whether the device under control is operating under dedicated power supply or a battery. Often when a wake-up signal is sent to a sleeping device, the wake up signal is burst in a long repeat pulse train to ensure that the signal is detected during the period in which a watchdog timer is alert. Robust communications can be established between a WCC and an end device by routing signals through an always-on device such as a phone or dedicated server, to the end device seeking to be controlled. Such "man-in-the-middle" routing schemes can be beneficial as always-on powered devices act as intermediary for signal repeating during long sleeping periods of a watchdog timer. In one embodiment, when an intermediary signal repeater receives a single command from a WCC, it can engage in a longer communication dialog with the end device than otherwise is generally possible using the power pump activation cycle of the WCC. This can enable the intermediary repeating device to send redundant signals, wait to get a confirmation from the device under control to confirm it has received the command, and ensure reliable communications in general.

Another embodiment of the WCC authenticator uses a secondary device such as a cell phone to receive WCC authentication payload when activating the WCC. In this example, the secondary device may take additional request such as a site specific password or requests a fingerprint or master password of the user, or the secondary device may check its geolocation to determine if the device is being used in a known location, such as the user's house, or the secondary device may request nothing of the user or take no additional precautions. In any case, the secondary device forwards the payload to either the requested secure resource or to another add credential to the authentication.

A passive device such as the WCC authenticator will have a safety feeling as users know it has no ambient power source so it can't easily be hacked. Master or site specific passwords, code, authentication tokens, public, private keys or other authentication criteria may be safely stored on the WCC without risk of tampering. WCC dials and settings may select an authentication service or site for which access is sought. WCC transmission payload will include associated credentials or sequence necessary to engage in the designated scheme for access to the site. WCC typical in this use will be energized only upon manual activation of power pump. When activating, the WCC transmits the authentication data to a receiver, typically a host PC or cell phone, router or any end-node.

A WCC authentication device may be coupled with a biometric fingerprint sensor to enable the detection of a master user in connection with transmission payload to the target resource, URL or end node. Asymmetric UAF authentication schemes may be used where the biometric sensor user data is used to identify to register and authenticate biometric signatures with a corresponding UAF verification server on premise or on the cloud. Symmetric biometric one time password schemes may also be used where biometric tokenization handshake is made between the WCC and a host to enable access. In another WCC authentication scheme, a WCC may be configured as a Universal 2nd Factor (U2F) hardware authenticator. In another series of schemes, the YubiKey line of authentication schemes are improved upon, whereby the YubiKey dongle is eliminated and the WCC operates to mimic each version of YubiKey but whereas, upon activation, a wireless transmission to a YubiKey server is called directly from the WCC. In this improvement, further security can be added using WCC with fingerprint sensor and multi-tier authentication.

Authentication credentials may be entered into the WCC authenticator in various ways, including through wireless encrypted communication portals, etc. But the premise of the WCC authenticator is that it is largely a decoupled passive device, hack-proof, in that it's not plugged in or active unless it is physically triggered. Therefore, entering user credentials into a WCC authenticator is preferably done using a process that is disconnected from computers or phones that may have malware, spyware, key-loggers, etc. In one embodiment, a WCC authenticator includes a USB port enabling a keyboard to be connected. The WCC has a setting for learn or use mode and dial for selecting one of several popular websites or custom URLs. The user enters a password credentials for a specific URL by first selecting the website or URL using the WCC dial and then he presses the activation power pump one or several times to activate the WCC in learn mode. Using the keyboard, the user types their username followed by their password at least one time. Using the keyboard as in the above example, the user would enter the username and password for the selected site. Upon pressing enter, the WCC may transmit the credentials, causing the credentials to be tested, and provide feedback to the user to indicate that access to the site was successful.

In one example, the coded communication can include a node ID of the receiving device, state of pre-activation settings, encryption info etc. In some embodiments, active scanning is possible. For example, after activation of a WCC device a multitude of sensor data may be read into the device. Sensor may be data sourced from one or more sensors. For embodiments that include multiple sensors, the device can be configured to read the sensor output in a time multiplexed manner, or simultaneously or in any order.

FIG. 1A illustrates one example embodiment of a WCC device 100, in accordance with one embodiment. In this example, the WCC device 100 includes a power source 104, a power storage 106, an integrated circuit (IC) 114, memory 112 (which may be part of the IC, separate from the IC or in communication with the IC. Further included in this example is, wireless Rx/Tx circuitry, which is referred to herein as a wireless chip 116. In some embodiments, the IC 114 may be integrated with the wireless chip 116.

The wireless chip 116, in one embodiment, is a Wi-Fi chip. In another embodiment, the wireless chip 116 is a Bluetooth chip. In another embodiment, the wireless chip 116 is a radiofrequency communication chip. In another embodiment, the wireless chip, memory and microcontroller are all formed on single chip or module. In another embodiment a hybrid chip module containing the wireless functionality, memory and micro controller or logic chip is an ESP8266. In other embodiments, the wireless chip 116 can be defined by other communication protocols, modes, and network transmissions. In some embodiments, the integrated circuit 114 and the wireless chip 116 can be integrated into a single chip. In some embodiments, 114 and the wireless chip 116. The WCC 100 can communicate with a network 120. In one embodiment, data can be sent by the WCC 100, based on its programming which can be stored in memory 112.

The power storage 106 can be defined by a battery, a charge store, a capacitor, or device capable of storing energy. Memory 112 may be volatile or non-volatile including flash based memory capable of storing persistent data. The WCC device can include logic for processing instructions. The logic can be processed by the IC 114. In some embodiments, the IC 114 is defined as part of or in communication with a microcontroller, or an application-specific integrated circuit (ASIC), or firmware, or wired coded instructions, or any other type of processing logic that is capable of performing a predefined function. In some embodiments, the function is programmable, and changeable based on input settings by a user, or another application, or a program. These predefined functions can be programmed by a manufacturer before the WCC devices 100 are distributed or sold. In some embodiments, the WCC device 100 may include its own firmware, to process the special operations or functions of the WCC device 100. However, if the WCC device 100 is programmable, different settings can be made to the WCC device 100. The settings provided in the program can include defining different types of functions to be performed by the WCC device 100. In other embodiments, the settings can provide a single function to be performed by the WCC device 100.

In some embodiments, other devices can be used to program aspects of the WCC 100. For example, a cloud system can be used to enter programming settings, such as specific operational functions. The cloud system can allow any number of users to access a programming functionality, and identify the specific WCC devices that are associated with their user account. In this example, the user is able to access his or her WCC device 100 via the cloud system, or directly via a local signal communicated to an RF antenna of the WCC device 100. The settings can be programmed to enable communication by the WCC device 100. In one example, a user can communicate with the WCC device 100 in response to a connection request. In another embodiment, the user can select the program to apply to the WCC device 100. In another embodiment, a user can select to access a history of activity from the WCC device 100. In other embodiments, the user can decide to modify a program that is previously stored in the WCC device 100. Various other settings can be used to interface with the WCC device 100, either locally or via a network 120.

In one embodiment, the WCC device 100 can also have a DLC installed for execution on the WCC device 100. For example, the DLC may be provided as a container, which enables processing of an application that is in addition to the native or special purpose functions of the WCC device 100. In one embodiment, the application of the DLC container may be present on the WCC device 100 to provide the option of the WCC device 100 to reach out to other local devices to request processing power for one or more functions or operations of the WCC device 100. In FIG. 1, the WCC device 100 can communicate with a local network 120 to discover other devices, e.g., end nodes. The end nodes may be, for example, any processing device that has access to the network 120 and can be discovered. In one embodiment, if an end node is discovered that that does not have a DLC yet, the end node may be provided a DLC image by the WCC device 100. The DLC image may be a DLC that can be installed by the end node. Once the end node installs the DLC, that end node may provide or share part of its hardware processing to the WCC device 100. In other embodiments, the discovered end node may be provided with instructions and/or an internet link to allow the end node to download the DLC from a predefined website, or via an application programming interface (API).

Continuing with FIG. 1A, the wireless chip 116 of the WCC device 100 can be configured to communicate with a network 120 and transmit signaling data. In some embodiments, the signaling data can be sent directly to end nodes 130, in a type of peer-to-peer communication configuration without going through a network 120. In some embodiments, the end nodes 130 can be defined by any number of processing entities. The processing entities can be, for example, other computers, internet of things (IOTs), appliances, televisions, digital video recorders, interactive toys, servers, data centers, and other WCC devices 100. Any WCC device 100 or end node 130 may also communicate directly with servers or peers outside a local area network using NAT traversal techniques. A WCC device 100 or end node 130 may also be part of, or participate in, or be coupled to a chord overlay network.

As used herein, a WCC device 100 can be any computing device that can process and transmit signaling data via a wireless link. Accordingly, although the WCC device 100 shown in FIG. 1A may be a special purpose device, in other embodiments, general processing devices can perform the functions of a WCC device 100. For example, a desktop computer, a tablet computer, a smartphone, a watch, a laptop, or other such electronic device, having wireless communication capabilities, can process and send signaling data to a network and/or end nodes 130.

In one embodiment, an end node 130 can be any processing entity, such as a computer, a network switch, a router, a server, a cloud processing system, an intermediate repeating node, another WCC device 100, or any other processing entity that can receive data and process data. The end node 130, in one embodiment, may be connected to a network 120, and the network can receive data from the WCC device 100, which is then routed to the end node 130.

In some embodiments, a WCC device 100 may be configured to operate with power that is internally harvested. For example, the power harvesting can be by use of a piezoelectric device integrated with the WCC device 100 or interfaced with the WCC device. Other power source configurations are described, by way of example, in FIG. 2. If energy is harvested to power the WCC device 100, once a sufficient amount of power has to be harvested and stored in the power storage 106 and then the logic can detect that the power has been stored and reached a threshold amount. Such detection of sufficient power may be self-evident upon the logic having suitable power to activate a function. This detection that power is available can in one embodiment trigger the wireless logic to transmit data to an end node 130.

In some embodiments, various types of devices can be represented as WCC devices or include or more WCC devices. By way of example, computer keyboard may be a type of WCC device, wherein each key stroke can cause mechanical input to an energy producing element, e.g., one or more piezoelectric devices. In some embodiments, one or more keys of the keyboard can be linked to one or more piezoelectric devices, which can produce power that is stored in one or more storage devices. Thus, as the keyboard is used, the keyboard itself can provide power to a computing device. In one example, a WCC keyboard can be connected to a tablet computer. As the keyboard is used to enter information, the power generated by the WCC keyboard can provide power to the battery of the tablet computer. In other embodiments, any computer input device, e.g., a mouse, can also function as a WCC device, which can harvest power that is fed to the mouse itself and/or to a computing device. As these devices continue to be used, the power harvested can be used to power the WCC devices themselves or another device or power storage cell or cells.

Memory 112 can be in communication with the integrated circuit 114 as well as to the power storage 106. A display 110 can also optionally be provided on the WCC device 100. Low power displays can be used, such that power storage 106 can provide power to display 110. In one embodiment, the WCC device 100, once programmed, can operate to generate coded data that is communicated to a network 120. In other embodiments, the network 120 can communicate information back to the WCC device 100. In other embodiments, end nodes 130 can communicate back with the WCC device 100. Any one of these communication instances, or combinations of two or more thereof, can be processed to initiate discovery and pairing of WCC devices 100 to a group of WCC devices 100. In one embodiment, the group of WCC devices 100 can function to provide shared processing power that may be requested by one of the WCC devices 100. This functionality includes discovery of other WCC devices 100, joining the group of networked WCC devices 100, and processing data requested by the requester WCC device 100. In one configuration, the shared processing may operate to construct a dynamic local cloud (DLC) group.

The DLC group, in one embodiment, may be formed for a temporary period of time, e.g., sufficient to provide the shared processing required by the requester. In some embodiments, the DLC group may be have a longer life span, e.g., until the last two of the end nodes 130 that make up the DLC group leave the group. As mentioned above, a WCC device 100 may function as one of the end nodes 130, and thus, the DLC group may be formed from two or more end nodes 130, wherein at least one of the end nodes 130 has made a request to receive assistance or processing power from other end nodes 130. In some embodiments, the WCC device 100 can be preprogrammed with the program settings to communicate to a specific end node 130.

The WCC device 100 will utilize a wireless chip 116 to enable the communication, which is a wireless communication to the network 120 or another end node 130. As mentioned above, the wireless communication by the wireless chip 116 can be directly to another device. For instance, the WCC device 100 can communicate with another WCC device 100, a local end node 130 (e.g., connected to the same local network), a router, a switch, multiple switches, a local computer, or other device without a network. In other embodiments, the communication can be to a mesh network. The mesh network can include end nodes 130 that function as repeater notes that enable transmission of coded data signaled by the WCC device 100 to a desired end node 130 or group of end nodes 130 that are part of a DLC group. In some embodiments, the signaling data sent by a WCC device 100 is to initiated communication with other end nodes 130 or other WCC devices 100.

In this configuration, depending on the needs of any one of the WCC devices 100 and/or end nodes 130, a request can be initiated to discover other end nodes 130 that are receptive to join a group to form a DLC group. The discovery, as will be described below, can be processed in a number of ways. Program settings are simply to illustrate that any type of settings can be made. As such, one of skill in the art will understand that the program settings are purely customizable by the user depending on the implementation and needs. In some embodiments, the WCC device 100 can be preprogrammed with a predefined function.

Figure 1B:
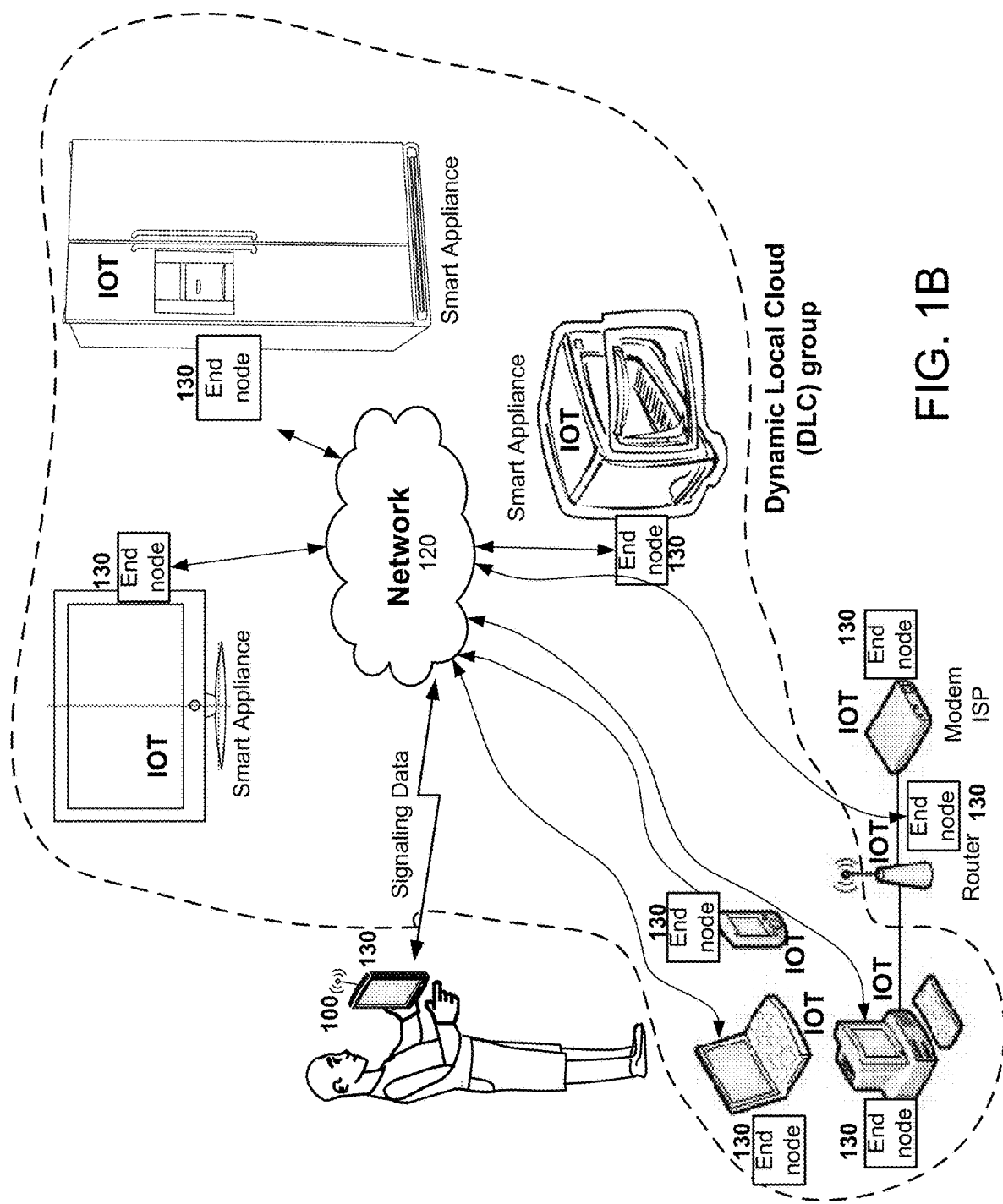
FIG. 1B illustrates a general example of devices, end nodes, WCC devices, and general computing devices with network connections interfacing with each other to define a dynamic local cloud (DLC) group, in accordance with one embodiment.

FIG. 1B illustrates a general example of devices, end nodes, WCC devices, and general computing devices with network connections interfacing with each other to define a dynamic local cloud (DLC) group. In this example, various appliances are shown, which are typically present in homes, businesses and commercial settings. In addition, other devices, such as portable electronics, tablets, laptops, desktops, routers, modems, and other networking devices are shown. These devices may interface with a network 120. In one embodiment, each of these devices have been registered with the network 120.

The network 120 may be a wireless network, and as such, the network may have an associated SSID (service set identifier). The SSID is a case sensitive, 32 alphanumeric character unique identifier attached to the header of packets sent over a wireless local-area network (WLAN) that acts as a password when a device tries to connect to the basic service set (BSS), which in this example is a component of the IEEE 802.11 WLAN architecture. The SSID differentiates one WLAN from another, so all access points and all devices attempting to connect to a specific WLAN must use the same SSID to enable effective roaming. As part of the association process, a wireless network interface card (NIC) must have the same SSID as the access point or it will not be permitted to join the BSS. This this example, the end nodes 130 are assumed to have registered with the network 120 having a particular SSID.

Further, in this example, a user is shown with a tablet computer, which may function as a WCC device 100. The WCC device 100 may desire processing power to complete a processing task. The WCC device 100 may, in one embodiment, attempt to send signaling data to the end nodes 130 in order to establish a DLC group. In one embodiment, each of the devices that are local to the user already have DLC logic installed thereon. Thus, when signaling data is sent by the user to establish a DLC group, one or more end nodes 130 may respond to the request by enabling access to some or all of the end nodes 130 processing power.

For example, if the television is not currently on or processing content for a viewer, the processing hardware of the television is being substantially wasted or inefficiently used. This hardware is thus able to supply processing power to the WCC device 100, in a slave mode. The requesting device, being the WCC device 100, is in a master mode. The DLC logic on the television can, for example, throttle the amount of processing power it is allowed to share with the WCC device 100. In one embodiment, as described above, the television has primary logic and applications that are specific to television processing.

The DLC may be, in one embodiment, a container (e.g., having a processing stack) that executes the sharing application to supply access to resources of the television to the requesting WCC device 100. In a similar manner, other devices, such as a toaster, a refrigerator, or any device connected to a network that is able to share part of its processing resources can be made part of the DLC group to provide the necessary resources to the WCC device 100 that requests those resources. In a reverse manner, another device of the DLC group may also become a master, which may request processing power from other local end nodes. For example, during some television presentation, the television may itself need more processing power. The television, for that requested processing task, can reach out to the DLC group or establish a DLC group to process that operation or task.

The television would then be a master and the other devices supplying processing power may be slaves. As new devices come into a network, it is possible for those devices to register with the network, and the network, e.g., hub, router, modem, end node, etc., may provide DLC logic to that device, so that the device can be part of DLC groups when requested. In other embodiments, as new devices are added to the local area, those devices may be dynamically registered by other devices that are already part of the DLC group.

In one embodiment, device profile migration is executed. For example, a toaster or any IOT device can recognize user based on either detection ambient (e.g., voice, images taken by a camera, signaling data that identifies a user) or express "fingerprint" detection. In one embodiment, based on the identified user, the device can be set to self-configure one or more settings of the device to ensure consistent operation for the user. For example, using the cohesive local cloud, a toaster or loaner device at the workplace may detect the current operator, and use the profile of the operator to configure the device for the operator, based on known profile and preferences that the operator typically uses in connection with the device type.

FIG. 1C-1 illustrates a table, showing how certain IOTs can be grouped to define a DLC group, in accordance with one embodiment. For example, certain appliances and computer devices may be located near each other, and these devices can be discovered. Generally, these devices may already be connected a router of a home, a business, a commercial space, or some general area. In one example, the general area may include a space of about 100 meters in diameter. In another example, the space may be about 50 meters in diameter. In still other embodiments, the space may be 20 meters in diameter. The diameter may be measured horizontally or vertically, or in terms of volume, e.g., spherical or other geometric outlines.

The space in which devices can be discovered may also depend on the strength of wireless routers, the signal strength of individual devices, or a combination thereof. In other examples, the devices may not yet be connected to a local router, e.g., a secure network. For instance, the local router may have several devices registered, so that when devices enter the space, the devices are authenticated and granted access. This is similar to devices automatically logging into a WiFi network automatically using saved credentials, e.g., user names and passwords. If new devices that are not part of the network appear in the space, it is possible to give them access manually, e.g., by logging them into the network, either directly on their user interface or using a second device and/or the cloud. Once these devices are brought into the network, these devices can be checked to determine if they have DLC logic already or if they need to acquire DLC logic. For example, some devices may already have DLC logic.

In one embodiment, DLC logic may be simplified to be basic code integrated into an operating system or firmware, and may be added by manufacturers automatically, e.g., based on a standard. The basic code may provide DLC-like functionality, e.g., to enable the device to join groups of devices and share at least some of their hardware resources with a requesting device of the group. If these devices have the basic code for DLC-like functionality or have DLC code, their DLC identifier (ID) may be found and used to register the IOT (i.e., device) to the DLC group. In this simple example of FIG. 1C-1, the IOTs include a refrigerator, a toaster, a television, a hand held device, a router, having DLC IDs 1-5. As devices enter the DLC group, more devices may be identified. Similarly, if devices leave the group, e.g., because they are busy or not available, or removed from the space, fewer devices will be identified.

In one embodiment, various other methods may be used to connect new IOT nodes through access control migration. For example, a new out of the box node needs to obtain WIFI credentials to access LAN and WAN and services in an external cloud, such as those provided by Amazon Web Services, including Lambda services. To obtain WIFI security credentials, a new IOT node will initiate itself on first boot to engage as an unsecured access point where it will allow another node that already has the WIFI credentials to pass those credentials to itself.

In one example, the new out of the box node will establish itself as an unsecured access point having a 31 byte SSID identifier comprised of a type and an ID. In one configuration, one or other nodes may periodically, at some fixed or ad-hoc duty cycle, search all available unsecured WIFI connections, and parse the new unsecured SSIDs to determine if any of the SSIDs match the known TYPE. If a known type is discovered, the SSID is further parsed to retrieve the ID portion of the SSID of the newly discovered connection. Then the newly discovered IOT node is authenticated using any known authentication methods, including a handshake using private and public key, double asymmetric encryption, etc. The polling IOT that discovered and authenticated the new node then registers the new IOT ID on either a local cloud or public cloud, or both. Once the new node is authenticated, the polling IOT that discovered the new node, passes the WIFI credentials to the newly discovered IOT upon which the new IOT can drop its connection as unsecured access point and reconnect to the secured WIFI to obtain access to the LAN and WAN resources. An example of a new node may be IOT3, shown in FIG. 1I below.

In one embodiment, an IOT failsafe method of recovering from failed node is provided. For example, an IOT node can provide heartbeat at a known duty cycle. Other nodes may monitor heartbeats to determine the status of the beating node. Loss of heartbeat can indicate a node failure due to loss of power or communications interference or some other state. When node loss is detected, a redundant node previously configured to mirror the lost node can be configured to take over to sustain operation of the lost node duties in the DLC, whether it be sharing processing power or providing operation of one application or sharing in operation an application, OS, virtualized computer, etc. Optionally, another node, preferably one that is reserved for such circumstance, can be set to mirror the mirrored node, so a redundant backup is regained.

In one embodiment, devices that are part of a DLC group can operate to provide RAID storage. For example, an application of DLC logic can be configured to allow raid 0 raid 1, raid 2, raid 3, raid 4, raid 5, raid 6, raid 7, raid 8, raid 9, raid 10 and other user controlled distribution of memory and or storage across a LAN or WAN, DLC or non-DLC-portion-of-nodes. Thus, if a DLC group is provided to provide a share of storage, that share of storage can be protected using a particular RAID level.

In one configuration, a Photonic Detector can be used to receives WIFI credentials, e.g., to enable pairing to a DLC to form a DLC group or join a DLC group. In one embodiment, a device (e.g., WCC device) may be configured with the capability to receive some or all of its configuration settings through an encoded light source transmission. The light source transmission may be received by a photodetector coupled to the device. The device is configured to decode the stubbed (or modulated) light, enabling it to wirelessly receive configuration settings. Configuration settings may include but not be limited to a profile, code, value, status, trigger or request, challenge, response, WIFI SSID, WIFI PASSWORD or other access credentials required to signal, interact with, connect to, register with or itself register, a secure connection, network, WIFI connection, router, node, server, computer, website or service running locally or on a WAN, public or private cloud or combination thereof.

By way of example, a newly purchased IOT, e.g., WCC device, when first brought into a home, business or industrial environment, must be supplied access credentials to enable it to be configured with the security settings for the router, to enable it to make a connection to local devices, and to the outside world. Various light sources alone, in coordination with, or in combination with other light sources, whether part of a WCC device or otherwise, may contribute to an encoded optical transmission stream for transmitting the configuration settings and exchanging data with a WCC.

In one embodiment, the configuration settings may include the WIFI access credentials, and a mobile phone display screen is strobed to cause the transmission of the access credentials to a receiving WCC device, enabling the WCC device to connect with a secure WIFI router or hotspot and if appropriate, engage in DHCP or other protocols, receive a local IP address and enabling it to send packets to other nodes on the local network or the WAN.

The WIFI connection may be to a home or office router, that the phone connects to, or it may be the phone's own WIFI hotspot as it operates in tethering mode. To transmit the configuration data, the mobile phone may run code that traverses through bytes of a transmission sequence encoding the configuration settings, through strobing the display ON and OFF at a known or adaptive baud rate according to the bit pattern of the transmission sequence. In one embodiment, a start trigger may be used to set the WCC in a pairing mode to ready the device to capture the configuration settings. Depending on the configuration the WCC to enter pairing mode upon a start trigger can be caused by shaking it, pushing a button on it, sending a predetermined sound to it, sending a wireless signal to it when it is configured as an unsecured access point mode, sending a data transmission to it under a cellular frequency, or generally by the state or condition of the WCC device or service interacting with the device.

With respect to use of a button to trigger the start of pairing mode, it is known that the button may be dedicated to initiating the start trigger for pairing mode or the button may have a different primary purpose other than for pairing and the WCC may distinguish between typical use of the button and manipulation of the button to engage in WCC pairing. For example, a long press and hold of the button may engage pairing mode. Multiple bursts of button presses, double or triple clicks or click patterns with predetermined delays, voice input, gesture inputs, combinations thereof, can be used to differentiate typical button press or input for WCC device to enter pairing mode.

A WCC or IOT device equipped with Near Field Communication (NFC) may be brought in close proximity to another device with NFC to exchange pairing data. Pairing may occur over NFC or NFC may be used to start a sequence of pairing using another technique. Such pairing data may include but not be limited to SSID and PASSWORD credentials as well as any keys necessary to authenticate with a remote server or service.

In one embodiment, upon entering pairing mode, the WCC device may poll the output of the photodetector to receive the incoming transmission pulse representing the configuration settings. In one configuration, the access credentials include SSID and PASSWORD fields and the WCC device engages in network connection device registration. Access credentials may also include a key or information required to authenticate with another device or service. In another embodiment, the button for setting the WCC device into pairing mode is an energy pump that makes a mechanical click sound when pressed. A cell phone app or any WCC device with microphone capability listens for the click sound for causing the timing of the start of the light wave transmission. In another embodiment the light wave transmission is not strobed ON/OFF to encode the configuration settings but its brightness is modulated. In another embodiment the WCC device photodetector is replaced by an optical module that detects color including RGB values or similar, and the data transmission is encoded using color patterns.

A transmission scheme may involve an start sequence or frequency to synchronize the transmission and receiving clocks to coordinate bitwise transmission and bitwise reception events according to the baud rate. The transmission to a WCC device may be encrypted and deciphered, signed, and wrapped with challenge and response. To facilitate any aspect of passing the configuration settings to a WCC using light waves, the coordination or signing, encrypting, decrypting and processing of challenge and response wrappers may be in part of whole accompanied by a communication link between the WCC device and another device over an unsecured connection while the WCC operates as an access point.

In one embodiment, the strobe light source may take any form other than a display. It may be a modulated light source including light sources that provide ambient overhead room lighting. The modulation of access credentials may be undetectable by the human eye in a similar manner as how a 60 hertz AC ripple that can be detected by a photodetector receiving light from an overhead fluorescent light is not detectable by most humans.

In one embodiment, a photodetector user interface is provided. In one configuration, a WCC device may differentiate commands sent to it based on swiping the user's finger over the photodetector back and forth at a predetermined approximate frequency. Preferably the WCC is subject to some background ambient light so the photodetector can differentiate the ON OFF signals. Tethering a private connection to a local cloud, e.g., DLC, may use a cell phone as gateway/router to register IOTs and to reach beyond to WAN, avoiding the need to reach WAN through home or enterprise router. In other configurations, a phone unlocks temporary enhancements to shared WCC devices i.e. purchased rights to Starbucks recipes on a shared coffee maker, for user who purchased rights to those recipes. In other configurations, local WIFI credentials can be received using two-factor authentication involving unsecured neighbor and node/device/phone with cellular link.

FIG. 1C-2 illustrates an example of device configuration metrics that can be supplied by individual IOTs that are discovered. For example, the various devices identified in FIG. 1C-1 may have DLC logic, which enables sharing of resources with the DLC group. In one embodiment, the DLC logic may be installed on the devices by way of device firmware or operating system (OS). Some devices may have code that enables functionality similar that provided by DLC logic. As mentioned above, DLC logic may be integrated into circuitry, firmware, integrated circuits, one or more chips, or software of the device. In some embodiments, devices may be enabled to run DLC logic by downloading firmware updates from the manufacturer of the device or from a website that provides patches, add-ons, and/or code enhancements. The DLC logic may also be bundled in a container, as mentioned above, which has its self-contained operating system, application and web stack. The application, for example, may enable the sharing of hardware, enable discovery of devices, and pairing to DLC groups.

Continuing with the example of FIG. 1C-2, the configuration data present on individual IOT devices may be obtained from the DLC logic, which can reach into settings, registers, data structures, tables, memory and the like. In this example, the data gathered may include, without limitation to other metrics that may be present, amount of memory, processor size, firmware or OS present, version of OS or firmware, whether the device is currently DLC enabled, amount of memory the device is willing to share, and the amount of processor the device is willing to share. In configuration, the device itself may provide a setting regarding how much memory and/or processing power it is willing to lend out to a DCL group.

This setting may be adjusted, however, if the device itself needs that processing power for optimal operation of its native function. By way of example, if the television is using its memory and processor to render content to a user, that television may throttle back the amount of processing power or memory it is willing to lend to the DLC group or even stop all sharing. If the television is idle or in a sleep mode, the television may appear off to the user, but its memory and processor may be at least partially supplied to the DLC group. The setting that defines the amount of processing available for sharing may be adjusted from time to time, e.g., based on other factors. Such factors may include the time of day, historical use patterns, and manual settings by the user.

In the illustrated example, the device configurations can be collected by the DLC logic of each device, and shared to the other devices that are part of the created DLC group of two or more devices. In one embodiment, the device configurations can be saved to memory of each device, so each device has a copy of the device configurations of devices that are part of the group. In another embodiment, cloud storage can be used to save data related to created DLC groups and the device configurations present. Cloud storage can be managed by a cloud service that interacts with one or more of the devices, or as a separate device service. For example, a cloud service can be provided as a device service, where devices can be registered. Devices that join the DLC group can then publish their device configurations to a save data structure for a DLC group session. In this manner, the data structure can persist for at least the period of time when the DLC group session is active. In some embodiments, DLC group past sessions can be saved, so as to access historical data regarding past sessions, sharing functions, and the like.

FIG. 1D illustrates an example of a user utilizing a device to access a network 120, to request processing power from devices that can operate DLC logic, in accordance with one embodiment. As shown, the device can be a portable device, such as a phone, tablet, or any other type of computing device. Generally, the device is and end node 130, capable of wirelessly communicating with network 120. In this configuration, the user's device is a requesting node, that is requesting processing power from other devices that are DLC enabled. In this configuration, the device acting as the requesting node includes DLC logic, that is configured to communicate with network 120 and find other devices connected to the network 120 that are also DLC enabled.

As mentioned above, is possible for devices to be connected to the network 120 and not be DLC enabled. And those configurations, devices that are not DLC enabled can be made DLC enabled by requesting device to load DLC logic. The request can be, for example, to request that the device access the Internet to download and install DLC logic. In another embodiment, the requesting node can pass a lightweight DLC logic to the discovered devices on the network 120 which do not yet have DLC logic installed. In some embodiments, DLC logic can be installed on devices when those devices installed updated firmware.

The updated firmware can be obtained, for example, from the manufacturer of the device. In other embodiments, the updated firmware can be accessed from a cloud database or server, which can serve DLC logic to requesting devices. As illustrated, DLC enabled devices in FIG. 1D are shown to be a refrigerator and a television. These devices are simply examples, and any other device that is capable of communicating with a network 120 and processing information is suitable for executing DLC logic. In this example, the requesting node is the device of the user, which is functioning as an end node 130. The other devices are also functioning as end nodes 130. In one embodiment, the requesting node may function as a master and node, and the devices that are supplying shared processing power to the requesting node will be slave and nodes. The DLC logic, in one embodiment, is configured to work together the form of a DLC group.

The DLC group will therefore harness together the shared processing power and memory, to define a virtual group of hardware resources they can be utilized by the requesting node to process a task, a job, an application, multiple applications, intensive operations of application, or the like. In general, the DLC logic may include an application that manages the sharing functions of the hardware resources, the routing logic for routing instructions between the DLC logic at the various end node 130, and manage the return of process instructions back to the requesting node. In some embodiments, the DLC group will persist for a period of time sufficient to process the requesting task or job by the requesting node, and then the devices will return back to individual operation. In other embodiments, the DLC group, once connected to a network, will be ready to process instructions from any requesting end node. For example, although the requesting and node is shown in FIG. 1D to be a user's device, the requesting end node can shift to be the television end node 130, in some embodiments.

For instance, it may be necessary for the television to process more intensive operations on the content and it may require additional processing power that it receives from the DLC group. Accordingly, it should be understood that the requesting node that functions as a master node and the slave nodes can switch based on which device needs processing power and which devices are available to join and function with the DLC group for the requested task, operation, or function.

FIG. 1E illustrates an example table showing the members of the DLC group, for the DLC group shown in FIG. 1D. In FIG. 1E, the devices are identified as IOT 1-3. As mentioned above, devices are generally referred to as IOTs, since they are devices or things that have processing power and some hardware. The IOT devices are also capable of either wired or wireless communication with network 120. The different IOTs are identified by description, such as WCC 1, refrigerator, and television. Because the devices are connected to the network, they are assigned IP addresses, as shown. The SSID for the network is also shown in the table. Additionally, the role of the devices for the DLC group are also shown, such as master and slave.

In one embodiment, the table of information associated with the registered members of the DLC group can be access by anyone of the devices that are part of the DLC group. In one embodiment, each one of the devices can store a copy of the table that defines the registered members of the DLC group that the device is associated with. In another embodiment, the table defining the registered members of the DLC group can be saved to a network device, such as memory of a router, hub, switch, or other networked equipment. In another embodiment, a copy of the table can also be saved to storage connected to a server over the Internet. In some embodiments, the groups that are created for a DLC group can be updated from time to time, as groups are created four different processing tasks.

The table for DLC groups can also be updated when you devices are added to the DLC group. The table for DLC groups can also be updated when devices are removed from the DLC group. In some embodiments, the table can also identify devices that are found connected to the network 120, but are not DLC enabled. In some embodiments, a history of devices that connect to a DLC group or form DLC groups on a network can be saved to a history log. Accordingly, the example of the registered members in FIG. 1E only define one simple example and this table can be dynamically changing over time based on the functionality utilized by formed DLC groups, DLC groups that disassemble, DLC groups that are formed for special purposes, and a lifetime set up of DLC groups in particular networks.

FIG. 1F-1 illustrates an example of a device end node 130 held in the hand of the user, and executing DLC logic, is able to connect to a local device executing DLC logic. Local device, in this example is a connected watch. The connected watch can be of the same user holding the end node 130 or can be a connected watch of the nearby user. In this example, the watch is functioning and slave mode, thereby providing processing resources to the device held by the user. In this example, the device can be a WCC device, which needs additional processing power to execute a function of the WCC device. In one example, the WCC device can be a communication device that sends information to another node or a predefined recipient. The WCC device can include fingerprint readers that require processing of the fingerprint of the user's hand. In one embodiment, fingerprint reading can be used to verify the identity of the user handling the end node 130, that is functioning as a requesting node in a master mode.

The verification of the fingerprint can be done using processing power of the WCC device, or part of the processing for fingerprint verification can be handed off to the shared processing power of the watch, executing DLC in slave mode. The example fingerprint reading function of the WCC device is only one example implementation, and any number of functions can be performed by the WCC device or a requesting node 130.

FIG. 1G-1 illustrates an example of the registered members of the DLC group of FIG. 1F-1. In this example, the communication between the DLC logic of the requesting node and the DLC logic of the connected watch operate in a peer to peer communication function. In this manner, there is no need for the requesting note the first access a local network and the same is true for the connected watch. Allowing peer-to-peer communication between DLCs of devices enables for another mode of network connectivity between devices. In the table of FIG. 1G-1, it is shown that the WCC device and the watch our registered and have DLC logic identifiers associated there with. For instance, the DLC logic may have been loaded, associated with, plugged in, added, or integrated with the devices prior to the request by the requesting node.

In FIG. 1F-2, the requesting node is the connected watch. The connected watches functioning in master mode while the WCC device is functioning and slave mode. Thus, if the connected watch requires or needs additional processing power to complete a function, the DLC logic of the connected watch can communicate with the local WCC device that has DLC logic associated therewith. In one embodiment, the configuration and communication between DLC enabled devices can begin where one device is a slave device and other device is a master device. During the communication or during one or more sessions, the roles of the devices can switch depending on the needs of the devices. In essence, the devices will be handing off back and forth there slave or master designation depending on the needs of the devices for processing functions at specific points in time.

FIG. 1G-2 illustrates an example of a table showing the devices connected in peer-to-peer mode, where the watch is now acting in a master mode and the WCC device is acting in slave mode. As mentioned above, the roles played by each of the DLC devices connected in a DLC group can change depending on the requested functionality at the specific point in time.

The table data shown in FIG. 1G-1 and FIG. 1G-2, can be stored in each connected device, or can be stored in a network storage location. In another embodiment, the table data can be stored on network storage for cloud-based storage. In various embodiments, cloud processing logic can be accessed to assign additional devices to a local network. The cloud processing logic can provide access to assignment tables, assignment configuration interfaces, and/or settings which can be then propagated down to the devices connected to the local network. This embodiment can also allow for addition of additional DLC enabled devices to an existing group of DLC devices. The management therefore provides for efficient remote management of DLC groups, establishment of DLC groups, or simply assigning code to the devices connected to a network to enable them as DLC enabled devices.

FIG. 1H illustrates an example of DLC group having various devices connected to network 120, in accordance with one embodiment. In this example, the requesting node 130 is a WCC device, with its connection to other DLC enabled devices. The other DLC enabled devices include a tablet computer.

FIG. 1I shows that the tablet computer is functioning as a slave to the requesting node that is functioning as the master. As shown, currently only the tablet computer and the WCC device are enabled DLC devices in the DLC group. This is shown in FIG. 1I, that identifies the WCC device and the tablet with assignments to that SSID network, and respective IP addresses assigned thereto. Currently, the camera end node 130 is not connected to the DLC group, as it is not assigned to the SSID network. The table shows that it is currently an unsecured node, that has not been made a member of the DLC group. In one embodiment, one of the devices already connected to the network and with the DLC logic, can request that DLC logic be provided to the camera. In one embodiment, the camera can download the DLC logic from the website.

In another embodiment, the camera can download firmware from a website to enable DLC logic. In another embodiment, another device connected to the DLC group can provide a copy of DLC logic to enable the camera to join the DLC group. In one embodiment, devices connected to a DLC group can have a lightweight DLC logic image, which can be shared to local devices that need to be brought into the DLC group. This lightweight DLC logic can be provided to the new device to enable the new device to access the network and become part of the DLC group.

FIG. 1J illustrates an example of when the camera has now been brought in to the DLC group and is a registered member, as shown in FIG. 1K. The camera now is operating as a slave device just as the tablet device operates as a slave device for the requesting node. This means that excess processing power provided by the tablet computer and the camera can be used by the requesting node, such as a WCC device that requires processing power to execute a function. Further shown in FIG. 1K is that the wireless camera has now been assigned an IP address to the SSID network.

FIG. 1L illustrates an example of a home, having a variety of end nodes 130, which may be connected to a router 162. In this example, the end nodes 130 are referred to as IOT devices. In one room, a treadmill 150 is wirelessly connected to the router 162, and has logic to operate as an end node 130. The window shades 152 in one room can also be automatically controlled, and can have processing power and memory to communicate with the network. A door 154 can also have end node 130 logic, including processing resources.

The door 154 can include logic for determining when the door has opened, when the door has closed, how frequently the door has opened, the rate at which the door opens, identification logic for sensing the number of people walking through the door, key codes used for accessing the door, biometric data for identifying people walking through the door, and other processing functions. This end node 130 can therefore have processing resources that can be shared from time to time, when the door functionality is not operative or the door functionality is not being used sufficiently to exhaust the available resources provided for end node 130 associated with door 154.

In another room, a television 158 can operate as an end node 130. In another room, a computer 156 can also function as an end node 130. Smoke detectors 160 can also function as end nodes 130, as well as other devices not specifically shown in this figure. In one embodiment, the router 162 can also function as an end node, which has DLC logic available to allow for sharing of its resources with other notes that may request processing power when part of a DLC group. In other embodiments, the home can be connected to a network 120, such as the Internet or other local or wide area network. Other end nodes 130 that are remote from the home can also be in communication with and nodes of the home.

FIG. 1M illustrates an example of registered members of a DLC group. The DLC group, in one embodiment, provide a description of the different devices that may be part of a specific network. The network will have its own specific as SSID. Each device in the DLC group will have an assigned role, depending on the device that is requesting resources. In this example, the computer is acting as the master, while other devices are acting in slave mode. In some embodiments, some of the devices acting in slave mode may not provide processing resources depending on whether those devices are active performing their native functions and are not able to provide or share their resources.

However, in some embodiments those devices will still be identified as part of the DLC group. Once those devices are done performing their native function, they may then provide resources to the DLC group for the requesting node. For the DLC group that is associated with registered members, the master function of specific devices in the DLC group can be switched dynamically depending on which device needs processing power. For example, at some point the router will need more processing power and the computer will then become a slave and the router will become the master.

Dynamically, the WCC on the door can require more processing power, and it can become the master and other devices will become the slave. The slave devices will therefore provide a proportional or proportion amount of processing power to the requesting device, based on their predefined allocations for sharing as defined by the DLC logic of those specific devices.

In one embodiment, WCC devices or end nodes may terminate their associating with a DLC group. A node termination "Playbook" by be predefined for such nodes. For example, when it is known in advance that a WCC node will be departing a network, the WCC node may switch from its current operating state into a final "playbook" state of functionality to define a set of functions to control state-full shutdown (i.e., prevent losing state for a job or function being performed by a DLC group) and passing off of any functions it is required to perform either for itself or for any contributions to the local cloud computing platform for which the node may participate in or define in any way. A broadcast notification to one or more topics may be accompanied by a memory transfer to preserve the overall functionality of the local cloud (e.g., DLC group) for which the node is known to be departing.

Figures 2A, 2B:
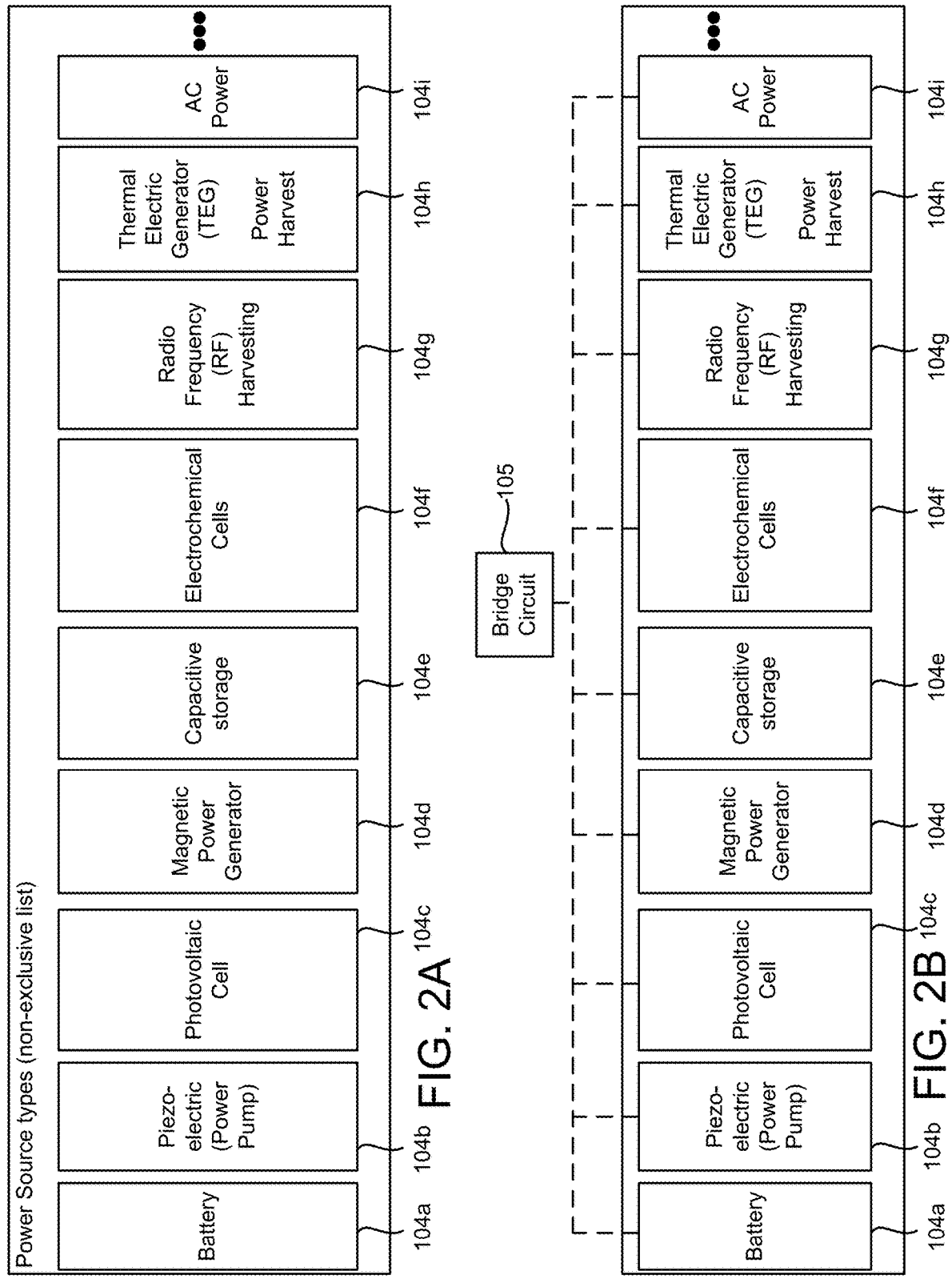
FIG. 2A illustrates an example of different types of power sources, which are nonexclusive of other types that are possible, in accordance with one embodiment.
FIG. 2B illustrates an example of a bridge circuit, in accordance with one embodiment.

FIG. 2A illustrates an example of different types of power sources 104, which are nonexclusive of other types that are possible. In one embodiment, the power source 104 can be a battery 104*a*, a piezoelectric device 104*b*, a photovoltaic cell 104*c*, a magnetic power generator 104*d*, a capacitive storage 104*e*, electrochemical cells 104*f*, a radio frequency (RF) harvesting system 104*g*, a heat sensor power harvesting system (e.g., thermal electric generator (TEG)) 104*h*, alternating current (AC) power, and others. Combinations of the above power sources are possible. And a WCC device 100 that operates with an energy harvesting device based on mechanical force can be used along with a primary power source to supply a secondary power source that is either isolated from the primary power source or merged with the primary power source to provide a power capacity necessary to perform any action.

Increasing the power capacity or mAH in this manner may provide necessary supplement to enable any device chip or functionality, whether it is part of WCC device 100 or the device operating in connection with the WCC device 100. In other words, the voltage boost is not intended to be limited exclusively to using the voltage boost for WCC device 100 activity.

As noted, the WCC device 100 may be configured with an RF harvesting system 104*g*. In one embodiment, the WCC device 100 will have an antenna that is configured to capture RF power that may be in the vicinity of the WCC device 100. An RF harvesting is a process whereby Radio frequency energy emitted by sources that generate high electromagnetic fields such as TV signals, wireless radio networks and cell phone towers, but through power generating circuit linked to a receiving antenna, captured and converted into usable DC voltage.

The ambient energy, generally, may come from stray electric or magnetic fields or radio waves from nearby electrical equipment, light, thermal energy (heat), or kinetic energy such as vibration or motion of the device. The DC voltage that is generated may then be used to charge or store power to a power source 104. In some embodiments, the RF harvesting system 104*g* can include an impedance matching circuit that is tuned to capture certain frequencies of RF power. A rectifier circuit may then receive and rectify the RF power wave forms, which are stored in the power source 104. In some embodiments, a booster circuit may to generate amplify power used by the WCC device 100.

As mentioned above, RF harvesting 104*g* may also be used as a power source, e.g., for an IOT, a WCC device, or the like. In one configuration, a method is defined for harvesting energy from ambient radio frequency transmissions present in the airwaves. First, a WCC device can be equipped with a power source circuit receiver that harvests the ambient RF energy in proximity to the WCC. Such RF-based energy harvesting power source could be tuned to a specific frequency where known radio waves are abundant, such as a frequency tied to, for example, one of the WIFI bands, FM or AM broadcast bands or a cellular band such as GMS, 3G or 4G LTE, HTMS, or other.

Second, the power source circuit could be tunable across a range of frequencies, and whereby the circuit itself detects the best frequency to select for harvesting RF in order to harvest the most power. This may be accomplished in a closed loop where output power is monitored and frequencies are scanned (i.e. round robin or otherwise) until one cycle of testing each frequency band associated with known RF energy sources in the tunable range was tested, upon which the tuner is selected to change to the band generating the maximum power.

Third, an RF-based energy harvesting power source may be equipped with multiple tuners and harvest RF from multiple frequency bands. Tuners can be configured as fixed frequency, variable frequency, or include both fixed and variable. When using multiple tuners, the circuit may be configured to scan the available frequencies and select one or more frequencies to achieve maximum harvested power.

Fourth, the RF-based energy harvesting source may learn the environment and be able to profile the timing of frequencies and self-adapt a tuning change schedule suited for harvesting energy from a particular location. The RF-energy harvesting power source, when learning a time schedule for switching tuning frequency or for waking up to harvest, scans power across the frequency band and detects and logs peek activity by time and frequency.

In one example and without limitation to other methods, to reinforce what we shall call "location adaptive dynamic RF-harvesting power source", consider a factory that operates a faulty motor consistently at 1 pm for one hour and during that time, the motor is inadvertently transmitting high RF energy at a specific frequency. Over time, the RF-power harvesting supply, using time-stamping and history of power output and frequency, using known statistics, detect the daily event at 1 pm and the RF-power harvesting circuit can adapt its tuning pattern to lock into the motor output RF-frequency from 1 pm to 2 pm, to capture the RF burst that occupies the airwaves in proximity to the RF-power harvester. While this example illustrates the dynamic ability of the RF-power harvester, it also illustrates how a WCC or any device coupled to the RF-power harvester can be used to raise a flag to new and possibly unknown RF activity.

For example, if the RF-power harvester was equipped with a baseline profile of known RF energy spectrum for an area, and FCC or other regulatory guidelines on use of spectrum in proximity to the device, then any activity outside of the baseline may signal an electrical or mechanical failure or suspicious interference, leading to find and correct the faulty motor before catastrophic failure. In summary, a location adaptive dynamic RF-harvesting power source may scan and change frequency to maximize power output, may engage in switching decisions based on closed loop monitoring or historical or predictive RF patterns in the air, and may report frequencies that can signal a mechanical failure or suspicious RF. WCC may be coupled to one or more antennas to increase the capture of RF for energy harvesting. A traditional antenna may be used. One or more traditional antennas may be used. Alternate antennas may be used, including but not limited to, a pipe, cord, vent, steel stud, gutter, machine, flat, coil, frame, shelf, floor, wall, ceiling, shingle or any building or other material constructed or positioned in a manner and able to receive RF energy.

In still another embodiment, methods may be used to detect a state of the current or another device based on AC Ripple. For example, a use of a WCC device may include the ability to monitor the consumption or output of another device and deduce, report or act on the change in status of the decoupled device. In one embodiment, an WCC AC power outlet may be capable of keeping track of devices that are plugged into it. Such may include the ability to determine which device is plugged into the outlet at any time. However, such may also mean determining a condition or change in condition of the device plugged into the outlet.

Typical consumer electronic devices that draw alternating current (AC) power leave a fingerprint of AC ripple modulated on top of the 60 hertz AC signal. The ripple pattern changes with changes in the AC power profile of the underlying device. For example, it is possible to detect when a compressor for a refrigerator turns on or off. It is possible to detect when a cell phone charger changes from primary charge mode to maintenance trickle mode. It is possible to detect when a coffee maker is actively heating water vs. when sustaining a heat base to keep coffee warm vs when it is not making coffee but keeping time.

Devices plugged into an AC socket may be registered with the AC socket, causing the download of a device profile that may contain known safety tolerances for the device as well as a state table and notification table that defines conditions upon which the WCC outlet may trigger notification. Notification may be safety related or related to a condition of the device which needs attention. For example, a user may register the model number of their refrigerator to the WCC AC outlet, causing the WCC AC outlet or system monitoring the WCC AC outlet to receive the device profile upon which the WCC AC outlet may monitor the AC ripple fingerprint of the refrigerator (or any appliance or device that can consume or use AC power) to determine, for example, if the compressor is being run beyond the threshold for the device profile, which may indicate a door left open or failure of the compressor. An appropriate notification may be sent to a user to remedy the situation. The notification can be by email, by text, by phone call, by message, or data posted to a website or database for access by an application (e.g., via a user account).

The device profile may be generic but local offsets may be applied to accommodate for both time of year and geographical differences as well as operating conditions within the geographic area of use, including high altitude areas (i.e., for boilers), hot vs cold weather areas, etc.

Still further, the WCC AC outlet may send data itself over the AC line to a receiving device, using internet of power line technology. In which case, the modulation of data packets over AC line may need to be filtered from the AC line to eliminate the interference from the data transmission. Or, the data transmissions can be burst and sequenced at a specific duty cycle to allow for interleaving of quiet times where devices can be monitored without the possibility of interference from IP packets or data over the AC line.

The use of an WCC AC outlet can provide monitoring of both next generation "smart" appliances but also "dumb" legacy appliances that otherwise have IOT reporting capabilities.

However, the techniques described in connection with monitoring AC outlet for AC ripple profile of devices coupled to the outlet can be built into next generation "smart' IOT or WCC appliances that are particularly configured to be plugged into traditional legacy power outlets.

In one such embodiment, an IOT appliance itself monitors the power consumption and/or AC ripple passing through its power cord, and it confirms that the profile of the ripple conforms to the expected pattern of ripple given the current and/or usage history of the device. If the pattern does not match the expected pattern, or the pattern matches a known consumption or fingerprint pattern of a known fault, a payload may be transmitted to a desired end node. The payload may be transmitted over AC power line or wirelessly.

In one embodiment, if the consumption pattern does not match the expected pattern, or the pattern matches a known consumption or fingerprint pattern of a known fault, a bridge circuit may cut off AC supply from the device and switch to an alternative power source. In such circumstance, the WCC or IOT device may engage in a payload may be transmitted to a desired end node to indicate change in power status. In some applications, the indication that a power change has occurred in one node will result in a playbook of functions that may include, but not necessarily include, transferring storage from the WCC or IOT device that is experiencing the change in power status, changing or transferring DLC functionality or responsibility in the cluster, modifying resource tables, logging the event in persistent remote cloud, making configuration changes to application software or firmware or DLC code run on the appliance IOT or WCC device subject to the power change, switching back to AC power, engaging in additional testing of AC fingerprint and/or consumption patterns, collecting additional diagnostics, creating an event, and/or logging activity.

Multiple IOT devices may engage in coordinated maintenance and diagnostic routes with one another to maintain or adjust service levels for a DLC cluster. In one embodiment, if a first IOT device experiences a suspected fault. The suspected fault may be identified in various ways either through the device itself or through other devices. In one embodiment a first device senses a potential fault of a second device over the wire.

In other embodiments another device senses a potential fault wirelessly, or through some other field, radiation or signal that is detected either with or without the active polling of the sensed condition by the other device. In one configuration, the indication of a fault has occurred in one node will result in a playbook of functions in one or more IOTs that may include, but not necessarily include, transferring storage from the WCC or IOT device that is experiencing the potential fault, change in power status, changing or transferring DLC functionality or responsibility in the cluster, modifying resource tables, logging the event in persistent remote cloud, making configuration changes to application software or firmware or DLC code run on the appliance IOT or WCC device subject to the potential fault, engaging in additional testing and collecting additional diagnostics, creating an event, and or logging activity.

In one embodiment, upon suspecting a fault IOT will perform a comparison between its actual vs its expected AC ripple fingerprint. Known fingerprint patterns are associated with known states of the device, and a fingerprint that does not match the state of the device will cause a suspected fault upon which an event is generated and action taken to either further investigate or dynamically address and adjust the cluster or device to sustain suitable operation for the desired application or service. In one embodiment, another IOT device is prompted to engage in activity to observe its own AC ripple fingerprint and report the status. The payload reported by either device may include status or an image of the fingerprint. In one embodiment, the fingerprints are compared to determine if local power interference or global noise is causing the mismatch. In another embodiment, more IOT devices are included in the analysis to determine or rule out a cause or fault.

If the consumption or AC fingerprint pattern matches the expected pattern, the device may report no fault in connection with this specific class of monitoring. In one embodiment, an image of the AC ripple fingerprints are periodically or when prompted, shared with an end node which may use the data for understanding, filtering cross-talk and identifying a particular device failure or detecting the state of another device or network event.

Similar to the method of above for monitoring AC ripple patterns for faults, and capturing images of AC ripple from various IOT devices, in some embodiments, RF patterns and communication data at two or more devices are analyzed for quality of service, intrusion detection, malware, signal augmentation, interference or the like. Upon detection of a condition of anomaly at least one IOT device In still another embodiment, a supercapacitor may be used by WCC devices or end nodes. By way of example, a WCC storage capacitor may be of a supercapacitor type.

Supercapacitors act like a traditional capacitor, only they can store tremendous amounts of energy. The supercapacitor's high energy storage and high power delivery make it an excellent choice to buffer energy loads, including those involving a high-power load from a low-power, energy-harvesting source. A supercapacitor can be charged very quickly due to their low internal resistance and they can be quickly discharged, too. Supercapacitors offer an important benefit for energy-harvesting applications. In one embodiment, a WCC device uses an energy-harvesting circuit to interface an energy-harvesting source to a supercapacitor. In another embodiment, a WCC device maintains the output voltage or current of the energy-harvesting source so it delivers the maximum possible power.

In another embodiment, over-voltage protection is used to ensure the supercapacitor-rated voltage is not exceeded. In another embodiment, active balancing is used to maintain the supercapacitor cells at the same voltage with a low-current circuit. In another embodiment, a WCC power source is a quasi-crystal nano-diode battery. In another embodiment, a WCC is coupled to a graphene supercapacitor. In another embodiment, the WCC is coupled to one or more supercapacitor that is of a stacked, 3-D type. In another embodiment a WCC device is coupled to graphene-based micro-supercapacitors that are produced on both sides of a polymer sheet with sections stacked, separated by solid electrolytes, where the stacked configuration substantially provides increased energy density.

In another embodiment, a WCC is coupled to a mechanically flexible supercapacitor. In another embodiment, a WCC is coupled to a micro-supercapacitor that is small enough to fit in wearable or implantable device. In another embodiment a WCC is coupled to a supercapacitor that is thinner than a piece of paper yet capable of holding more than twice as much charge as a comparable thin-film lithium battery. In another embodiment, a WCC is coupled to a supercapacitor having a design employed laser-scribed graphene, or LSG with manganese dioxide. In another embodiment a WCC is coupled to a boric acid infused laser-induced graphene supercapacitor.

FIG. 2B illustrates an example of a bridge circuit 105, which may be utilized in some devices to provide one or more of enhanced power management, dynamically or static utilization of more than one type of power, provide power switching, provide controlled gating of output power, and provide power monitoring feedback.

In one embodiment, the IOT or WCC device is connected to a bridge circuit that provides AC to DC conversion. Upon loss of AC power, the bridge circuit optionally notifies the IOT or WCC of the change in power condition. For a period of time after the AC power is cut, the bridge circuit provides the buffered DC output through a capacitor 104i.

In some applications, the bridge circuit utilizes a power buffer such as a capacitor to provide power for itself to operate. This enables the circuit to engage in switching, monitoring, signaling or any of its function, when changing power sources due to a currently used power source being drained, switched, or cut-off.

When changing power sources, the bridge circuit may switch to another power source. In one embodiment, the bridge circuit gives priority to available power sources and changes the priority table when active power is available. In one embodiment, the priority is changed in response to the state of the power sources.

In one embodiment, the IOT or WCC device is connected to a bridge circuit that provides AC to DC conversion. The DC output is used to sustain charge of a battery power source 104a. Upon loss of AC power, the bridge circuit optionally notifies the IOT or WCC of the change in power condition, to signal that power is now operating from battery. In one embodiment, the bridge circuit also provide the WCC or IOT with an indication of the power level of the battery. In one embodiment, the DCL cluster of nodes reorganize functionality across the cluster of devices due to the status change from operating from a consistent power to a temporary power source.

In some applications, for a period of time after the AC power is cut, the bridge circuit provides the buffered DC output through a capacitor 104*i* until the capacitor is discharged and depleted by the WCC.

An IOT device that is about to lose power or if one loses a primary power supply, the bridge circuit 105 can dynamically switch to another form of power to maintain the device processing at least sufficiently long to power-down or switch to performing another operation or complete the processing of a specific currently operating function. In one embodiment, the device can have a bridge circuit that communicates between AC power and capacitive storage power. If the device loses AC power, the device can immediately transition to capacitive storage power to avoid loss of data, loss of processing function, interruption in processing, interruption in wireless communication, or interruption in sharing of resources between devices in a DLC group.

In one embodiment, the power sources of FIG. 2 may optionally individually and exclusively, or alternatively, together or in one or more clusters, can coupled to an interface circuit that adapts in particular scheme according to a design. The scheme can include utilizing portions of the power sources and dynamically switching between power sources or grouping power sources for specific functions. The grouping, selection, or switching between power sources can be configured by a user, or can be configured by the DLC group, an authority, or depending on the specific operation being processed. In some embodiments, the specific devices can identify when they can be clustered or be associated with more than one power source. In some embodiments, the bridge circuit 105 allows for dynamic switching between different types of power sources depending on the power requirements, the availability of power in any one power course, failures in power, or based on predefined configuration profiles.

In one embodiment, the bridge circuit 105 taps and couples the AC power 104*i* into a capacitor 104*e* to provide a desired output DC voltage to a WCC device. The bridge circuit may replenish a storage capacitor 104*e* to recharge the capacitor at a regular interval or upon detecting the loss of voltage in the capacitor due to leakage over time. A bridge circuit may also include an activation trigger for prompting initiation of an AC tap source for charging a supercapacitor for DC use. In one embodiment the trigger is tied to short throw relay which engages in an instant temporary coupling of the AC power through the bridge circuit into a storage capacitor 104*e*. In one embodiment, the trigger is tied to the output of the capacitor and upon reaching a threshold voltage level engages in the AC coupling to recharge the capacitor, keeping the capacitor charged. In some cases, a trigger is received from a local WCC or from a remote source and depending on the application, it may be triggered through mechanical contact.

In one embodiment, the bridge circuit is triggered upon mechanical engagement and manipulation of switch, such as a light switch or switch coupled to an AC device, or a relay. In one embodiment, the bridge circuit is triggered upon transitioning a switch from OFF to ON or ON to OFF and whereby the bridge detects the state transition, causing a one-shot tap of AC to charge the capacitor 104*e* for loading an engagement cycle for reporting the switch state change to a desired end node.

In another embodiment, the above configuration is enhanced through a state signal that may be read by the WCC or IOT to indicate that stable power is available while the switch is sustained in the current state. The bridge circuit engages in the maintenance of a DC power source by coupling the AC power source into a DC source and the DC power sources is maintained by the bridge circuit using any known means in the art. When the switch coupled to the AC power source is turned OFF, the bridge circuit changes its state signal to notify the WCC that power loss from the current source is imminent, enabling the WCC or IOT to engage in any special functions to report this to a desired end node. In one embodiment, one or more or all DLC nodes take action to transfer payload. In one embodiment, one or more or all DLC nodes take action to transfer functions carried out by the soon-to-be dormant device to another device.

A bridge circuit may be configured to both convert AC to DC in devices that have access to DC, but may also pull power from multiple power sources 104. In one embodiment, a bridge circuit is configured to wake up when activated using a piezoelectric power pump source and when power is provided to provide wake up signal to the bridge circuit In addition to bridging one or more power sources 104 into a WCC or IOT device, a bridge circuit may also be equipped with a gate for controlling the voltage provided to activate a WCC or IOT. The gate, can shunt stored power from any power source 104 into the WCC or IOT such that the power is provided at a specific instance.

The bridge circuit may also have a control signal capability to provide a WCC or IOT with information characterizing available power. This may be useful to notify a powered WCC that power sources is reaching a threshold power level and soon power will be lost. In one embodiment, a WCC or IOT may engage in routines in a special playbook that are tailored for use when short burst power loss is imminent, so other nodes can be made aware of the status and take any necessary action, if any, to ensure functionality of the DLC application or services being provided by a cluster of DLC members.

In one embodiment, the bridge circuit may include a low loss, efficient, rectifier and one or more buck converters to provide efficient energy extraction from sources with high open circuit voltages. In one embodiment a Linear Technology LM3588 may be configured to provide energy harvesting. In one embodiment the bridge circuit is coupled between an AC power source and a supercapacitor for enabling a short burst of AC into DC to satisfy a DC operation of a device for a period of time.

Figure 3A:
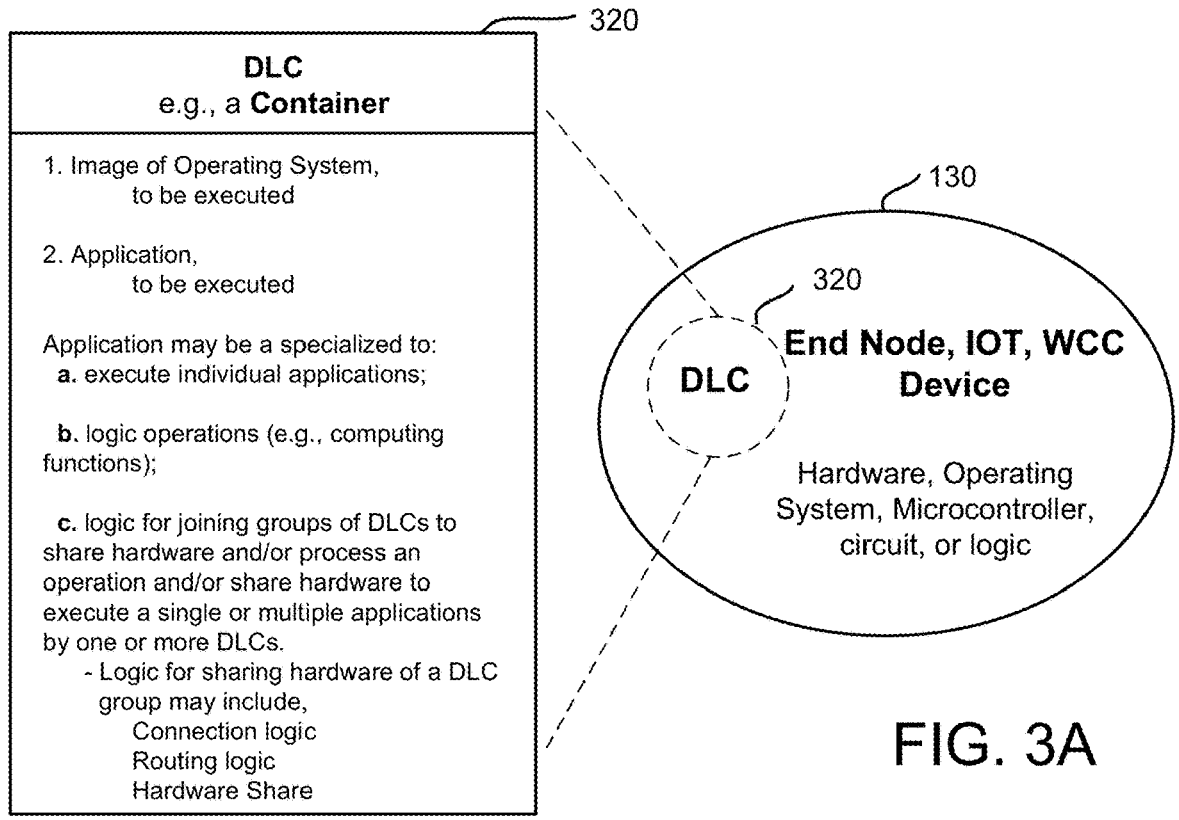
FIG. 3A illustrates example of components associated with DLC logic, in accordance with one embodiment.

FIG. 3A illustrates example of components associated with DLC logic, in accordance with one embodiment. In this example, without limitation two other configurations of DLC logic, the DLC logic can be defined as a container. For ease of reference, the DLC logic is referred to as DLC 320. DLC 320, when defined as the container, will include an image of an operating system to be executed. Additionally, the container will include an application to be executed. The application can vary depending on the functionality provided to the DLC 320. In some embodiments, the application may be specialized to perform specific functions, operations, sharing, and other interfacing or communication functions. By way of example, the application may be specialized to execute individual applications.

For example, some DLC 320 applications may be configured with specialized logic for performing specific tasks. Example of specific tasks, without limitation, may include communicating with other end nodes 130. The communication may include transmitting a message to a recipient, sending data to another node, requesting data from a node, requesting image data from a remote node, processing data for another note, exchanging data between nodes, communicating with network devices, communicating with a cloud infrastructure device, communicating with cloud storage, interfacing with virtualized hardware, interfacing with data centers, interfacing with data stored in data centers, interfacing with processing servers of data centers, communicating between nodes as peer-to-peer notes, communicating this hybrid notes that utilize peer to peer and networking education, processing display data, processing video data, processing security functions, processing identity functions, verifying users, biometric processing, processing WCC functions, and other types of processes, functions, communications, interfaces, or exchanges of data.

Continuing with that example of DLC 320, other types of applications can be defined for performing logic operations, such as computer functions. Other types of operations performed by applications or portions of applications, or simply logic that's not associated with any application may include logic for forming or connecting to other devices. The logic and also include logic for joining nodes to DLC's that are part of a group, or forming a group with more than one DLC. In one embodiment, the logic can be provided to enable two or more DLC enabled devices to share hardware and/or processing power.

In one embodiment, the sharing can enable certain devices to share a portion or parts of their hardware resources to other devices that may be requesting processing power. In one embodiment, notes can operate with one or more DLC 320, and specific DLCs can be executed to process specific functions or multiple functions. In some embodiments, the logic provided by DLC's can include logic for sharing hardware of a DLC for forming a DLC group. The operations can include logic for forming connections between the DLCs and forming specific connections with better bandwidth, priority, or optimized functionality. In some embodiments, the logic and also include routing logic for routing messages, data packets, and information among the DLC's of the DLC group. In another embodiment, the application data can also include hardware share configurations that enable the devices to define how much hardware will be shared with other devices, aced on predefined functionalities, predefined share capabilities of the vices, and bandwidth requirements.

As shown, end node 130 can include DLC 320. The node 130 can be an end node, and IOT, the WCC device, or any other device that's capable of executing DLC 320. In one embodiment, the hardware, operating system, microcontroller, circuit, or logic of that end node 130 can be shared proportionally depending on the requirements of the DLC 320. The requirements can be preprogrammed into the DLC 320 by a user, or by access to a configuration network, file, protocol, or information retrieved from the Internet. Broadly speaking, DLC 320 can be defined as a container as noted, or can be defined as simple code that can be executed by specific devices. The code can be defined by one or two program instruction lines, links to the Internet for further execution, links to other devices for further execution, shared execution of the logic, and other configurations. Example implementations of a container were described above, and those examples are applicable to this discussion of the DLC 320, when defined by a container.

Figure 3B:
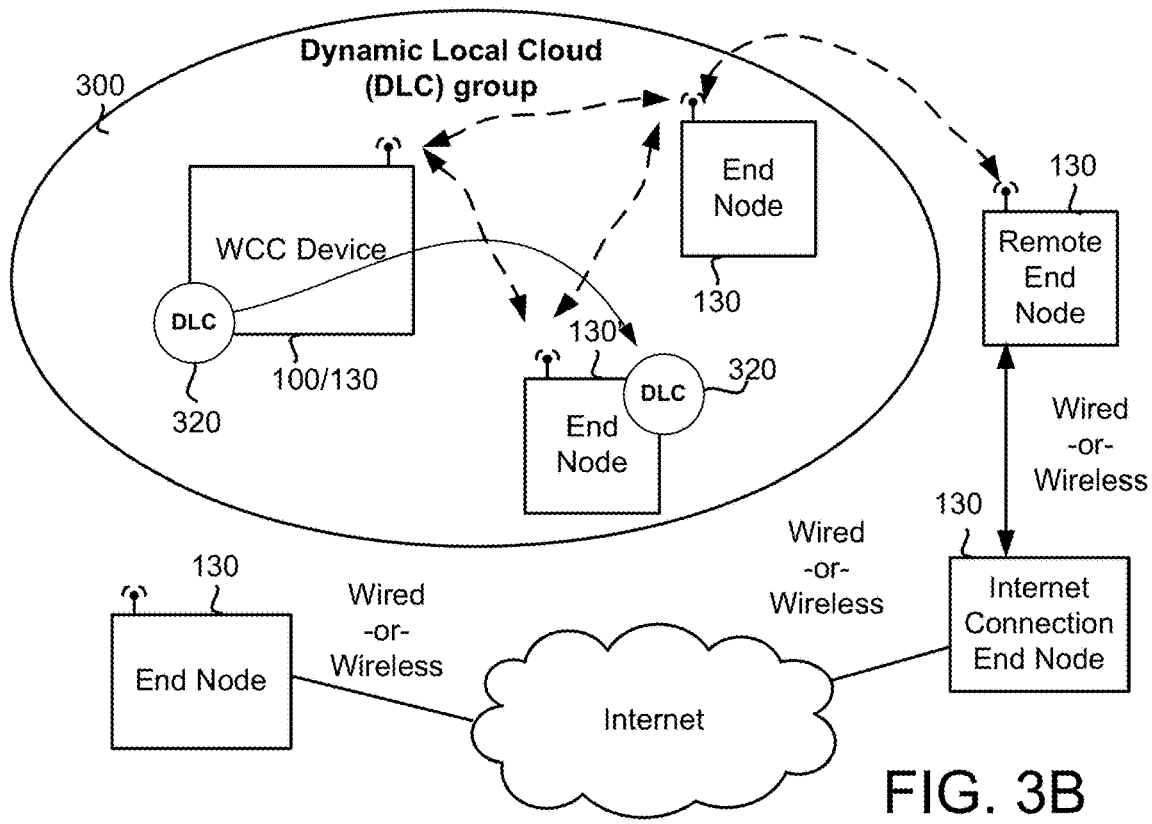
FIG. 3B illustrates an example of a WCC device, associated with a dynamic local cloud (DLC) group, in accordance with one embodiment.

FIG. 3B illustrates an example of a WCC device 100, associated with a dynamic local cloud (DLC) group 300. In this example, the DLC group 300 is established between certain end nodes 130, which may be available to provide processing power to the WCC device 100, and which may be requesting processing power. In one example, the WCC device 100 may be configured to populate a request to end nodes 130 that may be local to the WCC device 100 and willing to provide processing power. For example, if the end nodes 130 are devices that have idle time or cycles, those devices can be asked (e.g., using request packets, data pings, API calls, signal exchanges, etc.) to join a group to define a DLC group 300.

In this example, two end nodes 130 have been discovered local to a network, e.g., a wireless network. In this example, one of the nodes is a WCC device 100/130. The WCC device 100 is executing DLC 320, and is requesting at least one other note to join the WCC device 100 to form a DLC group 300. In this example, two other end nodes 130 do not yet have DLC 320 or have DLC 320 but not executing DLC 320 at the instant of the request by WCC device 100. In one configuration, WCC device 100 can send a lightweight DLC 320 to one of the end nodes 130 for installation. In one embodiment, the end node 130 that receives DLC 320 can have firmware that already accepts DLC processing.

In another embodiment, lightweight DLC 320 can include management logic to integrate with existing logic of the end node 130. In still other embodiments, end node 130 can be requested to download its own copy of DLC 320 from a website. In still another embodiment, the end node 130 can be requested to download firmware from the manufacturer of the end node or from another website. Once the end node 130 has secured or obtained DLC 320, and has executed DLC 320 for active use, the WCC device 100 can use the processing logic of DLC 320 to communicate with other notes having DLC logic 320, in the form of a DLC group 300.

In the illustrated example of FIG. 3B, other end nodes 130 may not have DLC logic 320, but may still be able to communicate with other devices having DLC logic 320. For example, is possible that one of the end nodes that does not have DLC logic 320 has a strong Internet connection to a remote end node 130. The remote end node 130 can then have wired or wireless access to an Internet connection end node 130 for access to the Internet. Messages communicated or data requested by any one of the notes of the DLC group 300 can thus exchange data with and notes that are either local within the DLC group or remote via the Internet.

This example illustrates the flexibility of creating DLC groups with notes that are not yet members of a DLC group or do not yet have DLC logic executing thereon. Once DLC groups are created, the group of devices can execute a program, a function, a task, or operation that is requested by one of the members of the DLC group. In still other embodiments, in remote node made request processing power from a DLC group that is remote. In that situation, neither of the devices of the DLC grouper masters and they all operate as slaves to a remote node that is not part of the DLC group.

In some embodiments, some end nodes 130 may have direct access to an Internet connected node 130. The Internet connected node 130 may be, for example, a wireless access point, a local router, a gateway connection, a switch, or cell tower, or other networking device or system. As further mentioned above, the devices that form end nodes 130 can include Internet connected or wirelessly connected computers, cell phones, smartphones, tablet computers, routers, repeaters, base stations, servers, smart watches, smart glasses, personal computers, telephones, vehicles, bicycles, appliances, lighting equipment, and any other device having wireless communication capability and/or processing bandwidth. Other devices, circuits, things, IOTs, WCC devices, and electronics described throughout this document are also included as end nodes 130, without limitation. While it is desirable for a WCC device to operate in a wireless manner, a WCC device 100 may be configured without a wireless capability but instead include an alternate communication path to engage its function is a pseudo or phantom wireless mode.

In some embodiments, additional end nodes 130 can be paired with the WCC device 100 to expand the DLC group 300. In some embodiments, the group that defines the DLC group 300 may shrink, e.g., by losing end nodes 130. If the DLC group fails to have capacity to process a task or processing request, the DLC group 300 may automatically close end nodes 130 or may disengage with such nodes. In other embodiments, the WCC device 100 can discover other end nodes 130 even though the end nodes 130 are not yet paired with the WCC device 100.

In one example, the end nodes 130 can be part of a mesh network. Broadly speaking, and by way of example, a wireless mesh network (WMN) is a communications network made up of radio nodes organized in a mesh topology. In one embodiment, the WMN is a type of wireless ad hoc network. Wireless mesh networks may consist of mesh clients, mesh routers and gateways and/or other computing devices noted above. In one example, a mesh clients (i.e., local nodes, remote nodes, end nodes, connected nodes, generally nodes, etc.) define the mesh and assist in routing and forwarding traffic to and from the gateways which may, but need not, connect to the Internet.

The coverage area of the end nodes 130 working as a single network may also be referred to as a mesh cloud. Access to this mesh cloud is dependent on at least some end nodes 130 being proximate to each other working together to create a radio network. A mesh network also provides redundancy. When one node can no longer operate, the rest of the nodes can still communicate with each other, directly or through one or more intermediate nodes. In one embodiment, wireless mesh networks can self-define and self-repair. Wireless mesh networks can, in one embodiment, use various ones or combinations of wireless technologies, such as Wi-Fi (e.g., 802.xx), Bluetooth, NFC, radio, and cellular technologies, etc.

In general, the local proximity is a relative term, which relates to nodes that are local to a specific node. For instance, one of the local nodes 130 may be capable of wirelessly communicating with remote node 130, but WCC device 100 does not directly have wireless communication to the remote node 130. In one example, the local node 130 accesses a repeater or forwarder of the data or information or payload being transferred or sent by the WCC device 100 to a specific end node 130. The routing of data from the WCC device 100 to the end node 130 can be over a local network and/or over the Internet, which couples to a connected node 130. For example, the remote node 130 can be wirelessly or wired connected to the connected node 130. In one embodiment, the connected node 130 can be a router, repeater, computer connected to the Internet via wire or wireless, or the like.

In one embodiment, the end node 130 is a device, system, cloud system, or recipient of data produced by the WCC device 100. The data routed over a wireless network between the WCC device 100 and the end node 130 is therefore utilizing one or more networks. In other embodiments, the communication to the end node 130 can bypass the Internet. Other example networks can include Wi-Fi networks, such as WiFi aware networks utilized by devices that discover other devices and transmit and relayed messages to the destination devices. Once the data has reached the end node 130, the end node 130 can then perform processing to either store data received, forward data to another device, and data to a database, add data to a big data database utilize for mining and metric analysis and learning, and/or simply record the operation so that other devices can view status information or communicate data back to the WCC device 100 or a different WCC device 100.

Figure 3C:
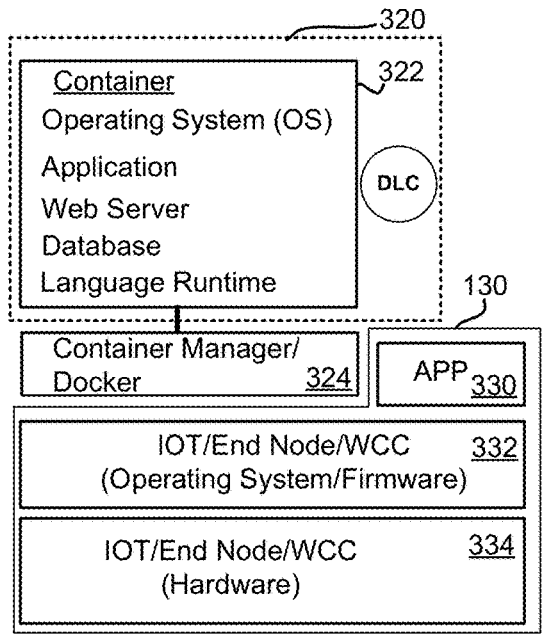
FIG. 3C illustrates other examples of platforms usable for running DLC, when defined by a container, in accordance with one embodiment.

FIG. 3C illustrates other examples of platforms usable for running DLC 320, when defined by a container 322. In this example, the container includes an operating system (OS), an application, a Web server, a database, and language runtime. In other embodiments, the container can simply include an operating system and an application. Instill further examples, the container can simply include an application or lines of code that enable the functionality for sharing resources with other end node's perform a DLC group. Therefore, it should be understood that the use of a container 322 is by way of example, and not necessarily tied to a specific container definition provided by certain manufacturers or organizations.

In one embodiment, it is shown that the container 322 is interfaced with the container manager 324. One example container type is called a Docker. For example, a Docker is also sometimes referred to as a container that wraps up a piece of software or code with a complete file system that contains the logic to run code, a runtime, system files and tools, system libraries, and other files that are typically installed to define a server or installed on a server. Thus, Dockers enable the packaging of applications with all the dependencies into a standardized unit of software for development. As shown in FIG. 3C, the container manager 324 enables the execution of the container 322 of DLC 320. The end node 130 that has its own function or native application, can be utilized to run DLC 320.

In one embodiment, end node 130 can preinstall the container manager 324, such as by downloading code and installing code onto the end node 130. The container manager 324 may also be installed as part of the firmware or operating system of the end node 130. Application 330 is provided to illustrate that the end node 130 may already have a specific application or function. For instance, if the end node is a refrigerator, the refrigerator will have its own application 330 running refrigerator functions. If the end node 130 is a general-purpose computer, such as a smart phone, tablet computer, desktop, and then the end node 130 will have the ability to install multiple application 330.

In still another example, if the end node 130 is a thermostat, the thermostat functions and applications that enable its functionality will be part of end node 130, and may communicate with the operating system or firmware 332 of that end node 130. Further shown is that end node 130 will include its own hardware 334. As mentioned above, the hardware 334 may include multiple components usable to execute a program. The hardware can include a processor, digital circuits, wiring, batteries, I/O devices, displays, buses, memory, interfaces, connectors, input interfaces, cameras, gyroscopes, recorders, speakers, microphones, etc. The operating system or firmware 332 of the end node 130 will therefore communicate with the hardware 334.

The container 322 is in communication with the container manager 324, which is interfaced and working with the operating system or firmware 332 of the end node 130. The container 322, in one embodiment will execute its own application. The application can be one that executes sharing functions to enable end node 130 to share part or all of its resources at certain periods of time. In some embodiments, the end node 130 can be preprogrammed to set the amount of resources it is willing to share with a DLC group, based on the processing performed by the application of the container 322 of DLC 320.

Figure 3D:
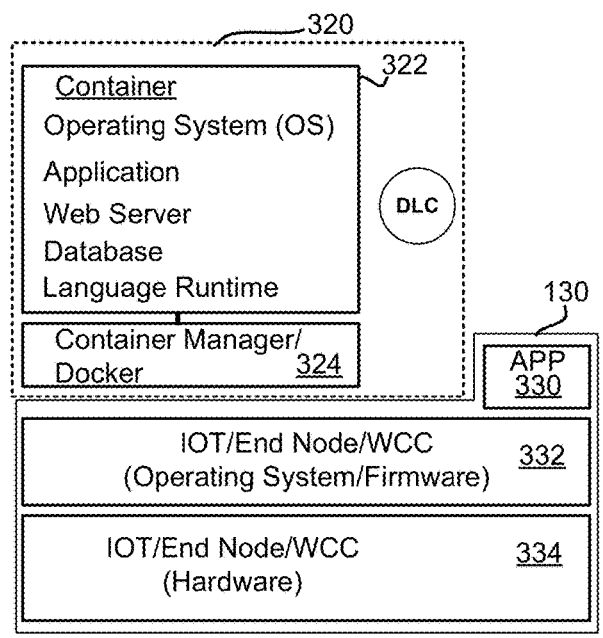
FIG. 3D illustrates an alternate example where DLC will include a container manager, in accordance with one embodiment.

FIG. 3D illustrates an alternate example where DLC 320 will include a container manager 324. In this configuration, when the DLC 320 is installed on the end node 130, the container manager will be contained as part of the DLC 320, reducing the need to separately download or install firmware updates in order to make the device operational.

In one embodiment, firmware replacement operations on specific end nodes, IOTs, devices, etc., may be performed. For example, one IOT controls another IOT through a process to load new firmware to another IOT. Predefined functions may also be triggered if a controlling IOT determines replacement IOT firmware not successfully loaded.

In one embodiment, a global program interface may be provided. By way of example, programs that may be specific to an IOT or be related to new functionality provided by a combination of IOTs, may be contained either in the DLC container of an IOT, spread out across multiple DLC containers, and have different user interfaces and controls. To satisfy the balance between local interaction and overall management of a combined system, a global program interface may be configured to coordinate both access to individual IOT settings but also new services that form in connection with active DLC instances that provide service and functions. The user interface may reflect characteristics and the branding of a new breed of operating system reflecting traditional features, including backup and restore of images across all nodes, etc. In one configuration, the operating system is Linux-based. In one configuration, the operating system has packages and modules and may be kept up to date with a package manager. In one configuration, a DLC container runs an image that is maintained and updated over time.

Further a DLC image and instance management is provided. The DLC may operate as a container facilitating the running of an instance of an image of whose contents can be managed, updated, to ensure security and functionality of the image.

In one embodiment, preregistration of WCC devices can be done via online marketplaces (e.g., websites). Any WCC IOT device described herein may pass through a preregistration process at a retail outlet so that when received at the user's home, office or industrial environment, the device is already configured to connect to the router and out to external systems. In one configuration, a retailer such as Amazon.com is provided or has access to the access credentials and can pre-program access credentials into the WCC IOT prior to shipping the device to the end user.

In another embodiment, signaling system for registering product to user after product is already packaged is provided. For example, remote flashing of customization data to a packaged product may be made using an electromagnetic emission field. This field may penetrates the product package. The field can be received by a WCC device which harvests the energy from the electromagnetic emission to wake up the WCC device, which monitors ongoing electromagnetic emission pattern which is modulated to pass customization data. This data can include, for example, a user profile or access credentials or the like to the WCC device product while it is in the product packaging, even when shrink-wrapped.

On one embodiment, processing can be via single or multi-threaded applications. There are often challenges of running a single-threaded application in an environment optimized for distributing multiple-threaded applications to multiple cores. Multiple-threaded applications typically offload a batch of work to a worker thread so an application can either continue responding to user input or run code that doesn't rely on that input. Multiple-threaded applications use parallel processing to sub-divide work into discreet non-dependent units of work. However, DLC operations may contain a mix of single threaded applications and multi-threaded or concurrent programming to gain the benefits of both simple applications and those requiring parallel processing. In one configuration, a single threaded processor operates in DLC environment having access to global variables for context switch preservation, where the operation of a low overhead mechanism provides concurrent programming using stack-less, non-permutable, blocking context switching using muxes and thread synchronization.

In one embodiment, bundled consumable distribution is provided. By way of example, a network of WCC IOT's may comprise multiple items that need replenishing for sustaining operation over time. For example, a WCC water filter, coffee filters, coffee, items in a refrigerator that are tracked, air filter, etc. A global software layer may report all needed or soon to be needed items for one household to multiple online marketplaces to obtain a quote for replenishing the goods. The user may then receive offers on a bundle of replenishment items for their smart ecosystem of devices from such marketplace. In one embodiment, when fulfilling an order to replenish goods, if necessary, the online marketplace can receive any personalization data, or access credentials, to pre-register any items to ensure seamless operation within the user's household.

One consideration for engaging in the commerce, exchange or sale of products involves the need to transfer ownership of a used IOT device to another owner, after the IOT device was originally registered, to transfer the device to the new owner. It is here expected that IOT devices may be sold at an economic loss, or as part of a subscription, or leased, or bundled with other products or services. In one embodiment, an original seller, OEM, service provider, operating system provider or retailer establishes a registration service associated with the IOT that ensures the IOT device ownership is tracked over time, where new ownership is reported or where such change is governed, and may be transacted for consideration under an obligation. In one embodiment, a device re-registration service may include a security process to facilitate secure tracking change of ownership of the device. The registration transfer process may be zero cost, fee-based, subscription based, advertising based or based on an evident strategy where a company or service seeks to establish a base of customer upon which future economic benefit may transpire.

If no registration transfer service is bound to an IOT device, reprogramming the device is possible even though it was previously registered. In one embodiment, when an IOT or WCC device is sold or transferred to a new environment, or when a gateway router access credentials are changed directly on the router without reporting the credentials to the local IOT authority, the IOT will recognize it no longer has access credentials to the local network. If the WCC IOT device already includes DLC content, the IOT can reconfigure itself into a wireless access point for pairing as a new device through a factory restoring a WCC IOT device.

Other DLC devices may engage in the periodic polling to detect the IOT signature SSID as an access point and engage in a modified registration process that involves (a) passing the WIFI or gateway credential to the IOT and (b) engaging in the registration. In one configuration, the registration includes an indicator of the new legal owner, characteristics of the new network environment, and the rights associated with the device.

In one embodiment, a WCC device can be DASH-like device, but can be pre-programmed with user identification information before shipping. AMAZON or other retailers can add code to a WCC device to pre-register it to the purchaser, so future event triggers can link back to user without configuration. Disposable WCC device made part of product packaging and may be preprogrammed to original purchaser, enabling a user to purchase additional unit upon activation, without configuration. The WCC device can be made part of product packaging and packaging includes auto trigger upon product state depletion.

In some embodiments, devices may include sensors built-in the construction of a physical container. The physical container may hold any item, thing, or object. For example, the container may hold a solid, a fluid or gas. In some embodiments, the containers may be used to hold products. The products may be, for example, food products, grocery products, automotive products, commercial liquids, oil, grains, etc. In the example of food products, the physical containers may be for holding milk, cooking oil, refrigerated products, dry goods, etc. In one implementation, a low cost sensor may be integrated into the physical container. The low cost sensor may include WCC logic and/or DLC logic. The low cost sensor, in another embodiment, may simply include a passive sensing device that can transmit information regarding the product to a requesting device. For example, the passive sensing device may be an RFID tag, which communicates with a sensing element.

The sensing element may be interfaced with the product in the container, either inside of the container or outside of the container. Depending on the full level of the product in the container, the RFID tag may emit a different frequency, when a detector transmits energy to activate the RFID tag. In one configuration, the detector may be built into the area where the product will reside. For example, a refrigerator may have a detector that can communicate with the products in the refrigerator. Thus, the detector may, from time to time, send signals to the RFID tag to sense data, e.g., fill level of the product. When the fill level reaches some level, e.g., under half full, the detector can transmit information to a central device. The central device, e.g., may be part of a home automation system. The central device can then keep track of how full the different containers are in the refrigerator, and can assist in recommending that new products be ordered.

In another embodiment, a DASH like device may flash or notify the user that product needs to be ordered, depending on the full level. The product may be any type of product, include, for example, laundry detergent. Different sensors may be used depending on the physical makeup of the product full level being sensed. For dry products, a weight sensor may be used, and the detector may receive signal data regarding the weight, that is indicative of a level of full for the dry product. In other embodiments, instead of an RFID tag, other types of sensors can be used, which can sense humidity, dry/wet, pressure, motion, agitation, inertial movement, container bending, stress, etc.

Using data from these sensors, it is possible to determine when these products may be close to needing replaced, especially if these are consumable necessary products. In a commercial setting, sensors may also be used to determine when devices, objects, machines, fluids, paper, toner, oil, etc., needs replacement or replenishment. Using sensors, e.g., which can be interrogated for full level, this information can be communicated to an interested node, e.g., to alert a user or automatic replenishing system to order more.

A product can be packaged in a custom manner for a specific customer and the packaging includes a pre-registered WCC device that automatically detects and reports opening or and use/flow of the product, or potentially the state of the product as it gets near end of contents or end of life. In one embodiment, the product may be more expensive and WCC device may be disposable. In one embodiment, the WCC device may be cellular or WIFI based. In one configuration, the WCC may initiate itself to engage as an unsecured access point where it will allow another node that already has the WIFI credentials to pass those credentials to itself, as previously described.

Figure 3E:
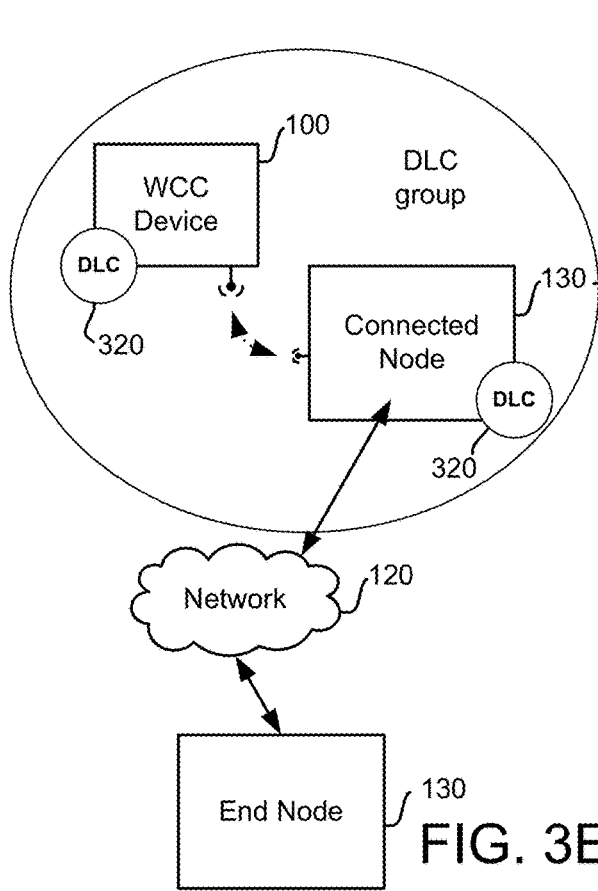
FIG. 3E illustrates an example where a WCC device can communicate wirelessly to a connected node to establish a DLC group, in accordance with one embodiment.

FIG. 3E illustrates an example where a WCC device 100 can communicate wirelessly to a connected node 130 to establish a DLC group 300. The connected node 130, in one embodiment, may be a router, or computer or device that communicates or is wired to an Internet or network access point. The network 120, which can include the Internet or can include local mesh networks or combinations thereof, can then communicate with a remote end node 130, if desired.

Figure 3F:
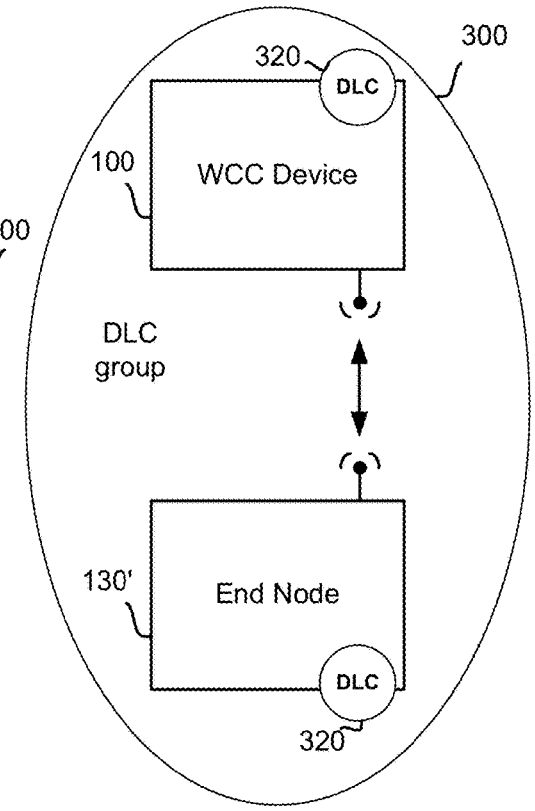
FIG. 3F illustrates another example where a WCC device can communicate directly to an end node, to define a DLC group, in accordance with one embodiment.

FIG. 3F illustrates another example where a WCC device 100 can communicate directly to an end node 130, to define a DLC group 300. This example may be where the WCC device communicates using a peer-to-peer signal to an end node 130. In one example, peer-to-peer signaling may take place using a local chord overlay network inside a local area network, a chord overlay network outside the local area network on a wide area network, or on a combination of both. In another example, the WCC device 100 can communicate signals directly to another WCC device 100, which may be represented by the end node 130.

In still other embodiments, a WCC device 100 can communicate with a plurality of WCC devices 100, and one or more of the WCC devices 100 can communicate with an end node 130, such as a server or processing entity. In some embodiments, interactions between the WCC devices 100 can be recorded and sent as interaction data to the end node 130. This data can then be processed by the cloud processing system and utilized for providing recommendations to users, notifications to users, logging of data, or simply providing viewing data or information to interested users or recipients of the data collected, sensed, process, or communicated over time.

In one embodiment, WCC devices 100 can communicate with geolocation servers, geolocation routers, geolocation wireless devices, and other location finding devices. The location identification function of a WCC device 100, can enable services to deliver data to the screen of the WCC device 100, or audio data, or video data, or related data. In some embodiments, the image data, video data and other information can be relayed to the user's smart phone or the user's smart watch. In such cases, the WCC device 100 can operate and its operation can signal to a media provider over the Internet that a user may request or need certain services or data. The data instead of being sent to the WCC device screen, can be linked to the user's device, which may be linked in a user account along with the WCC device 100.

The WCC device 100 may include a button that includes a biometric sensor. In this example, the biometric sensor can capture the user's finger prints and use the fingerprint to identify the user and enable the WCC device 100. In some embodiments, multiple users can be paired to the WCC device 100, and different services can be provided to the specific user based on the biometric ID. For example, in a family environment, a WCC device can be utilized to order goods or services. If a family adult is using the WCC device 100, the WCC device 100 can be enabled to order specific goods or services by the click of a button of the WCC device 100.

In some embodiments, user fingerprints are stored in the cloud and WCC devices couple to servers capable of retrieving a range of tiered access from simple identity through payment account information, depending on the intended application. In some embodiments, user fingerprints are stored in the cloud from various cell phone manufacturers including Samsung Inc. and Apple Inc., and WCC devices couple to servers capable of interacting with data provided by cell phone service providers or manufacturers.

If the WCC device 100 is utilized by a child of the family, the biometric sensor would prevent the ordering of certain types of goods and services, or only the goods and services associated with a profile. The profile the child, the profile of the child can then be monitored in the cloud service to identify the type to goods and services that would be offered, can be ordered, can be selected, can be reserved, etc. by the specific individual based on the biometric identification. In one embodiment, the biometric data is transferred by a wireless chip 116 to a network 120 so that an end node 130 can process the data, e.g., such as data processed by a DLC group 300.

The biometric data can be processed to verify the biometrics of the user, such as identifying the user and/or providing access codes or data to enable its use. In some embodiments, the WCC device 100 can be used to open doors, open cabinets, enabled devices, disabled devices, or provide general access to applications or data. If the end node determines that the biometric sensor data captured by the WCC device 100 matches and is verified, a determination is made as to whether the access target will be enabled.

In one configuration, an access target is simply end node 130 that allows communication to specific devices, data, digital data, physical objects, or other information based on a verified biometric code or access code. In some embodiments, a WCC device 100 can also include a camera that is activated to biometrically image the user. The image can be used to identify the user and allow access to specific device if the verification is confirmed. Therefore, in addition to a biometric sensor taking a fingerprint, other biometric data can be captured by WCC device 100, such as images of the person's eyes, DNA from ambient dust shed from the user skin, facial characteristics, saliva, hair samples, or other combinations thereof. In some embodiments, a matrix of biometric data it is used to provide access to a specific type of thing, such as a physical thing or digital thing based on the identification enabled by a WCC device 100.

In one embodiment, the program code stored in memory of a WCC device 100 can be updated based on the use of the WCC device 100. The updating can occur dynamically over time based on the use, or can also be updated by an end node 13 which programmatically send data back to the WCC device 100 for programming In some embodiments, the biometric sensor on the WCC device 100 can capture a fingerprint and then enable password to be entered automatically into a webpage. The password can then be stored in a cryptographic form on the WCC device memory 112, and only enabled or decrypted when the biometric sensor has detected or identified or verified the user.

Figure 4A:
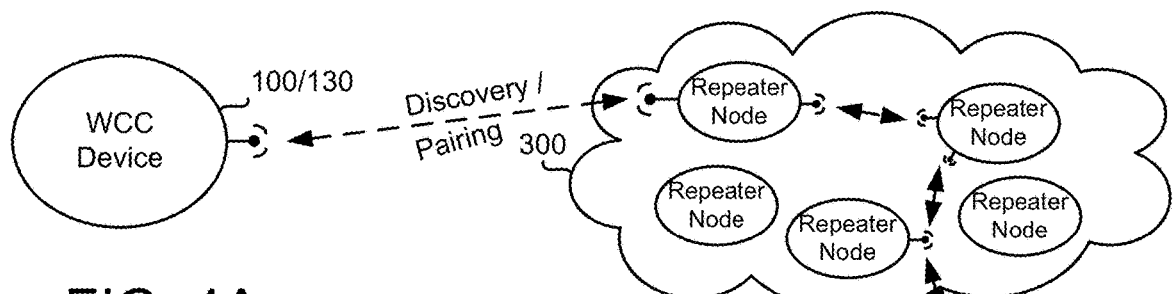
FIGS. 4A-4F illustrates various examples of communications between a WCC device and various nodes over one or more networks or directly between nodes, in accordance with one embodiment.
Figure 4B:
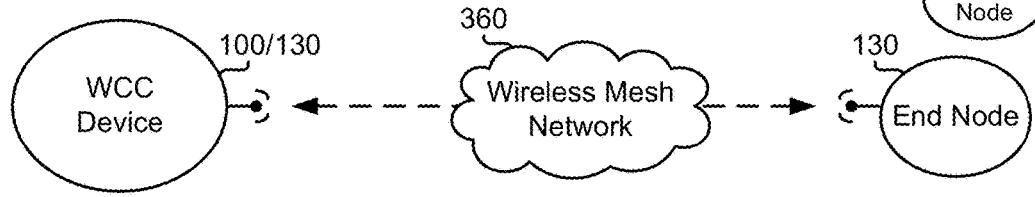

FIGS. 4A-4F illustrates various examples of communications between a WCC device 100/130 and various nodes over one or more networks or directly between nodes. For example, FIG. 4A shows a WCC device 100 that can communicate with dynamic local cloud (DLC) group 300, which is defined by various end nodes 130. As shown, the DLC group 300 can be defined from a plurality of repeater nodes that can also allow communication of data to an end node 130 that is outside of the DLC group 300. FIG. 4B illustrates an example where a WCC device 100 communicates with the mesh network 360, which can be functioning as the DLC 300 or enabling a group of end nodes 130 to process at least one operation for a requesting node or WCC device 100.

Figure 4C:
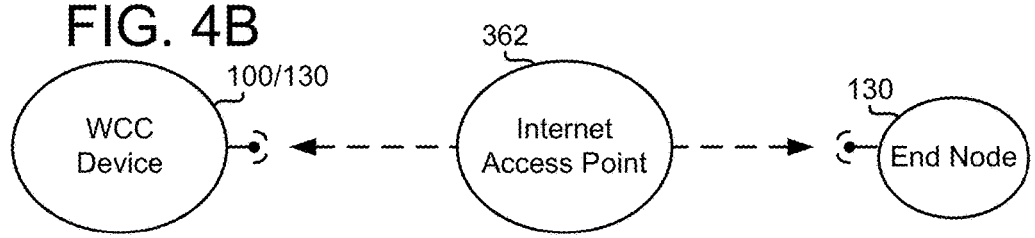
Figure 4D:
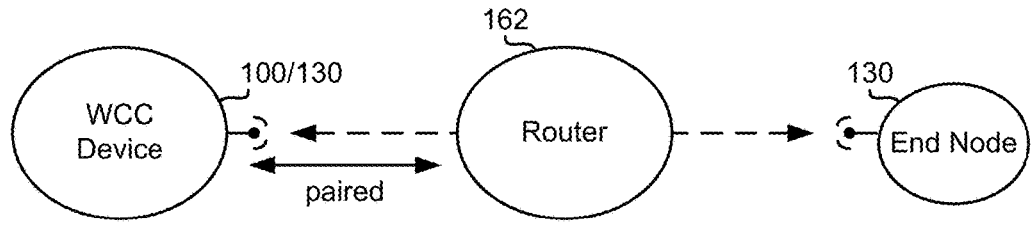
Figure 4E:
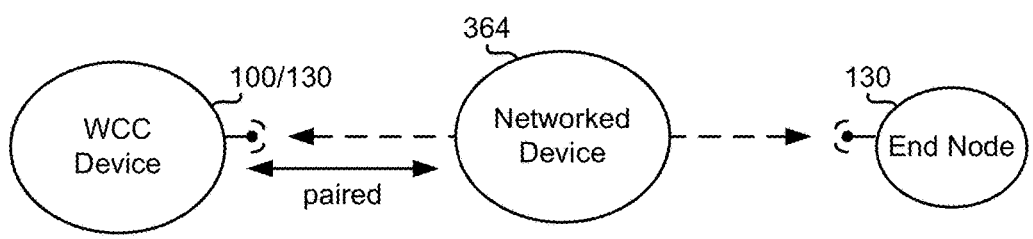
Figure 4F:
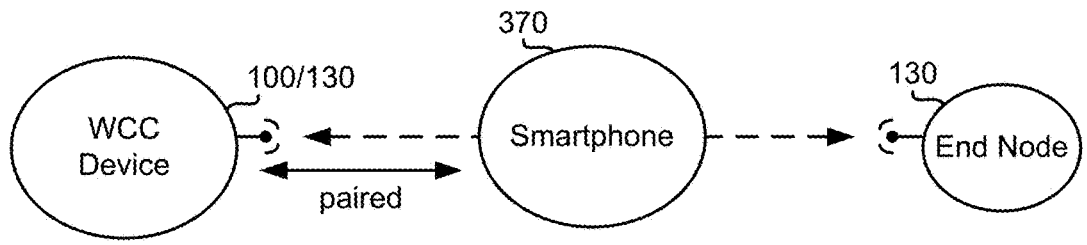

FIG. 4C illustrates a WCC device 100 communicate with an Internet access point 362, which then communicates with an end node 130. The end node 130 can be a local end node, such as a local computer within the user's home, appliance, smart device, IOT, or could be a remote computer distributed in a different part of the world and interconnected over the Internet. FIG. 4D illustrates an example of a WCC device paired with a router 162 that is defined by an end node 130, which then provides access to the end node 130. FIG. 4E illustrates an example of a WCC device 100 paired with a network device 364 which then communicates with an end node 130. FIG. 4F illustrates an example of a WCC device 100 paired with a smartphone 370 that operates as an end node 130, and which is used to provide access to the Internet or directly provide access to an end node 130.

In still another embodiment, the WCC device 100 can be paired and communicate directly to the smart phone, a smart watch, smart glasses, a display in a smart watch, display on the smart set of glasses, etc. As used herein, the term smart refers to a device that is capable of processing data using at least a processor and memory, and communicates with at least another device, or a network, or the Internet.

As used herein, proximate locations can include locations that are located with the same physical structure, the same room, or located within a wireless distance that does not require wide area networks, or within a few feet, within 10 feet, within 100 feet, within 1000 feet, within 1 inch, within several inches, or variants thereof or any number between any one of said example distances that are proximate or can be considered proximate to the WCC devices or end nodes or networks.

The cloud, in one embodiment, is part of a server and storage system that processes information, or stores information in response to data received, based on a program, based on requests, based on a schedule, based on user identity, based on credentials and requests, etc. In some embodiments, the cloud can also send data based on predefined programs, or programs that are either systematically update or updated in ad-hoc fashion, or both, over time. For instance, use of an appliance can be tracked and sent to a cloud system, which is then reporting to a specific end node 130. The owner of the appliance can then be notified, or track the use of the power tool or appliance over time by accessing the website, an application on a smart device, or receiving notification on some connected device over the Internet.

In some embodiments, WCC devices 100 can be used to track use of different objects or things in a home or commercial location, or public location. Data associated with the tracking can be monitored by the owner of the home, in a private way. Tracking information can also be encrypted, so that only those persons having privileges for viewing the data can view it. In one embodiment, the WCC device 100 may itself be an IOT. The end nodes themselves, may also be referred to as IOTs.

Figure 4G:
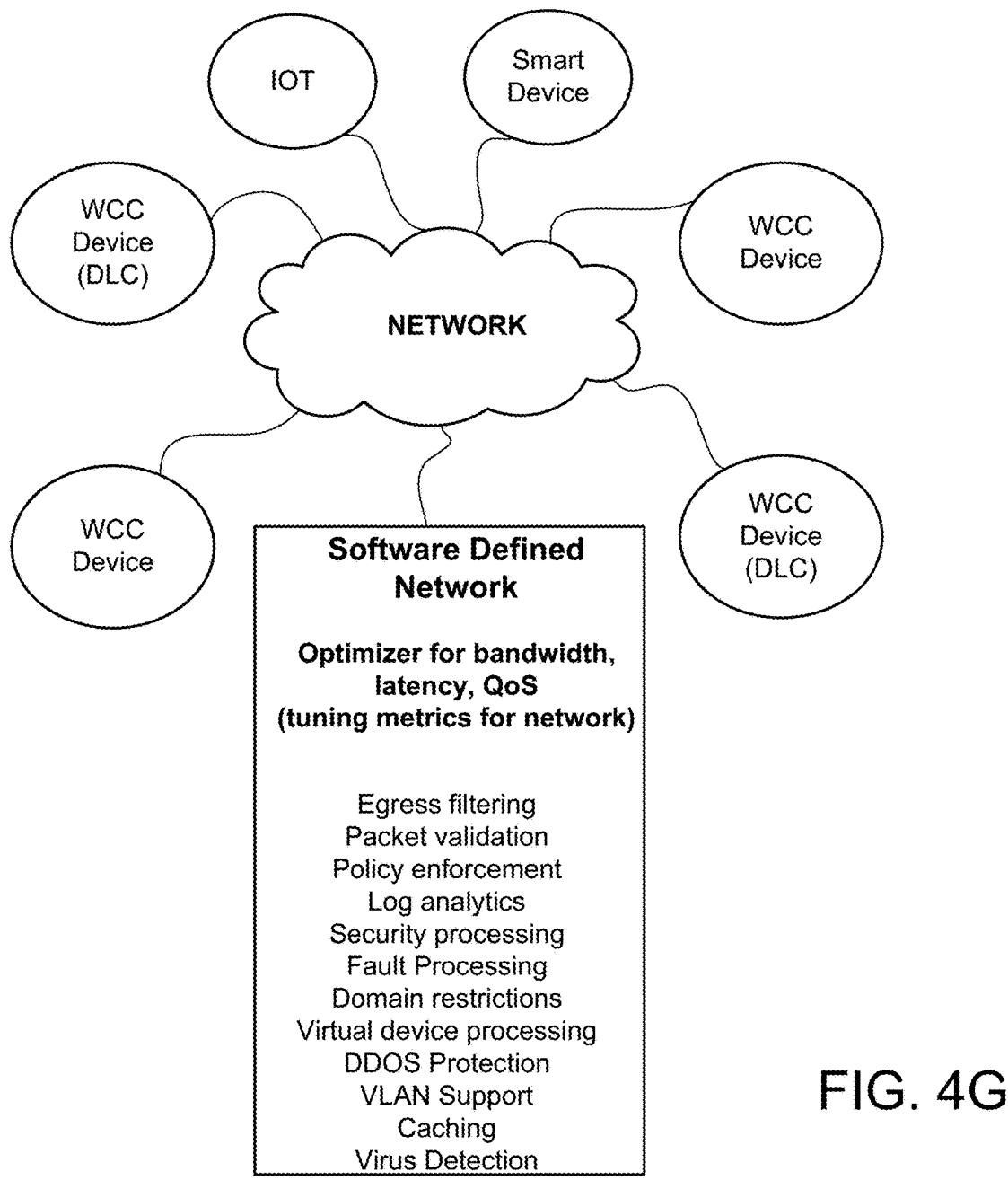
FIG. 4G illustrates an example of how a DLC or a WCC device may operate as or be coupled to a software defined network (SDN), in accordance with one embodiment.

FIG. 4G illustrates an example of how a DLC or a WCC device may operate as or be coupled to a software defined network (SDN), in accordance with one embodiment. By way of example, the DLC can be made to operate in a manner that optimizes parameters of bandwidth, latency, and cost using a range of optimization algorithms. In some embodiments, DLC maintains a dynamic network topology configuration with fault and performance states. In some embodiments, DLC may perform egress filtering and packet validation to ensure that a device on the network is operating properly, or to prevent rogue devices on the network from participating in a DDOS attacks. DLC may also conduct network resource optimization and quality of service, define a logical centralized network, enforce policies, log analytics for virtual and physical domains, establishes policies to achieve traffic engineering across a heterogeneous infrastructure, create protection bandwidth, place services in a dynamic service environment using resources from disparate devices, perform path computation and perform resource management.

Figure 5A:
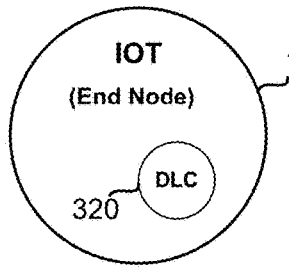
FIGS. 5A and 5B illustrate examples of end node's, which include one or more DLC, in accordance with one embodiment.
Figure 5B:
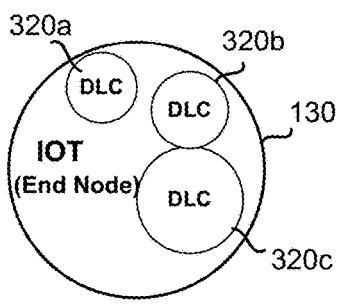

FIGS. 5A and 5B illustrate examples of end node's 130, which include one or more DLC 320. For example, some end nodes may have sufficient processing power to execute multiple DLC's 320, and various DLC's can have different applications or functions that require more or less processing. For example, FIG. 5B illustrates different DLC 320a-c integrated with end node 130. In some embodiments, each one of the DLC 320 is configured to process a different function, and the different functions can operate in concert to perform a bigger or general task. Accordingly, should be understood that DLC 320 can be installed in specific end nodes 130, or multiple DLC's of different processing power capacity or requirements can be installed in single end nodes 130.

Figure 5C:
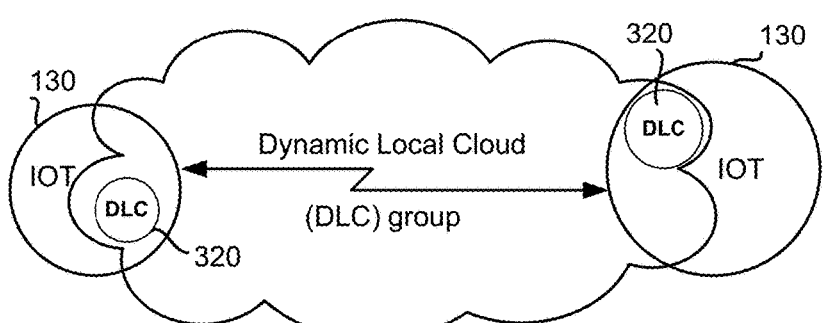
FIG. 5C illustrates an example of the user with a device that includes DLC accessing a DLC group, in accordance with one embodiment.
Figure 5C:
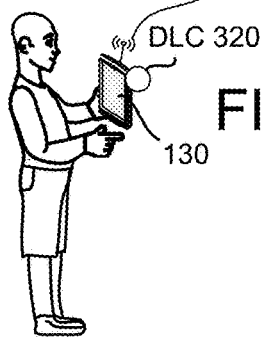

FIG. 5C illustrates an example of the user with a device that includes DLC 320 accessing a DLC group 300. The DLC group 300 is shown generically established by two and nodes 130, which each includes DLC 320. The applications running on DLC 320 may be the same applications or different applications. In one embodiment, the application running as part of DLC 320 will at least enable the creation of a DLC group. The creation of the DLC group can be for the purposes of providing processing resources to the user or can be assembled such that each DLC 320 will perform a different function of a larger system. For instance, two DLC 320s can be executed to perform a single task, and each DLC can perform a different processing task the complements the other.

Figure 5D:
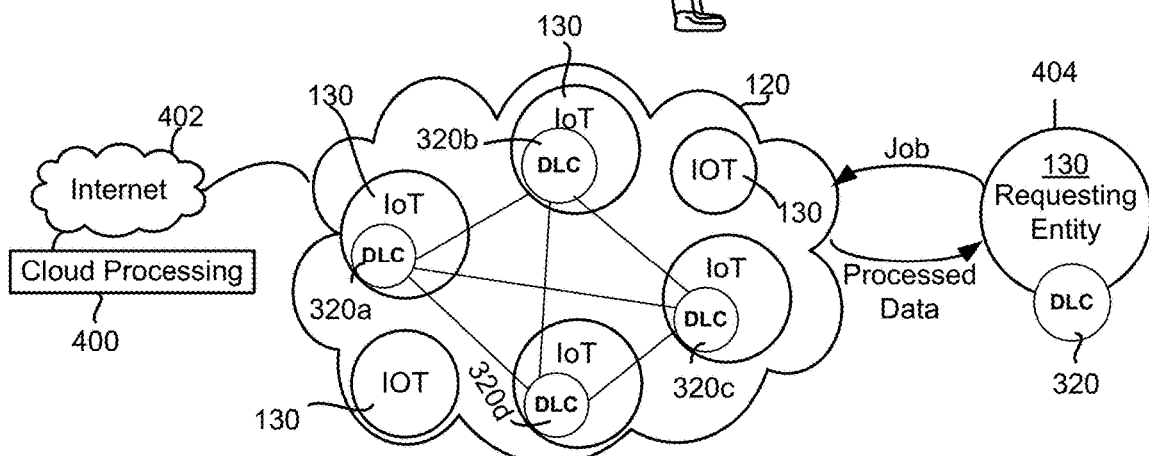
FIG. 5D illustrates an example of network that has certain and notes 130 executing DLC 320, in order to perform a processing task, in accordance with one embodiment.

FIG. 5D illustrates an example of network 120 that has certain and notes 130 executing DLC 320, in order to perform a processing task. For example, certain ones of the end nodes 130 will include DLC 320a-d, which enable conductivity and communication between the DLC 320s and the requesting entity 404, which itself can be an end node 130. For example, the requesting entity 404 can generate a job or request that is passed to DLC group 300 organized of two or more DLC 320 executing on one or more and notes 130. In one embodiment, one or more of the endnotes 130 can be provided with access to bet Internet 404 and cloud processing 400.

In some embodiments, the DLC group 300 cannot communicate with the Internet and cloud processing 400 to find and notes capable of executing DLC 320, managing the endnotes that are executing DLC 320, and/or store the process data recovered from the processing by the DLC group 300. In one embodiment, the requesting entity requested processing of a job by shared hardware of one or more and notes 130. The job is process by the DLC group 300 and the process data or results are passed back to the requesting entity 404. In this manner, the requesting entity 404 that may not have sufficient power or time to process a larger processing task or complex processing task, can then offshoot or delegate the processing to the DLC group composed of one or more and notes that are local to the requesting entity 404.

Continuing with FIG. 5D, an example processing flow for a requesting entity requesting processing power by the DLC group is shown, in accordance with one embodiment. For example, and operation 502 distributed resources are accessed by communicating with one or more and nodes 130 that have or are in communication with and notes that process DLC 320 logic. Once the DLC group is established, and the DLC group is capable of processing a task for a requesting entity, a job request 504 is sent to that DLC group. In one embodiment, operation 506 includes resource assembly, which requires that the specific end node 130 delegate or identify which resources are going to be shared with the requesting entity.

For example, some and notes may only be able to share a smaller amount of their processing power, or the processing power will only be shared at particular points in time or when the end node is not busy or there is a threshold of not busy that allows the and note to share its resources. The same characteristics and processing of memory can be performed by the specific and nodes, to identify the amounts of memory that it's willing to share at specific points in time or under specific circumstances. In operation 508, request routing is performed, which allows the DLC 322 set up a routing function that delegates certain operations between the DLC's, and then returns the data back to the requesting entity.

In one embodiment, if different DLC's are performing different tasks, it may be required that certain DLCs perform the task before another task is performed. Thus, the full operation can be performed in order and in accordance with the request routing 508. And operation 510, processing of the request can then proceed, allowing the DLC's of the endnotes to execute the task associated with the job. Once the job processing is complete, operation 512 includes the return of the process data back to the requesting entity 404.

Figure 6A:
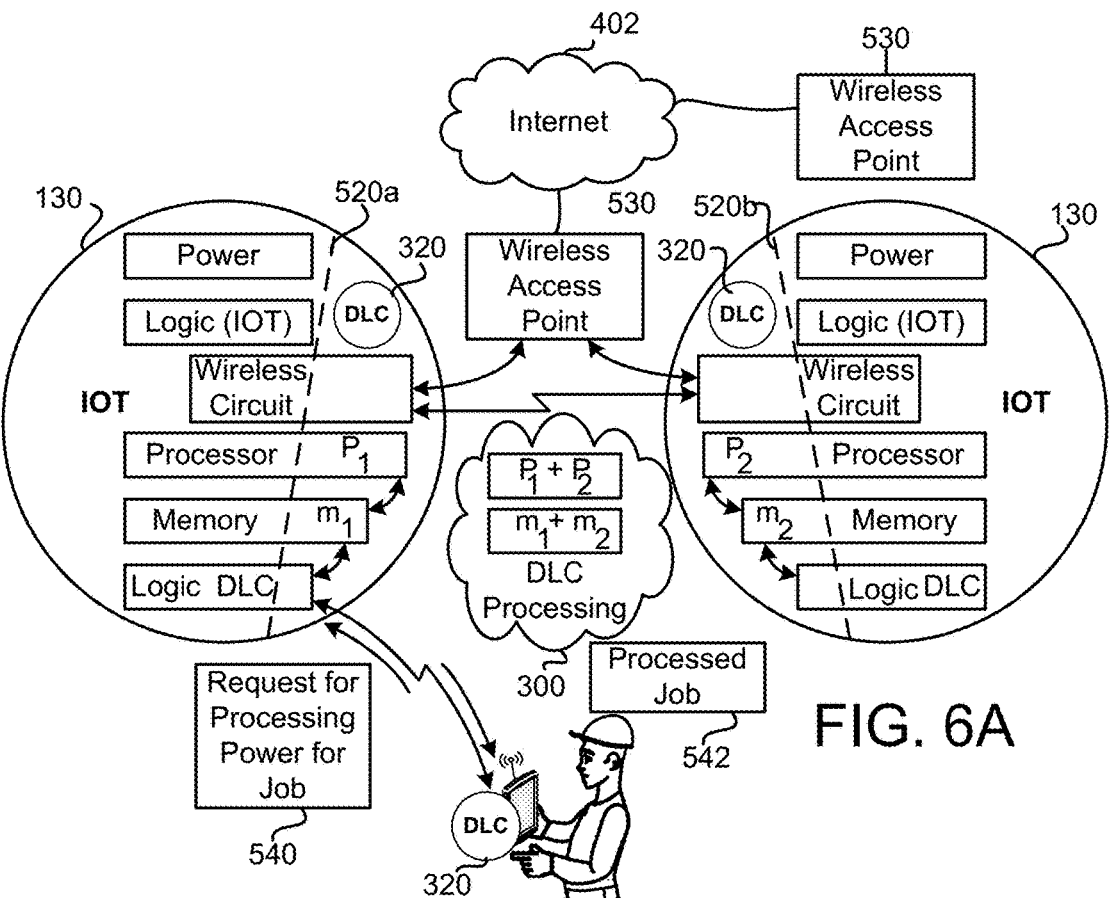
FIG. 6A illustrates an example of and nodes, which have specific components and the capability of executing DLC to share resources by defining a group, in accordance with one embodiment.

FIG. 6A illustrates an example of and nodes 130, which have specific components and the capability of executing DLC 320 to share resources by defining a DLC group 300. In one embodiment, end node 130 may include a power component, logic of the IOT, wireless circuitry, processor power, memory, and logic that enables execution of DLC 320. These components or simply an example of components of one end node 130. It should be understood that other and notes may have more componentry and other and notes may have less componentry, depending on their native function or intended application. By way of example, the end node 130 may be a refrigerator, and its functionality will have different components than does a smoke detector. Smoke detectors may have different componentry than a personal computer or smart device, and the like.

With this general understanding in mind, it is shown that end node 130 may be preconfigured to share a certain amount of resources. For purposes of illustration, lines 520a and 520b are meant to show an amount of processing resources that the end node 130 are willing to share to a requesting end node, such as the device utilized by the user. In one embodiment, the endnotes 130 may be communicating with each other utilizing respective wireless circuitry. In other embodiments, the communication can be peer-to-peer communication or communication over a network 402, such as via communication through a wireless access point 530.

Other wireless access points 530 may be present in the location, and specific DLC groups can communicate with one or both depending on their proximity, and network assignments. In the illustrated example, the user maybe using a tablet computer, a WCC device, or other device that is executing DLC 320. This device can then process and sent a request for processing power for a job 540 to the DLC group 300. The DLC group 300 will then assemble an amount of processing power, e.g. processor P1+P2, memory m1+m2. The actual amount of processing power and memory contributed to the DLC processing in the DLC group will depend on configuration set by each of the respective endnotes 130.

In another embodiment, a cloud processing node can be accessed to set or adjust the amount of processing power specific nodes can be allowed to share. In other embodiments, firmware of the end nodes and/or the applications running on the end nodes 130 can dictate the amount of resources that can be shared, given the circumstances. Once the DLC group has processed the operations for completing the job, the process job 542 is returned to the requesting device.

Figure 6B:
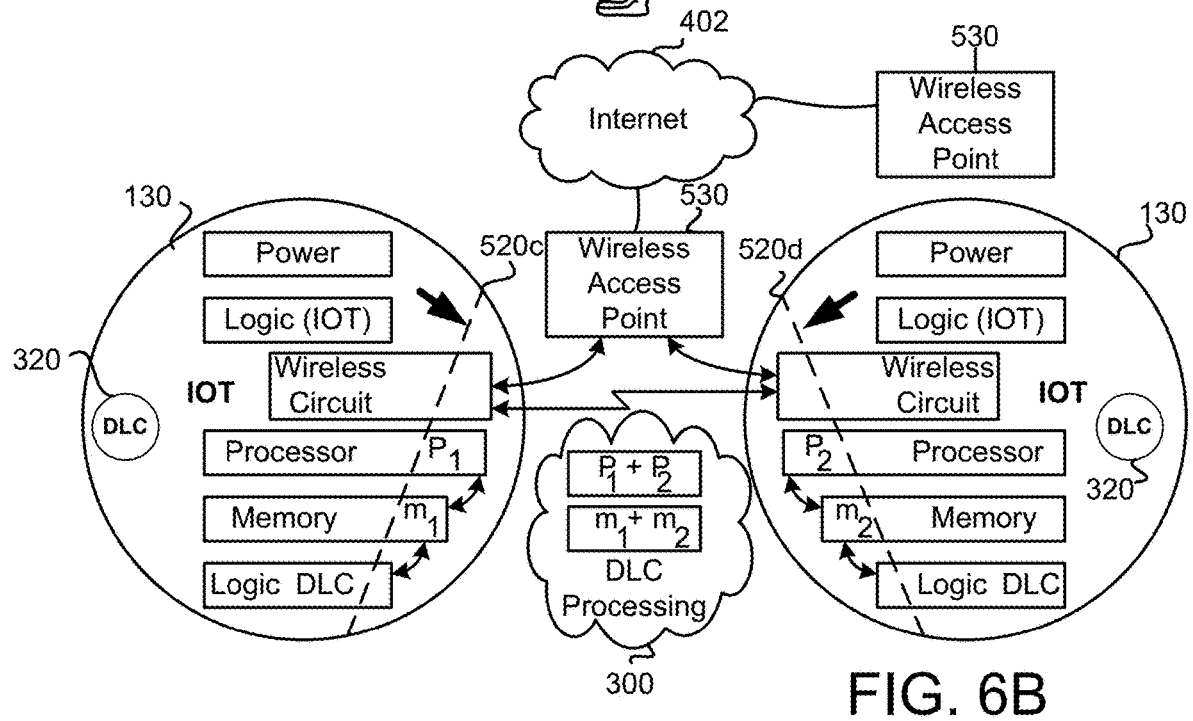
FIG. 6B illustrates when the configuration of line and modify the amount of processing power that the respective and nodes are willing to share, in accordance with one embodiment.

FIG. 6B illustrates when the configuration of line 520c and 520d modify the amount of processing power that the respective and nodes 130 are willing to share. As mentioned above, the degree of sharing by specific and nodes 130 can vary based on settings in the application that is part of the container of DLC 320, or can be set by the native processing OS or firmware of the end node 130 that hosts the respective DLC 320.

FIGS. 6A-6i show or relate to applications of technologies that will range across a spectrum. Device interoperability will occur between low cost devices that operate with limited power and resources including ones that get and post data to local devices, to large robust commercial cloud services, including provisioned cloud infrastructure such as Amazon EC2 as well as pay-as-you-go micro transaction services such as Amazon Lambda.

In devices on the low cost or feature limited space, DLC 320 is also lightweight and thin, and provides the capability as a bridge signaling system that allows a device to engage in a standard class of service.

Figure 6C:
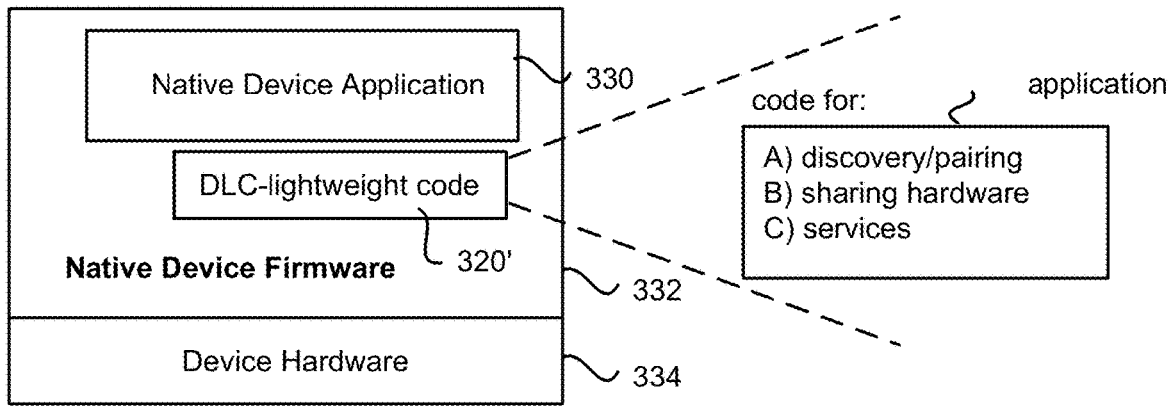
FIG. 6C illustrates a DLC along with the device application is embedded in the device firmware, in accordance with one embodiment.

As one embodiment shown in FIG. 6C, the DLC 320 along with the device application is embedded in the device firmware 332. The DLC 320 routines provide discovery and pairing capabilities while also sharing access to the underlying hardware either directly or through a proxy. The device firmware provides traditional control of the device but additional device interaction is provided via DLC 320. In several embodiments the device referred to above is an IOT or WCC device 130. DLC 320 routines operating in device 130 may be run in a microcontroller or system on a chip or other logic.

These routines may be part of a watchdog timer or ones that are serviced periodically over time. The frequency of such servicing, or the priority given the DLC class of service may be set by the user or by an authority over the device, and it may change dynamically in connection with application and service demands presented to it. In any case, periodic servicing of the DLC code can result in time-based multi-plexing such that the device operates as intended, however, with the added feature of a DLC signaling bridge to allow a secondary class of service to be coupled to the device.

DLC 320 may be contained in whole or part of an interrupt routine that is triggered upon a condition associated with the device. DLC 320 may also be a segment of code in a code base where an instruction pointer is pointed to causing the code to be executed in connection with a prompting condition. One or more prompting conditions may be associated with one or more instruction addresses in device 130 firmware, causing execution of code to branch, enabling DLC 320 routes to operate, then return to execution of firmware prior to the branch. The prompting condition may be caused by human interaction or based on device state, or a combination of both.

Device state conditions for prompting DLC 320 code execution may include but not be limited to, state associated with a bridge circuit in connection with power profiling of the device itself or another device, a request, a reply to a request, or the device state conditions for prompting DLC 320 code execution may also be time-based, signal based, packet based, sensor-based, security-based, or based on a random seed, or some combination, including those conditions necessary to satisfy the various embodiments presented herein.

Figure 6D:
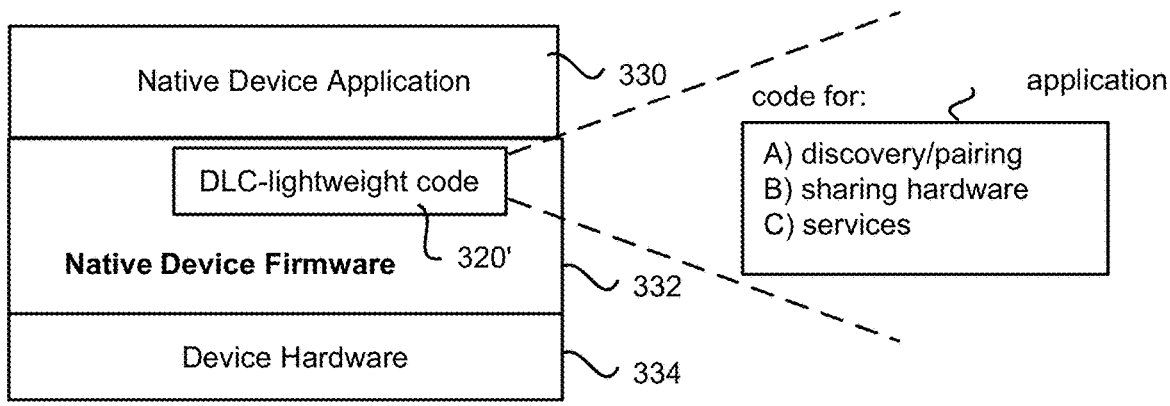
FIG. 6D illustrates a DLC that may be embedded in the device firmware but the device may utilize additional memory for storing the device application, in accordance with one embodiment.

As one embodiment shown in FIG. 6D, the DLC 320 may be embedded in the device firmware 332 but the device may utilize additional memory for storing the device application. The device and application firmware may be held non-volatile memory devices such as ROM, EPROM or FLASH MEMORY. In one embodiment, a tamperproof firmware is locked and burned into ROM and application firmware is placed in flash memory so the application can migrated, repaired, upgraded and serviced without disrupting the underlying device firmware. The application may be locked and obfuscated and require access credentials to perform any manipulation to data or program contents.

The DLC 320 routines provide discovery and pairing capabilities while also sharing access to the underlying hardware either directly or through a proxy. The device firmware provides the application access to control the device but additional device interaction is provided via DLC 320. In several embodiments the device referred to above is an IOT or WCC device 130. DLC 320 routines operating in device 130 may be run in a microcontroller or system on a chip or other logic.

These routines may be part of a watchdog timer or ones that are serviced periodically over time. The frequency of such servicing, or the priority given the DLC class of service may be set by the user or by an authority over the device, and it may change dynamically in connection with application and service demands presented to it. In any case, periodic servicing of the DLC code can result in time-based multi-plexing such that the device operates as intended, however, with the added feature of a DLC signaling bridge to allow a secondary class of service to be coupled to the device.

DLC 320 may be contained in whole or part of an interrupt routine that is triggered upon a condition associated with the device. DLC 320 may also be a segment of code in a code base where an instruction pointer is pointed to causing the code to be executed in connection with a prompting condition. One or more prompting conditions may be associated with one or more instruction addresses in device 130 firmware, causing execution of code to branch, enabling DLC 320 routes to operate, then return to execution of the calling application or firmware prior to the branch.

The prompting condition may be caused by human interaction or based on device state, or a combination of both. Device state conditions for prompting DLC 320 code execution may include but not be limited to, state associated with a bridge circuit in connection with power profiling of the device itself or another device, a request, a reply to a request, or the device state conditions for prompting DLC 320 code execution may also be time-based, signal based, packet based, sensor-based, security-based, or based on a random seed, or some combination, including those conditions necessary to satisfy the various embodiments presented herein.

Figure 6E:
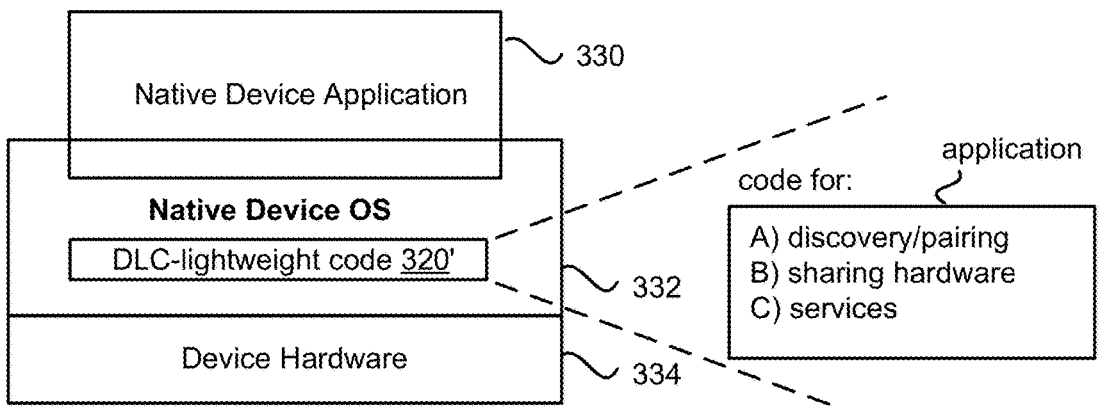
FIG. 6E illustrates a DLC that may be installed in the device operating system preferably (but not required) on an ARM-based or Intel based CPU, in accordance with one embodiment.

As one embodiment shown in FIG. 6E, the DLC 320 may be installed in the device operating system 332 preferably (but not required) on an ARM-based or Intel based CPU. In one embodiment, the native device application (i.e. IOT thermostat, IOT alarm panel or other IOT application) runs on a minimalist Linux distribution having a container manager directly on top of the Linux kernel, where all user-space Linux services are distributed as a container and where the software package distribution mechanism for the operating system is optionally provided by the container manager, so a separate package manager for the OS is not necessary.

In another embodiment, the native device application (i.e. IOT thermostat, IOT alarm panel or other IOT application) runs on a minimalist Linux distribution having two container managers, one for the OS and one for the user space. In one configuration, the DLC 320 runs in a system container with elevated access rights to hardware and memory resources. In another configuration the DLC 320 runs in a user container with limited rights to hardware and memory resources, but adequate to perform certain DLC services for the class of device.

In yet another embodiment, the native device application (i.e. IOT thermostat, IOT alarm panel or other IOT application) runs on a minimalist Linux distribution tailored to provide DLC 320 features built into the OS, yet still provide the native device application isolation and kernel security using a direct extension framework to provide mediation of shared hardware and memory in connection with the native application 330 and the DLC class of service. In one configuration, the framework provided for the device application is tightly coupled with a separately maintained security policy that extends the security policy available to the native device application 330 consuming the framework. In one mode of operation, the security policy may change, for example, in connection with DLC clustering activity, or when the level of security is modified by a user or authority, or in connection with a tasks or event that DLC cluster class of service is providing at any moment.

Figure 6F:
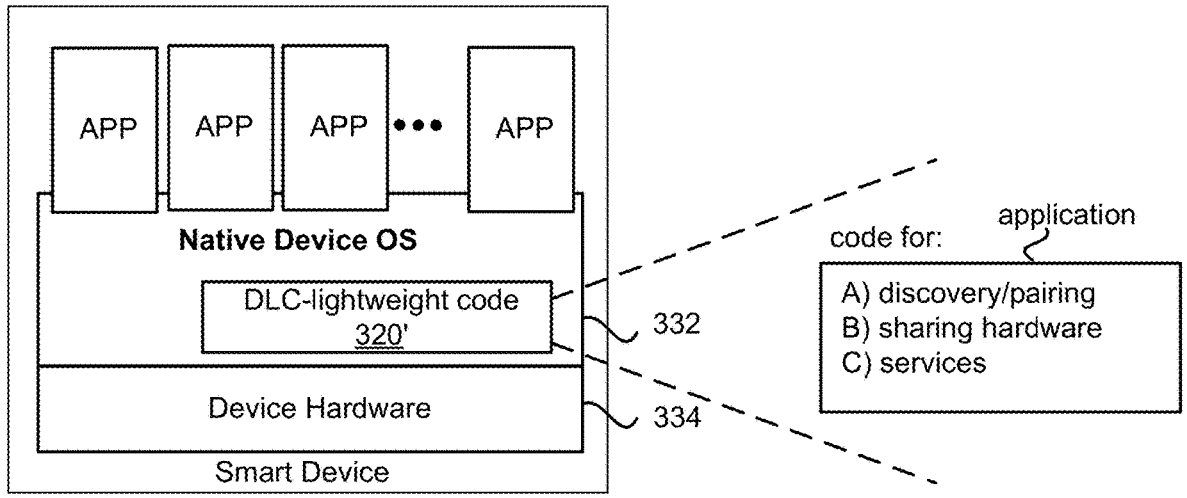
FIG. 6F illustrates a DLC that may be installed in the operating system of a smart device, such as a phone or tablet, along with other applications, in accordance with one embodiment.

As one embodiment shown in FIG. 6F, the DLC 320 may be installed in the operating system of a smart device, such as a phone or tablet, along with other applications. The phone or table may run a Linux-based operating system such as Ubuntu Touch OS, IOS, Android or Chrome OS.

In one configuration, in addition to providing native DLC 320 support, a smart device runs multiple applications. The container manager sits directly on top of the Linux kernel, where all user-space Linux services are distributed as a container and where the software package distribution mechanism for the operating system is optionally provided by the container manager, so a separate package manager for the OS is not necessary.

In another configuration, in addition to providing native DLC 320 support, a smart device runs multiple applications. The smart device runs on a Linux distribution having two container managers, one for the OS and one for the user space. In one configuration, the DLC 320 runs in a system container with elevated access rights to hardware and memory resources. In another configuration the DLC 320 runs in the kernel. In yet another embodiment, the DLC 320 runs in a user container. It is possible to restrict or limited rights to hardware and memory resources for DLC when operating in a user container but preferably the rights are adjusted to be adequate to perform certain DLC services for the class of device.

In yet another embodiment, in addition to providing native DLC 320 support, a smart device runs multiple applications. The applications are isolated and kernel security provided using a direct extension framework to provide mediation of shared hardware and memory in connection with the applications and the DLC class of service. In one configuration, the framework provided for the applications are tightly coupled with a separately maintained security policy that extends the security policy available to each device application 330 consuming the framework. In one mode of operation, the security policy may change, for example, in connection with DLC clustering activity, or when the level of security is modified by a user or authority, or in connection with a tasks or event that DLC cluster class of service is providing at any moment.

Figure 6G:
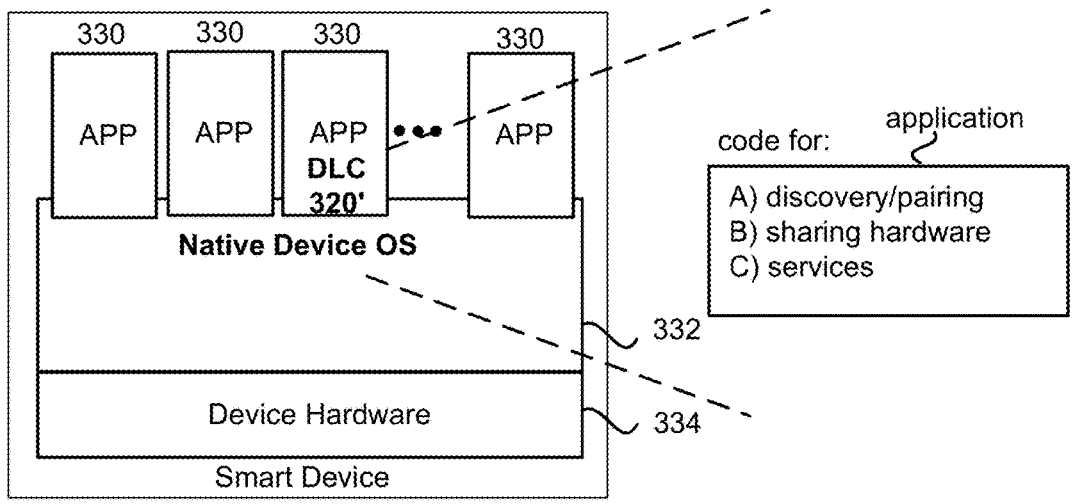
FIG. 6G illustrates a DLC that may be installed as an application of a smart device, such as a phone or tablet, personal computer, laptop, server or mainframe, along with other applications, in accordance with one embodiment.

As one embodiment shown in FIG. 6G, the DLC 320 may be installed as an application of a smart device, such as a phone or tablet, personal computer, laptop, server or mainframe, along with other applications. The phone or table may run a Linux-based operating system such as Ubuntu Touch OS, IOS, Android or Chrome OS.

In one configuration, a smart device runs multiple applications. A container manager sits directly on top of the Linux kernel, where all user-space Linux services are distributed as a container and where the software package distribution mechanism for the operating system is optionally provided by the container manager, so a separate package manager for the OS is not necessary.

In another configuration, a smart device runs multiple applications. The smart device runs on a Linux distribution having two container managers, one for the OS and one for the user space. In one configuration, a portion of DLC 320 runs in an application system container with elevated access rights to hardware and memory resources and a portion DLC 320 runs in a user level container having limited rights to hardware resources. In yet another embodiment, the DLC 320 runs in the user space applications container but relies on OS functions to carry out DLC 320 services to a DCL cluster.

In yet another embodiment, a smart device runs multiple applications. The applications are isolated and kernel security provided using a direct extension framework to provide mediation of shared hardware and memory in connection with the applications, including an application providing support for DLC 320. In one configuration, the framework provided for the applications are tightly coupled with a separately maintained security policy that extends the security policy available to each device application 330 consuming the framework. In one mode of operation, the security policy may change, for example, in connection with DLC clustering activity, or when the level of security is modified by a user or authority, or in connection with a tasks or event that DLC cluster class of service is providing at any moment.

Figure 6H:
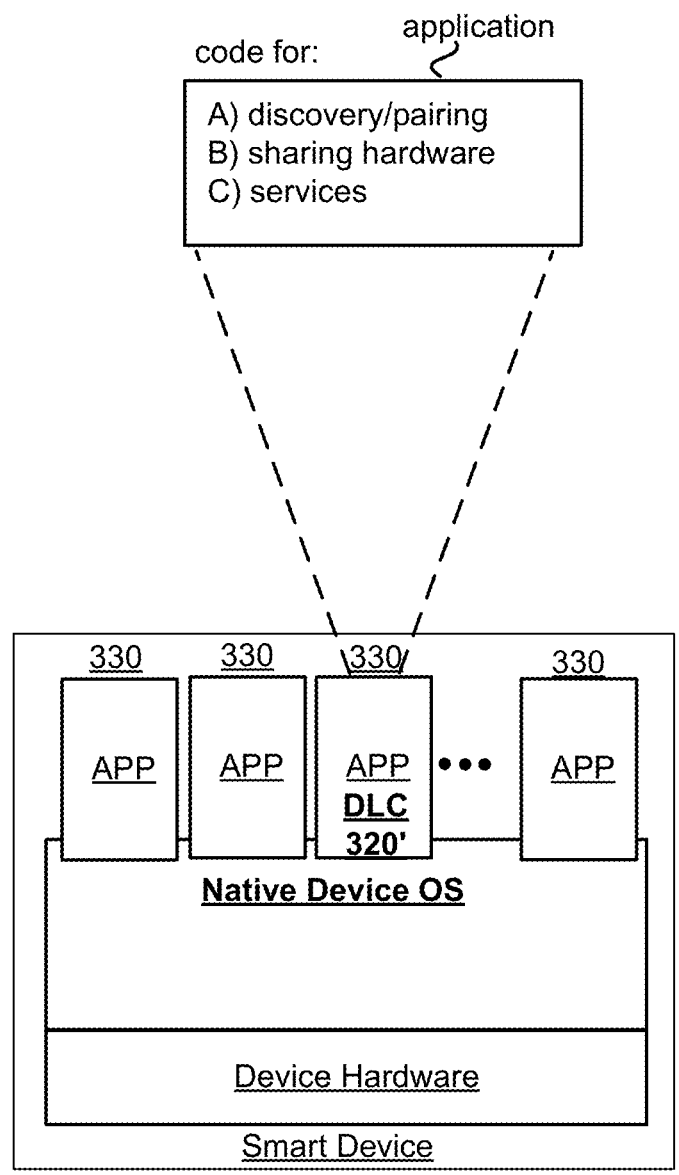
FIG. 6H illustrates a smart device such as a desktop PC, server, mainframe, phone or tablet provides certain functionality of DLC through a DLC service application when no DLC service is configured or installed in the base operating system of the device, in accordance with one embodiment.

As one embodiment shown in FIG. 6H, a smart device such as a desktop PC, server, mainframe, phone or tablet provides certain functionality of DLC 320 through a DLC 320 service application when no DLC 320 service is configured or installed in the base operating system of the device. This configuration may be useful for a controller application that doesn't necessary need or want to share access to own hardware or memory resources within DLC cluster.

In one variant configuration, the smart device that runs multiple applications has at least one application running DLC 320 service application. A container manager sits directly on top of the Linux kernel, where all user-space Linux services are distributed as a container and where the software package distribution mechanism for the operating system is optionally provided by the container manager, so a separate package manager for the OS is not necessary.

In another variant configuration, in addition to providing native DLC 320 support, a smart device runs multiple applications, including at least one application containing support for DLC 320 service application. The smart device runs on a Linux distribution having two container managers, one for the OS and one for the user space. In one configuration, the DLC 320' service application runs in an application container.

In yet another variant embodiment a smart device runs multiple applications. The applications are isolated and kernel security provided using a direct extension framework to provide mediation of shared hardware and memory in connection with the applications and the DLC class of service. In one configuration, the framework provided for the applications are tightly coupled with a separately maintained security policy that extends the security policy available to each device application 330, including DLC service application 320 consuming the framework. In one mode of operation, the security policy may change, for example, in connection with DLC clustering activity, or when the level of security is modified by a user or authority, or in connection with a tasks or event that DLC cluster class of service is providing at any moment.

Figure 6I:
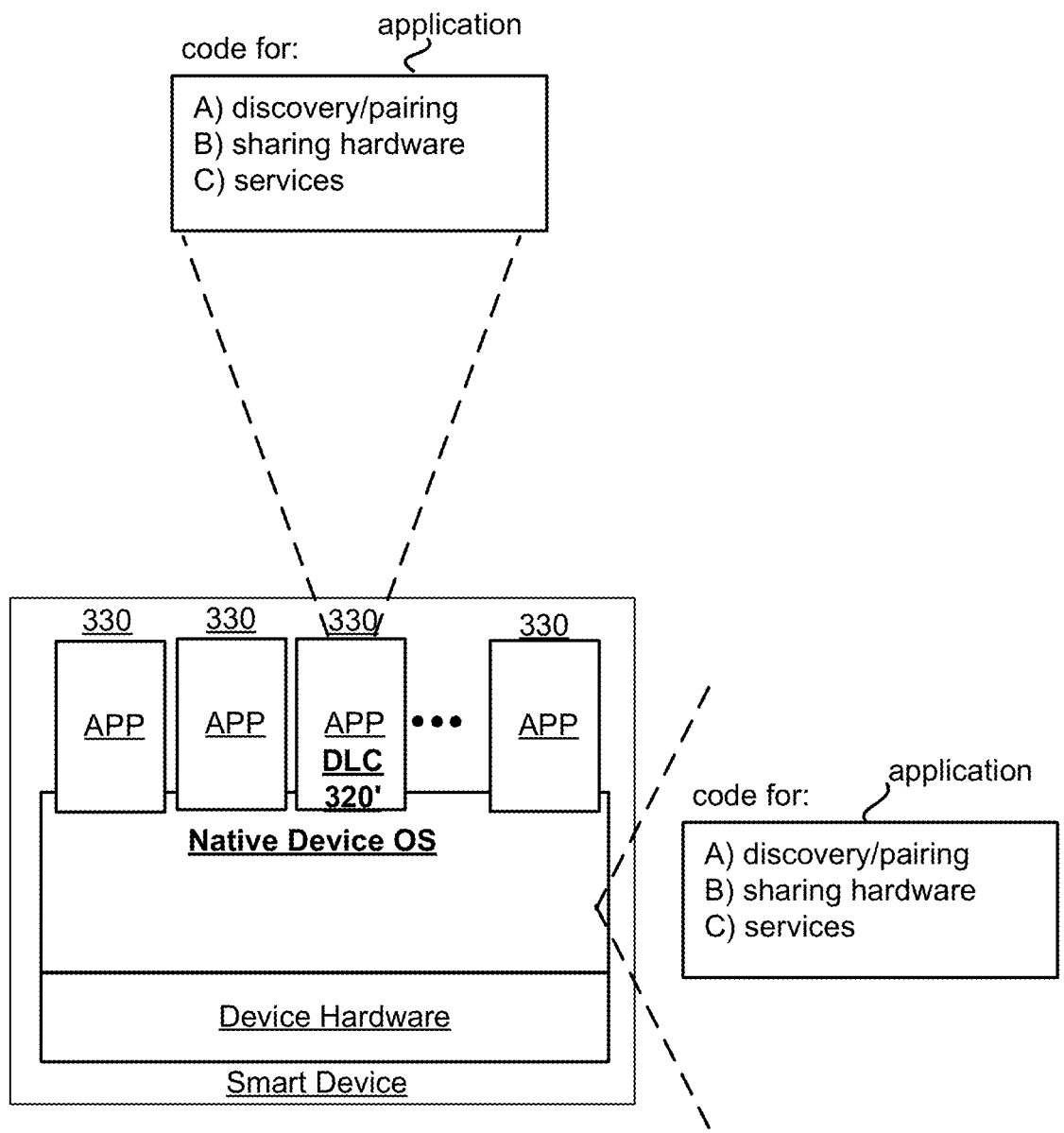
FIG. 6I illustrates a smart device such as a desktop PC, server, mainframe, phone or tablet provides certain functionality of DLC through the OS even though DLC is not necessarily installed in the operating system of the device, in accordance with one embodiment.

As one embodiment shown in FIG. 6I, a smart device such as a desktop PC, server, mainframe, phone or tablet provides certain functionality of DLC 320 through the OS even though DLC 320 is not necessarily installed in the operating system of the device. The device is capable of running multiple applications. In the embodiment of FIG. 6I, however, at least one application is running a DLC 320 service application.

In one variant configuration, the smart device that runs multiple applications has at least one application running DLC 320 service application. A container manager sits directly on top of the Linux kernel, where all user-space Linux services are distributed as a container and where the software package distribution mechanism for the operating system is optionally provided by the container manager, so a separate package manager for the OS is not necessary.

In another variant configuration, in addition to providing native DLC 320 support, a smart device runs multiple applications, including at least one application containing support for DLC 320 service application. The smart device runs on a Linux distribution having two container managers, one for the OS and one for the user space. In one configuration, the DLC 320' service application runs in a system container with elevated access rights to hardware and memory resources. In another configuration the DLC 320 features are present in the kernel. In yet another embodiment, the DLC 320 runs in a user container with limited rights to hardware and memory resources, but adequate to perform certain DLC services for the class of device.

In yet another variant embodiment, in addition to providing native DLC 320 support, a smart device runs multiple applications. The applications are isolated and kernel security provided using a direct extension framework to provide mediation of shared hardware and memory in connection with the applications and the DLC class of service. In one configuration, the framework provided for the applications are tightly coupled with a separately maintained security policy that extends the security policy available to each device application 330 consuming the framework. In one mode of operation, the security policy may change, for example, in connection with DLC clustering activity, or when the level of security is modified by a user or authority, or in connection with a tasks or event that DLC cluster class of service is providing at any moment.

In one embodiment, DLC 320 services application may be provisioned to have an almost completely private view of the operating system with their own process ID space, file system structure, and network interfaces. Resources are isolated, and services restricted. Multiple DLCs can share the same kernel, but each container can be constrained to only use a defined amount of resources such as CPU, memory and I/O.

In one embodiment, an IOT device includes a software stack geared towards providing identity services including authentication and authorization for distributed infrastructure, applications and containers. In one embodiment, the software stack includes a directory service, a certificate authority, an authentication framework daemon/service and secure token service. In one specific example, Federated User Authentication (FUA) may be used. Federated User Authentication may involve using a first application/device to provide authentication on a second application/device. In some embodiments, this process or related process may be referred to as a Federated Identify Management (FIM), which is an arrangement that can be made among multiple enterprises that allows subscribers use the same identification data to obtain access to the networks of all enterprises in the group. The use of such a system is sometimes called identity federation. Thus, access via FUA or FIM processing, authentication to a DLC group can be made, which avoids having each DLC group perform separate authentication. In one embodiment, any device that is part of the DLC group can trigger authentication. In some embodiments, two or more devices that are part of the DLC group can trigger authentication. In other embodiments, authentication can be triggered by a device in response to a pairing event. The pairing event can be triggered via a button push, a bump-pair with another device (e.g., by detecting an inertial impact), or in response to two devices detecting a similar bump-pair event at about the same time.

In one embodiment, a dynamic DLC is provided. In this embodiment, one WID (WID=a WCC, IOT, DLC or device) device or device can couple to another WID to retrieve input, send output, retrieve payload or process payload. In one configuration, the coupling is dynamically established in response to an engagement event. Engagement event may include a previous pairing, a dynamic pairing, instantaneous pairing via bump, a voice command, or some other input.

In some embodiments, a WCC device may be configured to communicate a certificate to an authentication server using wireless communication. In one embodiment, a WCC sends the certificate to a device operating DLC. In another embodiment, a WCC transmits its certificate causing an authentication server to receive the certificate and check that the digital certificate has been issued/signed by a trusted certificate authority (CA), that the certificate is not expired and has not been revoked. In one embodiment, after the certificate is determined to be valid, a browser-plug automatically logs a user into a website currently pointed to be the user.

In one embodiment, the Linux core is maintained and updated using transactional updates. The transactional updates are provided by a remote server. And in one embodiment the updates are differential based, so their size is minimized and enabling the possibility to revert or roll back any update. In some configurations, the device application 330 may also be maintained and updated using transactional updates. In some configurations, the DLC 320 service application may also be maintained and updated using transactional updates. The transactional updates may be provided by a remote server or a local node in the cluster. And in one embodiment the updates are differential based, so their size is minimized and enabling the possibility to revert or roll back an update if necessary or preferred.

In one embodiment, CoreOS Linux distribution is used with Docker and Fleet. In another embodiment, RancherOS is used. In another embodiment, TinyOS is used as a device firmware or OS. In another embodiment, PhotonOS is used. In at least one embodiment a container manager service maintains third party dependencies and code contained within a container. In another embodiment, a multi-hop, network-wide time synchronization processes are used through FTSP protocol and data collection services are provided to a designated root or gateway through CTP protocol.

In one embodiment, DLC content is not housed in any container. In one embodiment, reliable data dissemination is provided to every node in a network through the trickle algorithm. In one embodiment, installation of new binaries over wireless network is provided using Deluge. In another embodiment, support for RPL is provided for low-power wireless network. In another embodiment, any application 330 may interact with a DLC service application 320 or a DLC cluster to provide any functionality necessary to carry out the inventions described throughout this family of patent applications.

In yet another embodiment, the IOT device periodically enters a deep sleep and upon waking reboots itself. In another embodiment, the IOT device periodically enters a deep sleep for a precise amount of time and wakes itself, without completely rebooting. In another embodiment, the IOT device enters power savings mode periodically and during the period has reduced features associated with the class of service. In another embodiment, a signal payload is generated to log the change in state of the IOT. In another embodiment, services are coordinated and adapted across a DLC cluster with an authority capable of tracking the patterns.

In an additional embodiment, the DLC 320 routines provide discovery and pairing capabilities as well as access to shared memory and CPU support in a DLC cluster using multiple nodes. Resources sharing may occur directly or through a proxy. In some embodiments, the device firmware or OS provides the native device application access to control the device but additional device interaction is provided via DLC 320. In several embodiments the device referred to above is an IOT or WCC device 130.

DLC 320 routines operating in device 130 may be run in a microcontroller, system on a chip, other logic, ARM CPU, Intel-based CPU, EC2 instance, Lambda function, or any variant. The DLC routines may be part of a watchdog timer or ones that are serviced periodically over time. The frequency of such servicing, or the priority given the DLC class of service may be set by the user or by an authority over the device, and it may change dynamically in connection with application, security and service demands presented to it. In any case, periodic servicing of the DLC code can result in time-based multiplexing such that the device operates as intended, however, with the added feature of a DLC signaling bridge to allow a secondary class of service to be coupled to the device, enabling devices to provide the independent functionality as well as precise coordination between devices.

Depending on the configuration used, DLC 320 service routines may vary depending on the device type and may be defined in a class of service that is suitable for the device type in the class. Therefore, given the various embodiments, DLC 320 should not be necessarily limited to those services necessary to add standard connectivity and resource sharing in a cluster of devices.

While signaling and logging, device registration, application maintenance, container maintenance, access control, security, sensor activation and polling, file system activity, device management, event synchronization, and the like may be important for select applications, DLC 320 routines, depending on the embodiment, may take on diverse array of characteristics: they may be contained in, couple to (in whole or part) a single thread, multiple threads, single threads combined with remote threads, a distributed computer, a cluster of IOT nodes, an interrupt routine that is triggered upon a condition, an associated device, one or more Amazon EC2 instances, one or more Amazon Lambda functions. DLC 320 may direct a load balancer.

DLC 320 may embody functionality of a load balancer. It may define security rule changes, enable access control, data sharing, device synchronization, trigger events on other IOT or WCC devices, transmit a payload, receive a payload, transcode data, encrypt data, augment data, process metadata, time stamp, log, perform image backup of system and data, direct backup of other devices, restore devices, reflash firmware, update a container package, update contents of a container, emulate another processor, emulate another device in a local or remote IOT, emulate a cluster of IOTs, insert DLC functionality into another device, migrate a database, POST data, GET data, register a DLC service with a device, register an IOT or WCC device, as well as those functions, service and applications described.

Depending on the configuration, DLC 320 code execution may be triggered through any of the above or through user interaction, a cascade of events, a time-based trigger, a signal based trigger, a interrupt-based trigger, packet based trigger, a sensor-based trigger, an AC fingerprint state, a security-based trigger, the state of a bridge circuit, a mechanical force, the presence of an electromagnetic field, based on a random seed, or some combination, including those conditions necessary to satisfy the various embodiments presented herein.

Figure 7:
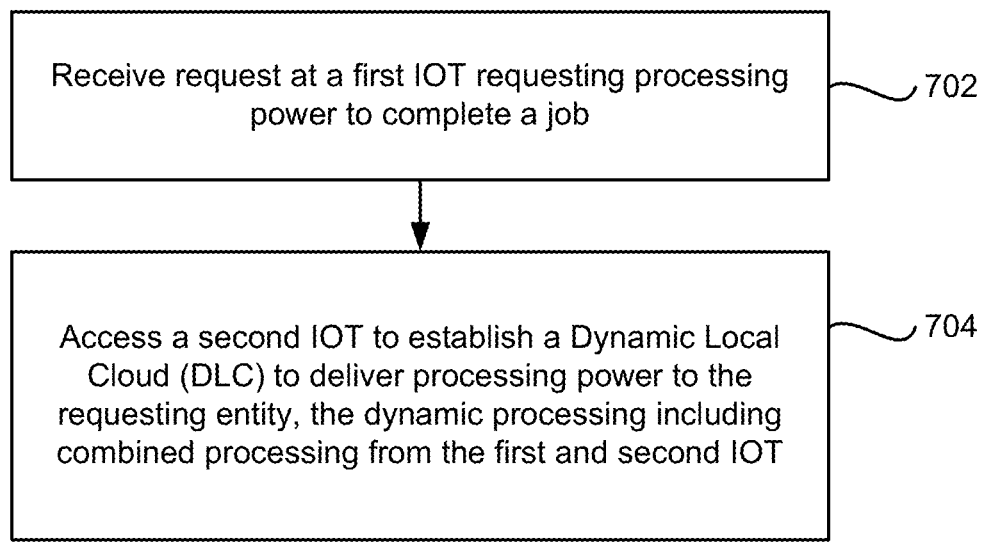
FIG. 7 illustrates a general flowchart diagram of the use of and nodes that operate with DLC logic to execute a job, for requesting entity, in accordance with one embodiment.

FIG. 7 illustrates a general flowchart diagram of the use of and nodes that operate with DLC logic to execute a job, for requesting entity. And operation 702, a request from a first IOT is received, which request processing power to complete a job. As mentioned above, the IOT can be a device that may require additional processing power or can benefit from additional processing power the complete a task or job. In operation 704, a second IOT is accessed to establish a DLC group to deliver processing power to the requesting entity. The dynamic processing includes combined processing from the first and the second IOT, so as to efficiently execute the job and provide the results back to the requesting entity.

Figure 8:
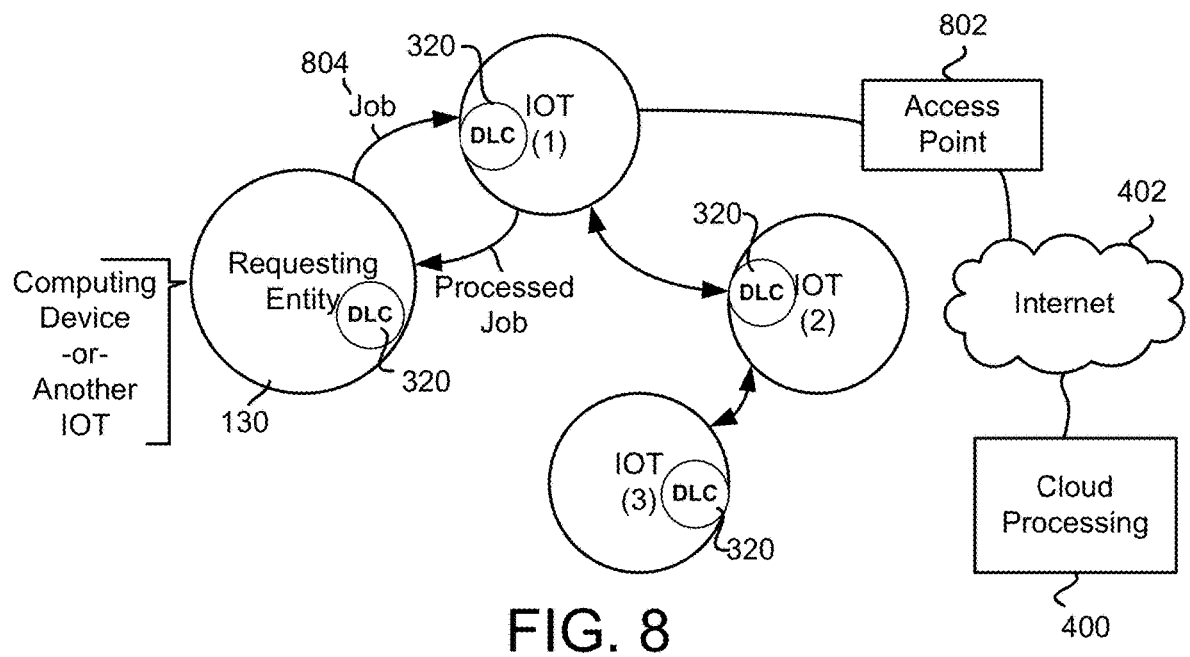
FIG. 8 illustrates an example of a plurality of IOT's, which are interconnected for communication between selected ones, to process a task for a requesting entity, in accordance with one embodiment.

FIG. 8 illustrates an example of a plurality of IOT's, which are interconnected for communication between selected ones, to process a task for a requesting entity, in accordance with one embodiment. In this embodiment, the requesting entity is an end node 130, which can be any computing device, or another IOT. The requesting entity is shown executing DLC 320, and so are other IOT's (1)-(3).

In this embodiment, one of the IOT's is also in communication with an access point 802, which can provide access to the Internet 402 and cloud processing 400.

As mentioned above, cloud processing 400 can be used to execute operations which can include server executed tasks, communication with other servers connected to the Internet, communication with other data repositories using APIs, servers that process rules for executing predefined tasks, servers that communicate with databases that store state data associated with assembled DLC groups, databases that store actions performed by previously assembled DLC groups, caching databases for storing state data from active DLC groups, servers that process or send information to other recipients or devices based on tasks executed by a DLC group, storage of recipes of instructions that are executed by DLC groups in order, historical data regarding communication that occurred between specific IOT's, and the instructions processed by each IOT to perform a specific task, job, routine, recipe, or function.

These are simply examples of information that can be processed and/or stored in cloud processing 400, and made accessible to an IOT that is part of a DLC group, which may be processing a job for a requesting entity. In some embodiments, multiple IOT's can have access to the access point 802, and thus access to the Internet 402 and cloud processing 400.

Figure 9A:
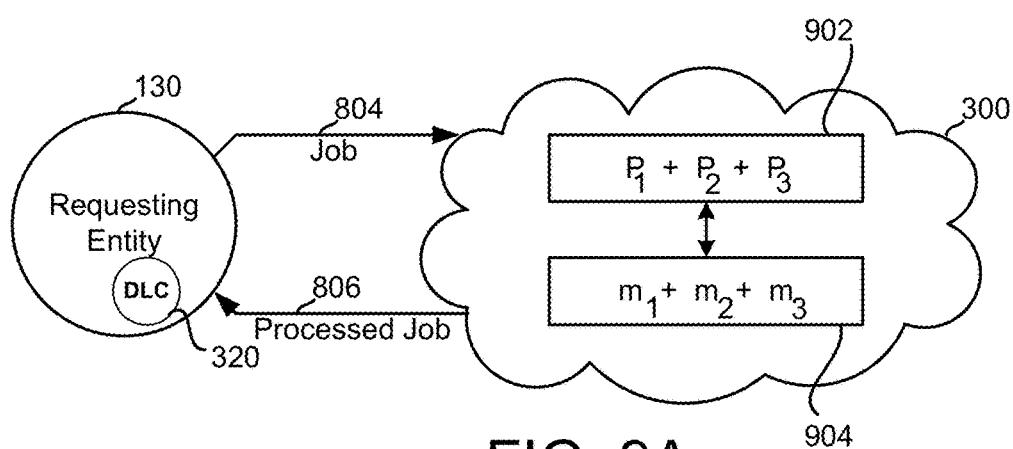
FIG. 9A illustrates an example of the use of processing resources of the assembled IOT's from the DLC group, in accordance with one embodiment.

FIG. 9A illustrates an example of the use of processing resources of the assembled IOT's from the DLC group 300, in accordance with one embodiment. As shown, the job 804 is communicated to the DLC group 300, which can utilize the processing power of the different IOT's, e.g., collective processing (P1+P2+P3) 902, and collective memory (m1+m2+m3) 904. The processing and memory storage utilize from the DLC group can be executed in series, where specific nodes will process specific packets of data, store specific packets of data, and transfer packets of data to the next IOT in order to complete the functional processing of the job and produced processed job 806.

The process job 806 is then returned to the requesting entity that is operating DLC 320. As described above, each IOT can set the amount of processing power it will contribute to a DLC group. The setting can also be adjusted via a user interface once a DLC group is created, and managed. In one embodiment, cloud processing 400 may be utilized to manage an instance of a DLC group, and also allow for settings regarding the sharing capabilities of each IOT. For instance, once a DLC group is created among IOT's, the creation information can be shared to cloud processing 400 which can assemble a data structure defining the DLC group. The data structure can be continuously updated based on changes to the DLC group, these of the data updates provided by one or more of the IOT's of the DLC group. In one embodiment, accessing cloud processing 400 can be by way of a user device. The user device can be used to visualize which IOT's are available in a specific location, and assembled DLC groups.

In another embodiment, DLC groups can be assembled automatically by interconnection and communication among the IOT's. Once the DLC group is created, the DLC group can be managed either through an individual IOT that is a member of the DLC group, or via cloud processing 400. In another embodiment, instead of utilizing cloud processing 400, a local web interface can be used to access the DLC group in the local network. In this embodiment, there is no need to access the Internet in order to manage, access, view, adjust settings, interface with, and configure DLC groups. In some embodiments, the DLC groups can be stored to databases, such that historical data regarding created DLC groups can be accessed.

In some embodiments, learning algorithms can be utilized to pre-assembled DLC groups based on anticipated needs of specific devices that are local to a specific area. For example, if some device within a home requires access processing power during specific periods of time, that information can be harvested from historical use and IOT's can be assembled into DLC groups ahead of time to manage or provide additional processing power for those requesting entities.

In one example, certain kitchen appliances may require more processing power during dinner-time, and DLC groups can be pre-assembled and created to process specific tasks that may be requested from appliance IOT's, and the delivery of process jobs for the requesting IOT's can be expedited.

Figure 9B:
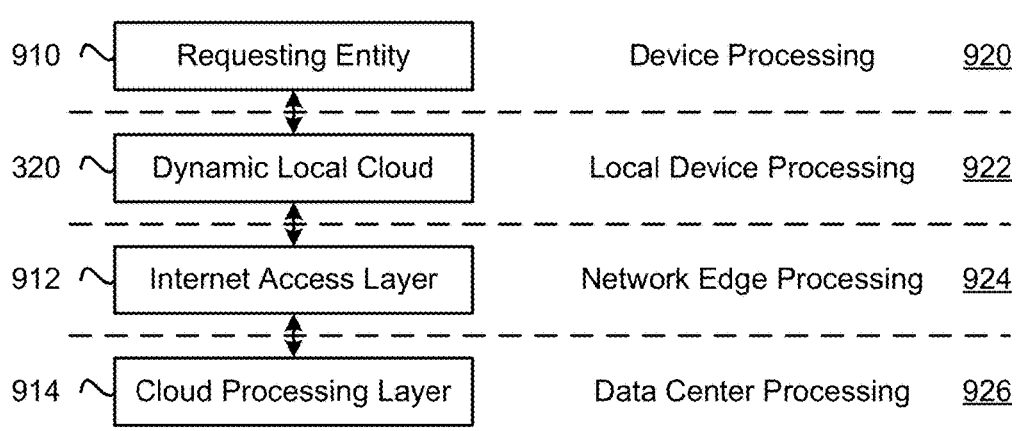
FIG. 9B illustrates an example of different levels of processing that can be created using DLC processing and other processing layers, in accordance with some embodiments.

FIG. 9B illustrates an example of different levels of processing that can be created using DLC processing and other processing layers, in accordance with some embodiments. In one embodiment, a requesting entity 910 can be a device that operates at the processing level 920. A requesting entity can be, for example, and end node 130, a smart device, a computer, and IOT, or any other device that communicates with each other or with certain nodes to process data for requesting entities. The requesting entities can also be processing power delivering entities, based on the needs of the DLC group.

The dynamic local cloud 320 layer, the find local device processing 922. Local device processing means that devices that are local, such as in a local network, or multiple local networks, can operate by communicating with each other to process specific tasks. In some embodiments, the DLC 320 assists devices to communicate with each other to share information about their resources, they share information about their abilities, to share information about their availability, to share information about their constructs, to share information about their hardware specifics, to share their information about their software stack, to share information about their schedules, the share information about their native processing functions, and other information.

This sharing of information among the IOT's utilizing DLC 320, enables for the DLC group to be formed to process a specific task. In some embodiments, the task may be to share processing power with a requesting entity. In another embodiment, various IOT's that form the DLC group can function to execute specific and specialized tasks which are shared among the IOT's of the DLC group. By way of example, some processing operations require multiple subtasks to be performed. In this manner, the subtasks can be distributed to different IOT's for processing, and then each IOT will deliver back its result of the processing operation back to the requesting entity. The requesting entity can then assemble the resulting processed information from each of the IOT's to form a complete result to the overall task. In other embodiments, jobs or processing tasks or functions can be performed by the IOT's of a DLC group in a round robin format, wherein certain IOT's perform certain tasks and results are passed to the next IOT.

In another embodiment, the processing by the various IOT's in a DLC group can be performed in a serial manner, where one IOT performs a task and then hands it over to the next IOT and so on, until the overall task is complete. In one embodiment, the IOT's that function and communicate using DLC 320, can manage a shared data structure, so that the operation of the different IOT's can be managed locally and globally by each of the IOT's that have access to a copy of that data structure. The data structure can save information regarding the progress for completing a task, the operations that remain to complete the task, and completion metrics for specific tasks. The data structure can also hold historical data regarding the processing operation performed by the DLC group.

Continuing with FIG. 9B, and Internet access layer 912 is shown, which can include network edge processing 924. In this layer, networking tools, such as routers, hubs, servers, switches, can work together to process information that can then be communicated to the DLC 320. In some embodiments, some network processing 924 can be performed in the local device processing 922. For instance, some network devices can function as IOT's that are also part of a DLC group. Accordingly, edge processing can also be encompassed within DLC 320 processing and assembly of data or processing local to the devices that need the data.

For example, if a requesting entity 910 requires data that can be assembled locally using the dynamic local cloud 320 and the Internet access layer 912, this can avoid trips to the Internet or for cloud processing layer 914. In other embodiments, by bringing processing power closer to the requesting entity, the DLC cloud 320 and the Internet access layer 912 can work together to minimize the amount of traffic that has to be communicated to the Internet, which may be time-consuming when the trip for processing requires access to servers of the cloud processing layer 914.

Cloud processing layer 914 can, in one embodiment include data center processing 926. As mentioned above, cloud processing can be performed to manage DLC groups, tasks performed by DLC groups, management of information shared by DLC groups, formations of DLC groups, historical data associated with DLC groups, and other processing information and access over the Internet.

Figure 9C:
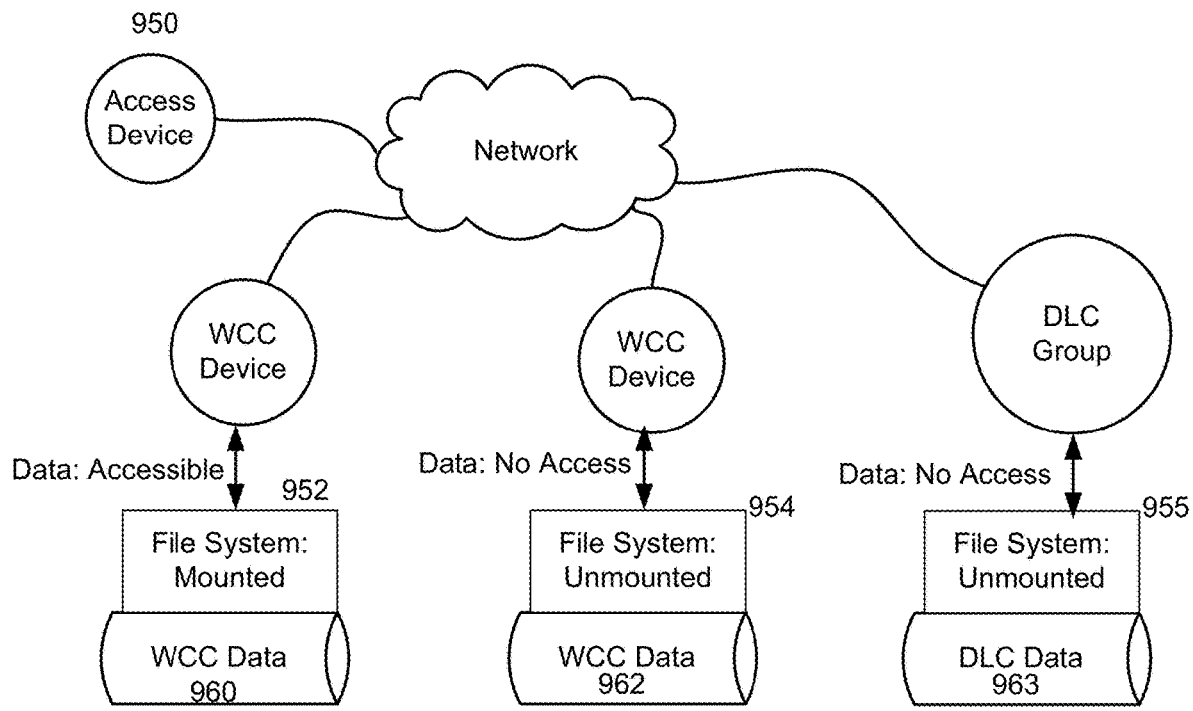
FIGS. 9C and 9D illustrate examples of methods for mounting or unmount teen filesystems, to prevent access the data associated with WCC devices, IOT devices, DLC groups, or device connected to a network, in accordance with some embodiments.

FIG. 9C illustrates methods for WCC file system mounting and unmounting, in accordance with one embodiment. WCC file system mounting and unmounting is provided so that mounting occurs only if certain conditions are satisfied. Thus if data of that WCC device is not needed, it remains unmounted. By way of example, if the data associated with a DLC device is not mounted, that data is not live or accessible to other devices that may attempt to sniff or illegally gain access to the data. This is particularly beneficial for cases where a WCC device stores information that is personal to a user, and that information is not be used or needing access. By maintaining the data of that WCC in a file system that is unmounted, that data cannot be accessed over network, and thus cannot be accessed by hackers or virus agents.

In still other embodiments, the file system can mount only certain data. In this configuration, the file system of the WCC device can be mounted, but only certain data is accessible via the mounted file system. Segmentation of the data stored for or on a WCC device or DLC group can be managed, so only certain data is made accessible via a live file system mount. The data accessible via the mounted file system can be segmented in containers, folders, virtual drivers, or some other segmentation method.

Figure 9D:
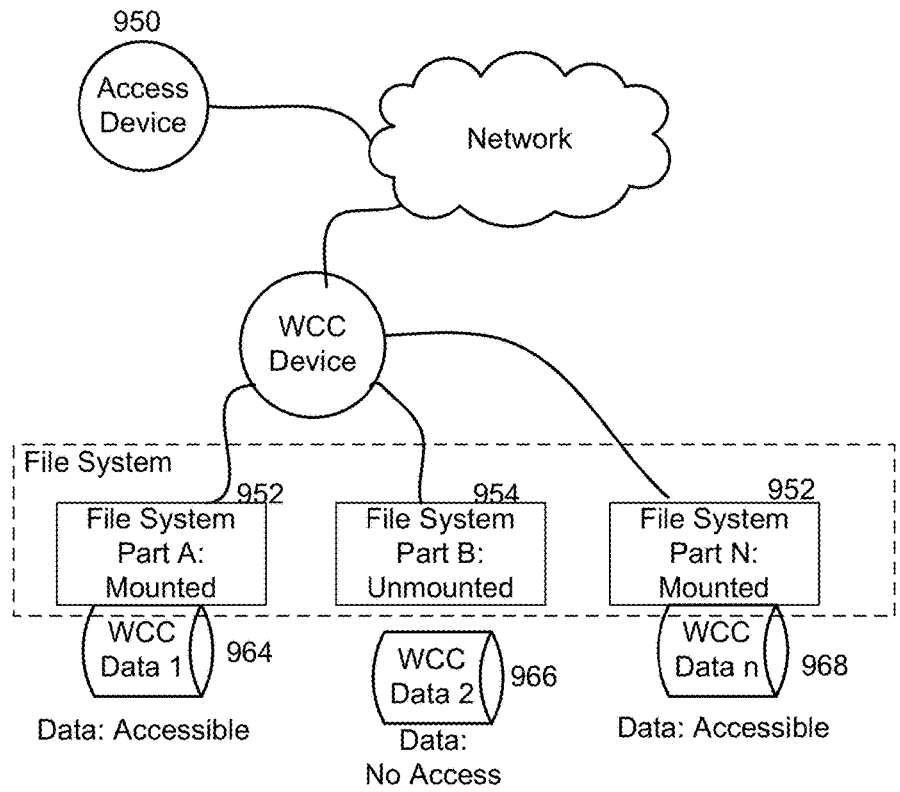

FIG. 9C further illustrates an example of an access device 950, which has access to the network, and can access or communicate with one or more WCC devices or a DLC group. As shown, and access device can be one that is requesting data from a specific WCC device or a DLC group. In some embodiments, the access device may be an unauthorized device that is attempting to gain access to the data held or used by the WCC device or a DLC group. In order to prevent unauthorized access to data that is not even being used, the unmount teen and mounting process can be performed dynamically, so that only data that is needed is mounted. In some embodiments, data that is about to be needed or requested by an authorized user, can be mounted dynamically. In the same manner, data that is not being used or is detected to not be used by an authorized user, can be automatically unmounted, so as to prevent the data from being live or accessible over the network. This example shows a WCC device that has a file system that is mounted 952, and provides access to the WCC data 960. No access is provided to the WCC data 962, as the file system 954 is not mounted. Similarly, DLC data 963 is not accessible, since the file system 955 is unmounted. In the context of a DLC group, the DLC group can be made up of one or more WCC devices, IOT devices, smart devices, computer devices, or generally computing entities. The data made accessible to the DLC group, can therefore be mounted and unmounted similar to the way that WCC data can be mounted and unmounted in response to the respective filesystems being mounted or unmounted. FIG. 9D illustrates an example where the access device 950, is attempting to gain access to data of a WCC device over a network. In this example, the file system of the WCC device can be segmented, in accordance with one embodiment. The segmenting of the file system can be in the form of creating multiple images of the file system, where each image of the file system can be associated with specific data or partitions of data. In this manner, a file system mount or image can be made accessible to data, which is part of the mounted filesystem segment or part. As shown, file system part A 952, is mounted, providing access to the WCC data 1, 964. File system part B 954, is not mounted, therefore no access is provided to the WCC data 2, 966. Similarly, file system part N is mounted, which provides access to the WCC data n, 968.

Broadly speaking, providing for the dynamic mounting and unmounting of a file system or parts of the file system enable data associated with specific WCC devices, IOT devices, DLC groups, etc., to be essentially off-line when not being used. This avoids having the data that may be sensitive or simply personal to a user from being hacked or accessed, when in fact the data need not be accessible to a network. When data is needed, the file system can be mounted for the specific device. When data is no longer needed, the file system can be unmounted, therefore rendering the data not accessible. This provides a layer of security to the utilization of WCC devices, IOT devices, DLC groups, and other types of devices that communicate with networks or provide data accessible over a network. In one embodiment, a DLC group/IOT devices will not mount unless triggered or conditions met. Machine learning and/or Deep learning can be used to identify when to mount and unmount.

Figure 10:
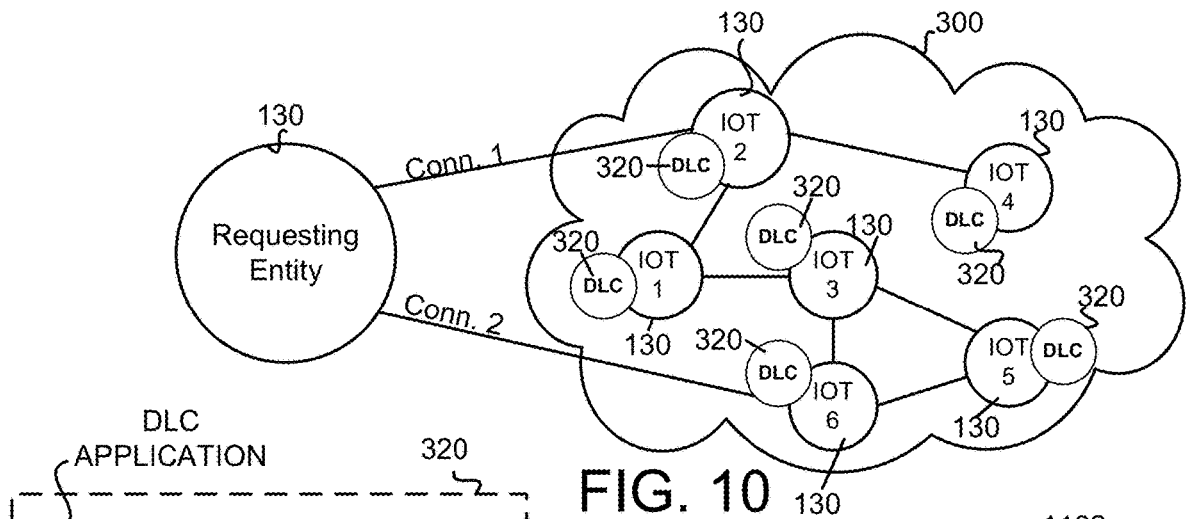
FIG. 10 illustrates an example of a requesting entity, which is an end node, and which may be processing DLC logic, in accordance with one embodiment.

FIG. 10 illustrates an example of a requesting entity, which is an end node 130, and which may be processing DLC logic 320. In one embodiment, the requesting entity can request for a certain process to be executed by a DLC group 300. In some embodiments, the different IOT's connected to a DLC group 300 can have various connection paths. The connection paths can, in one embodiment can define efficiencies for processing or inefficiencies for processing. For instance, some connection paths may introduce delays, since some IOT's may be further away from the requesting entity, yet still be part of the local cloud.

In other embodiments, IOT's may be arranged with stronger connections between other IOT's, and those connections even when the devices are further away from each other may provide more efficiency or speed. In one embodiment, the DLC group processing can include operations the test different connections to the DLC group 300, to ascertain the more efficient processing routes for completing a requested job, task, or operation. As shown in FIG. 10, connection 1 and connection 2 may be provided to DLC cloud 300 to the requesting entity. In some embodiments, many more connections will be provided between the requesting entity and more of the IOT's of the DLC group 300.

However, for purposes of illustration, two connections are shown, to illustrate the various configurations of memory and processing power that can be assembled, based on the strengths of the connections, delay calculated between connections, and other factors. This measurement can be performed during a quality of service operation that is performed to test the different connections between the IOT devices that form a DLC group 300. In some embodiments, once the optimal IOT devices are selected and the connection is found to be superior over other connections, other IOT devices may be dropped from the DLC group 300. In some embodiments, multiple connections may remain, leaving options for downgrading to other connections if a particular connection fails, or loses conductivity for any reason.

In some embodiments, the connections can be prioritized based on strength, delay, efficiency per specific tasks, and historical performance. These quality of service (QoS) metrics can be stored locally to the memory of one of the IOT's, can be cached every IOT that's part of the DLC group, can be stored to memory of a router connected to the local network, memory to a switch connected to the local network, or local storage available to the network that supports the DLC group. In still other embodiments, this information can also be stored to cloud services or storage connected to the Internet or a data center.

Figure 11:
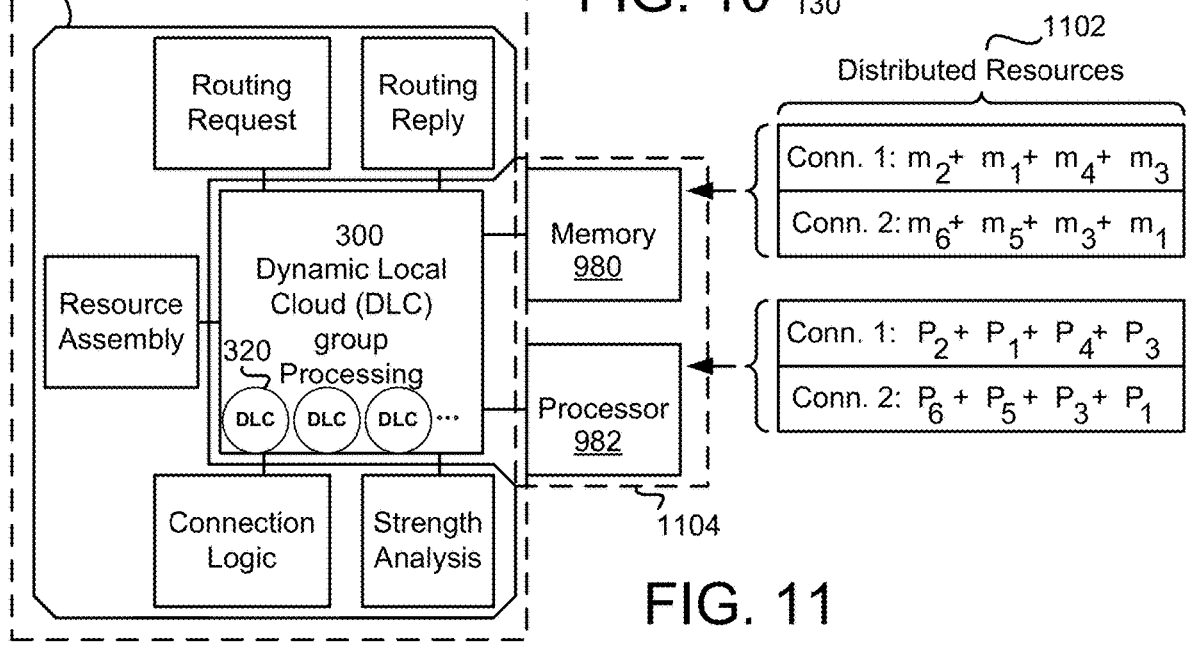
FIG. 11 illustrates an example of DLC application processing that can be performed by DLC group 300, to manage processing by the group, in accordance with one embodiment.

FIG. 11 illustrates an example of DLC application processing that can be performed by DLC group 300, to manage processing by the group. In this example, without limitations to other components or fewer components they can be executed by DLC group 300, the application that forms part of the DLC 320 that the fines the DLC group 300, can execute operations such as resource assembly. Resource assembly can include communication with multiple IOT's to identify which IOT should be selected for specific connections to define the DLC group 300.

Resource assembly can also include identifying IOT's that have specific processing power, based on the desired request for the DLC group. For instance, if the request for processing power is at a specific level, certain IOT's that do not provide sufficient amount of power can be excluded. Another application function of DLC 320 can be connection logic, which can test the different connections between various routes between the various IOT's of a proposed DLC group 300. Strength analysis can also be performed to test the strength of the connections between the IOT's and the requesting entity.

Route request logic can also be performed to initiate the identification of routs between IOT's, to establish connections for a DLC group 300. Routing request logic can also be operated to execute the distribution of data between the IOT's to send request for processing, and received process data between the IOT's or back to the requesting entity. The route request logic can ensure that operations that require execution by multiple IOT's get completed before being returned for assembly by the requesting entity. In some embodiments, the routing request can request certain IOT's to assemble data processed by other IOT's before sending data back to the requesting entity.

By way of example, memory 980 and processor 982 are shown to be virtually assembled from the IOT's that are contributing to the DLC group 300. Memory 980 and processor 982 define hardware resources 1104, which are harvested from the assembly of parts of the resources from IOT's that are part of DLC group 300. It should be understood that other hardware resources can also be shared, such as registers, counters, cache, data structures, logic circuits, integrated circuitry, etc. Hardware resources 1104 should therefore not be limited to memory and processors. However, by way of example the distributed resources 1102 are shown to be differently assembled based on the connections that are found through the DLC group 300. Based on the quality of service processing, one of the connections can be selected for the memory and another connection can be selected for the processor. In another embodiment, the memory and processors select the same connection.

Figure 12:
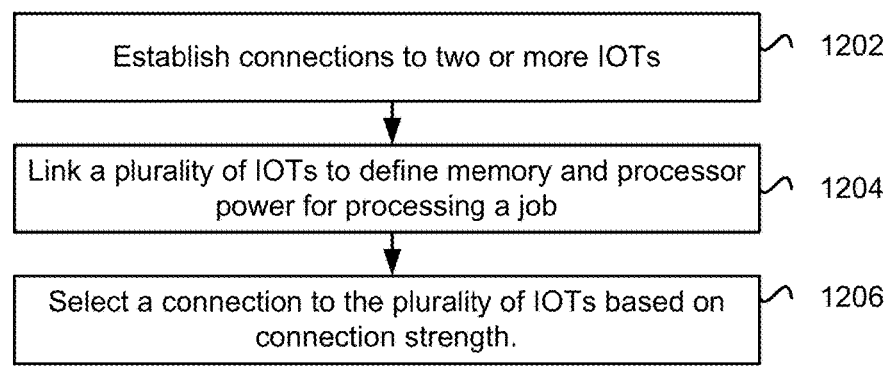
FIG. 12 illustrates a general flowchart diagram for establishing connections to two or more IOT's, in accordance with one embodiment.

FIG. 12 illustrates a general flowchart diagram for establishing connections to two or more IOT's, in accordance with one embodiment. In operation 1202, connections are established to the DLC group, to identify the connections that are available between the IOT's of a local network. Broadly speaking, the IOT's may be devices that have connection to the network but are not yet registered with DLC logic. In another embodiment, the IOT's may be devices that have already been integrated or supplied with code for performing DLC logic operations. Once these devices have been identified, the connections are established to identify one or more connections among the IOT's.

In operation 1204, links are defined between the plurality of IOT's to define memory and processor power for processing a job. As shown in FIG. 11, the distributed resources 1102 show different assembly orders for memory and processing power, based on the connections that are identified. For each connection, links between the memory elements and the processing elements can be established.

In one embodiment, these links identify an order between the processing that will occur among the IOT's for processing a task. For example, in connection 1, the memory path would be memory 2, memory 1, memory for, and memory 3. For connection 2, the memory path would be memory 6, memory 5, memory 3, and memory 1. For connection 1, the processing path could be processor 2, processor 1, processor 4, and processor 3. For connection 2, the processing path could be processor 6, processor 5, processor 3, and processor 1. This linked order would be utilized, in one embodiment for establishing connections that define routes for the data that is going to be processed by the DLC group.

In an alternative embodiment, even when a linked order has been established, IOT's can be skipped so that the processing power can be distributed among the processing power of the IOT's to allow parallel processing. Accordingly, it should be understood the processing can be ordered in a linked order, such that serial processing of memory operations and processing operations can take place or parallel processing can be performed so that the different memory elements and processing elements of the IOT's can be executed in parallel or out of order.

In some embodiments, the processing task can be single threaded or multithreaded. Multithreaded operations may utilize the processing power the different IOT's in different orders, and utilize some or one of the IOT's as the backbone network for the multithreaded operations to generate the ordered completed task, or assembly of the multiple thread data back to a processed unitary operation. In operation 1206, the system can identify connection to the plurality of I/O tees based on the connection strength. As noted above, connection strength is only one example, and other quality of service elements can be used to select the connection or connections.

Figure 13A:
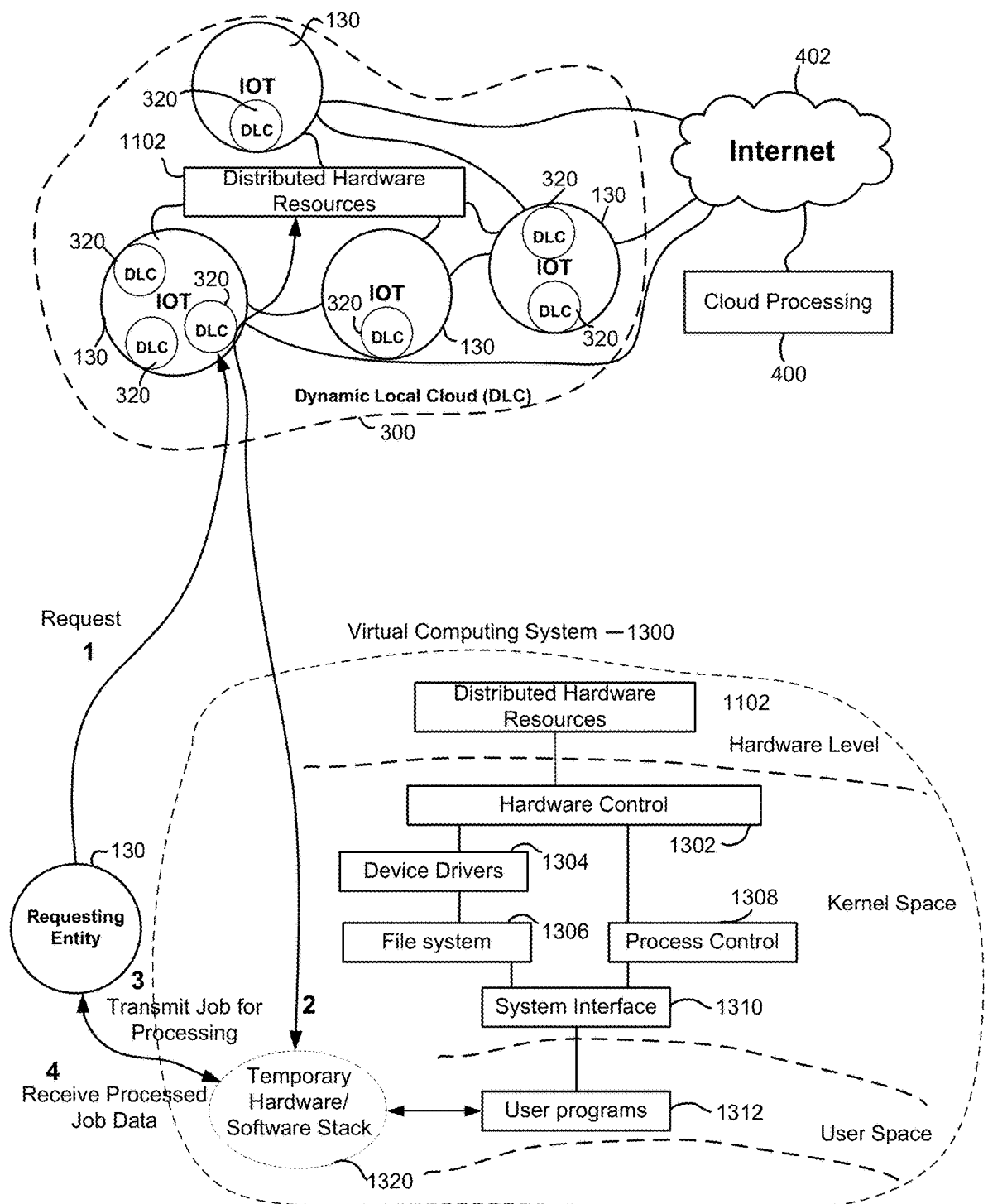
FIG. 13A illustrates an example of distributed hardware resources utilized by a DLC group, the process a request received from a requesting entity, such as an node, in accordance with some embodiments.

FIG. 13A illustrates an example of distributed hardware resources 1102 utilized by a DLC group 300, the process a request received from a requesting entity, such as an node 130. As shown, IOT devices have been assembled to define a DLC group 300, and some of the IOT's can have access to the Internet 402 and cloud processing 400. The collective resources utilized for processing can be viewed as the distributed hardware resources 1102, which can be utilized by the requesting entity. In one specific example, a virtual computing system 1300 is defined from the processing provided by the DLC group 300.

For example, some of the IOT's can process one or more DLC 320, which process different logical operations to execute specific tasks, or operate an application that requires various resources. For instance, some applications require resources of a full computer, and the full computer can be established as a virtual computing system 1300, utilizing the distributed hardware resources 1102. The virtual computing system 1300 can be defined by distributed hardware resources 1102 at the hardware level.

In the kernel space, hardware control 1302, device drivers 1304, file system 1306, process control 1308, system interface 1310, can be logical components of the kernel space of a computing system 1300. These operations can be mimicked or executed by applications of DLC 320 in a distributed manner across the DLC group 300. User programs 1312, in the user space, can utilize the distributed hardware resources 1102, such as by utilizing the kernel space and hardware level of the virtual computing system. In one embodiment, the DLC group 300 is established for a temporary period of time, so that operation of a program, e.g. user program 1312 can be executed and the results returned to requesting entity 130.

By way of example, a request can be sent to the DLC group, which can be received by one of the IOT's executing at least one DLC 320. The request can cause the assembly or generation of DLC group 300. The request can identify the need to generate or process a virtual computing system 1300. That request can assemble the different I/O tees necessary to execute the functions of fertile computing system 1300 for processing the request. Once the assembly has occurred of the distributed hardware resources, and applications of DLC 320 have been assembled to create the virtual computing system 1300, a job can be transmitted by the requesting entity to the temporary hardware/software stack 1320, which is developed by the DLC group for processing the request. The request this delivered to the DLC group 300, such as any request for processing can be transferred to a virtual computing system.

Once the request has been processed by the assembly of the virtual computing system, utilizing the distributed hardware resources 1102 and the applications defined by DLC 320 that are distributed among the IOT's, the data can be responded back to the requesting entity in the form of process data. The process data can include information that can be rendered by the requesting entity. For instance, the request can be to process certain information and return graphical data to the requesting entity. The request can be to execute a complicated DNA sequencing operation and return the data back to the requesting entity.

The request can be to execute a graphics operation and then returned the image data back to the requesting entity, the request can be to assemble graphical components of the model, access data from the Internet, assemble it locally by the virtual computing system, and return it to the requesting entity. A benefit of utilizing the virtual computing system 1300, utilizing the resources of an IOT in a distributed local cloud 300 is that the requesting entity can be a very light weight device, but backed up by very high processing power that can be assembled for executing specific tasks, applications, results, interfaces with the Internet, and the like.

In this manner, it is possible for a very lightweight computer or simple handheld device to harness power from distributed IOT devices, have those distributed IOT devices execute on this data and then returned process data back to the handheld device for display or rendering. This offloads the heavy processing that would be required by the handheld device or processing that would be incapable of being processed by the handheld device, without the harnessing of the distributed DLC 300, and the IOT's and distributed hardware resources 1102.

In one embodiment, IOT containers may be used to encapsulate applications and services. In one embodiment, multiple WCC devices are present and at least two or more WCC devices operate a common Linux based operating system distribution. The two or more WCC devices each further operate a container within themselves and between the two or more multiple containers operating within the nodes, a cloud-based common Linux based operating system is defined.

Figure 13B:
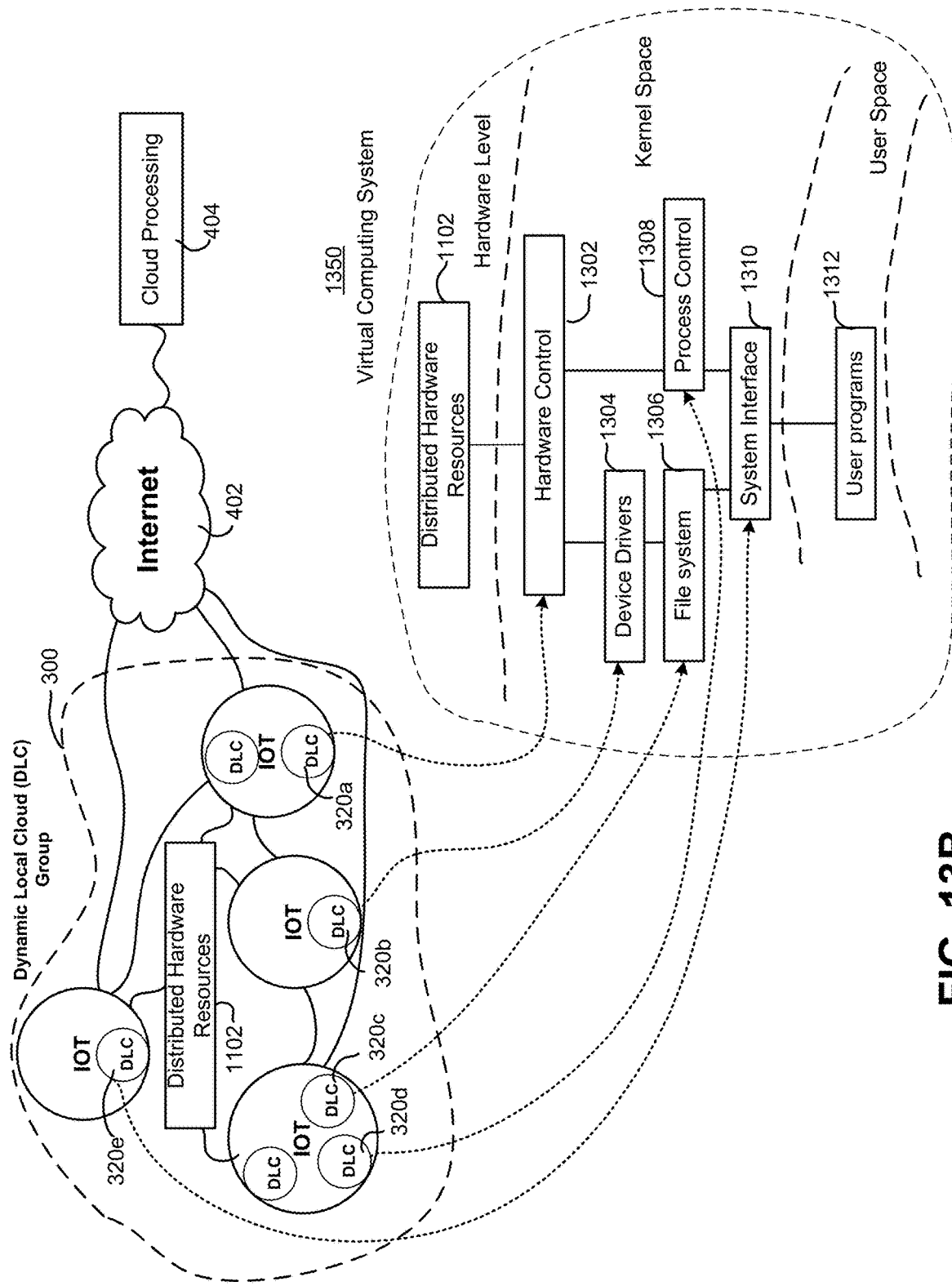
FIG. 13B illustrates a similar assembly of IOT devices, with DLC utilized for processing different tasks of a virtual computing system, in accordance with one embodiment.

FIG. 13B illustrates a similar assembly of IOT devices, with DLC 320s utilized for processing different tasks of a virtual computing system 1350. In this embodiment, select DLC 320 (a)-(e) are assembled to execute specific virtual computing tasks. For example, the applications of each DLC that is assembled for the virtual computing system 1350 can be specialized to execute a specific operation. For example, DLC 320a can be used to execute hardware control 1302. DLC 320b can be executed to process device drivers 1304.

DLC 320c can be executed to process filesystem 1306. DLC 320d can be executed to execute process control 1308. DLC 320e can be executed the process system interface 1310. Although not shown, other items, such as user programs 1312, and other glue logic or interface logic, bus logic, sharing logic, caching logic, saving logic, etc. can also be processed by other dedicated DLC's 320 assembled by distributed hardware resources 1102.

Figure 14:
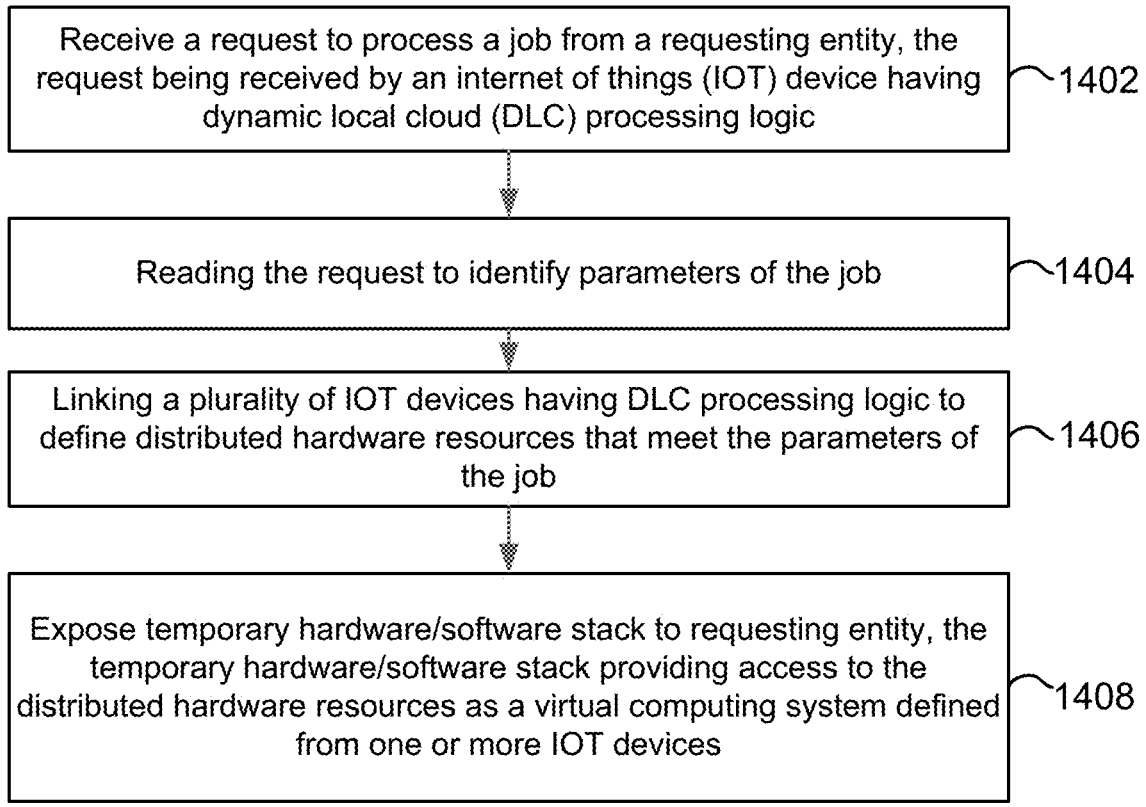
FIG. 14 illustrates an example processing operation, for utilizing IOT's to define DLC groups, in accordance with one embodiment.

FIG. 14 illustrates an example processing operation, for utilizing IOT's to define DLC groups, in accordance with one embodiment. In operation 1402, a request is received to process a job from a requesting entity. The request can be received by an Internet of things (IOT) device having DLC processing logic 320. In operation 1404, the request is read to identify parameters of the job. The parameters of the job can identify what processing task will be performed. For example, the processing task and simply be to utilize or give a certain amount of resources of specific coyotes for executing a simple task by requesting entity.

In another embodiment, the request can be to assemble a virtual computing system to execute a more complex task and return process data. In another embodiment, the request can be for the IOT's to communicate with each other to execute an ordered operation, or communicate with each other to handle a distributed task or complete a recipe. Additional details regarding recipe settings, configurations, modifications, and synching of operations, is described with respect to FIG. 20 below.

These examples are just some type of examples that can be processed by DLC groups, which have I/O tease that communicate with each other, share processing power, and work to assemble data for requesting entities, or assembled data among themselves to operate as a group.

In operation 1406, the plurality of IOT devices are linked together to perform the DLC processing logic, which defined a distributed hardware resources that meet the parameters of the job. As mentioned above, the job can take on various forms, and the assembly of DLC logic and selection of specific IOT devices can be customized for the specific job. This is to say that not all IOT devices, even though they are local, will participate in the specific job.

In some embodiments all IOT devices will participate in the job. In operation 1408, temporary hardware software stacks are exposed to the requesting entity. The temporary hardware software stack provides access to the distributed hardware resources, which may be virtualized computing systems defined from one or more IOT devices, as described with reference to FIGS. 13A and 13B. In some embodiments, the assembly of hardware resources may not be referred to as virtualized, but simply as assembled hardware resources. In other embodiments, virtualization can occur among the IOT nodes, by including hypervisor layers within the DLC processing, so that further abstraction of the hardware resources can be performed, and better utilization of hardware resources by the DLC cloud can be delivered to requesting entities.

Figure 15:
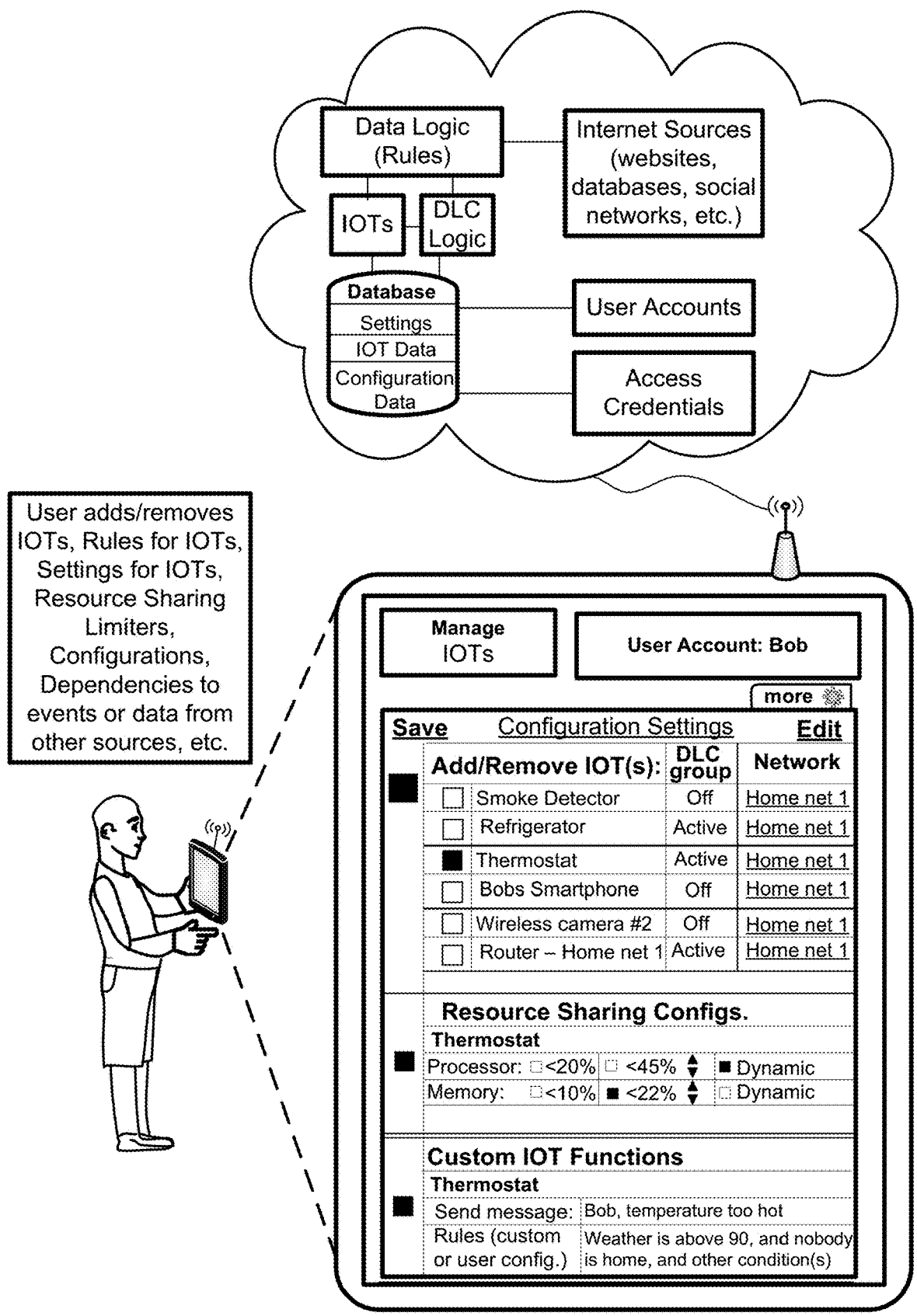
FIG. 15 illustrates an example of a user device, such as a tablet computer, they can be utilized by a user to access DLC groups, IOT's, and manage the setup, configuration, and assembly, of DLC groups, in accordance with one embodiment.

FIG. 15 illustrates an example of a user device, such as a tablet computer, they can be utilized by a user to access DLC groups, IOT's, and manage the setup, configuration, and assembly, of DLC groups. In some embodiments, the DLC groups can be assembled automatically by the IOT's, utilizing DLC 320. In other embodiments, the DLC groups can be assembled, manage, and modified utilizing a user interface. As mentioned above, the assembly of DLC groups, and their existence can be saved to the table, data structure, or memory of each IOT of the DLC group.

In another embodiment, this data can be saved to memory of a network device connected to the network local to the DLC group. In another embodiment, this information data can be saved to data storage of cloud processing, so as to enable remote configuration of DLC groups from any location. In some embodiments, the creation, assembly, management, configuration, and other management functions can be accessed over the Internet through access to cloud processing.

Cloud processing may be configured to periodically receive updates from IOT's, regarding DLC's created, functions process, configuration settings, and other information. User accounts can be managed by cloud processing to provide access credentials to certain users, who may assemble DLC groups. The user account can be utilized so as to access the user's local networks where IOT's are functioning for the specific user account. Databases can be managed by cloud processing to store settings, IOT data, and configuration data.

This information, as mentioned above, can be updated periodically based on information received from IOT's during processing. In some embodiments, DLC logic 320 can be programmed to broadcast data up to the Internet periodically to update cloud processing regarding the establishment of DLC groups, functions performed by the DLC groups, resources utilized by DLC groups, computing functions performed by DLC groups, historical data, and other information. In still other embodiments, cloud processing can be used to access a network of the user utilizing credentials provided by the user to cloud processing.

These credentials can identify titles, private networks, or other connections to the networks where a user may be creating DLC groups using one or more IOTs. As shown, cloud processing can also manage data logic rules, which may be programmed by a user to set recipes for when certain functions will be performed by IOT's which may be part of a DLC group. In some embodiments, the data logic rules can interface with DLC logic of the IOT's, so as to require specific IOT's to perform certain functions based on the qualification of specific rules. This information and rules can be programmed utilizing cloud processing, and user interfaces that can be access via user accounts.

By way of example, users can add and remove IOT's, set rules for IOT's, control settings for the IOT's, program resource sharing limiters, adjust configurations and dependencies to advance or data from other sources, and other configuration functions. This information can be saved to databases where the settings can be accessed and used the program IOT's for the user. For example, once the programming is set to the cloud processing, that programming can be then communicated down to the users network and then program to the IOT's, by communicating with the DLC logic of the IOT's.

Broadly speaking, the DLC logic of the IOT's can simply be code running on the IOT's that enable communication with a remote server. In this case, the remote server is part of the cloud processing, and the remote server is able to remotely program settings of specific IOT's. Further shown in this example, is the ability to add and remove IOT's, determine their status within DLC groups, identify their network associations within the user's network, etc. In some embodiments, the user may have multiple networks, and different groups of IOT's that can function within those different networks. In some embodiments, the user account can be associated with a home network, a commercial network, a vacation home network, a work network, etc.

The user account can therefore allow the user to enter credentials and access their specific networks to then manage the different IOT that can be part of DLC groups. In some embodiments, resource sharing configurations can also be adjusted for specific IOT's. In this example, the thermostat is being adjusted so that the amount of processing power that it was willing to share is identified by the user as a setting. In another embodiment, the system can set up a dynamic sharing profile, so that the individual IOT's can limit the amount of sharing of either memory or processor other hardware resource depending on their functionality, their workload, the time of day, historical metrics, or other information.

In some embodiments, custom IOT functions can also be programmed for specific IOT's. By way of example, for a thermostat, message sending can be programmed based on specific conditions. The rules can be adjusted to be custom based on the user's configurations. For instance, when the weather is above 90° and nobody is home and other conditions are set, a message may be sent to Bob indicating that the temperature is too hot. This message can be adjusted, customize, or change dynamically based on learned settings, settings obtained from other similar users, or other widely user commonly use settings.

Figure 16:
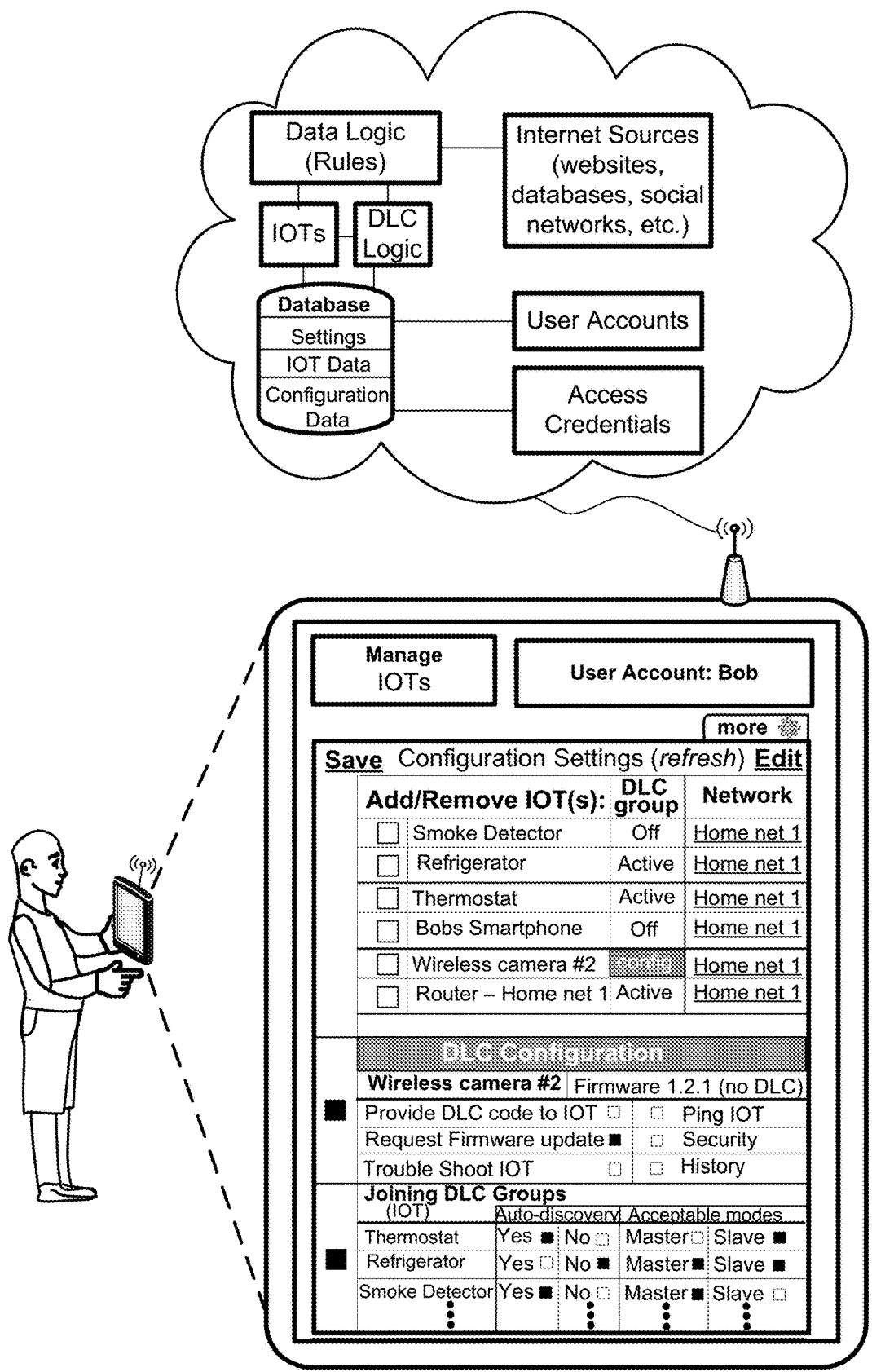
FIG. 16 illustrates yet another example of a user interface and configuration settings that may be programmable by the user, in accordance with one embodiment.

FIG. 16 illustrates yet another example of a user interface and configuration settings that may be programmable by the user. In one embodiment, the user can simply program IOT's or configure DLC group information by touching configuration icons on the touchscreen of the device. Although a touchscreen or tablet is shown, the configuration can also be done through a standard computer, utilizing a mouse and keyboard. In other embodiments, the configuration can be done using voice input, directly to IOT's, or to an interface of the device or over a network. Also shown in FIG. 16 is other functionality related to DLC configuration.

In this example, wireless camera number 2 is selected for configuration. As shown, the firmware is identified for the wireless camera number 2. This example shows that no DLC 320 is running on firmware 1.2.1. This information was gathered by cloud processing by sending a query to the IOT, which retrieves the configuration data of the specific IOT that is connected to the network, but not yet made part of the DLC group. If the user wishes to make the wireless camera part of the DLC group, the user can request that DLC code be provided to the IOT by simply making a selection on the user interface.

The user can also request a firmware update, which may come from the manufacturer of the wireless camera, or can come from the custom cloud service provider that supplies code for enabling IOT functionality. In another embodiment, the user can troubleshoot IOT, to see why the IOT is not working or fails to utilize DLC logic properly. In another embodiment, the user can select the pain the IOT, to see if the IOT is actually working. In another embodiment, the user can access security settings of the IOT, so as to provide or validate that access to the IOT is authorized.

The security settings can include providing passwords, codes, serial numbers, encryption or decryption handshakes, etc. In another embodiment, a history can be selected to identify the historical use of the IOT on the network.

Further shown is the option to troubleshoot or assist in joining DLC groups by specific IOT's. The user can select specific IOT's to set auto discovery parameters, acceptable modes of operation, and other settings. This functionality allows the user to set how specific entities will react, when exposed to DLC groups, and their operation. For instance, the user may not wish the refrigerator to be auto discovered, but does wish to smoke detector in thermostat the be auto discovered.

The setting of master and slave mode can also be selected by the user, which optimizes the functionality of IOT's within specific networks. This allows a user to set and limit the functionality of specific IOT's when made part of DLC groups, so that their native applications can function as the user wishes them to function. For instance, some users may not wish to overload the refrigerator, since the refrigerator IOT may be processing more information than other devices. For instance, the refrigerator maybe part of a restaurant kitchen, and that refrigerator may be tasked with tracking when food items come in and go out of the refrigerator, and generating new grocery lists for replenishing items being used within the refrigerator.

These task can be very complex if the refrigerator has high usage, so the user can set the DLC settings so that that refrigerator is not auto discovered and only operates in master mode, when it requires or needs more processing power from nearby IOT devices.

Figures 17, 18A:
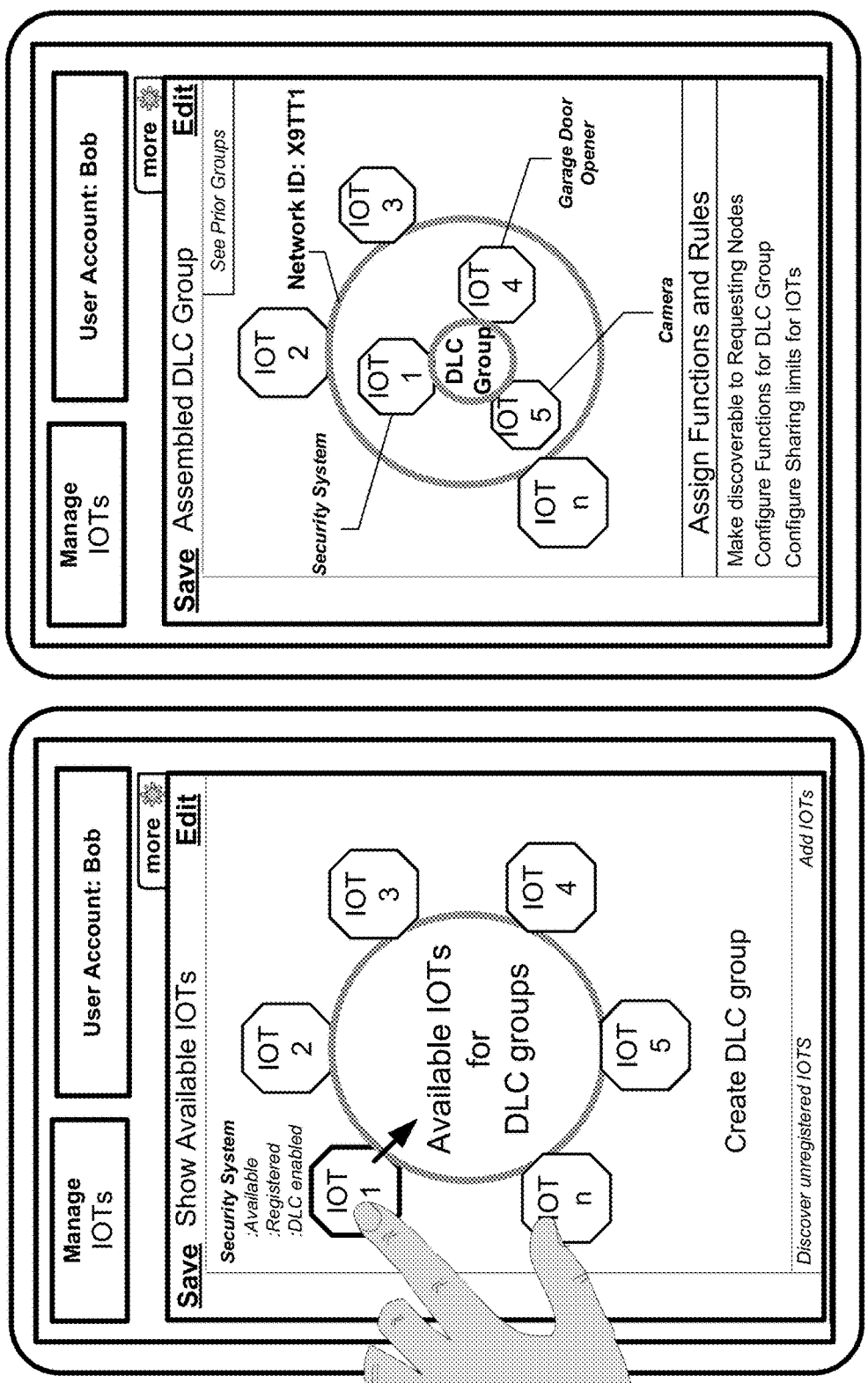
FIG. 17 illustrates a user interface that can be utilized to arrange an access IOT's that is discovered in specific networks, in accordance with one embodiment.
FIG. 18A shows an example of having assembled a DLC group from a plurality of IOT's, in accordance with one embodiment.

FIG. 17 illustrates a user interface that can be utilized to arrange an access IOT's that is discovered in specific networks. In one embodiment, the user interface can be a dynamic interface that identifies IOT's that are available within the network and allows a user to select specific IOT's and drag them and drop them to the center for making a DLC group. The user can also tap on different IOT's to identify what the IOT is, determine if the IOT is available, determine if the IOT is registered within the group, determine if the DLC is enabled, etc.

If the user wishes to add IOT 1 to the DLC group, the user can simply drag IOT 1 to the center region, or any other region on the user interface. The location of where to drag-and-drop can be configured based on customization, screen orientation, UI functionality, and other considerations. The user can also be provided with interface options to discover unregistered IOT's, to add more IOT's to the list, access more system functions, save changes, edit functions, and other management tasks.

FIG. 18A shows an example of having assembled a DLC group from a plurality of IOT's. In this example, IOT 1, IOT 4, and IOT 5, have been assembled to define a DLC group. The network to which these IOT's are connected are also identify graphically, to provide visual recognition of where the IOT's are located or the network that they belong to. The different IOT's that were assembled to define DLC group can also be identified graphically, in terms of their native functions.

For example, IOT 1 is part of a security system, IOT 4 is a garage door opener, and IOT 5 is a camera. This example is one where the group is created dynamically using the user interface, by accessing the network. As mentioned above, the user interface can be communicating locally to the network, without accessing the Internet.

In another embodiment, the user interface can be communicating over the Internet via cloud processing, which then allows the programming to be transferred to the IOT devices upon creation or assembly of DLC groups, settings, configurations, updates, and the like. In one embodiment, the user interface can provide other functionality, such as to see prior groups that were created at the specific network. This historical data can show how useful the DLC groups were, the amount of processing the performed, and can provide recommendations for future DLC group assemblies.

In another embodiment, the user interface can be used to provide or sign functions and rules to specific DLC groups, or specific IOT's. Some of these functions can include making certain IOT's discoverable to requesting nodes or other IOT's. Other functions can include configuring functions of the DLC group. Other functions can include configuring sharing limits for specific IOT's.

In some embodiments, functionality of specific DLC groups can be managed to operate and execute specific recipes. The recipes can include management of operations that will occur based on other operations occurring earlier or conditions.

A novel task management application can cooperate with DLC and DLC-controlled appliances to achieve profound new levels of productivity, including a family incentive and reward system for accomplishing various tasks around the house, and a sophisticated enterprise productivity management system for accomplishing projects around the workplace.

Figure 18B:
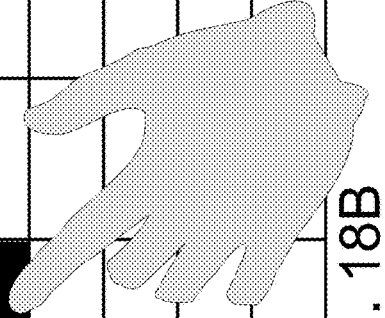
FIGS. 18B-18D illustrate a task management system may be operated by an authority such as a parent to select tasks and identify the tasks with members of the family, such as the children, in accordance with one embodiment.

As shown in FIG. 18B, a task management system may be operated by an authority such as a parent to select tasks and identify the tasks with members of the family, such as the children. In one embodiment, the tasks may be transmitted to the recipient through various channels and to devices registered to the users. In some configurations the tasks are transmitted in a message over DLC. In one embodiment, DLC enabled smartwatch are worn by recipients who can receive notification of tasks over the watch. In another embodiment, simcard-enabled smartphone watches are worn by recipients who can receive notification of tasks for completion over the watch. In some configurations the tasks are transmitted in a message over DLC. In another embodiment, multiple devices are registered to a user in which a task may be delivered. In another embodiment, the task delivered is only delivered to a device in which a user is detected to be using at the time in which the task is intended to be delivered.

Figure 18D:
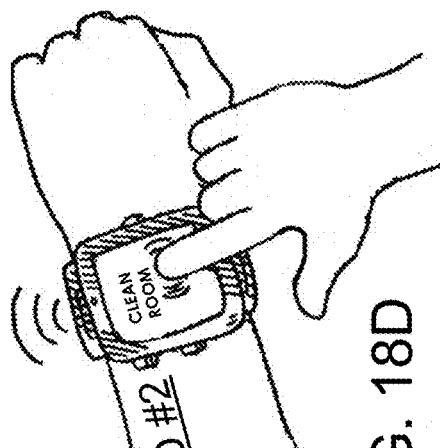
Figure 18C:
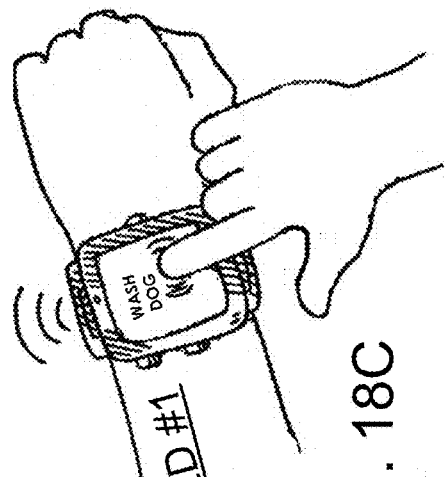

In one preferred embodiment, notification of tasks are delivered to a smart watch as shown in FIG. 18C and FIG. 18D. In one embodiment, also shown in FIG. 18B, the tasks can be assigned to rewards. It is preferred that the rewards comprise points that can be added and subtracted, such that the points can be tallied and a leaderboard be associated with one or more users. In one embodiment, the points can be redeemed for a variety of rewards. In one embodiment, the rewards include screen time on televisions, personal computers, iPad, time on any device, money, gift cards, etc. In one embodiment, a parent provides a schedule of rewards associated with the tasks and defines how the rewards can be redeemed. In one embodiment, the reward system has bonus modes to help assist a parent motivate a child, especially during rough times, when kids are out of control.

As shown in FIGS. 18E-18I, a parent or some authority, using a smart watch, tablet or phone or any convenient device, may speak or select a task request for a user. In one embodiment, as shown in FIG. 18B, a race condition may be set by an authority. In this mode, multiple persons may compete in a race mode to accomplish the assigned tasks. Bonus points can be allocated to the winner of a race. In one embodiment, the amount of time taken to complete a task may be tallied. To incentivize quick reaction and fast completion of goals, an authority such as a parent may skew a point schedule to provide more points depending on the amount of time to complete the task. In one embodiment, more points are given the tasks that are completed swiftly. In another embodiment, the points are held in reserve until an authority performs an inspection. This will ensure that quality is not compromised. In another embodiment, additional bonus may be added or subtracted during inspection, depending on the quality, or lack of quality, in completing the task.

In one embodiment, the start of a race event is triggered only after all participants have accepted the challenge. In one embodiment, as shown in FIGS. 18C and 18D, the acceptance of a task is indicated by touching a face of a smartwatch that shows the task. Depending on the settings and configuration, points that depend on a time component for computing the reward may compute the reward upon the initial notification of the task or upon the user accepting acknowledgement of the task, as shown such acknowledgement is showing in FIGS. 18C and 18D.

In one embodiment, one or more enrichment activities such as read, study, play outside, exercise has a point system that aims to extend the amount of time the user is occupied by such activity. In another embodiment, data from the smartwatch or from any device operating in connection with the present invention, including DLC devices, may track the user to provide some confirmation or evidence that the user was actually performing the activity instead of cheating the system.

In one embodiment, a task notification system includes a vibration. In another embodiment, the task notification includes speech of the authority who speaks into a phone to define the task, and the task is played back through the smartwatch of the recipient. In another embodiment, the notification system is made aware of the user schedule so as to avoid any audible alerts to children wearing the smartwatch during school hours. In another embodiment, the school hour schedule is checked against GPS activity to enable notification of alerts during school hours but when the child is away from school premises, such as to accommodate flexibility during days off, holidays, etc., without needing to set the notification settings.

Figure 18E:
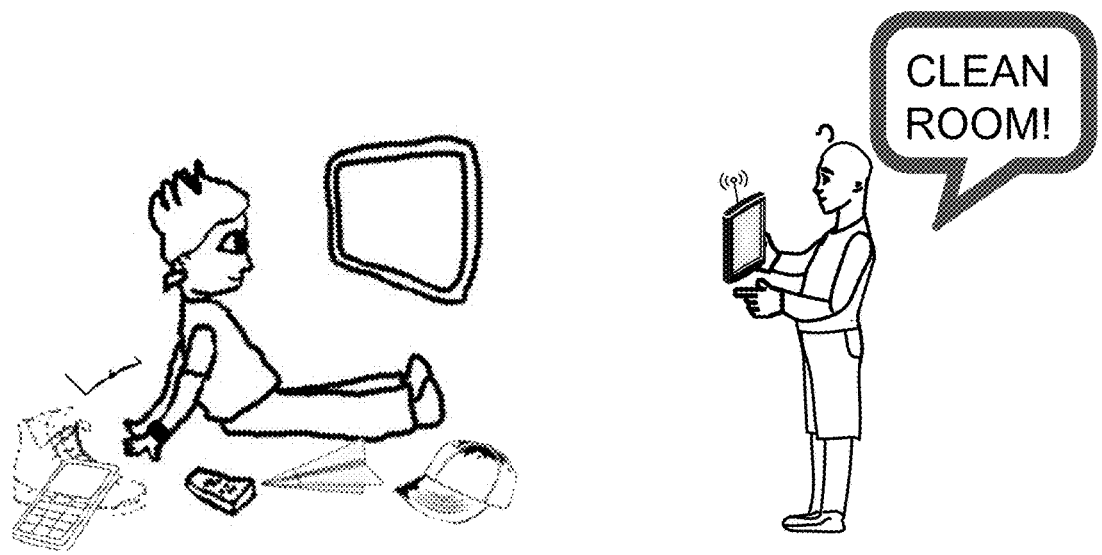
FIGS. 18E-18I illustrate a parent or some authority, using a smart watch, tablet or phone or any convenient device, may speak or select a task request for a user, in accordance with one embodiment.
Figure 18F:
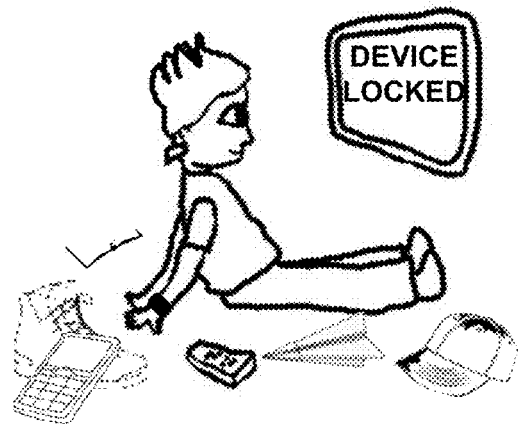
Figure 18G:
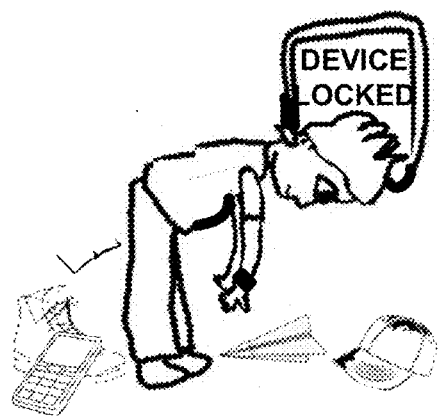
Figure 18H:
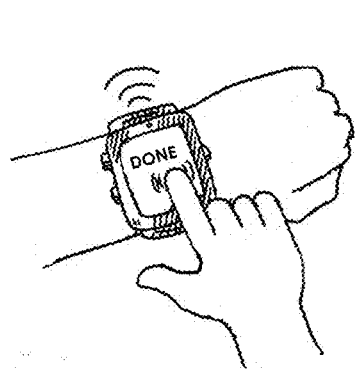
Figure 18I:
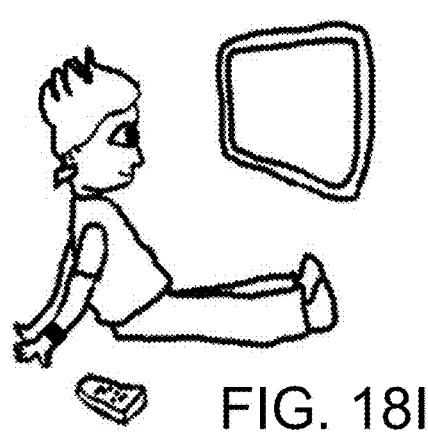

As shown in FIG. 18E, a user such as a parent or manager, makes a request for a child to clean his room. As shown in FIG. 18F, in one embodiment, the devices associated with the child may be locked by the task management program. The coordination of locking of devices may be through DLC. The task management application may control the locking one or more devices and store settings and scoring data. The locking may occur during a task event or in connection with the number of points the child has accumulated. As the user cleans up his room, FIG. 18G, time may be tallied. In one embodiment, telemetry from the watch, including photos of the activity, may be accumulated and sent to the task authority or parent. When finished cleaning the room, the child may tap the screen of his smartwatch, as shown in FIG. 18H, to mark the task as complete. In one embodiment, upon completion of the task, one or more devices associated with the user may be unlocked again for use, FIG. 18I.

In one embodiment, through an application interface, user is provided ability to download templates that define sets of tasks, points and rules. In one embodiment, incentive-based templates are defined for a variety of categories, including ones tailored for kids having special needs. In one embodiment, users can upload templates for other users to share. Competitions can be local within a family with siblings, or with others outside the family Families can be matched against other families and competitions made to increase productivity and provide positive reinforcement for both families. The task management system may be integrated into a social network, such that friends may supply currency to incentivize activity of others.

In one embodiment, a challenge or race involving multiple persons, will start after all have accepted the challenge. In one embodiment, a synchronized countdown timer marks the start of the race. In another embodiment, a challenge may be forced to occur at a certain time period without requiring all participants accept the challenge. In another embodiment, tasks can repeat on a schedule. Winning a challenge may include a bonus. A challenge can be based on accumulation of points over a period of time. Rewards may be earned over time and accumulated.

In one embodiment, points can be delivered to a child instantly, for rewarding good behavior. In one configuration, a parent uses his phone or smartwatch to quickly add points to a user. In another configuration, a bonus can be given upon a child reaching a certain number of positive instant awards over a period of time.

In one embodiment, points can be subtracted from a child account instantly, to penalize bad behavior. In one configuration, a parent uses his phone or smartwatch to quickly subtract points from a user. In another configuration, a bonus penalty can be given upon a child reaching a certain number of negative instant awards over a period of time.

In one embodiment, a task management application may track various tasks that are typically scheduled for the day. As show in FIG. 18J, tasks can be made activated, managed, points rules allocated, challenges configured. In one embodiment a parent may trigger a task to another by selecting preconfigured tasks from a list, such as walking the dog, washing the dog, or cleaning a room.

Figure 18K:
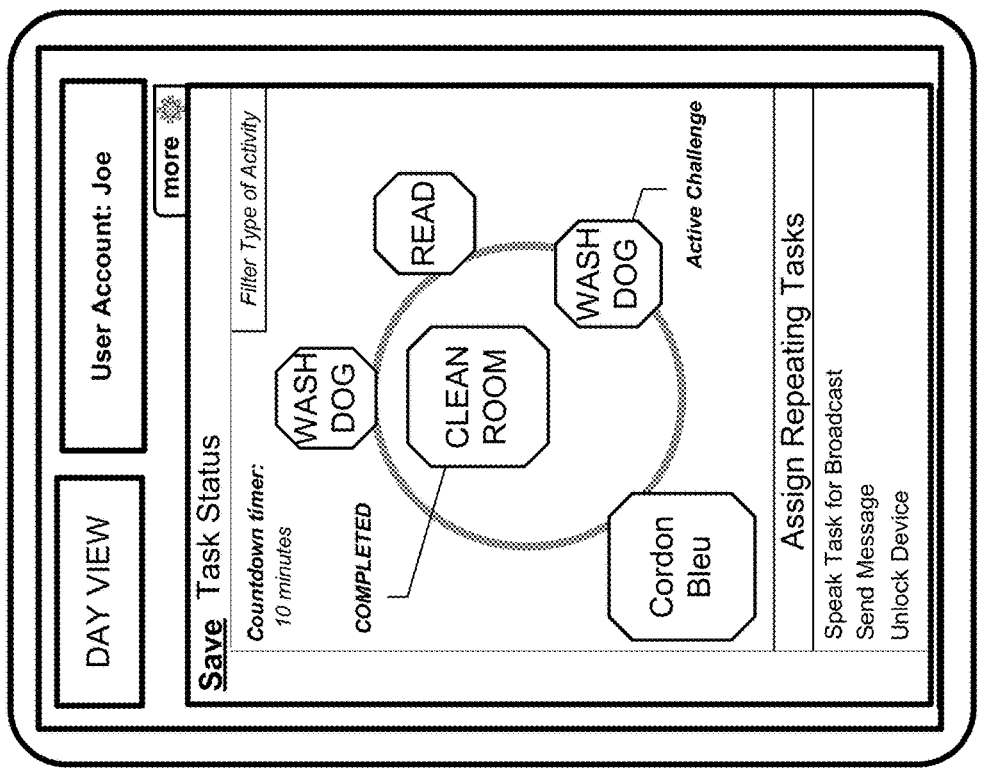
FIG. 18K illustrates, that in addition to speaking tasks, a user may send a message to a participant, or lock or unlock a device, assign repeating tasks, via a user device, in accordance with one embodiment.
Figure 18J:
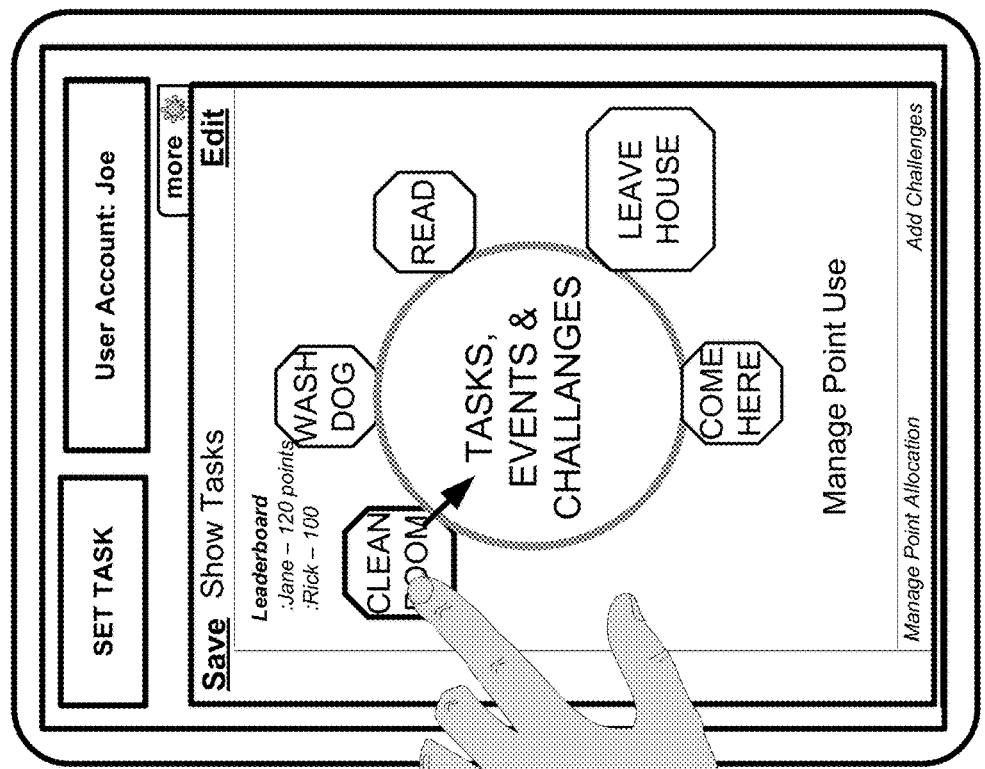
FIG. 18J shows that a task can be made activated, managed, points rules allocated, challenges configured, in accordance with one embodiment.

In one embodiment, active tasks may be shown, including ones both completed and currently in active challenge mode. As shown in FIG. 18K, in addition to speaking tasks, a user may send a message to a participant, or lock or unlock a device, assign repeating tasks, etc. In one embodiment, a task has a fixed period of time in which to complete it. In another embodiment, if a task is completed with reserve time, the reserve time is used to compute bonus points or translate to direct additional screen time for the user completing the task early.

In one embodiment, location based tasks are triggered in response to tracking the location of a user as they manipulate about a space. In one embodiment, the tracking is communicated to DLC. In another embodiment, DLC devices sense the absence or presence of the user near another appliance, and report the activity to the DLC. In another embodiment, the task management application is coupled to the DLC. In more enhanced embodiments, the task management system defines a task as a recipe. In a similar enhanced embodiment, the DLC enabled devices may be controlled to guide and assist one or more user achieve the goal of completing the task. In still another embodiment, the DLC appliance participate in an ancillary way to remind a user of a challenge, to stimulate and entice a user in connection with a challenge, or to notify the user of a change in rules in a challenge.

In a more advanced version of the task management inventions herein, certain complex tasks relating to a recipe are contained in a graph of interconnected task nodes that may be traversed by multiple members or workers aiming to complete project. In one such embodiment, task-based delivery is provided to individuals and groups, with coordinated and tracked enterprise collaboration activity, emphasizing and leading individuals and teams down targeted pathways leading to accomplishment of one or more goals.

In one embodiment, a recipe leads to the accomplishment of a goal and will include one or more tasks necessary to be carried out to reach the goal. Different recipe requirements define the makeup of a task graph. In one embodiment, to reach a goal, all tasks nodes leading along a path the leaf node must be accomplished. Similar to a project management software, a task graph can shift in time and have pre-requisite nodes that must be traversed in order to complete the project. A task graph may include a variety of attributes. In some conditions, a task graph can be defined based on nodes having task definitions where each task is an independent of another task and all tasks can be carried out in any order. Linear list of tasks to order or graph are accomplished may be fixed or flexible. Tasks may require a pre-requisite task to be completed before the task can be accomplished.

Figure 19:
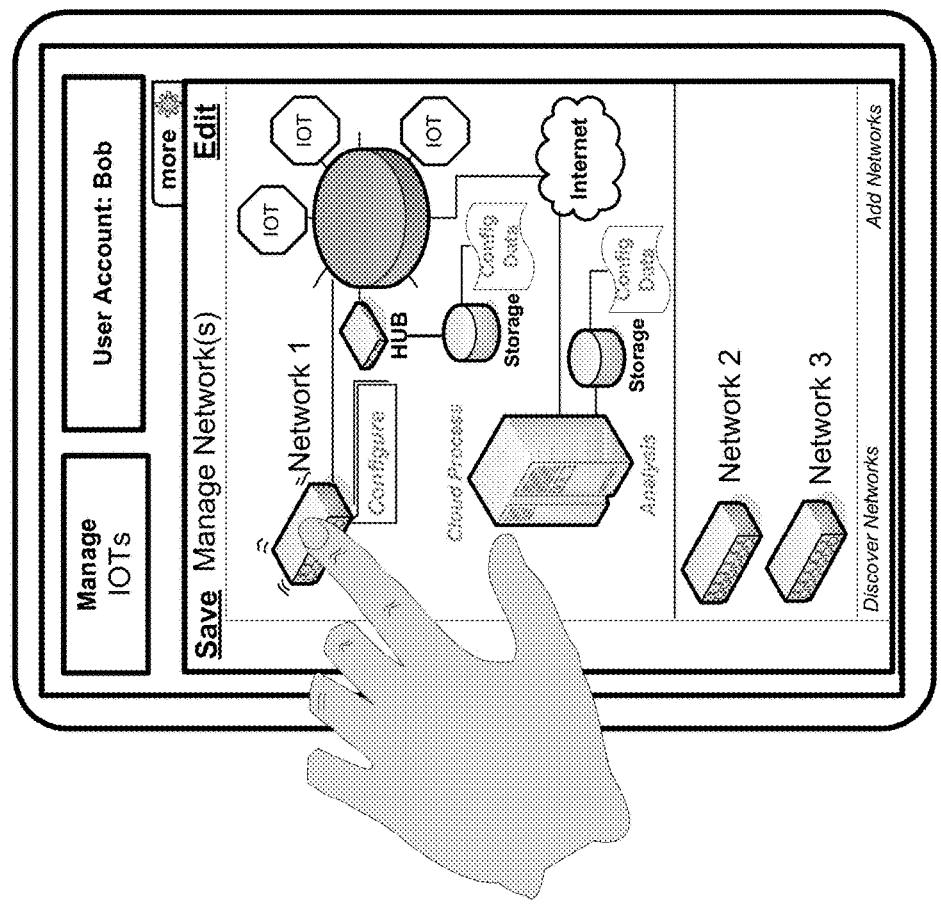
FIG. 19 illustrates an example of a user interface on a portable device or computer, where the configuration of networks can be displayed when a user is accessing a management function for communicating with IOT's of one or more networks, in accordance with one embodiment.

FIG. 19 illustrates an example of a user interface on a portable device or computer, where the configuration of networks can be displayed when a user is accessing a management function for communicating with IOT's of one or more networks. In one embodiment, the user may select to manage networks, which may populate the screen with a plurality of networks, such as network 1, network 2, network 3, and the like. In one embodiment, the user interface may be provided by a router that can display which devices are connected to the router, and enable access for configuration.

The router may include processing power and storage, and applications for rendering the user interfaces to show which devices are connected to the network. When the user decides to configure the network 1, or access the network to see which devices are connected to the network or configure the IOT's that are connected to the network, the graphical user interface may show those devices for interactive configuration. For example, the network shows 3 IOT devices and a hub connected to the network 1. Additionally, the hub is associated with storage, which can also store the configuration data for network 1.

The configuration data may include information regarding the IOT's and also configurations for the DLC logic associated with the IOT's, and also can include DLC group information. By way of example there are many types of management functions possible and this interface can provide graphical user interface access to view, set, and manage such functionalities.

Example functionalities can include, without limitation, determining which IOT's are part of a DLC group, making IOT's part of a DLC group, setting the functionality of the DLC group, assigning tasks to each of the IOT's of a DLC group, setting profiles for the IOT's in the DLC group, changing the configurations of individual IOT's, managing the sharing of resources for each specific IOT, setting security levels associated with specific tasks performed by the DLC group, modifying security levels for different tasks, joining more than one DLC group together to function to complete a task, populating new DLC groups, changing the lifetime associated with DLC groups, setting reporting tasks for the DLC group, programming recipes to be performed by the DLC group, setting ownership information for the DLC groups, setting passwords, setting biometric data for DLC groups ordered IOT's, accessing historical data for DLC groups, rearranging a DLC group, defining connection links between specific IOT's of a DLC group, and other management functions.

These management functions are simply an example and many more are possible as described throughout this document. Broadly speaking, the user is able to select different network things and configure their settings, make adjustments, and graphically see or make adjustments by dragging and dropping graphical icons for establishing, managing, and viewing status or operation.

As further shown, a DLC group that is managed locally on network 1 can also be connected to the Internet. In one embodiment, a cloud process server or servers or data center or data centers, may be accessed to save in storage configuration data of DLC groups. In one embodiment, a timing routine is processed by DLC groups to maintain synchronous data between the local network and the remote cloud processing storage. In some embodiments, updates are populated to the cloud when changes are made.

In other embodiments, batch changes are updated on a schedule. In one embodiment, users wishing to see what DLC groups are established, or establish DLC groups remotely, can access cloud processing servers via a user account. Therefore, remote management of DLC groups as possible, including the setting of notifications, warnings, alerts, and real-time information for mission critical or specific non-mission critical tasks performed or scheduled to be performed by DLC groups in any network.

As mentioned earlier, the configuration data associated with DLC logic associated with specific IOT's can be stored directly on the IOT's themselves. Therefore, access of the configuration data for a DLC group can also be accessed without the need for a hub or storage separate from the IOT's themselves. However, having the data separate from the IOT's or updated and received from IOT's to a storage associated with the network provides the flexibility of accessing that network device to gather the configuration data of each IOT that may be associated with a DLC group. Devices that join the DLC group can therefore register their configuration data with a central storage, which avoids their need to manage requests made of the DLC. As mentioned above, the gathered configuration data received from individual IOT's that form a DLC group can also be stored on remote cloud storage, for providing remote access to the information.

As further illustrated in FIG. 19, the user interface can also provide functionality to discover additional networks, which causes for a searching function to discover other networks. In other embodiments, additional networks can be added if the user that wishes to add the network has credential information for accessing and making the networks part of the management interface.

Continuing with FIG. 19, the illustration also shows one embodiment where the system may discover IOT devices connected to a network, and selection of the network will illustrate graphically the IOT devices that are connected to or are connectable to the network that was selected. In one embodiment, touching the router configuration button can enable setting of configuration data of the router but also cause propagation of SSID and password data downstream to all IOT nodes. In some embodiments, variations of this template can include versions of the finger moving around the storage containers in different locations, version with options for backup management services, version for replacing the IOT octagons with actual names or custom names of devices like PC, IPAD, TV, DVR, NAS (network addressable storage), CAMERA1, CAMERA2, bedroom light, downstairs closet, pool area camera, barbeque outlet, etc.

In some embodiments, two DLC groups can be connecting to each other. For example, a DLC group at a regional office #1 connects to DLC group at a regional office #2. In a home, the home DLC group connects to a cluster vacation home DCL. Some IOTs can be queried, to seek information related to their status or operation, relating to maintenance (e.g., air filter, water filter, coffee filter, coffee, tide detergent, saw blades, vacuum bags, etc.) or maintenance of tool #1 (wear at 50%), tracking of forklift weight load, motor activation, pump load, etc.

Figure 20:
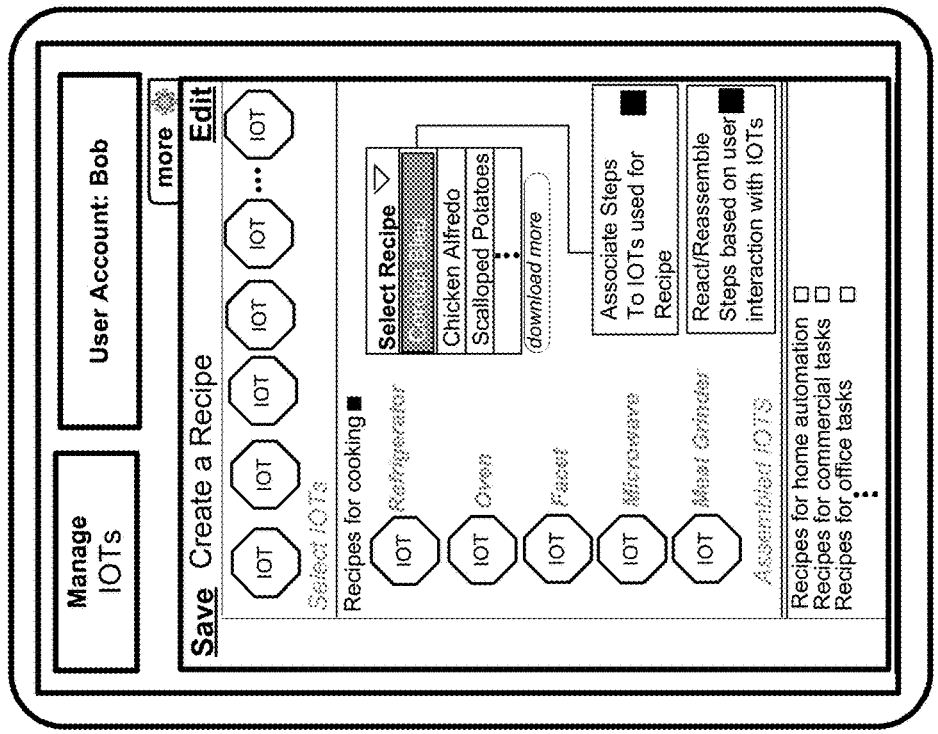
FIG. 20 shows examples of setting, generation, and construction of recipes for operations between IOTs, in accordance with one embodiment.
Figure 21:
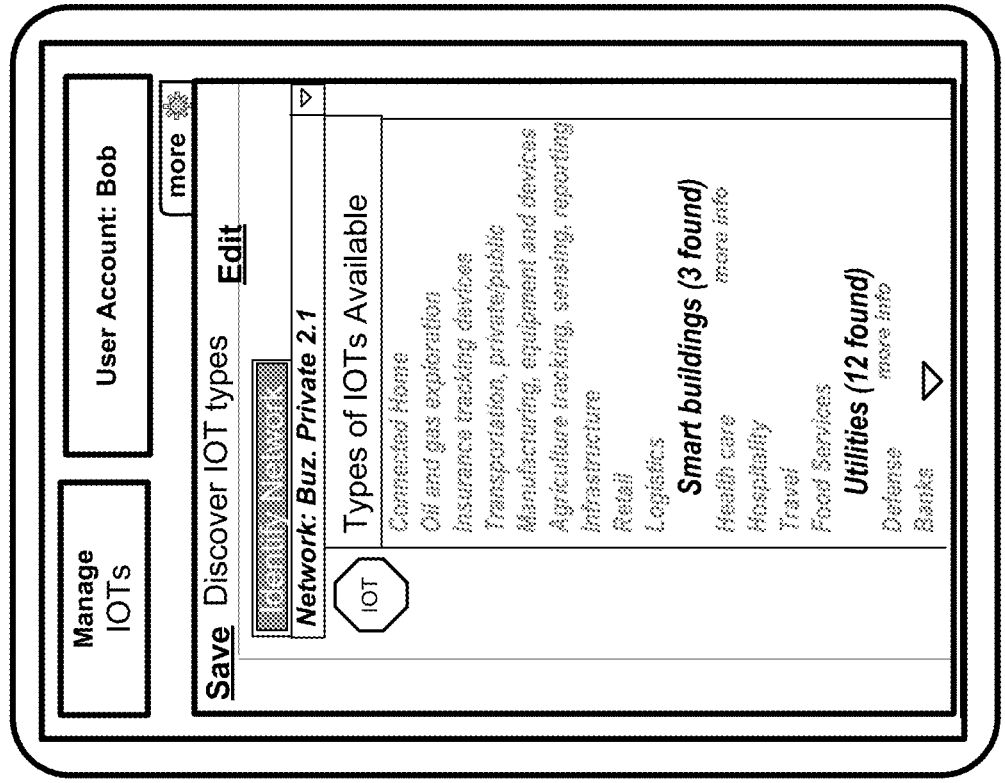
FIG. 21 illustrates an example of a management interface, which can access one or more networks for which a user account is provided with credentials, or the user account can input credentials to interface with specific networks, in accordance with one embodiment.

FIG. 20 shows examples of setting, generation, and construction of recipes for operations between IOTs. As shown, a user can select various IOTs that will be needed for performing a task. This example shows the use of IOTs that are appliances, and these appliances can coordinate to accomplish a task, e.g., cooking an actual recipe. If the recipe is for cooking, the user can select a recipe or download a recipe. The user can associate steps for the IOTs to be used for the selected recipe. It should be understood that the term "recipe" is not tied to cooking, but more generically associated with performing tasks by one or more IOTs, and coordination. For example, the recipe can be associated with home automation tasks, coordination in tasks for home automation, recipes for commercial tasks or office tasks, or other tasks that coordinate timing, operation, and actions performed with IOTs for completing a recipe. FIG. 21 shows examples of various types of IOTs, and recipes can be coordinated, defined and adjusted for the types of IOTs assembled for a task.

In one embodiment, the task can be defined by a recipe of steps that should be performed by specific IOT's. The recipe of steps can be managed by the group of IOT's that communicate with each other in order to assist in completing a task. For example, the different IOT's can function as devices that must perform specific tasks before other devices complete their tasks. In some embodiments, these task can include tasks they're interface with users. The users can be humans that are required to perform specific tasks utilizing one or more IOT's. The users can be self-guided or DLC-guided robots where the robot itself becomes a hybrid user navigating the DLC appliances but also providing telemetry and sensor data as well as optionally compute and memory resources back into the DLC cluster. The users may be a hybrid of humans and robots, or hybrid of humans and factory equipment working together. The IOT's can be, for example, an appliance.

The task can be for example, to complete a recipe utilizing one or more appliances. The IOT's can communicate with each other to determine whether the user has completed specific tasks utilizing those appliances in the specific order, and IOT's can anticipate when the next IOT needs to operate or begin operation to assist the user in completing the task. If the user goes off task, or forgets to complete an order task, the IOT's having communication with each other can reassemble the recipe so as to provide alternate path for completing the task. For instance, if the recipe requires the user to utilize the oven for 15 min, but the user instead utilizes the microwave for 3 min., the task can rearrange itself so that the next operation to be functioned or completed by another IOT is ready for the user ahead of time, given the users divergence from the ordered recipe.

In one embodiment, the different IOT's, having communication logic provided by DLC 320, can communicate with each other so that an order task, a recipe, or in operation can be performed to completion, even when human operators change the variable inputs, the tasks, or failed to perform specific operations or task of a recipe. In general, the IOT's are able to communicate with each other and can react to the order in which operations are performed, and if changes or divergence from specific predefined tasks occur, the IOT's can reassemble and generate a new path for completing the task.

Thus, devices around the user, a person, or other computer can react to the choices made by the user, and provide more efficient utilization of IOT's. This example has been provided with reference to home appliances, but may also be applicable to any IOT device in any setting, including commercial settings. For example, in commercial settings operations are sometimes ordered, to complete a task. If the worker fails to complete one of the order tasks, the IOT devices in the commercial setting can be rearranged or reset in order to assist the human operators to complete the job, even though a specific task has been performed out of order, or completed in a different fashion that was originally determined by a recipe.

In one embodiment, in a smart kitchen example, one or more devices coordinate to intelligently guide a user to efficiently produce a meal. For example, a user selects a recipe for Chicken Cordon Bleu. The recipe asks the user to boil two cups of water. In one embodiment, once the recipe is presented to the DLC cluster of kitchen appliances, a DLC-enabled faucet provides automatic dispensing of exactly two cups of water; the DLC device is prepared to quickly respond to adapt itself to assist in the user's goal to complete the recipe. In the next step, the user needs to boil the water. In this case, multiple ready devices can be used to complete the task: the microwave and range top.

The DLC-enabled microwave and the DLC-enabled range top both are both ready devices as each present a distinct path leading to the completion of the recipe. Both devices are aware of the next step in the recipe and both devices made aware of the current progress in connection with completed events that have occurred towards the goal of achieving completion of the recipe. In this example, upon dispensing the two cups of water, a DLC message is received by other devices to track the activity. The faucet may communicate the message or another device using any of the sensory capabilities described herein may detect the water was dispensed and reports the message. In one embodiment, a user interfaces with a device to indicate completion of a task/step in a recipe.

In one embodiment, once DLC becomes aware that all pre-requisite steps in a recipe have been completed along a path leading to a device or appliance in a next step of a recipe, DLC can associate the device as one that is assist-ready. In one embodiment, assist-ready devices enter a mode responsive to the next step in the recipe. Being "responsive" to a next step in the recipe may take on several inventive forms. For example, in one embodiment any device may simply provide an auditory or visual or audiovisual feedback to the user to prompt or guide the user.

In one embodiment, the DLC device that met the pre-requisite criteria and is available to perform a next step can alert the user toward them. Such guidance may be similar to GPS, actually or metaphorically prompting the user and in many cases with specifics for the current recipe i.e., "boil the two cups of water here" alert is provided by both the range top and the microwave. Then a user makes a choice in completing the next step, he chooses to put the two cups water in the microwave. DLC recognizes that that a specific path was selected using microwave is selected as the current task.

Now, prior to the selection, both pathways involving the range top and the microwave lead to completion of the recipe. In one embodiment, after a selection is made to pursue one path over another path, the DLC device in the unchosen path, that was previously prepped as being responsive to the next task, no longer operates in a mode responsive to that task. Again, being "responsive" to a next step in the recipe may take on several inventive forms. For example, in one embodiment the assist-ready devices at the current location in a traversal of a recipe may self-configure for the next step in the recipe.

In the previous example, the microwave may have received programming or may have performed local computation to adapt the step in the recipe to adjust the time and power or other settings require reaching boiling of two cups of water. In one embodiment, a DLC device operates in user-assisted auto-pilot mode, where some or all of its settings self-configure and auto start and with or without prompting. In one embodiment of the current example, a user does not need to select time or power level, just move the water into the DLC-enabled microwave and upon detecting that the microwave door was closed, the microwave automatically starts and cooks for the amount of time required to complete the task.

Again, being "responsive" to a next step in the recipe may take on several inventive forms. For example, in one embodiment, already devices in the path of a recipe and particularly ones positioned at the next step in a recipe, are set in a state of enhanced monitoring. Such DLC devices enter a mode where payload messages generated in connection with the device have elevated influence to future and immediate successor tasks or steps in the recipe. For example, in the current example, before the user selected the microwave over the range top to boil the water, upon opening the microwave door, a DLC can interpret that as an indication that the user selected the microwave path in the traversal of paths leading to complete the recipe.

In one embodiment, DLC messages relating to a ready device in the next step of direct path of a recipe are monitored to identify if the user is advancing forward along a path with that device. In one embodiment, other confirmations are made to confirm that the user seeks to choose a specific path and is not seeking to inadvertently use the device for some other purpose. Thus, the ability to rule out false positives and prevent "smart" devices from drifting off path in their effort to provide assistance without misunderstanding, can be aided through use of tracking confirmations.

In the current and not be limiting example, upon opening the microwave door, the DLC may poll for an indication that the user is manipulating the microwave in connection with the next step in the path. In one embodiment of the current example, the microwave performs tracking confirmation that the microwave is not being used for another unrelated purpose. In another embodiment, a user pushes tracking confirmation to DLC to associate the user activity with intent to follow a setup of a recipe.

A device may operate "in recipe" or in freeform operation, or a mixture of both. In one embodiment, a DLC device makes an intelligent determination of when to provide assistance, so that multiple users can engage in different tasks, different recipes (simultaneously in one kitchen/factory/brewery/office/hospital/etc.), whether such tasks are for the current recipe or another recipe or not related to any recipe. The intelligent determination may be based on tracking confirmations to confirm paths and rule out false positive assumptions about device use. In one embodiment, DLC operates to ensure that device coordination does not drive devices to be too locked and over guided by any one recipe.

For example, in one embodiment, at least one ready-assist appliance engages tracking confirmation from the user upon detection of interaction with the device, that the user is seeking use of the device in connection the current recipe associated with the user, such that the device may deliver assist for that user, for the user's selected recipe. In one embodiment, at least one appliance uses a proximity-based sensor for tracking confirmation to detect the presence of the user. In another embodiment, the proximity-based sensor is a wearable device that detects a specific placement of a hand or body part relative to a DLC device. In another embodiment, tracking confirmation is based on tracking the absence or presence of an object at a location.

In another embodiment tracking confirmation is based on NFC signal. In another embodiment tracking confirmation is based on an optical signal. In one embodiment, at least one appliance detects a condition of the user to determine they are seeking use of the device in connection the current recipe. In one embodiment, at least one appliance detects a condition of another DLC device to either directly determine, or to formulate an indication that user is likely to be, seeking use of the device in connection the current recipe. In one embodiment at least one member in a DLC cluster confirms that a user is seeking use of a DLC device in connection the current recipe.

In the current example, the faucet may engage in a tracking confirmation that the user is actually seeking the two cups of water, not some arbitrary use of water for some other purpose. In some cases, tracking confirmations are based on a gesture or a voice command that is recognized. In some embodiments, any DLC device may process and respond to recognize a tracking confirmation for itself or for another device.

In one embodiment, a user may choose to change in the amount of one ingredient over or under the amount called for the recipe and the DLC can perform the computations to scale the ingredients and process to the new quantity.

In one embodiment, a user may choose to change in the amount of one ingredient over or under the amount called for at any point in the steps in processing the recipe and the DLC can perform the computations to scale the ingredients and process to the new quantity, and reorder and provide additional programming of DLC to perform to make the necessary adjustments.

In one embodiment, a first user is working to complete a recipe with one or more devices and a DLC provides guidance to the user, helping them to achieve the goal of completing the recipe. The first user operates in a shared environment with a second user who is also using devices. In one embodiment the second user is not associated as a participate helping to complete the recipe, or is associated with another recipe for the designated area (kitchen). The availability of paths enabled for the first user is restricted as a result of the second user blocking of resources in the environment, where in the non-limiting kitchen scenario, in one embodiment, if the second user was already using the microwave, only the range top device would be an available path guiding the user after the two cups of water was poured.

Usage priority and device lockout may be set through DLC. In one embodiment, a first user is working to complete a recipe with one or more devices and a DLC provides guidance to the user but also locks devices from other users to ensure that the DLC environment, in this case a kitchen, has a profile set with high priority to the first user's recipe. Other user's actions in the kitchen are blocked. In one embodiment, the blocking may be overridden on a device basis. In one embodiment, the blocking may be overridden on a task basis. In one embodiment, the blocking may be overridden on a device and task basis. In one embodiment, the blocking may be overridden using tracking confirmation.

In one embodiment, depending on how the recipe is crafted, or whether a device is shared with another user or recipe, it may be useful for a device to prepare for a future step in a graph of a recipe even when the current task in the graph is multiple hops away from a task in a path that requires use of the device. For example, it may take an oven 15 minutes to preheat, so DLC can recognize and adjust timing and order of the recipe graph to accommodate performance of the oven.

In connection with kitchen appliance automation, another novel invention is provided for delivering precise volumes of additives from containers. For example, an IOT container or container top is provide with a capability to automatically dispense a micro-volume of its contents. In one embodiment, a spice container has a screen mesh selected for the dimension of size of crush of spice contained inside the container. When operating a recipe, the spice container is programmed to receive the amount of volume of spice necessary for any step in the recipe. To deliver the spice, a user tips the spice container upside down.

An gyroscope or accelerometer may be used to detect the orientation change. In one embodiment, upon tilting past a threshold angle, voltage is applied to automatically engage a haptic vibration. Any means for vibration may be used but a motor with an eccentric mass or linear actuator is preferred. It is known that a linear relationship can established between the volume of spice released through a mesh upon subject to the haptic force. Therefore, a timer corresponding to the volume required for the recipe is used to gauge how long to apply the haptic force is applied so delivery of the proper volume called for the in the current recipe is delivered.

In one embodiment, when the time associate with the volume elapses, the voltage to the haptic actuation is terminated, causing the vibration to stop, upon which a user may turn the spice container right-side-up, ensuring that no spice can flow through the mesh. In one embodiment, haptic profiles can be established for different mesh sizes and volumes, where more or less amplitude or wave shape amplitude curve may be used to deliver accurate dispensing volumes. In one embodiment, autonomous spice containers each include a battery on the base and all spices sit in a spice rack having an inductive charging bottom.

In one embodiment, the spice containers each contain the WCC capability to enable DLC coordination in a recipe. In one embodiment, the orientation sensor is a simple mechanical alternative to gyro or accelerometer and uses a rolling ball in a contact bladder to recognize when tilted beyond a threshold. In another embodiment no orientation sensor is used but a start button is provided to initiate the haptic action, and after the period of time tolls relating to the volume that was communicated to the container via DLC, the haptic actuator stops. In one embodiment the spice container operates in assist-ready mode for a recipe. In one embodiment, a lookup table associating volume to actuation time is used as a driver to define how long to run the vibration. In another embodiment, different mesh sizes are used in different containers. In another embodiment, the containers have QR codes associated with them for registering the containers in connection with the DLC operating environment.

Another novel kitchen DLC-enabled technology includes a similar concept may be applied to volume of liquids for oils, milks, water, etc. In one embodiment, a common container with a flow tracking top and WCC capability is filled with a volume of liquid used in common recipe. When a recipe calls for the use of the liquid in the preparation of the item, the IOT WCC container recognizes the volume needed for any step in the recipe. The flow of liquid passes through a restricted channel with an active flow control.

Similar to the above, the container may include an orientation sensor to determine the tilt angle and upon tilting the container past a threshold, the flow control may open flow of liquid through the channel outside of the container. To dispense the desired amount of liquid according to the recipe, a relationship lookup table provides a translation for each liquid type and based on chamber material and dimensions, such that the proper amount of time is used to flow the volume of liquid necessary for any step in the recipe. In one embodiment, a rechargeable battery is provided on the base of the container and the container is shelved on an inductive recharge plate.

In cases including but limited to signaling systems, network synchronization, service synchronization, moving objects, tracking, control, or any of the wide array of situations including where precise timing of services, events and synchronization are important, the DLC can coordinate and achieve synchronous or near-synchronous events to occur across multiple services or devices.

Of particular need is to be able to trigger an operation at a precise time in the future. In one embodiment, the time period in which to trigger the operation is based on ad-hoc timing data. In one embodiment, the ad-hoc timing data may be part of either of two dependent events that require to be synchronized. In another embodiment, the operation that is triggered is subject to a startup delay that is either fixed or itself ad-hoc. In one embodiment, a device or service is monitored over a period of time to generate a forecasted future time in which the device, service or function will achieve a certain future state. In one embodiment the forecasted future time generated by or shared with DLC.

In another embodiment, there is a lag-time associated with starting up a device, service or function that provides the operation whose timing requires precise control, and the device, service or function is triggered to start up in advance, at a time before the first device, service or function reaches the forecast state, and in consideration to the lag time, to align the timing to ensure that the intended synchronized operation has started up precisely or substantially at the time when the first device, service or function reaches its forecast state in which synchronization is intended. In one embodiment, the second device, service or function has passed through the lag phase and reached its startup condition at substantially the same time as when the first device, service or function, but the second was started at a time offset according to DLC.

In one embodiment, the startup lag time of the second device, service or function is arbitrary or may fluctuate but is monitored over a period of time to predict a duration of lag time. In one embodiment, the startup lag time is estimated by DLC according to historical lag time or through sampling of the device or startup function, service or a similar device or service in a common zone or region (Amazon EC2 instance, Lambda function). Such sampling may occur at any time or just prior on a similar modelled device, service or process to determine lag time.

FIG. 21 illustrates an example of a management interface, which can access one or more networks for which a user account is provided with credentials, or the user account can input credentials to interface with specific networks. In this example, the user is accessing a business private network 2.1. By way of example, the user may wish to discover the types of IOT's that may be connected to the business private network. In some configurations, the number of IOT's that may be accessing a particular network may be very large. In some commercial environments, the number of IOT's and their specific function can vary significantly, and can amount to tens or hundreds or even thousands of IOT's.

These different IOT's can have different functionalities, such as simple sensors, controllers, light switches, door activation switches, WCC devices, motion sensors, cameras, road sensors, equipment utilization sensors, etc. Furthermore, the types of IOT's can vary significantly depending on the industry or their utilization. The example list provided is not exhaustive of the types of IOT's that can be found in different environments, and which may be connected to different networks. In this example business private network, the user has requested to find the number of IOT's in a specific location or locations. Due to the high number of possible IOT's, the system can identify IOT's and automatically categorize them in terms of industry or use. In this specific example, the request to find IOT's has uncovered 3 smart building IOT's and 12 utility IOT's.

If the user wishes to see the actual functionality or the type of IOT's for the found IOT's, the user can select by touching the identified found IOT's. This would bring up additional information for each one of the IOT's and provide the user with the ability to attempt to access the specific IOT configurations. In one embodiment, if the user has permissions to access the network, permissions can be provided for accessing the IOT's that are found. In other embodiments, some IOT's have their own privileges, which may require authentication or verification of the user that's requesting access to the specific IOT's.

In still other embodiments, some IOT's may not be shown due to security concerns for their type or use. In still other embodiments, some IOT's can be accessed or made part of DLC groups, depending on their availability, their programming for sharing resources, or their availability to communicate signaling information between them. As mentioned earlier, it is possible to have IOT's that are not registered or are not capable of automatically executing DLC functionality. In one embodiment, those IOT's can be made DLC enabled by requesting that they update their firmware, update their operating system, or are provided with an image of a DLC logic which can be run on the DLC's while the IOT's are part of a DLC group, or can be made to function with a lightweight DLC code or link to a device that can run DLC logic for enabling their formation or addition to a DLC group.

Figure 22A:
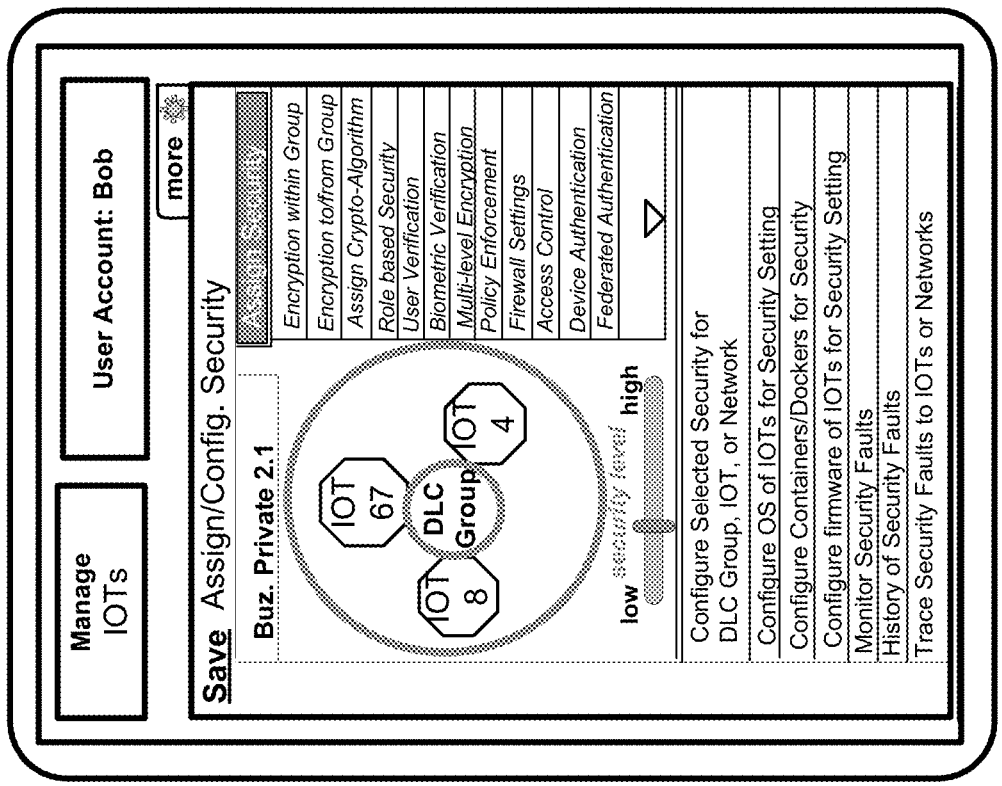
FIG. 22A illustrates a graphical user interface for managing IOT's, forming IOT groups, and assigning or configuring security for such IOT's, in accordance with one embodiment.

FIG. 22A illustrates a graphical user interface for managing IOT's, forming IOT groups, and assigning or configuring security for such IOT's. This system provides a dynamic method for identifying IOT's that may be connected to a network. As shown, business private network 2.1 has an example set of IOT's that have been formed as part of a DLC group. This DLC group may have been formed for the purposes of executing a function that requires a specific security level. Based on the security level, the IOT's that are part of the DLC group will assign or changed their security process to match the DLC group security requirements for carrying out the task.

Therefore, even if IOT's that are assigned to a DLC group are initially operating with a different security level among themselves, the security level for all of the IOT's in the group can be synchronized so that the function that's carried out utilizing the DLC group can exercise a unified security level. In one embodiment, the user can assign their print types of security. The security can be assigned to DLC groups, and in this example business private network 2.1 is the DLC group that the user wishes to configure. The user can configure other networks or other DLC groups within the same network utilizing other graphical user interface settings provided by the management UI.

Continuing with this example, the user can select different types of security methods for achieving a security level. Broadly speaking, the security level can be selected very simply, by asking a user if they want low security or high-security, or something in between. If the user is more sophisticated, the user can select different types of security algorithms or methods or protocols to achieve the level of custom security. For example, the user may select that there be encryption within the group during communication of data processed by the DLC group. In another embodiment, the user may select to require encryption when data is exchanged to or from a DLC group.

In still another embodiment, the user can assign a crypto algorithm for exchanging data between the IOT's of the DLC group or with other DLC groups or with devices that are outside of the DLC group which may be requesting data, requesting information that results from the DLC operation, or synchronizing communication between the IOT's for achieving a task. In still another embodiment, the security can be role-based security. The roles can preconfigure the IOT's that are part of a DLC group to change based on the function that's being performed by the DLC group. For example, if one function has a role that is not security sensitive, the security level may be low or not existent.

If the function switches to a role that is more security intensive, the security level can switch to a higher security level for performing that function or exchanging data related to that function among the IOT devices or with devices that communicate with the IOT devices. In another embodiment, biometric verification can be required to access DLC groups. Biometric verification or user verification can include having the user provide information regarding themselves, or an attribute of their bio makeup. In still other embodiments, more sensitive operations performed by IOT devices in a DLC group can require multilevel encryption, such as encryption that builds on top of encryption.

This higher level encryption can be required when DLC groups process sensitive information, such as secret government information, personal tax information, personal credentials, payment information, credit card information, digital fingerprints, electronic keys, and other types of digitally processed information. In some embodiments, policy enforcement may be utilized to select when specific levels of security will be applied to the communication between IOT's, or utilized when processing information on specific IOT's. For instance, if an IOT device is a low security device that is lending its processing power to a security function, a firewall is built or established between the normal functionality of the IOT device and the functionality being executed by the IOT when processing an DLC group information or tasks of that higher level of security.

In addition the firewalls, code segregation can also be set as a policy enforcement setting, which the DLC logic can implement, based on the task, or policy being enforced along with the processing of the sensitive data. Other access control methods can also be utilized for the DLC group, such as user names and passwords, passwords, codes, bio fingerprints, face scans, eye-retina scans, or combinations thereof. In still other embodiments, security settings can also enable device authentication requirements, such that devices that are members of DLC groups are required to authenticate themselves user periodically, at the establishment of a DLC group, or multiple times during the processing of a task.

In further embodiments, the user can select configure selected security for the DLC group, and IOT, or a network. Thus, the security setting can be granular to any specific device that is a member of a DLC group, or the infrastructure that enables communication to form the DLC group. In some embodiments, the user is able to request that the OS of the IOT be configured or upgraded for a security setting that is required for processing tasks consistent with the DLC group functionality. The same can be set for firmware of IOT's, such that their upgrade can be requested based on the required security level assigned to a DLC group.

In some embodiments, the containers and or Docker settings can be set or updated based on the desired security level for a DLC group. As mentioned above with respect to FIGS. 6A through 6I, various integration schemes can be provided for enabling DLC functionality to IOT devices. Anyone of those integration schemes can be augmented with security information or settings that can facilitate setting of security levels for specific DLC groups and their functionality. In one embodiment, the user interface can provide access to monitor security faults for created DLC groups or monitor or access the history of security faults for one or more DLC groups that may have been created over time. In one embodiment, for sensitive processing, security fault tracing can be enabled to identify which IOT devices or networks or devices were connected to define DLC groups when certain process operations or tasks were executed.

The tracing operation is a form of forensic analysis of the type of operations that were performed by specific IOT's during specific points of time, so as to enable accurate and granular examination of data processed, packaged exchange, flag settings, register data, memory information, exchanges of data, processing times, patterns for processing, etc. These tracing operations can also be utilized to execute predefined functions that can trace suspicious activity performed by DLC groups.

The suspicious activity can be the result of bugs or malware that could have been installed on a system, on a specific IOT, or on a DLC group. Continuously tracing or monitoring the suspicious activities, patterns, operations, can enable automatic disablement of DLC group functionality, setting of alerts, notifications, and the like.

FIG. 22B illustrates an example flowchart operation for assigned security levels for DLC groups, in accordance with one embodiment. In operation 2210, a request is made for IOT's from a network to establish a DLC group to process a task. This request can include, for example, request packets or data signaled to specific IOT's requesting that they join a DLC group, such as in response to a user wishing to form a DLC group, or simply because an IOT is connected to a network. In operation 2212, the IOT's that are available to join a DLC group are identified. The IOT's can be identified on the user interface, such as shown in FIG. 17.

In another embodiment, the IOT's can be provided in a list or text format that identifies the IOT's. In another embodiment, one of the IOT's can make the request and the identification of the IOT's can be sent back to the IOT in the form of data. In operation 2214, a security level for the task is identified. The identification of the security level can be set by a user, or can be set based on the task to be executed. In operation 2216, the IOT's capable of operating under the identified security level can be filtered. For instance, only those IOT's that are capable of executing the desired security level for processing the task will be shown or listed as available by the filtering. As mentioned earlier, the number of IOT's that can be identified can be many tens, hundreds, or thousands, depending upon the network or networks that are accessible.

Therefore, filtering provides a method for automatically reducing the number of IOT's that would have to be accessed to determine their availability for processing specific security level tasks. In operation 2218, a DLC group is assembled from the available IOT's that meet the security level for processing the task.

FIG. 22C illustrates an example of another operation that can be executed to assemble DLC groups with specific security levels. Operations 2010 through 2014 are repeated, as noted above. Operation 2012 includes instructing IOT's to switch to the identified security level for processing the task. The switching instruction can be a command that ask or instruct the device to switch from one level of security to another level of security, while executing the task for the DLC group. As mentioned above, the security level executed by the IOT can be for the function of the DLC logic, and the security level can be distinct from the security level executed for the function native to the IOT. In operation 2222, the DLC group is assembled utilizing the identified security level.

FIG. 22D illustrates an example of a flowchart for setting a security level for a DLC group for processing a function, in accordance with one embodiment. In operation 2224, IOT's are identified from a set of available IOT's to process a task. In one embodiment, the IOT's can be selected from a list, from a text document, from codes, from custom names, from a graphical user interface, from a range of addresses, from specific networks, etc. In operation 2226, a group of IOT's are assembled from the available IOT's to define a DLC group.

In operation 2228, a security level is defined for the task. In operation 2230, the security level is communicated to each one of the IOT's such that the security level is applied before processing data or exchanging data for the task. In operation 2232, the task is processed using the security level assigned for the task. As mentioned above, the security level can be assigned on a per task basis, per DLC group basis, during a peer to time, based on the security level for the data being exchanged, based on the user profile, based on data in the user account, or dynamically set by the system.

FIG. 22E illustrates an example of setting a security level for processing the task, in accordance with another embodiment. In operation 2234, connections between IOT's are identified. As mentioned earlier, connections between different IOT's can have different links, different strengths, different quality of service, and different attributes. These connections can then individually be examined to see which can support specific security levels for processing data. In operation 2236, a security level is selected for processing a task. In operation 2238, the IOT's for the different connections can be queried to identify their available security levels that are settable by the IOT's, e.g. while processing tasks.

For instance, some IOT's are not able to execute certain security levels while others are. For this reason, query data can be sent to the IOT's of the different connections to identify their capabilities for processing certain security operations, such as those described with reference to FIG. 22A. In operation 2240, one of the connections is selected between the IOT's that is capable of processing in accordance with the security level. The IOT's that are selected for the connection will define a DLC group, which will then process the task. In some embodiments, more than one connection can be utilized for processing a task, and certain nodes or in between nodes can be utilized to blend, combined data, or reassemble data that is obtained from multiple connections. In operation 2242, the task is processed utilizing the security level.

Figure 23:
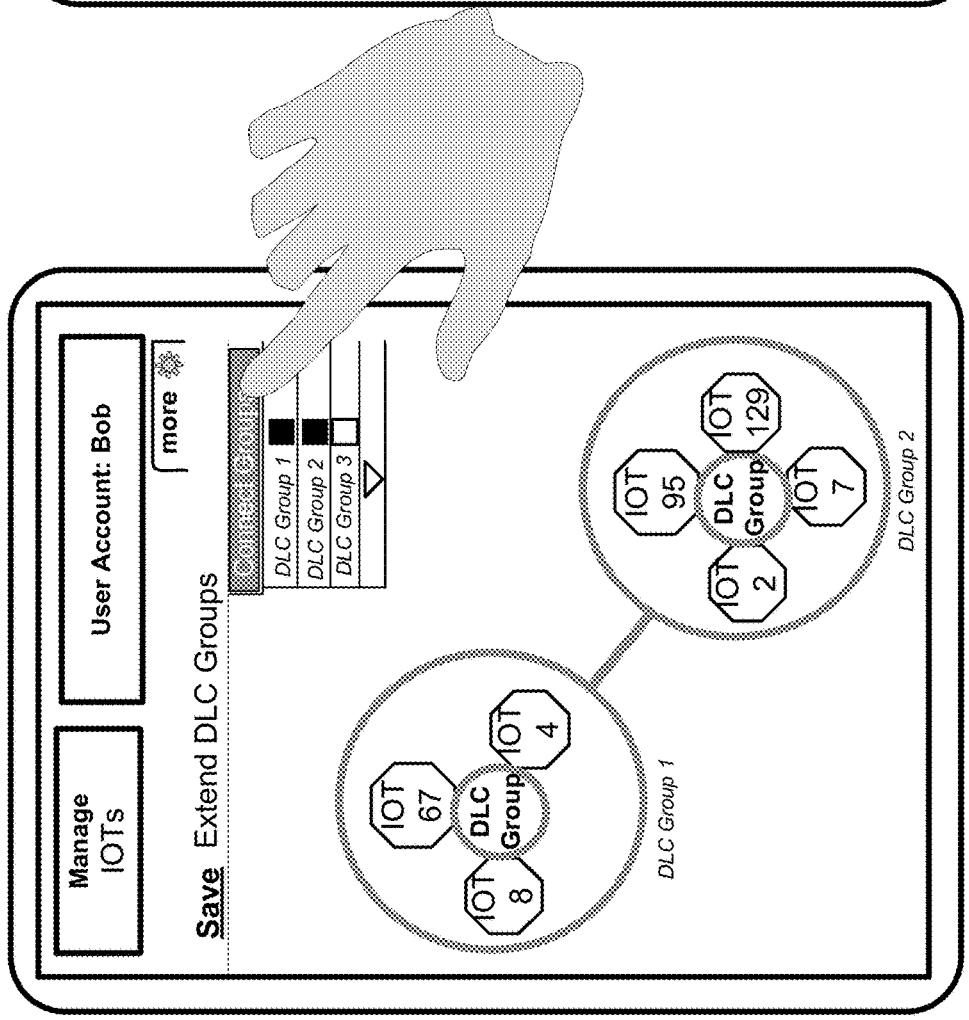
FIG. 23 illustrates an example of being able to extend DLC groups, which can be made by connecting two or more existing DLC groups, in accordance with one embodiment.

FIG. 23 illustrates an example of being able to extend DLC groups, which can be made by connecting two or more existing DLC groups. As shown, the user can select to extend DLC groups so that the functionality executed by one DLC group can share either the results of a function or work together with another DLC group to accomplish the functionality of an overall task. By way of example, the user can select a user interface to select available DLC groups that can be connected. Discovery of available DLC groups can be facilitated by accessing the DLC groups that are part of one or more networks. As mentioned above, information regarding the DLC groups, IOT's, and functionality associated with previously created groups can be accessed from configuration data.

The configuration data can be accessed locally if the user is connected to the local network, or can be accessed from a cloud database which is updated with DLC group information. Depending on whether the data is current, e.g. using timestamps, the information can be determined to be accurate regarding the availability or creation or existence of the DLC group and IOT's that are part of the DLC group. This information can be populated to illustrate on a graphical user interface to groups that can be selected. In this illustration, groups 1, 2 and 3 are shown as available groups, and the user has selected to connect and expand group 1 and group 2 only. In one embodiment, the graphical user interface can show the connections or connection between the DLC groups. This illustration has shown the connection between DLC group 1 and DLC group to. If other previously assigned DLC group connections have been formed, the user can also identify those to view their connections, functions performed, historical data, performance, quality of service, or security. These are only some examples performance or metrics data that can be accessed regarding functionality performed by DLC groups either currently or over time.

Figure 24:
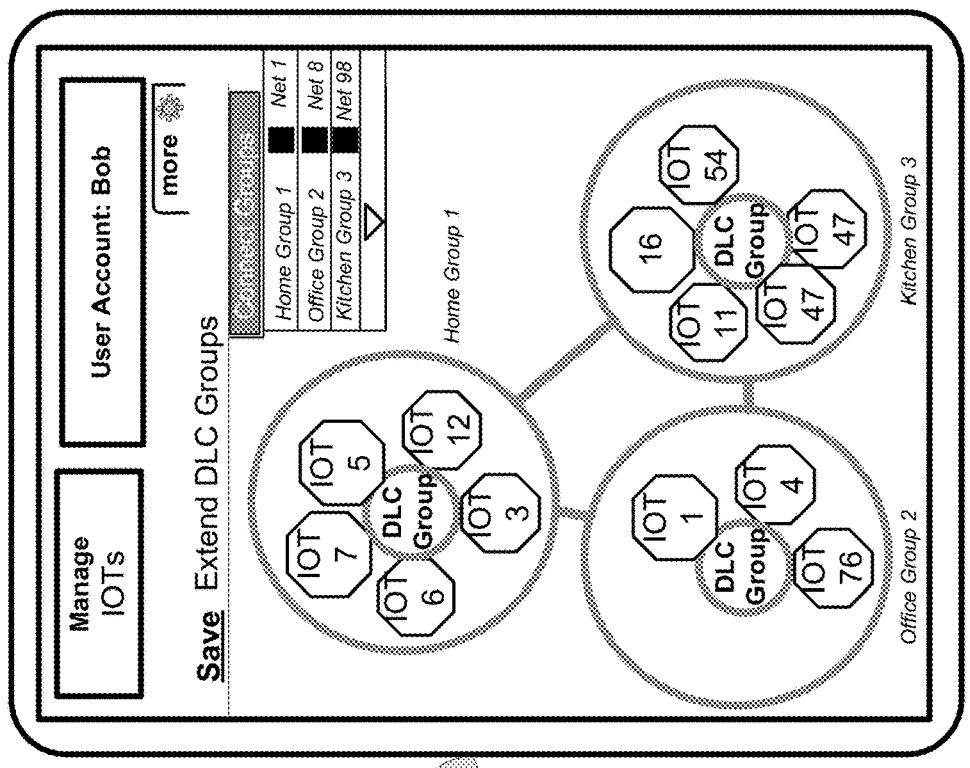
FIG. 24 illustrates an example of the interconnection of 3 DLC groups, which have been customized by a user with specific names, in accordance with one embodiment.

FIG. 24 illustrates an example of the interconnection of 3 DLC groups, which have been customized by a user with specific names. Additionally, this example shows that the DLC groups can be part of different networks, which can be local networks to each other or remote networks. For instance, the home group 1 and the kitchen group 3 maybe part of the same local area, but not part of the same network. For instance, separate networks may be provided or utilized in the same home. The office group 2, is an example of another network, which may not be part of the other networks but the DLC groups are allowed to be extended and interact to exchange data, processed data, notify nodes from different networks, share information, make determinations based on logical recipes, import data from remote networks, and the like.

This distributed processing allows for IOT's from different networks to communicate with each other, in order to perform a specific task, function, or ongoing monitoring and data record-keeping. In one embodiment, security levels can be assigned to the specific DLC groups, or can be assigned to extend the DLC groups or clusters of DLC groups. As mentioned above, the security level can change based on the functions being performed by specific DLC groups, modifications to the functions performed by DLC groups, or changes in the types of I/O tease that form part of the DLC groups.

Figure 25:
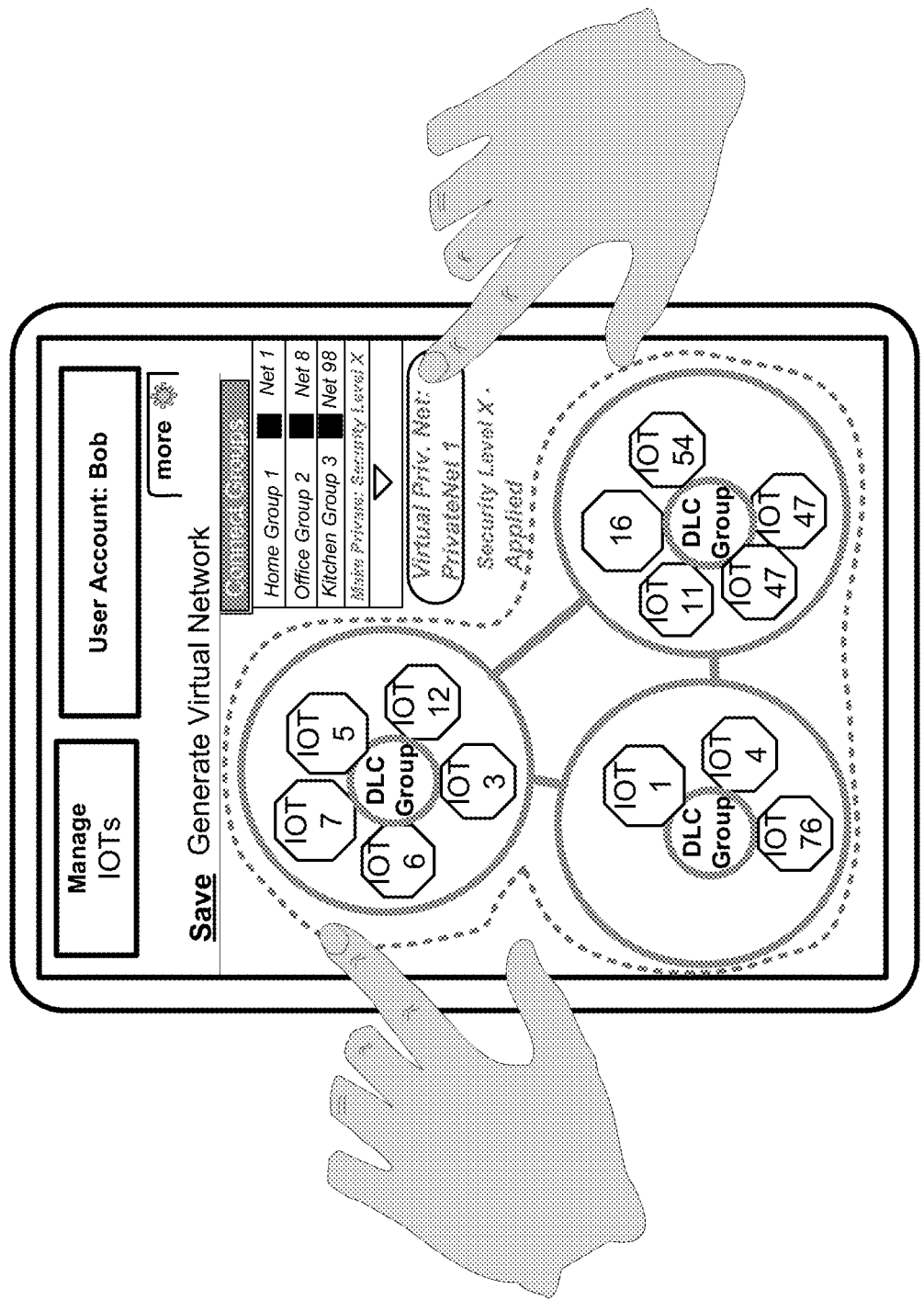
FIG. 25 illustrates an example where multiple DLC groups have been selected for extending, in accordance with one embodiment.

FIG. 25 illustrates an example where multiple DLC groups have been selected for extending. For example, three DLC groups are selected, and the user wishes to communicate data or process data of a given security level. In one embodiment, the connected DLC groups can be associated to a virtual private network (VPN), that enables connection to that group securely, even when the DLC groups may be remote from each other or on separate networks themselves, e.g., as shown. In this example, it is also possible to associate or apply a security level for the task or operations of the connected DLC groups. Further shown is the ability to outline by hand the DLC groups that will be associated to a VPN, and as such, will operate under the set or user assigned security setting. Thus, even though IOT devices may not be operating in a secure mode for their native IOT process, when the IOTs are associated with a group that requires a security level, the security will either be enabled on the IOTs or the DLC logic may apply the security as a layer, e.g., in the communication layer.

In one embodiment, a hand squeeze WCC device or part of the device may enable harvesting energy of the squeeze action to register a trigger count in the cloud for a user. In another application, a WCC device may be incorporated into a traditional exercise device. The WCC device can harvest energy from the mechanical force that occurs upon manipulating or squeezing the hand exerciser. The WCC device may report at each instance or collect and batch send data count or indication of squeeze activity to a receiving server. In one configuration, the amount of pressure applied to the hand squeezer is detected and transmitted for logging or other participation in a program monitoring or training on such activity.

In still another example, the WCC device may be exercise band that harvest energy from extension of tensile bands to trigger count and amount of extension in cloud for user. A strain sensor in the form of a stretchable band may be coupled to a WCC device for tracking exercise or any application involving need to track the amount of stretch being applied to the sensor. In one example, a series of rubber bands are encased in a facia to form a large rubber and at least one of the bands includes a sensor is made from a strain gauge whose resistance changes with the amount of stretch applied to the band. In embodiment, or more bands consist of infused liquid-exfoliated graphene into natural rubber to create.

In still another embodiment, the material strain sensor may be woven into stretchable resistant exercise fabrics that couple to a WCC device programmed to read the resistance level and signal the data to a desired end node. Exercise activity may be viewed in real time or later on cell phone, home computer, etc. In still another example, a WCC cookware harvests heat to power sensors that records temperature or other stats about cooking event in cloud for user and may include optional spectrometer to detect contents of food over time. A shipping container with cellular WCC device can be used to track temperature, location and internal forces that the container receives in real-time using tamperproof reporting scheme. A WCC filter with integrated WCC calculates flow and reports when new filter needed.

In one example, a filter has a WCC device with a flow meter for tracking flow volume of fluid passing through the filter. The filter may be ordered from an online marketplace capable of pre-registering the filter to the household, such that upon natural use of the filter, the filter reports notification upon reaching near end of filter life, prompting a notification or automatic ordering of a new filter to the household. Preregistration may include pre-setting the WCC with the appropriate access credentials for the particular household. A WCC enabled drinking glass may use thermal difference between hand grip and inside wall to detect drink type and volume with calculations and cloud reporting. In one embodiment, this may include fingerprint sensor to also detect who is consuming it.

In one embodiment, WCC device functions as a digital EAR detects predetermined sounds. After detecting sound, the device may filter or add an event to a notification stream. A WCC may be configured to pass an audio stream to a remote location. The audio may locally characterized and metadata representing the characterization, a thinner data transmission stream, may be sent to show the characterization over time. The characterization may include detected events such as a phone ring, alarm signals, baby crying, doorbell, etc. The detected events may be counted and a threshold set with a notification resulting upon passing the threshold. The threshold may also be amplitude based. In one embodiment, the threshold is frequency based, and yet in another embodiments the frequency is passed only in a specific bandpass region of the audio spectrum.

In one embodiment, a WCC device can be used for fermentation activity tracking. By way of example, a WCC may be coupled to a circuit capable of detecting fermentation CO2 emission and optionally temperature over time, with reporting to a desired end node 130 such as a service for enabling easy access, monitoring and optionally control of the fermentation temperature over time.

In one configuration, a microphone is positioned near the termination of an airlock. For example, the airlock is configured to receive a bubble of CO2, the CO2 bubble flowing through preferably a sanitized solution to vent to ambient air or an exhaust.

The microphone receives the sound of the bubble as it flows and releases, creating an audio signature. In one embodiment, the audio signature is processed, for example, by a sound module that may be tuned to respond to a threshold in proximate range to the amplitude or optionally, alternatively or additively one that discriminates to only allow bandpass filter to limit processing to the desired sound, reducing background interference. In one embodiment, an inertial sensor is coupled to the output of the airlock and vibration activity is detected and logged to derive a correlation to fermentation CO2 output. In one embodiment, fermentation temperature is also logged with CO2 activity, over time. In another embodiment, an optical gate with photo emitter and detector is coupled to an airlock or CO2 emission hose such that a bubble in the airlock passes through to interrupt the gate, casing the gate to report the bubble. In another embodiment, a sound detector and an optical gate are used together to better track accuracy in fermentation activity.

ADD

Figure 26A:
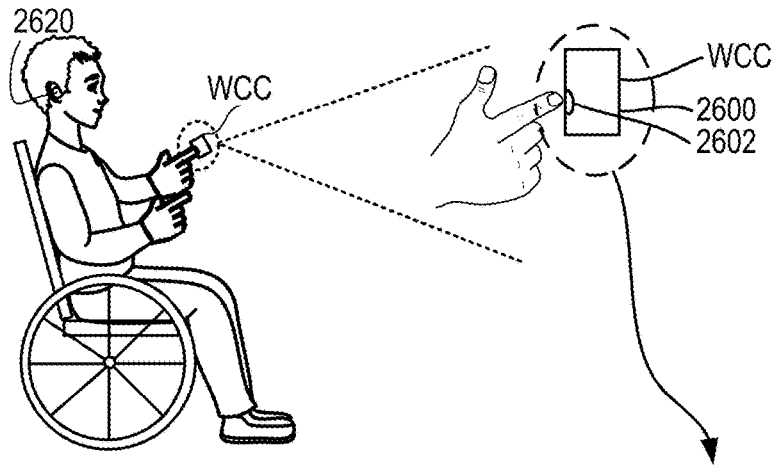
FIGS. 26A-26C illustrate examples of a WCC device which can be configured for use by persons with disabilities, in accordance with some embodiments.

FIG. 26A illustrates an example of a WCC device 2600 which can be configured for use by persons with disabilities. These uses can be, for example, by implementing WCC devices 2600 directly onto equipment used by such persons, such as the illustrated wheelchair. Other uses can include uses by those with illnesses or injuries. Hospital rooms and/or beds, hospital bathrooms, intensive care units, ambulances, etc., can also find uses for such devices. In one some embodiments, a WCC device 2600 can be configured to interface with a hearing aid 2620. The person needing assistance may, for example, press a button to ask for help, and a response by a nurse can speak directly to the person by sending audio, a message ID, a message, or coded sounds to the person's hearing aid.

Figure 26B:
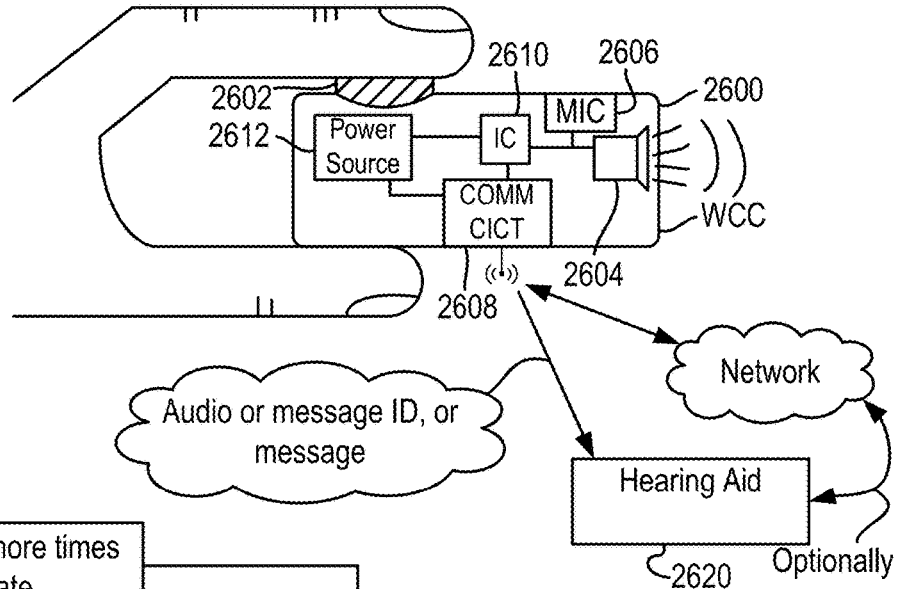

The user, to respond, can press the button and send a reply. The WCC device 2600 is therefore able to function as a communication device, which is pre-programmed to communicate with specific people, e.g., care personnel or the like. A benefit of a WCC device 2600 is that it can communicate with an end node without requiring a battery, which be depleted, leaving the person without help. In one configuration, the mechanical press by the user's finger is used to generate power that is harvested for use as a power source 2612, as shown in FIG. 26B. In other embodiments, other power sources may be used, not limited to mechanically harvested power.

The WCC device 2600 is shown to include an integrated circuit (IC) 2610 that is programmed with the instructions for enabling communication and exchange of data. The programming can also include, for example, the pairing data for enabling the WCC device 2600 to communicate with a specific end node, which can relay or process data for generating a response. A microphone 2606 and a speaker 2604 may also be provided, which is interfaced with the IC 2610. A communication circuit 2608 is provided, in one embodiment, to enable wireless communication with a network, for accessing a device/end node that can process information and return information for display or audio response to the user.

In an alternative embodiment, the WCC device 2600 may be configured with RF harvesting logic and circuits, instead of a mechanical energy harvester. The RF harvesting logic and circuits can, for example, harvest RF energy from one or more local devices to provided power for the power source 2612. Example RF harvesting logic and circuitry may be found in a paper entitled Wi-Fi RF Energy Harvesting for Battery-Free Wearable Radio Platforms, by Vamsi Talla et al., 2015, and a paper entitled Powering the Next Billion Devices with Wi-Fi, by Vamsi Tella, et al., 2015, which are herein incorporated by reference. Other implementations of the communications circuit 2608 is to implement Wi-Fi Backscatter, which uses RF signals as power sources and reuses existing Wi-Fi infrastructure to provide internet connectivity to battery-less devices.

An example of Wi-Fi backscatter is described in a paper entitled Ambient Backscatter: Wireless Communication Out of Thin Air, by Vincent Liu, et al., 2013, which is herein incorporated by reference. It should therefore be understood that embodiments and implementations described herein that use mechanical input to harvest power, e.g., power pumps, may be replaced with devices that use batteries, are hard wired to power, or receive power of the air using any number of RF harvesting configurations.

Figure 26C:
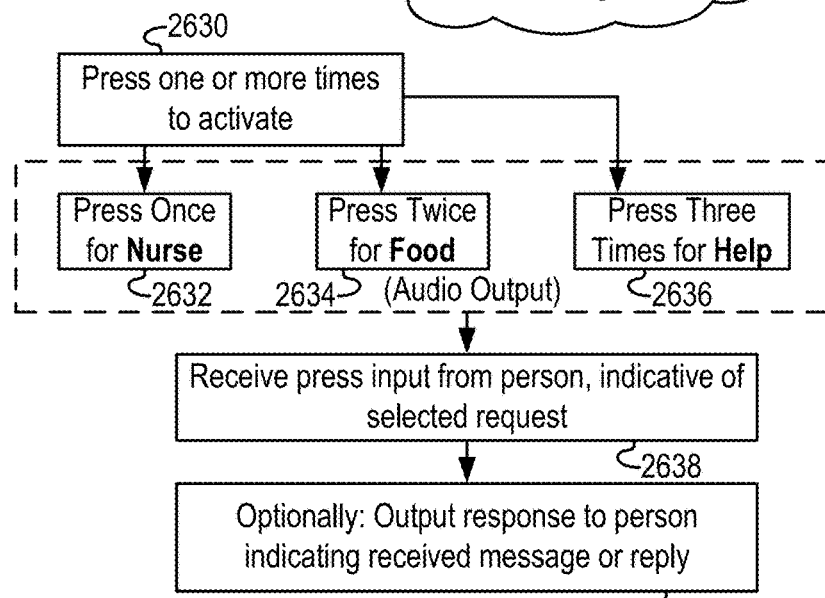

FIG. 26C illustrates an example implementation of a WCC device 2600 that can be programmed to send requests, receive data and/or process communication data based on a number of presses provided. In this example, the WCC device 2600 is one that is simply has one button, but other devices can have other interfaces, such as spinning dials, levers, plungers, display screens, finger print readers, etc. With this understanding, the one button configuration is able to be activated, e.g., from a sleep mode, by pressing the button one or more times in operation 2630.

After activation, the WCC device 2600 can provide a message via a screen or a speaker, providing options. In the example of a person who might be in a hospital or care home, the options can be, e.g., press once to call for a nurse 2632, press twice to request food 2634, press three times to get help 2636. If the WCC device 2600 provides audio output for interfacing with the user, the audio may also be communicated to the user's hearing aid 2620, as noted above.

In another embodiment, if the user watching TV, the TV can be an end node that can display text/audio or information to the user in response to the button press(es). The response can be provided, for example, via the speaker of the TV that the user is watching. The TV may mute, for example, and the nurse can provide audio communication to the user. If there are other audio producing devices in the room, e.g., connected speakers for music, those devices can be used to provide the response to a user implementing a WCC. In one embodiment, the user, by pressing the device may provide audio response, captured by the microphone 2606, which are transferred to the nurse over the network.

In this example, a computing device of the nurse can receive the input 2638 from the user, in response to the button press(es). The WCC device 2600 may optionally provide positive feedback to the user, to let the user know that his or her request was received in operation 2640. For instance, if the user needs help, and presses three times, the nurse can send an audio reply "on my way" or the like.

FIG. 27A illustrates an example of a user interfacing with an artificial intelligence (AI) bot 2710. Reference to Echo, an Amazon Inc. product, is only be way of example to the functionality usable for interacting with WCC devices 2702. In some embodiments, the AI bot functionality could be integrated into a WCC device or a plurality of connected WCC devices. In this example, the user sends a voice input 2704 to AI bot 2710, and WCC device 2702 may reply with information (e.g., sensed data, data collected, state data, data from other WCC devices, data collected from the Internet, etc.). AI bot 2710 can then provide a voice reply 2706 to the user. The data returned by the AI bot 2710 may be simply the data collected from the WCC device(s), or can be augmented with other data collected from the Internet and processed.

FIG. 27B illustrates an example of a user interfacing with a WCC device 2720, which is processing AI bot logic 2722. In one configuration, the AI bot logic 2722 may be an interface for communicating with a computer connected to the network that can process AI bot instructions with more processing power. The computer can then reply back to the AI bot logic 2722, with a response for presentation to the user, e.g., via a voice reply.

In another embodiment, the WCC device 2722 is a more powerful device, which can itself process the AI bot instructions, and generate replies to the user responsive to the queries. The WCC device 2720 in one embodiment may include one or more microphones 2730 and one or more speakers 2732.

FIG. 28 illustrates an example of a user providing a query to the AI bot 2710. The query is, for example, "when was the door opened last"? As shown, voice input 2704 is provided to the AI bot 2710, and voice reply 2706 can be provided back to the user. The AI bot 2710 can process information by pulling WCC device 2800, to obtain information that was detected based on opening and closing motions of the door. As mentioned above, the door can include a WCC device 2800, which can be powered by mechanical motion of the door itself, thus defining incidental power generation that is harvested and used by the communication circuitry of the WCC device 2800. As mentioned above, the WCC device 2800 may also or alternatively include a battery or other power source, such as RF harvested power. Passive Wi-Fi, RF back scattering, inductive transmission, and other types of power transfers can also be used to power the WCC device 2800.

The AI bot 2710 can therefore report back information that it received in response to a query made to the WCC device. In other embodiments, another WCC device can be used as a proxy for communication with the AI bot 2710. In other embodiments, a network attached hub can be used for communication with WCC device, which can capture motion data associated with the door or other object that is being sensed or can be sensed for activity or data generation. The AI bot 2710, and therefore interrogate the hub, instead of directly communicating with the WCC device. The report back regarding the motion, can include data regarding a number of previous motions or movements of the door. In one embodiment, the data reported that can be filtered based on the type of request being sent. In this case, the filtering has occurred, since the request by the user was to identify when the door was last opened.

Given the context of the question, the AI bot 2710 can filter out other information regarding the door having the WCC device. For instance, the response will not include information of when the door was last closed, or when the door was open most during particular times of day, or when the door was closed hard, or when the door was closed softly, or the rate at which the door was opened or closed, or other data that can be sensed. In some embodiments, the door can also be associated with other WCC devices that can sense other information. For instance, other information can include data collected by motion sensors proximate to the door, image sensors proximate to the door, sound collection devices proximate to the door, etc. These other WCC devices can also be queried by the AI bot 2710, to provide more specific information regarding the door when requests are made to the AI bot 2710.

In one embodiment, learning algorithms can be processed by the AI bot 2710, to identify frequently asked questions, questions that are related to specific objects, pre-identify information to filter, optimize response statements, optimize data sources to check on the Internet for supplying information, learning which WCC devices should be queried in response to a request, optimizing and ranking WCC devices that hold more relevant information to particular questions or requests, comparing types of questions asked by other users for similar types of questions, learning by big data mining of requests and responses made to WCC devices by remote connected users, examining the community database, finding similarities in types of requests and responses for WCC devices, promoting certain WCC devices over other WCC devices in view of the contextual questions, and other processing metrics. These types of analysis can be performed in order to provide more accurate and specific information to the types of requests made by users for WCC devices or IOT devices, which may be present in specific areas or which may hold information that is sensed, gathered, stored, or produced by WCC devices or IOT devices from time to time.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or state, in real-time), logic for identifying or recommending a result or a next input, a next screen, a suggested input, suggested data that would be relevant for a particular time, geo-location, state of a WCC device, and/or combinations thereof. In one embodiment, use of machine learning enables the AI bots and/or WCC device processing systems to learn what is needed by the user, at a particular time, in view of one or more operating/status state of the WCC devices or IOT device, in view of one or more state of one or more sensors and historical data from databases (local or connected over the Internet).

Thus, one or more inputs or data presented to the user may be provided without an explicit input, request or programming by a user at that time. In one embodiment, reference is made to learning and prediction, wherein both terms may be referencing the same or similar function, e.g., looking at user interactions, preferences, tendencies, etc., in order to identify or select a particular type of data that may be useful for the user based on the learning or prediction. In other embodiments, learning may be defined closer to the traditional sense of machine learning, pattern learning, historical data input analysis, etc., while prediction is may be defined closer to the traditional sense of identifying some data, which is predicted to be relevant based on analysis of the context in which the data is predicted. In still other embodiments, prediction and learning may be hybrids, used in conjunction for providing contextually relevant supplemental content to a user account, a user device, or some target associated with a user account or profile.

Overtime, machine learning can be used to reinforce learned behavior, which can provide weighting to certain inputs. This data, combined with other data, may be used to recommend data regarding information that can be obtained in particular locations. It should be understood that these are just simplified examples to convey examples of recommendations which may be based on some learning, preferences or pattern analysis, or likelihoods.

Thus, context awareness across multiple dimensions will allow for more accurate predictions, learning (e.g., by building and refining behavior models), and surfacing/suggesting recommendations of supplemental content or settings, when it is most probable or likely or useful, or needed by the user, or relevant at a current or proximate or near or destination geo-location.

For purposes of providing example ways of processing learning algorithms, machine learning methods, predictions, data analysis, and the like, without limitations to any specifically claimed embodiment, reference may be made to a book entitled "Introduction to Machine Learning", Second Edition, by Ethem Alpaydin, The MIT Press (ISBN 978-0-262-01243-0), Cambridge, Mass., London England (2010), which is herein incorporated by reference for all purposes.

FIG. 29 illustrates another configuration of interface by a user with a voice handler 2900, which can be connected to a network device. The network device can be any type of device that provides connectivity to devices whether wired or wireless. The network device can be for example, a router, a switch, a modem, and other computer, a server, a wireless communication device, a transmitter, a repeater, another IOT device, another WCC device, etc.

The voice handler 2900, may be the WCC device, which is programmed the process logical operations for responding to requests for information from the user. The user may communicate with a microphone 2908 and a speaker 2906, which may be integrated or coupled to the voice handler 2900. The voice handler 2900, in one embodiment, can be processing AI bot logic, and can communicate with the network device for obtaining information from WCC devices. The WCC devices, in one embodiment, may be local devices that are sensing information. In another embodiment, the WCC devices may be remote devices that are connected to the network device over the Internet. For example, some WCC devices may be co-located with the user, such as in the same home.

Other WCC devices may be remote, such as at the person's office, vacation home, another country, or simply another place that is connectable over the Internet. In this embodiment, the voice handler 2900, can provide information regarding status from the WCC devices. In some embodiments, a WCC logic hub 2904 may be connected to the network. The WCC logic hub 2904 can be configured to communicate with WCC devices either periodically, or when data is requested. In some embodiments, the data gathered by the WCC logic hub 2904 can be stored to another WCC device, which can function as a storage device that can log information regarding the status collected from other WCC devices. The log 2904 can also be stored to a storage device that is connected to the network. The storage device can be a local storage device or can be a remote storage device, e.g. cloud storage. In this manner, the voice handler 2900 can request information regarding the WCC devices and information can be provided back to the user in either a direct manner, where the WCC devices are interrogated at the point of the request, or indirect where the WCC logic hub 2904 is interrogated for status information that was previously collected and stored to a log or storage.

Broadly speaking, the WCC logic hub 2904 can be a networked device, which connects directly to a local network. The WCC logic hub 2904, in one embodiment, can be connected to a power outlet and can function to communicate with the WCC devices that may be connectable within the network. In other embodiments, the WCC hub 2904 can communicate over the Internet and collect information from other WCC logic hubs 2904, which in turn collect information from other WCC devices. As used herein, it should be understood that WCC devices can also be referred to as IOT devices.

FIG. 30A illustrates an example of a user interfacing with a WCC 3002, which can function as a terminal for communicating with the hub 3010, which in turn communicates with WCC devices over a network, in one embodiment. For example, the user can simply approach a WCC terminal 3002, which can collect information requested via a microphone 3006. The request can be sent to a hub 3010, which can then interrogate WCC devices or access a log of information that has previously been collected and saved from communication with WCC devices. The hub 3010 can therefore provide information back to the WCC device 3002. The information can then be communicated via a speaker 3004.

In one embodiment, the microphone 3006 and the speaker 3004 can be integrated into another WCC device, or can be part of another device. For instance, the microphone and speaker can be part of a user smart phone, or can be part of a user's smart glasses, or can be part of a user's hearing aid, or can be part of the users WCC device that is wearable. As shown, a local AI bot can also be executed to provide responses made to the hub 3010. As mentioned above, the local AI bot can query the hub or WCC devices in order to collect information, synthesize information, filter the information, and produce an intelligible response back to the WCC device 3002.

In other embodiments, an AI bot service 3020 can also be accessed over a network, to provide more information from other sources distributed throughout the Internet. The AI bot services, for example, may be provided by commercial entities, that process request using machine learning and or deep learning algorithms.

By way of example, a process flow for making the request and receiving data back from WCC devices that are either local or remote can include the numbered steps 1 through 8. These example steps are only provided for purposes of understanding one process flow, and should not limit the many additional or alternate process flows possible for requested information associated with WCC devices.

FIGS. 30B and 30C illustrate examples of queries made to the WCC device 3002 at step 1, and the responses received by the user from the WCC device 3002 at step 8. For example, the user can request information such as "when will my son be home?", in step 1, and the response may be "he is expected home at 4:20 PM; he stopped for ice cream at First and Main." In other query can be, "how long did the vacuum run today?", in step 1, and the response may be "it looks like it was use between 2:15 PM and 2:40 PM today, and it needs a new bag." These examples are only provided to show that information can be collected from sensors associated with WCC devices, and the information can be collected from more than one WCC device in order to provide coherent information that relates to the question and the context.

FIG. 31A shows a WCC device 3100 that operates using harvested energy from sound waves 3101 to power the device and for transmission of a representation of a voice or acoustic signal 3101 for processing. A WCC with acoustic signal energy harvesting may be used to provide any known function associated with natural language understanding system 3190. For example, a WCC with voice signal energy harvesting 3100 may be used to ask the same questions that Google or Amazon Echo provide answers to. For example "Ok Google . . . where is the nearest restaurant?", or "Alexa, when is my new laptop going to arrive?" etc.

Continuing with the example shown in FIG. 31*a*, sound waves 3101 representing words and sentences are spoken into the WCC 3101 are harvested by an acoustic energy harvest circuitry 3110 to produce power 3210 and signal 3200. Signal 3200 may be analog or digital, forwarded to an end node for local processing within a DLC, forwarded to a specific natural language understanding (NLU) hardware appliance, forwarded to a remote server, forwarded to a microservice, forwarded to an adapter coupled to a retrofit an NLU appliance or forwarded in connection with NLU processing. In some embodiments, a WCC or DLC group may access an NLU appliance over a network, to gain information or process voice input. The result can then be supplied back to a WCC or DLC group, for providing the response to a user, e.g., responsive to a voice input or voice request.

In some embodiments, an optional gain resonator 3130 may be used to increase the energy harvested from a voice signal 3101. The gain resonator 3130 may be formed in a housing of a WCC device. A gain resonator may a thin plane of metal, mylar, it may include magnetic elements, including maxels. The gain resonator may be coupled to a piezoelement 3140. The gain resonator 3130 and piezoelement 3140 may define a resonant frequency based on the sizing, tension, thickness and choice of materials, and such resonant frequency range may be selected or tuned to be at a harmonic within the band of the human voice spectrum. In some cases, the resonant frequency may be set below the center of the human band to pick up lower frequencies. A variable tuning component (not shown) may be coupled to the resonator and be used to tune for specific voice frequencies directed at men, women or children users.

In some embodiments, an optional acoustic grating 3120 may be disposed in the housing and used to squeeze the incident voice wave through a slit grating and into the gain resonator 3130. The acoustic grating may consist of a metal slit grating and the gain resonator 3130 may comprise a flat metal screen. The metal slit grating can squeeze the incident acoustic wave into an air gap between the slit grating and metal screen from the gain resonator, giving rise to high sound pressure and causing the metal screen to vibrate. Using the direct piezoelectric effect, the "squeezed" acoustic energy may be harvested efficiently by a piezoelectric component that is mounted on the back of the gain resonator.

In one embodiment a component of the acoustic energy harvesting circuitry is etched to form an antenna to conduct wireless transmission. For example, the gain resonator 3130 may be made of mylar (e.g., polyester film or plastic) or other non-metal material but include an etched antenna pattern on the resonator. WCC 3100 may use the direct piezoelectric effect, the acoustic energy is harvested efficiently by a piezoelectric component mounted inside. A signal 3200 representing the modulated voice is passed to an IC 3150 with wireless circuitry 3160 and memory 3170 for creating a payload 3189 representation of the voice signal 3101 for processing by NLU system 3190.

A natural language understanding system 3190 may operate standalone or as part of a DLC group. In one configuration, WCC 3100 passes the voice signal 3101 to the NLU system 3190 but the response from the NLU system 3190 is directed to or output from a device associated with DLC 3191. In one embodiment, the NLU 3190 generates spoken audio response to a voice command and the spoken audio response is output from another device in a DLC cluster associated with the WCC 3101. In one embodiment spoken words are forwarded across a network for processing by a natural language understanding (NLU) system and the system determines which devices in the DLC group to target the command or forward a response. While WCC 3100 may be associated to other devices in a shared DLC group, the voice commands sent from WCC 3100 may be targeted to specific DLC devices and a response from an NLU system may be forwarded across a DLC cluster. The NLU system 3190 may be in the form of hardware or software or both, including dedicated hardware appliance such as the Google Home or Amazon Echo appliance.

In some embodiments, the WCC voice harvester is constructed to be placed in the user's mouth, to force the voice and air pressure through the harvester. In some embodiments, a user speaks into a device in a similar manner as they would a kazoo toy. In some embodiments, the housing includes one or more output ports that allow air from the speech to exit the device.

In some embodiments, a WCC device used for NLU application may be configured without acoustic energy harvesting. In any case, WCC devices may operate as a forward proxy to send voice signals for processing by NLU system. An NLU voice command or inquiry may be initiated through a WCC, causing trigger to DLC processing for determination of a target device associated with the command or inquiry. In some cases, a DLC may learn target devices, or target device may be expressly identified by a user though an express verbal utterance or gesture, including gestures that are proximity based and ones that associate two devices through an inertial bump of an inertial IMU sensor 3351 of the WCC to another device. In other cases, an NLU system or process coupled to NLU system interprets the words or otherwise makes a determination as to which device the user's inquiry or command pertains to. Thus, the voice commands may be parsed to determine which device the voice command is directed to, and action may be used to trigger control of the device, gain federated access to another device, open or close or change the state of a software defined network, mount or unmount a file storage, set a DLC state, push or pull content or payload, receive a synthesized natural spoken word response.

A WCC device that receives voice input and forwards the same to NLU may process the response from the NLU itself or the response may be forwarded to a DLC device detected to be proximate to the WCC.

Figure 31B:
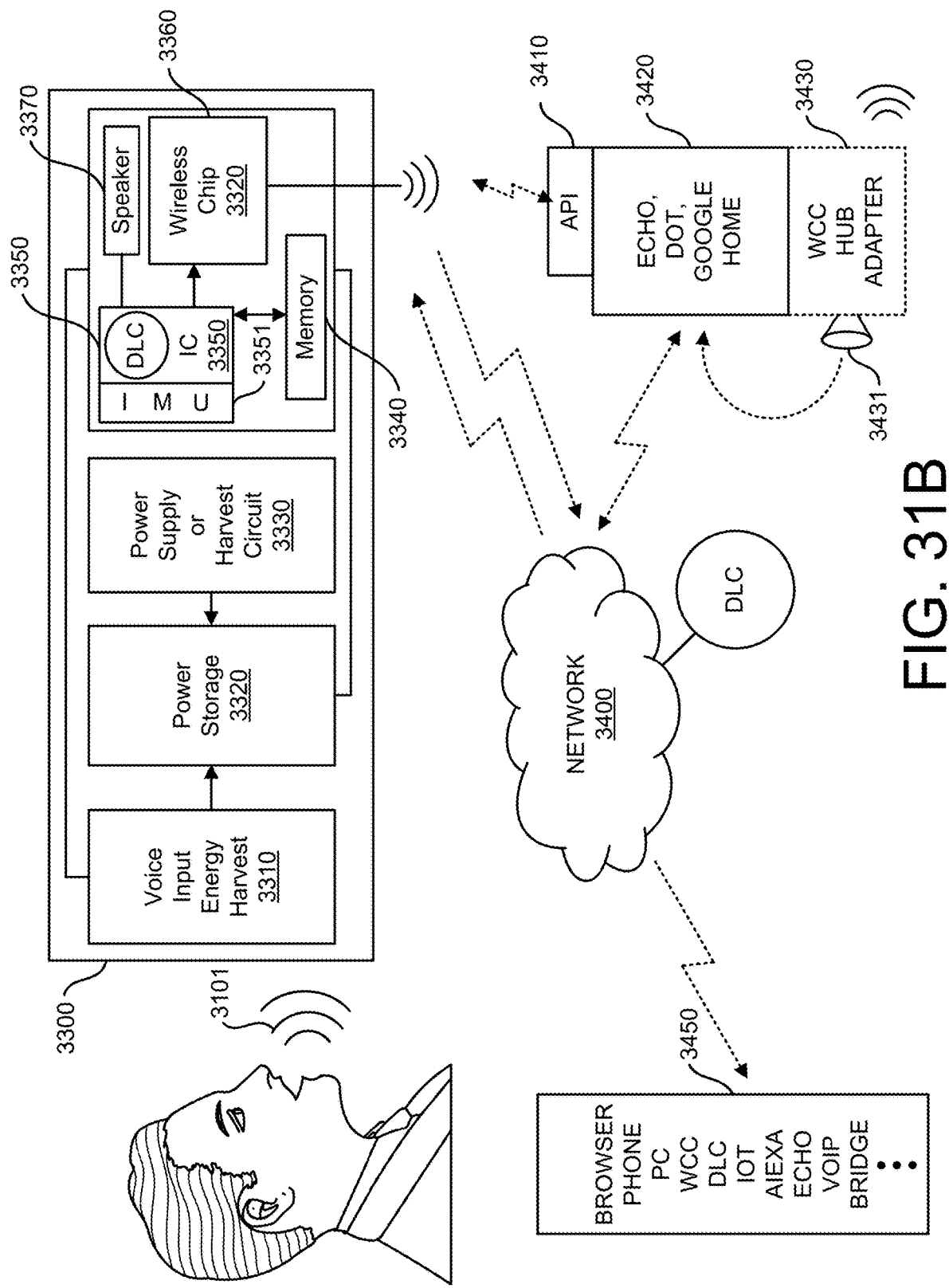
FIG. 31B shows a WCC with acoustic energy harvesting that also has a power supply or harvest circuitry configured to supply power to the WCC in advance of receiving the voice input to allow the system to receive a signal from the leading edge of the audio utterance, in accordance with one embodiment.

FIG. 31B shows a WCC with acoustic energy harvesting that also has a power supply or harvest circuitry 3330 configured to supply power to the WCC in advance of receiving the voice input to allow the system to receive a signal from the leading edge of the audio utterance. Without such additional power or harvest circuitry 3330, the WCC 3100 of FIG. 31a may require a WAKEUP vocal utterance that precedes the vocal message 3101 intended to be processed by the NLP system, where the WAKEUP utterance would provide the startup energy necessary for booting the circuit into a ready state to process the signal intended for the NLP system. Depending on the efficiency of the WCC 3110 acoustic harvest circuitry, the power required to sample and transmit the voice may be less than the energy harvested by the voice harvester. Therefore, providing a secondary power supply or harvest circuit 3330 will provide bootstrap energy to ready state prior to start of the voice utterance, to enable the complete voice signal 3301 to be processed and transmitted.

In one embodiment, WCC device 3300 is equipped with harvest circuit 3330, the harvest circuit including a power pump. In operation a user pushes on the power pump to click-bootstrap the device before speaking into the WCC. Voice energy is harvested and a representation of the voice signal is transmitted for processing by NLU system.

To enable full duplex communication in a single device, WCC 3300 may be equipped with an optional audio speaker 3370 coupled to the IC 3350 or wireless chip 3360. In one method of operation, a user provides pump power to click-bootstrap WCC 3300 into ready state then the user speaks a command into the WCC, waits several seconds and click-re-bootstraps the WCC by pumping the power pump to wake-up the WCC into ready state at which point it receives the response in connection with the NLU system and plays the response through speaker 3370. In one configuration of this embodiment, the NLU system polls for signal from the WCC or DLC device and after the signal is received, the NLU system or a hub adapter coupled to the NLU system transmits the response. This ensures that certain WCC battery less devices receive prompt response when they are click-re-bootstrapped into ready state following a prior NLU transmission.

It should be understood that power supply or harvest circuit 3330 may be of types other than battery, energy pump or click-bootstrap based. For example, harvest circuit may include any of known type including ones previously described in this family of patent applications, ones that receive wireless power when exposed in proximity to a power transmission source, ones that harvests RF from the airwaves, ones that harvest vibrational energy, etc.

In some retrofit embodiments, the NLU hub appliance 3420 may be coupled to an optional WCC hub adapter 3430 to receive the wireless voice signal for coupling to the hub. In one embodiment optional speaker 3431 is coupled to the hub adapter so that the voice commands are replayed through speaker 3431 for pickup by a standard microphone typically associated with the NLU appliance 3420. The hub adapter 3420 may contain logic and wireless capability to enable it to optionally communicate with DLC devices wirelessly to encode, transcode, augment and forward output from the NLU appliance 3420. In one embodiment, DLC nodes collaborate to assemble a hub adapter using shared resources from one or more devices operating DLC.

In several embodiments herein, a response from a NLU processing system may be processed, augmented, translated or forwarded. The handling of NLU processing events may be made by one WCC or DLC device which may forward the response as originally put forth, or it may forward an augmented response, or a translated response. In this case, a translated response is a signal that is transmitted in response to the state of the NLU processing system and not necessarily meant to mean a foreign language translation of the response from an NLU system, though DLC may perform such language functions as well.

Figure 32:
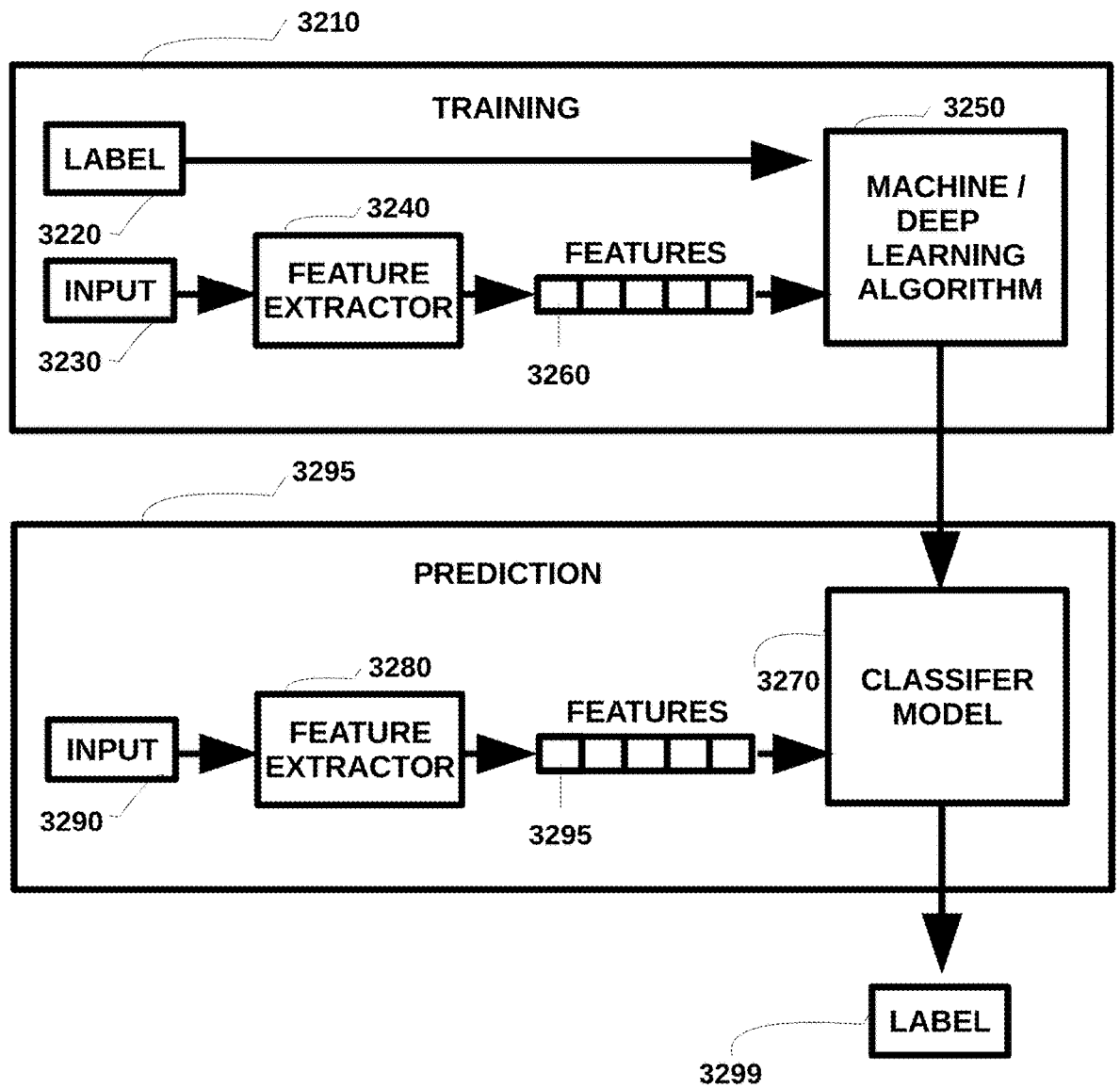
FIG. 32 shows an example deep learning algorithm that takes labeled data and as input into a continuous training system, and produces an output predication label for input data, in accordance with one embodiment.

FIG. 32 shows an example deep learning algorithm 3250 that takes labeled data 3220 and 3230 as input into a continuous training system, and produces an output predication label for input data 3290.

The machine learning model is trained by exposing the learning algorithm to labeled training data. In one configuration, data input during training flows through feature extractor 3240 which builds derived values or features intended to be informative and non-redundant, facilitating the subsequent learning and generalization steps. In one embodiment, the input data to the machine learning model is too large to be processed efficiently because it contains redundant data, so it is transformed into a reduced set of features through feature selection. The selected features 3260 contain the relevant information from the input data, so that the desired task or classification is performed by using this reduced representation instead of the complete initial data.

Feature extraction involves reducing the amount of resources required to describe a large set of data. When performing analysis of complex data one of the major problems stems from the number of variables involved. Analysis with a large number of variables generally requires a large amount of memory and computation power, also it may cause a classification algorithm to overfit to training samples and generalize poorly to new samples. Feature extraction is a general term for methods of constructing combinations of the variables to get around these problems while still describing the data with sufficient accuracy.

In one embodiment, an expert constructs a set of application-dependent features through feature engineering. In another embodiment general dimensionality reductions are applied to the data, including one or more selected from the group consisting of:
Independent component analysis
Isomap
Kernel PCA
Latent semantic analysis
Partial least squares
Principal component analysis
Multifactor dimensionality reduction
Nonlinear dimensionality reduction
Multilinear Principal Component Analysis
Multilinear subspace learning
Semidefinite embedding
Autoencoder, and;
Deep feature synthesis It is entirely possible that any machine or deep learning training algorithm will be exposed to noisy data, incorrectly labeled data or correctly labeled data from an unintended source. Take, for example, a WCC wearable device that learns metrics about its wearer and uses those metrics to make predictions. Perhaps it predicts the times of day that its owner exercises, her schedule or her pattern or activities, or travel path. If owner lends the wearable to a friend for a length of time, it would be desired to erase or purge some or all the training activity that occurred while the device was lent out.

Described now is a novel method that may be coupled to any system including a WCC or device running DLC for pulling out, purging or filtering training data from an iteratively trained model associated with the device, so a machine learning algorithm can avoid having its weights effected by data generated from events, conditions, situations, anomalies that distort the accuracy of the model away from learning the object of a lesson for which it is intended to be trained.

Table one shows labeled data comprising one or more features that are fed into a learning algorithm to update the weights associated with each epoch, resulting in a snapshot of the model that is preserved, saved.

TABLE 1

UNFILTERED TRAINING DATA TO DEEP LEARNING MODEL

| Feature | Feature | FeatureFeatureFeatureLabel | Snapshot1 |
|---|---|---|---|
| Feature | Feature | FeatureFeatureFeatureLabel | Snapshot2 |
| Feature | Feature | FeatureFeatureFeatureLabel | Snapshot3 |
| Feature | Feature | FeatureFeatureFeatureLabel | Snapshot4 |
| Feature | Feature | FeatureFeatureFeatureLabel | Snapshot5 |
| Feature | Feature | FeatureFeatureFeatureLabel | Snapshot6 |
| Feature | Feature | FeatureFeatureFeatureLabel | Snapshot7 |
| Feature | Feature | FeatureFeatureFeatureLabel | Snapshot8 |
| Feature | Feature | FeatureFeatureFeatureLabel | Snapshot9 |
| Feature | Feature | FeatureFeatureFeatureLabel | Snapshot10 |

In a method to remove training data from a iterative deep learning model, the first step is to identify the data to be removed. In some embodiments a WCC or device operating DLC may enable a user or process to erase data associated with another machine learning or deep learning process or activity. In one embodiment, a WCC learns to predict the activity that the user intends to erase. In another embodiment, a user may define a time period, day, week, minutes and the entire range of data in the period is erased from the training model. In yet another embodiment, events, locations, specific features, features over or under a value, label(s), may be removed from the training model. In still another embodiment, a user or process may define a time period and a filter and items that match the filter during the time period will be removed from the training data.

Table 2 shows the example training sequence of Table 1 with selected training data removed, including the deletion of snapshots associated with any removed data.

TABLE 2

PURGE OUT TRAINING DATA TO DEEP LEARNING MODEL

| Feature | Feature | FeatureFeatureFeatureLabel | Snapshot1 |
|---|---|---|---|
| Feature | ~~Feature~~ | FeatureFeatureFeatureLabel | ~~Snapshot2~~ |
| Feature | Feature | FeatureFeatureFeatureLabel | Snapshot3 |
| Feature | Feature | FeatureFeatureFeatureLabel | Snapshot4 |
| Feature | Feature | FeatureFeatureFeatureLabel | Snapshot5 |
| Feature | Feature | ~~Feature~~FeatureFeatureLabel | ~~Snapshot6~~ |
| Feature | Feature | FeatureFeatureFeatureLabel | Snapshot7 |
| Feature | Feature | FeatureFeatureFeature~~Label~~ | ~~Snapshot8~~ |
| Feature | Feature | FeatureFeatureFeatureLabel | Snapshot9 |
| Feature | Feature | FeatureFeatureFeatureLabel | Snapshot10 |

According to the method, after the data has been identified, the model is trained using a retrain cascade that begins with the snapshot of the model taken just prior to the first sequence in an interaction. In the case of the ongoing example, table 3 shows a retrain cascade that begins with snapshot 1 which is retrained using new data that was used to create the old snapshot3, replacing snapshot3 with snapshot2, etc. The method continues through each iteration, resulting in a training model that is retrained in a manner to avoid the subject data, resulting in higher accuracy prediction results from the model.

TABLE 3

RETRAIN CASCADE

| | | START > | Snapshot1 |
|---|---|---|---|
| Feature | Feature | FeatureFeatureFeatureLabel | Snapshot~~3~~2 |
| Feature | Feature | FeatureFeatureFeatureLabel | Snapshot~~4~~3 |
| Feature | Feature | FeatureFeatureFeatureLabel | Snapshot~~5~~4 |
| Feature | Feature | FeatureFeatureFeatureLabel | Snapshot~~7~~5 |
| Feature | Feature | FeatureFeatureFeatureLabel | Snapshot~~9~~6 |
| Feature | Feature | FeatureFeatureFeatureLabel | Snapshot~~10~~7 |

In one embodiment, a system is provided for improving the performance of a human identification system based on capturing mac addresses of cell phones in proximity to a facial detection camera, using a deep learning algorithm trained using feature data image representation of the person to be identified, label as their identity, feature as whether the mac address of the identity is known, feature of the mac address if known, and if the feature of mac address is not known, all mac addresses detected by the camera are added as training features to the model. Over multiple iterations, as the user with the same phone is imaged and recognized and mac addresses scanned, feature extraction will result in a high probability determination of their mac address, and upon reaching a threshold accuracy of such feature, the feature as to whether the mac address of the identity is known will be set to true, and the mac address copied into a known mac address established for the identity label.

In one embodiment, the system for human identification includes a video camera to image a face of a person, an access point configured broadcast a "who is there?" packet on each channel and receiving and logging a timestamp and mac address of wireless devices that respond, associating the mac address with training features in a deep learning model. In another embodiment, a human identification system includes a convolution neural network image classifier taking input from a video camera imaging a person's face, and a feature engineered classifier model having input of detected mac addresses in proximity to a Wi-Fi access point near the camera. In several embodiments, the human identification system may be used in a retail outlet for determining customers entering, navigating, and exiting a store.

In some embodiments, the IOTs can be part of or use various communication protocols. Some example protocols include Message Queue Telemetry Transport (MQTT) for targets device data collection. One use of this is telemetry, or remote monitoring. In one embodiment, MQTT can be used to collect data from many devices and transport that data to an IT infrastructure. This can be useful for collecting data from large numbers of IOTs that need to be monitored or controlled from the cloud. The cloud system can include, for example, an enterprise system, which can collect data from specific IOT types, e.g., home devices, retail store devices, passive devices, energy monitoring equipment, agriculture sensors, medical sensors or devices, vehicle devices, oil exploration devices, RFID sensors, computers, etc., including other types described in this document. In one embodiment, a hub-and-spoke architecture can be used for MQTT.

In some embodiments, IOTs or some IOTs can use an Extensible Messaging and Presence Protocol (XMPP) also referred to as "Jabber." This protocol can be used for instant messaging (IM) to connect people to other people via text messages, and for communicating IOTS for signaling data. In the IOT context, XMPP offers a way to address a device. XMPP uses the XML text format as its native type. This can be useful if data is traveling between distant, mostly unrelated points, just like the person-to-person case.

Another protocol that may be used is a Data Distribution Service (DDS), which targets devices that directly use device data. This can be used to distribute data to other devices. DDS offers provides for quality-of-service (QoS) control, multicast, configurable reliability, and pervasive redundancy. In addition, fan-out is possible using DDS. DDS also enables filtering to define exactly which data goes where, which can include many simultaneous destinations.

Still another protocol can be the Advanced Message Queuing Protocol (AMQP). This protocol provides for queues. It enables transactional messages between servers and nodes. This is a type of message-centric middleware, which can process thousands of reliable queued transactions. AMQP middleware provides for tracking all messages and ensuring each is delivered as intended, regardless of failures or reboots.

Another protocol may be the Constrained Application Protocol (CoAP) that is used to allow resource-constrained devices to communicate over the Internet using UDP instead of TCP. Developers can interact with any CoAP-enabled device the same way they would with a device using a traditional REST-based API. CoAP is useful for communicating with low-power sensors and devices that need to be controlled via the Internet. In some embodiments, a WCC, DLC or IOT may be coupled to or operate Opendaylight SDN from the Linux foundation. Further, depending on the construct described or desired for a specific implementation, the term DLC may mean digital local cloud, digital container, and function or construct as described, as singular or plurality of interaction between one or more devices.

These protocols have been identified as example protocols that can be used to facilitate communication between IOTs, and in some cases, transfer data being managed by DLC logic. As such, the embodiments described herein may use aspects of these protocols to facilitate or augment communication.

It will be obvious, however, to one skilled in the art, that the present disclosure may be practiced without some or all of these specific details. In other instances, well known process operations have not been described in detail in order not to unnecessarily obscure the present disclosure. Further, it should be understood that several embodiments have been described in relation to specific feature implementations or combinations. However, it is the intent that multiple combinations, permutations or recombination are possible to define additional specific example implementations using some or all of the features associated with one or more of the example embodiments. The figures have been provided to illustrate specific example uses, circuits, communication, logic, circuits, mechanical features, power supplies, power pumps, energy harvesting, buttons, housings, shapes, integration with other physical objects.

However, it should be understood that individual features used to define those specific examples may be recombined to define other examples. For instance, some devices may use energy harvesting and can provide for communication via wireless chips and processing via specialized microcontrollers or general controllers. The energy harvesting feature, however, may be replaced with a standard power supply, e.g., such as a battery, or power provided from an outlet, or power provided from a motor of a device, or power stored for transitory periods of time (e.g., storage capacitors), and the like. As such, it should be understood that the WCC devices described herein are not limited to energy harvesting models, e.g., those having a power pump, but are equally usable with standard power storing cells, e.g., such as batteries. In some cases, the batteries are rechargeable. The rechargeable batteries may be charged using a standard power outlet or may be charged from a solar cell or may be charged by harvesting RF power wirelessly.

With the above in mind, it should further be understood that the method operations and processes executed with, in connection with, or on a WCC device 100 can produce data. The data, in one embodiment can be stored to storage of the WCC device or a device interfaces with the WCC device locally. In other embodiments, the WCC device will include a wireless communication device that is configured to transfer the data wirelessly to a processing node. The data transferred, in one embodiment, is pre-processed by logic of the WCC device. In other embodiments, the data is raw data that is transferred to the end node for further processing. As noted above, the end node may be a server or some other device that has processing power to execute instructions. The instructions can be predefined, such that the end node knows what to do with the data. The data can, in one configuration, simply be saved to a database or file. In other embodiments, the data is communicated to some other device. In still other embodiments, the data is processed, e.g., such as to run analytics and data metrics analysis. The data metrics can be published or saved to a website or server. The data can then be accessed by any device having a network connection, e.g., provided the device has access or is granted access via a user account or the like.

Broadly speaking, example types of wireless networks usable by WCC devices are extensive, so long as signal data can be wirelessly transmitted initially without a wire or in a phantom pseudo capacity. Once payload or wireless data is sent to a node, the node may be wired or not. For instance, the WCC device can communicate wirelessly to a WiFi Router, which is connected by wire to a router. In some embodiments, the WCC device can communicate wirelessly to one or more nodes until the signal reaches the end node. The end node may be part of a network or connected to the network. In one embodiment, the end node may be a server, a computer, a mobile device, a data center, chord overlay network, a server cluster, a processing machine, a virtual machine, or some other logic that can process the data output by the WCC device.

In some embodiments, the network maybe part of the Internet or can communicate with the Internet. In further embodiments, users of devices, e.g., computers, tablets, phones, watches, desktops, terminals, etc., can log into a server or end node, and request to view, access, interface with, change, modify, or respond to data collected from the transmitting WCC devices. In the various embodiments, WCC devices can be owned by users with specific user accounts. The users can own one or more WCC devices and the data from each can be accessed. In further embodiments, one owner with a single user account can assign multiple WCC devices to multiple people or assign them to multiple physical objects. The data received from the users can then be saved, compared, processed, and generated to produce metric data from the multiple WCC devices.

The following are some examples, without limitation to other wired or wireless networks (both of which may be used for parts of the communication between the WCC device and an end node). The examples relate to example networks and/or protocols usable by WCC devices for at least part of a communication path to an end node or multiple end nodes. For instance, a WCC device 100 may be designed to communication its data, state, change in state, information, message or generally data information with multiple end nodes.

Some examples of wireless connections or networks include, for example, microwave communication networks, satellite communication networks, cellular communication networks, radio communication networks, frequency hopping networks, spread spectrum networks, 900 MHz, 2.4 GHz, wireless personal area networks (WPAN), Bluetooth links or networks, Bluetooth low energy (LE) links or networks, WiFi-Aware networks, infrared networks, ZigBee networks, near field communication (NFC) links or networks, Wi-Fi PAN networks, Wi-Fi links or networks, Wireless LAN networks, wireless mesh networks (e.g., with node repeating/forwarding/routing), wireless metropolitan area networks, WiMAX networks, Cellular based networks (e.g., that utilize cell towers and base stations and cell sites), global system for mobile communication (GSM) networks, personal communication service (PCS) networks, global area networks (GAN), space networks, wireless access points for network connections, wireless ad hoc networks (WANET), peer-to-peer networks, Wi-Fi Array networks, Wi-Fi direct networks, smart phone Ad hoc networks (SPANs), Internet based mobile ad hoc networks (iMANETs), For purposes of providing example ways of processing learning algorithms, machine learning methods, predictions, data analysis, and the like, without limitations to any specifically claimed embodiment, reference may be made to a book entitled "Introduction to Machine Learning", Second Edition, by Ethem Alpaydin, The MIT Press (ISBN 978-0-262-01243-0), Cambridge, Mass., London England (2010), which is herein incorporated by reference for all purposes.

AWS Lambda is a compute service that runs code in response to events and automatically manages the underlying compute resources. In one embodiment, some nodes or implementations may coordinate with or use or use part of AWS Lambda to extend other AWS services with custom logic, or create back-end services that operate at AWS scale, performance, and security. AWS Lambda may be used to automatically run code in response to modifications to objects in Amazon S3 buckets, notifications sent from Amazon SNS, messages arriving in Amazon Kinesis streams, or table updates in Amazon DynamoDB. Lambda may run code on high-availability compute infrastructure and performs all the administration of the compute resources, including server and operating system maintenance, capacity provisioning and automatic scaling, code and security patch deployment, and code monitoring and logging.

By way of example, code run on AWS Lambda is called a "Lambda function." After a Lambda function is created, it is ready to run, similar to a formula in a spreadsheet. Functions include code as well as some associated configuration information, including the function name and resource requirements. Lambda functions are "stateless," with no affinity to the underlying infrastructure, so that Lambda can rapidly launch as many copies of the function as needed to scale to the rate of incoming events. After code is provided to AWS Lambda, a function can be associated to a specific AWS resources (e.g. a particular Amazon S3 bucket, Amazon DynamoDB table, Amazon Kinesis stream, or Amazon SNS notification). Then, when the resource changes, Lambda will execute function and manage the compute resources as needed in order to keep up with incoming requests. Use of AWS Lambda is only one example of operations that can be integrated with node process described in this document. In some cases, some or parts of AWS Lambda functionality may be used to run DLC logic, logic on WCC devices, or execution functions or operations.

In some embodiments, at least one WCC is activated as a result of harvesting energy from the heat of the user's finger, harvesting energy from a mechanical force, or harvesting energy from an RF source.

In some embodiments, a user provides input to a first WCC using a convenient user interface coupled to the first WCC and wherein the first WCC then transmits the input to a second WCC.

In some embodiments, the registration of a first WCC onto a network involves a second WCC that is configured to perform its normal duties and responsibilities as an internet thing but also to sustain services associated with a standard class of products.

In some embodiments, the registration of a first WCC onto a network involves a second WCC that is configured to perform its normal duties and responsibilities as an internet thing but also to sustain services associated with registering or reregistering WCC devices onto a network.

In some embodiments, the registration of a first WCC onto a network involves a second WCC that is configured to perform its normal duties and responsibilities as an internet thing but also to periodically and repetitively poll for devices that require pairing to a network.

In some embodiments, the registration of a first WCC onto a network involves a second WCC receiving a request to engage in polling of a pairing handshake second WCC.

In some embodiments, the registration of a first WCC onto a network involves any form of polling by a second WCC and through direct triggering of a third WCC.

In some embodiments, the user registering the WCC is automatically identified without the user needing to expressly identify themselves.

In some embodiments, a WCC with display is provided, which cycles through 1-m each increment refreshing the display with a new image i.e. "snap to perform" "x(n)" function QR code, optional countdown timer and once countdown expires, new image zone for triggering direct command to the WCC using far route starting with phone app to cloud to WCC.

In some embodiments, a battery-less WCC terminal is provided that uses finger heat TEG with silent, deformable push-activation to fuel bistable display configured to rotate through a series of QR encoded display images where each image represents a different command and where a command is selected by scanning the QR code with another WCC or Phone, at a precise time, to select a precise function.

In some embodiments, a battery-less WCC terminal is provided that uses finger heat TEG with silent, deformable push-activation to fuel bistable display configured to rotate through a series of QR encoded display images where each image represents a different command and where a command is selected by scanning the QR code with another WCC or Phone, at a precise time, to both select a precise function and select a setting of the desired function (sub countdown selector).

In some embodiments, a battery-less WCC terminal is provided having a bistable display configured to rotate through a series of QR encoded display commands where a command is selected by scanning the QR code at a precise time.

In some embodiments, a battery-less WCC terminal is configured to function as a device for purchasing products having a bistable display configured to rotate through a series of QR encoded display commands where a command is selected by scanning the QR code at a precise time.

wherein the terminal is included as an interface of a WCC device selected from the group consisting of thermostat, a device made to trigger ordering of products, toaster, refrigerator, power tool, etc.

In some embodiments, a bistable QR command rotator is provided, which pushes index to flash so it can be retrieved at wakeup for next cycle.

In some embodiments, a WCC terminal is provided where the WCC displays a command and the command is selected by a user holding an object and bringing the object into proximity of displayed command, and wherein the WCC is able to detect the absence or presence of the object in connection with the displayed command.

In some embodiments, a WCC terminal is provided where the WCC displays a command and the command is selected by the user by tapping a threshold amount of energy into the WCC to indicate the users interest to select the displayed command.

In some embodiments, a WCC terminal is provided where the WCC displays a series of commands and where a user selects a specific command in the series by closing a hole to block off light from entering into a photo sensor during which time the command is displayed.

In some embodiments, a WCC terminal is provided where the WCC displays a command and the command is selected by the user by tapping a threshold amount of energy into the WCC to indicate the users interest to select the displayed command.

In some embodiments, adaptive WCC operation uses a leading edge of a swarm of nodes to quickly detect a pattern affecting the leading edge of nodes and applying a patch or a reconfiguration of non-affected nodes so the effect of the pattern to the non-affected nodes is transformed. The transformation is tangible and evidenced by the generation of an electronic signal encoding state data that otherwise would not have been generated but for the result of the transformation.

In some embodiments, a higher level OS lives in EC2 or Lambda but need redundancy across service providers, to enable Amazon plus digital ocean, etc.

In some embodiments, provided is one or more of intrusion, interference, malware, unauthorized use, expired rights, deactivation, device failure, module failure, system failure, service failure, or any status flag associated therewith to detect the direction of the pattern and apply the necessary system reconfigurations and notifications.

In one embodiment, a device is provided. The device includes a wireless chip, a memory interfaced with the wireless chip, and a power storage cell. A microprocessor is interfaced with the wireless chip, the memory, and the power storage cell. The memory is programmed to operate both the primary functions associated with the device as executed by the microprocessor. The memory is programmed with a resource sharing process. The resource sharing process is configured to enable the device to operate as a DLC group that such that device is managed to (i) cooperate with other devices and (ii) selectively engage in auto-assist operations in connection with a user's progress in moving through the steps towards completion of a recipe.

In some embodiments, a DLC layer connects to an Amazon EC2 instance or makes calls to one or more Amazon Lambda functions.

In some embodiments, a DLC system is provided where a derivation of the original SQRL login and user authentication service as described in www.grc.com is used for authenticating users, devices or processes in connection with DLC.

In some embodiments, an improved multi-factor authentication and login system is provided, similar to SQRL (www.grc.com), but using an audible low baud rate encoded URL instead of a QR-code and where the microphone receives the audible signal and a processor decodes the audio stream into a URL for processing.

In some embodiments, the audio-encoded URLs are time division interleaved into blank spaces in music, news and other broadcasts and where a portable device such as a phone is able to monitor and detect the presence and decode URLs over time, log them, and allow a user to select the URL using an application to access data associated with particular URL instance for which is associated with a time shifted history of log song, news article or broadcast, commercials they were exposed to.

In some embodiments, the user viewing the URL is automatically identified, and where advertising may be delivered or profile data gathered.

In some embodiments, a digital audio watermark is used that cannot be detected by the human ear and wherein instead of time division interleaving of the audio, the audio is augmented with the URLs.

In still other embodiments, WCC devices are provided, as follows.

A1. A wireless coded communication (WCC) device, comprising, a wireless chip; a memory interfaced with the wireless chip; a power storage cell; a microprocessor interfaced the wireless chip, the memory, and the power storage cell, wherein the microprocessor is programmed with a primary function that is executed by the microprocessor; wherein the memory has programming for a resource sharing process, the resource sharing process is configured to, (i) enable discovery of the WCC device by one more other WCC devices, (ii) enable allocation of a portion of the memory and a portion of processing power of the microprocessor to a pool of shared resources to be managed by the resource sharing process of the WCC device and the other WCC devices; and (iii) enable execution of a processing task requested by one of the other WCC devices, the processing task utilizing the resource sharing process of the WCC device to execute a request to for a processing task as requested by one of the WCC devices and a processing result of the processing task is routed back to one of the other WCC devices that issued the request to execute the processing task.

A2. The wireless coded communication (WCC) device of claim A1, wherein the request for execution of the processing task by one of the WCC devices initiates the discovery of the resource sharing process, the discovery is configured trigger a wireless signaling algorithm that interrogates a local wireless network to identify any connected WCC devices that are configured for execution of a resource sharing process as a group, wherein the group defines a dynamic local cloud (DLC).

A3. The wireless coded communication (WCC) device of claim A1, wherein each of the WCC device and said other WCC devices each have an identifiable allocation of their memory and processing power that is made available for allocation to the pool of shared resources.

A4. The wireless coded communication (WCC) device of claim A3, wherein the identifiable allocation is configured to dynamically adjust for each WCC device, wherein the primary function of the WCC device has priority to utilize the respective memory and processing power over allocation to the pool of shared resources.

A5. The wireless coded communication (WCC) device of claim A2, wherein the resource sharing process executed by the WCC device is a transient process that occurs upon assembling the allocation of the pool of shared resources of the WCC devices and in response by one of the WCC devices, the WCC device making the request being the WCC device that requires to process the processing task utilizing the pool of shared resources.

A6. The wireless coded communication (WCC) device of claim A1, wherein two or more of the WCC devices contributing to the pool of shared resources form a dynamic local cloud (DLC), the dynamic local cloud processing the resource sharing process jointly among two or more WCC devices.

A7. The wireless coded communication (WCC) device of claim A6, wherein the dynamic local cloud is formed by one or more WCC devices and wired or wireless devices having access to a local wireless network, wherein the local wireless network is defined by one of a wired or wireless router, a repeater, a cellular node, a wireless mesh network device, a WiFi device, a Bluetooth device, or combinations thereof.

A8 The wireless coded communication (WCC) device of claim A7, wherein a wireless access code for connecting to the dynamic local cloud is received and stored to the memory of the WCC device and other WCC devices.

A9. The wireless coded communication (WCC) device of claim A1, wherein the wireless chip is a WiFi chip or a Bluetooth chip.

A10. The wireless coded communication (WCC) device of claim 1, wherein the resource sharing process is integrated with or is part of an operating system (OS) executed by each WCC device.

A11. The wireless coded communication (WCC) device of claim A1, wherein the discovery process is configured to interrogate a network to identify any connected WCC devices or computing devices that are respectively able to process the resource sharing process.

A12. The wireless coded communication (WCC) device of claim A11, wherein the network is or is part of one or more of the Internet, a local network, a wireless network, a wireless mesh network, a cell network, a weave network, a wireless weave network, a WiFi network, a Bluetooth network, a local area network (LAN), a wide area network (WAN), a fiber optic network, a distributed network, a wired network, a hybrid wired and wireless network, a proprietary network, a low power network, a transmission line network, a backbone network, an Ethernet network, a Fibre Channel network, a cable network, a wired network, a conductor network, a hybrid network, a repeater node network, a repeater and end-node network, a node network, a server network, a peer-to-peer network, a global network, a regional network, a home network, a business network, a private network, or combinations of two or more thereof.

A13. The wireless coded communication (WCC) device of claim A11, wherein the network uses an internet protocol (IP) address space that is divided between a plurality of nodes.

A14. The wireless coded communication (WCC) device of claim A13, wherein the divided IP space is dynamically adjusted to ensure a supply of IP addresses for each of the nodes, wherein dynamic adjustment enables allocation and freeing of IP addresses locally to each node without synchronous interaction with the nodes, and wherein the dynamic adjustment enables inherent partition tolerance.

A15. The wireless coded communication (WCC) device of claim A14, wherein the IP address generation includes a CRDT to define a shared identification a space that shares the IP addresses.

B1. A wireless coded communication (WCC) device, comprising,
  a wireless chip; a memory interfaced with the wireless chip; a power storage cell;
  a microprocessor interfaced the wireless chip, the memory, and the power storage cell, wherein the memory is programmed with a primary function that is executed by the microprocessor; wherein the memory is programmed with a resource sharing process, the resource sharing process is configured to, (i) process discovery of the WCC device by other WCC devices, (ii) process allocation of a portion of the memory and a portion of processing power of the microprocessor to a pool of shared resources to be managed by the resource sharing process of the WCC and the other WCC devices; and (iii) process execution of a processing task requested by one of the other WCC devices, the processing task utilizing the resource sharing process of the WCC devices to execute a request to execute the processing task as requested by one of the WCC devices and a processing result of the processing task is routed back to WCC that issued the request; wherein issuing the request for execution of the processing task by one of the WCC devices initiates the discovery process of the resource sharing process, the discovery process is configured trigger a wireless signaling algorithm that interrogates a network to identify any connected WCC devices that are capable of processing the resource sharing process; wherein the resource sharing process executed by each of the WCC devices is a transient process that occurs upon assembling the allocation of the pool of shared resources of the WCC devices and in response to one of the WCC devices, wherein the WCC device making the request being the WCC device that requires to process the processing task utilizing the pool of shared resources.

B2. A wireless coded communication (WCC) device of claim B1, wherein the resource sharing process operates with or is interfaced with an operating system (OS) of the WCC devices.

B3. A wireless coded communication (WCC) device of claim B2, wherein the network is a wireless mesh network, and the wireless mesh network communicates with the Internet via one or more of the WCC devices.

B4. A wireless coded communication (WCC) device of claim B1, wherein each one of the WCC devices is a respective Internet of Things (IOT) device, and each IOT device is configured to perform its respective primary function.

B5. A wireless coded communication (WCC) device, comprising, a wireless chip; a photodetector; a memory interfaced with the wireless chip; a power storage cell; a microprocessor interfaced the wireless chip, the memory, the photodetector and the power storage cell, wherein the memory is programmed with an authentication process, the authentication process is configured to, (i) process discovery of the WCC device by both a router and a cloud-based service, the discovery process utilizing the photodetector of the WCC device to receive a strobed coded communication pattern from a portable display, where the strobed coded communication pattern encodes an SSID and a WIFI password credential required for the WCC device to securely connect to the router and engage in a registration process involving one or more server-hosted services. In some embodiments, NFC-based instead of optical or IR.

C1. A consumer electronic device comprising, a circuit for monitoring an AC fingerprint detected by the device, memory, a microprocessor interfaced the memory, wherein the memory is programmed with instructions to enable a microprocessor to transmit the classification of AC fingerprint to an end node; wherein the end node may compare the fingerprint against a known pattern of fingerprint activity for the device and determine a status condition associated with the device.

C2. The consumer electronic device of claim C1, wherein the detected fingerprint is from another device plugged into a shared electrical line.

C3. The consumer electronic device of claim C1, wherein the detected fingerprint is from the reporting device.

C4. The consumer electronic device of claim C1, wherein the detected fingerprint is compared against a lookup table of fingerprint patterns to detect whether a device is operating in a fault or dangerous condition.

C5. The consumer electronic device of claim C1, wherein the detected fingerprint is compared against a lookup table of fingerprint patterns to detect whether a device is operating in a condition associated with an event which may be triggered in connection with detection of the condition.

C6. The consumer electronic device of claim C1, wherein the detected fingerprint is compared against a lookup table of fingerprint patterns to detect whether a device is operating in a condition associated with an event which requires synchronization with another event.

C7. The consumer electronic device of claim C1, wherein the detected fingerprint is analyzed to determine whether a device is trending to reach an operating state, an estimate of time delay is made to forecast when in the future the operating condition may be met, and wherein a another process, service or function may be subsequently started at an offset time from the current time to ensure that the other process, service or function starts at or near the time where the operating state is actually reached.

C8. A device of claim C1 where in the device further includes a wireless transmitter and the transmission of data occurs over wireless.

D1. A method of synchronizing a second event so that it starts up upon a first event reaching a known state, when both events have ad-hoc time attributes associated thereto, comprising:
(a) Tracking the progress of a first event over time to determine a forecasted time in the future in which the first event will reach a known state, (b) Determining a time offset in lag time as required for the second device, service or function to startup, (c) Subtracting the lag time from the second event from the forecasted time in which the first event is scheduled to be at the known condition for which synchronization is required, (d) Triggering the start of the second event at the time computed in step (c).

D2. The method of claim D1 wherein the step (b) may further include performing a test on the second device, service or function to gauge how long it takes to reach the necessary condition of startup of the second device, service or function at a time period in advance of actually starting up the event, to gauge an estimate of time the second event may be taking to startup.

D3. The method of claim D2 wherein the step (b) may further include performing a test of a model startup of the second device, process or service that should mimic the performance of the actual startup event, to gauge an estimate of time the actual second event may take to startup.

D4. The method of claim D1 wherein the step (b) may further include performing network QOS test or another test.

E1. A method of synchronizing a second event so that it starts up upon a first event reaching a known state, when both events have ad-hoc time attributes associated thereto, comprising:
(a) Tracking the progress of a first event over time to determine a forecasted time in the future in which the first event will reach a known state, (b) Determining a time offset in lag time as required for the second device, service or function to complete an operation, (c) Subtracting the lag time from the second event from the forecasted time in which the first event is scheduled to be at the known condition for which synchronization is required, (d) Triggering the start of the second event at the time computed in step c.

E2. The method of claim E1 wherein the step (b) may further include performing a test on the second device, service or function to gauge how long it takes to reach the necessary condition to complete an operation of the second device, service or function at a time period in advance of actually starting up the event, to gauge an estimate of time the second event may be taking to startup, wherein the test may supply arguments or data inputs to the device, service or function that reflect a likely set of arguments or data inputs that will be submitted in the event in which synchronization is required.

E3. The method of claim E1 wherein the step (b) may further include performing a test of a model startup of the second device, process or service that should mimic the performance of the actual startup event, to gauge an estimate of time the actual second event may take to complete an operation.

E4. The method of claim E1 wherein the step (b) may further include performing network QOS test or another test.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. The apparatus may be housed with insulated housing to limit the volume of sound that may occur in some embodiments during an activation cycle. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A device, comprising,
a persistent memory,
a flat antenna,
a microcontroller; and
a power source configured to generate power in response to energy harvesting that is facilitated using the flat antenna, the power being transferred to a power storage of the device such that when the power storage has an amount of power the microcontroller performs processing of a part of a task resulting in state data related to the task stored to the persistent memory in response to a first cycle of energy harvesting, wherein in response to one or more additional cycles of energy harvesting, the device continues performance of the task by retrieving the state data for the part of the task from the persistent memory and resulting in assembly of a payload that is sent to an end node via a wireless transmission.

2. The device of claim 1, wherein the end node is one of a processing entity local to the device or a processing entity that is remote to the device, the processing entity that is remote to the device includes one or more processing entities, and one of said one or more processing entities include a cloud processor and cloud storage.

3. The device of claim 2, wherein the processing entity local to the device is a hub, and the hub acts as a gateway for bi-directional communication to a cloud computing resource, the cloud computing resource storing an identity related to the device as one being provisioned to operate with an account associated with the cloud computing resource.

4. The device of claim 1, wherein the payload is transmitted to a hub, the hub acting as a gateway for bi-directional communication to a cloud computing resource, the cloud computing resource storing an identity related to the device as one being provisioned to operate with an account associated with the cloud computing resource.

5. The device of claim 1, wherein the payload is transmitted to a cloud computing resource, the cloud computing resource storing the state data of the device in a memory associated with the cloud computing resource.

6. The device of claim 1, wherein the payload that is sent to the end node is read from the persistent memory of the device.

7. The device of claim 1, wherein a cloud computing resource causes the device to receive an update related to updated state processed by the cloud computing resource for the device.

8. The device of claim 7, wherein the updated state relates to a software patch, or relates to a desired state of the device, or relates to a security policy, or relates to a task, or relates to another device, or relates to a group of DLC devices or nodes, or relates to isolated process in a container, or relates to a device application, or relates to a user, or relates to a location, or relates to an image, or relates to a sound, or relates to voice command, or relates to a weight, or relates to a temperature, or relates to a sensed value, or relates to a network trojan, or relates to identification of a virus, or relates to a service, or relates to a kernel, or relates to a power level, or relates to a proximity, or relates to a challenge, or relates to a response, or relates to a wireless energy, or relates to an electromagnetic energy, or relates to access control, or relates to a process, or relates to a process involving a trust liaison.

9. The device of claim 7, wherein the cloud computing resource registers an identity related to the device, and said cloud computing resource is configured to execute a process responsive to a request from a requesting device and as a proxy for the device, the cloud computing resource is configured store updates to the state data of the device reflecting the process executed as the proxy for the device; wherein the cloud computing resource is configured to transmit to the device the updates to the state data when the device has power to receive the updates.

10. The device of claim 1, wherein the payload is transmitted using an MQTT protocol.

11. The device of claim 10, wherein the payload is transmitted as one or more messages using the MQTT protocol, wherein the one or more messages are transmitted during a MQTT connection.

12. The device of claim 4, wherein the communication for the wireless transmission uses bi-directional communications that implements X.509 certificate based authentication or token based authentication using a trust liaison.

13. The device of claim 1, wherein the device includes an input, wherein the microcontroller processes the input and selects and runs one or more code routines based the power available during each cycle of energy harvesting.

14. The device of claim 1, wherein the energy harvesting is based on capturing ambient electromagnetic energy using the flat antenna of the device and the power source.

15. The device of claim 1, wherein additional energy harvesting is performed by the device, based on capturing vocal energy from a human voice spoken to the device; or is performed by the device by sensing manipulation of the device or an input of the device.

16. The device of claim 1, wherein additional energy harvesting is performed while the device captures a user input from mechanical actuation of the input.

17. A device, comprising,
   a persistent memory;
   a microcontroller; and
   a power source configured to generate power in response to energy harvesting, the power being transferred to a power storage of the device such that when the power storage has an amount of power the microcontroller performs processing of a part of a task and producing state data related to the processing of the task stored to the persistent memory during a first cycle of energy harvesting;
   wherein in response to one or more additional cycles of energy harvesting, the device continues performance of the task, the continued processing uses at least part of the state data retrieved from the persistent memory, the continued processing of the task results in assembly and transmission of one or more payloads to an end node.

18. The device of claim 17, wherein the one or more payloads are assembled and transmitted by the device over time, wherein the one or more payloads include information used to predict a scenario, the scenario is based in part on data captured by a sensor coupled to the device.

19. The device of claim 18, wherein at least part of the payloads are transmitted using an MQTT protocol, and said prediction of the scenario is performed using a cloud-based service.

20. The device of claim 18, wherein the prediction of the scenario involves an identification of a person or a movement of the device, or a movement of another device, or relates to a user, or relates to a location, or relates to an image, or relates to a sound, or relates to voice command, or relates to a weight, or relates to a temperature, or relates to a sensed value, or relates to identification of a blood condition, or relates to identification of a virus, or relates to a service, or relates to a power level, or relates to a frequency, or relates to a proximity, or relates to a challenge, or relates to a response, or relates to access control.

* * * * *